(12) United States Patent
Matsuyama et al.

(10) Patent No.: US 8,753,016 B2
(45) Date of Patent: Jun. 17, 2014

(54) ROLLING BEARING, GREASE SUPPLY SYSTEM, SPINDLE UNIT, GREASE SUPPLY METHOD, AND GREASE SUPPLY PROGRAM

(75) Inventors: Naoki Matsuyama, Kanagawa (JP); Saburou Azumi, Kanagawa (JP); Yuu Koiwa, Kanagawa (JP); Mitsuho Aoki, Kanagawa (JP); Yasushi Morita, Kanagawa (JP); Yoshifumi Inagaki, Kanagawa (JP); Sumio Sugita, Kanagawa (JP); Ken Inaba, Kanagawa (JP); Kenji Yakura, Kanagawa (JP)

(73) Assignee: NSK Ltd., Tokyo (JP)

( * ) Notice: Subject to any disclaimer, the term of this patent is extended or adjusted under 35 U.S.C. 154(b) by 1399 days.

(21) Appl. No.: 10/522,669

(22) PCT Filed: Jul. 29, 2003

(86) PCT No.: PCT/JP03/09612
§ 371 (c)(1),
(2), (4) Date: Jan. 12, 2006

(87) PCT Pub. No.: WO2004/011817
PCT Pub. Date: Feb. 5, 2004

(65) Prior Publication Data
US 2006/0239598 A1 Oct. 26, 2006

(30) Foreign Application Priority Data

| Jul. 29, 2002 | (JP) | P2002-220015 |
| Aug. 2, 2002 | (JP) | P2002-226233 |
| Aug. 30, 2002 | (JP) | P2002-253082 |
| Mar. 14, 2003 | (JP) | P2003-070338 |
| Apr. 15, 2003 | (JP) | P2003-110788 |
| Apr. 15, 2003 | (JP) | P2003-110789 |
| Apr. 17, 2003 | (JP) | P2003-113421 |
| Apr. 25, 2003 | (JP) | P2003-122551 |
| Jul. 3, 2003 | (JP) | P2003-270786 |
| Jul. 15, 2003 | (JP) | P2003-274546 |
| Jul. 24, 2003 | (JP) | P2003-279135 |
| Jul. 24, 2003 | (JP) | P2003-279306 |
| Jul. 24, 2003 | (JP) | P2003-279345 |
| Jul. 25, 2003 | (JP) | P2003-280365 |

(51) Int. Cl.
*F16C 33/66* (2006.01)

(52) U.S. Cl.
USPC ............ 384/471; 384/473; 384/475; 384/504

(58) Field of Classification Search
USPC ......... 384/369, 398, 399, 400, 475, 471, 473, 384/504
See application file for complete search history.

(56) References Cited

U.S. PATENT DOCUMENTS 5,423,399 A * 6/1995 Smith et al. .................... 384/471
5,711,615 A 1/1998 Stitz et al.

FOREIGN PATENT DOCUMENTS

| EP | 1197702 A1 | 4/2002 |
| EP | 1482192 A1 | 12/2004 |

(Continued)

OTHER PUBLICATIONS

Sanei Tech Inc. "EFD liquid chemical discharge system catalog".

(Continued)

*Primary Examiner* — William C Joyce
(74) *Attorney, Agent, or Firm* — Sughrue Mion, PLLC

(57) ABSTRACT

A spindle unit comprises a rolling bearing including an outer ring having an outer ring raceway on an inner peripheral surface, an inner ring having an inner ring raceway on an outer peripheral surface, and rolling elements provided rollably between the outer ring raceway and the inner ring raceway, whereby a spindle is borne rotatably in a housing, and a grease supply system for supplying a grease to an inside of the rolling bearing, wherein the grease supply system supplies the grease such that a supply amount in one shot is set to 0.004 cc to 0.1 cc.

5 Claims, 110 Drawing Sheets

(56) References Cited

FOREIGN PATENT DOCUMENTS

| | | |
|---|---|---|
| JP | 56-59317 U | 5/1981 |
| JP | 57-150697 U | 9/1982 |
| JP | 59-26693 A | 2/1984 |
| JP | 59-211706 A | 11/1984 |
| JP | 61-85719 U | 6/1986 |
| JP | 63-53397 A | 3/1988 |
| JP | 63-180726 U | 11/1988 |
| JP | 63-285328 A | 11/1988 |
| JP | 64-67331 A | 3/1989 |
| JP | 2-57468 A | 2/1990 |
| JP | 2-78247 U | 6/1990 |
| JP | 2-208198 A | 8/1990 |
| JP | 3-4098 A | 1/1991 |
| JP | 4-132220 A | 5/1992 |
| JP | 4-90770 U | 8/1992 |
| JP | 5-8043 U | 2/1993 |
| JP | 5-9849 U | 2/1993 |
| JP | 5-87293 A | 4/1993 |
| JP | 5-45245 U | 6/1993 |
| JP | 6-33942 A | 2/1994 |
| JP | 6-35653 A | 2/1994 |
| JP | 6-35659 A | 2/1994 |
| JP | 6-29742 Y2 | 8/1994 |
| JP | 11-141559 A | 5/1995 |
| JP | 7-506896 A | 7/1995 |
| JP | 8-309643 A | 11/1996 |
| JP | 9-68231 A | 3/1997 |
| JP | 9-108986 A | 4/1997 |
| JP | 9-303683 A | 11/1997 |
| JP | 9-317778 A | 12/1997 |
| JP | 11-201173 A | 7/1999 |
| JP | 11-270789 A | 10/1999 |
| JP | 11-324882 A | 11/1999 |
| JP | 2000-266065 A | 9/2000 |
| JP | 2000-288870 A | 10/2000 |
| JP | 2001-90739 A | 4/2001 |
| JP | 3167034 B2 | 5/2001 |
| JP | 2001-241451 A | 9/2001 |
| JP | 2001-263580 A | 9/2001 |
| JP | 2001-315041 A | 11/2001 |
| JP | 2002-130589 * | 5/2002 |
| JP | 2002-130590 A | 5/2002 |
| JP | 2002-192442 A | 7/2002 |
| JP | 2002-206528 A | 7/2002 |
| JP | 2002-239867 A | 8/2002 |
| JP | 2002-361540 A | 12/2002 |
| JP | 2003-49850 A | 2/2003 |
| JP | 2003-65494 A | 3/2003 |
| JP | 2003-74567 A | 3/2003 |
| JP | 2003-83343 A | 3/2003 |
| JP | 2003-083498 A | 3/2003 |
| JP | 2003-113846 A | 4/2003 |
| JP | 2003-139294 A | 5/2003 |
| WO | WO 94/21932 A2 | 9/1994 |
| WO | 01/63132 A2 | 8/2001 |

OTHER PUBLICATIONS

ING Corporation "Automatic Continuous Grease Feeder made in Germany".
Chinese Office Action dated Feb. 22, 2008.
Japanese Office Action dated Mar. 26, 2008.
Japanese Office Action dated Apr. 2, 2008.
Japanese Office Action for JP-A-No. 2003-270786 dated Nov. 21, 2007.
Extended European Search Report dated Jun. 8, 2010 in counterpart European Application No. 03771409.4.
European Office Action dated Feb. 17, 2011 in counterpart European Application No. 03771409.4.

* cited by examiner

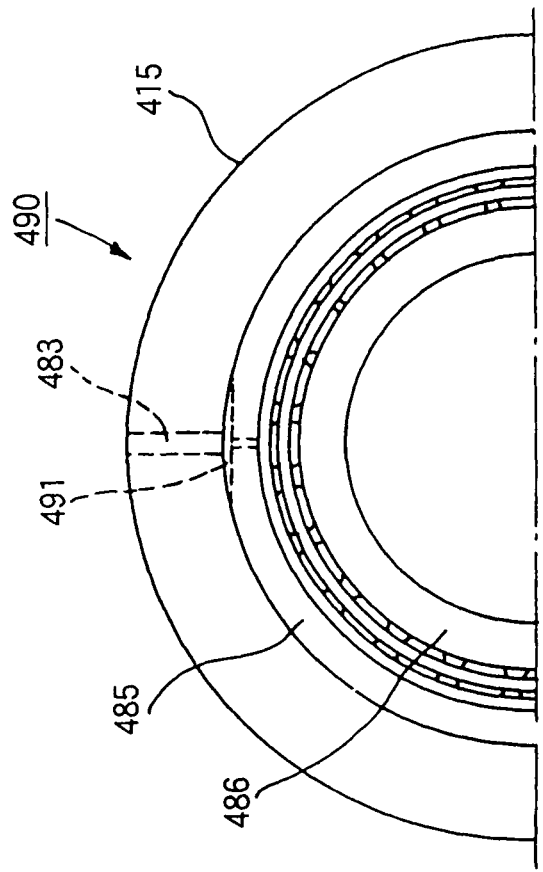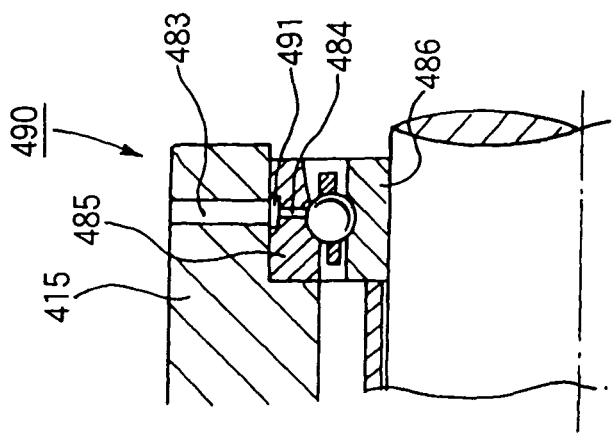

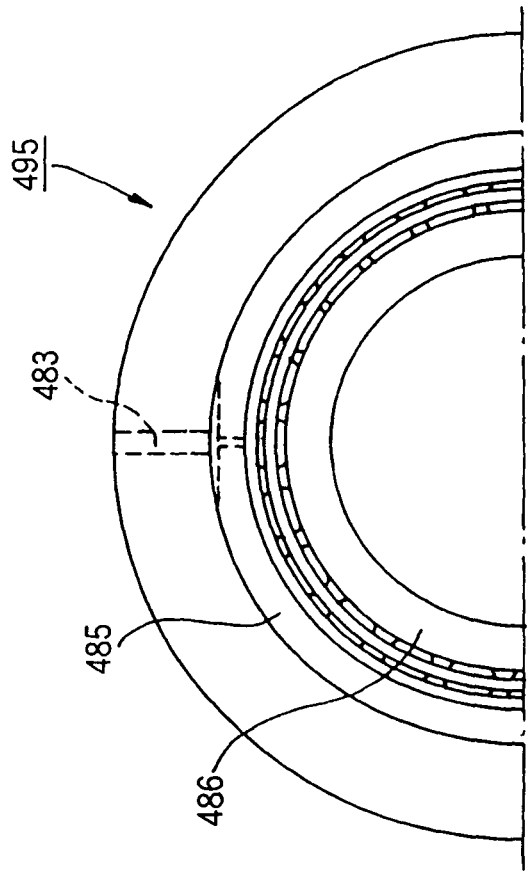
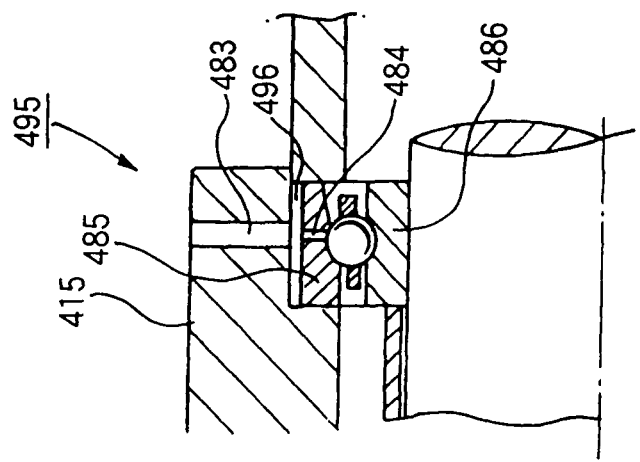
FIG. 37 (a)
FIG. 37 (b)

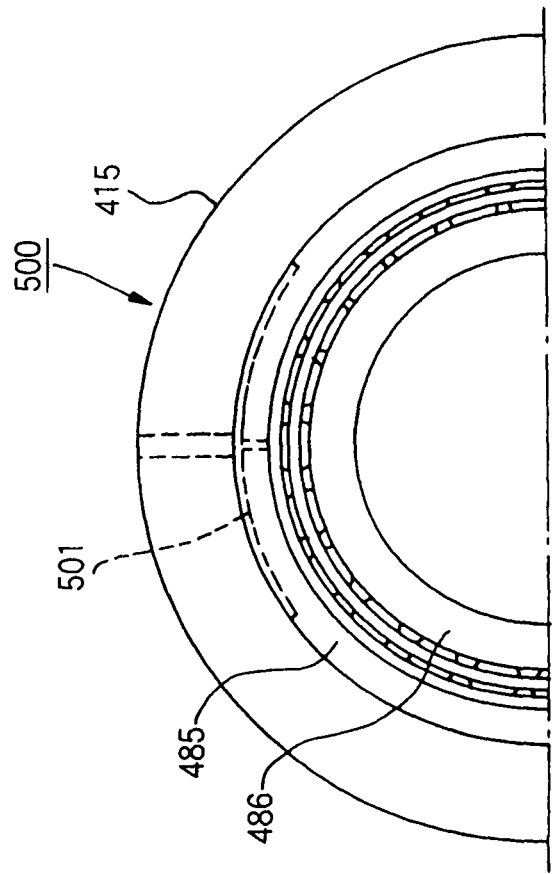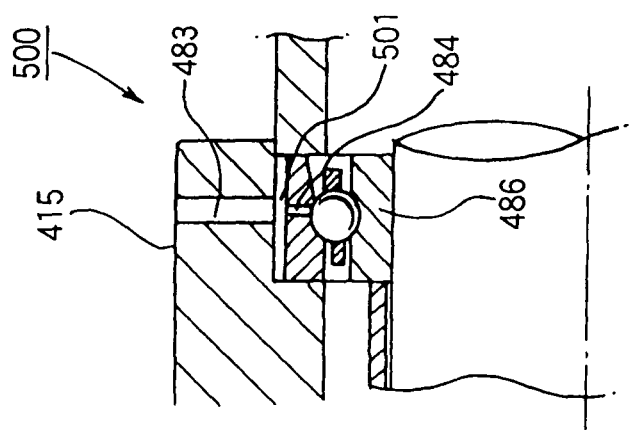

FIG. 60

| NAME | OPERATION TIMING AND MONITORING TIME | OPERATION | CONTENTS |
|---|---|---|---|
| SOLENOID VALVE | ON (T1) | — | — |
| AIR PRESSURE SENSOR | ON (T2, T3) | OFF | REDUCTION OF THE AIR PRESSURE |
| GREASE PRESSURE SENSOR | ON (T4, T5) | OFF | REDUCTION OF THE GREASE TANK PRESSURE |
| LEVEL SENSOR | ON (T6) | ON | LACK OF A RESIDUAL AMOUNT IN THE GREASE TANK |

FIG. 63

| NAME | OPERATION TIMING AND MONITORING TIME | OPERATION | CONTENTS |
|---|---|---|---|
| SECOND SOLENOID VALVE | ON (T1) | — | — |
| FIRST SOLENOID VALVE | ON (T7) | — | — |
| AIR PRESSURE SENSOR | ON (T2, T3) | OFF | REDUCTION OF THE AIR PRESSURE |
| GREASE PRESSURE SENSOR | ON (T4, T5) | OFF | REDUCTION OF THE GREASE TANK PRESSURE |
| LEVEL SENSOR | ON (T6) | ON | LACK OF A RESIDUAL AMOUNT IN THE GREASE TANK |

FIG. 65

| NAME | OPERATION TIMING AND MONITORING TIME | OPERATION | CONTENTS |
|---|---|---|---|
| SECOND SOLENOID VALVE | T1 | ON | — |
| FIRST SOLENOID VALVE | T7 | ON | — |
| FIRST AIR PRESSURE SENSOR | T2, T3 | ON | REDUCTION OF THE AIR PRESSURE |
| SECOND AIR PRESSURE SENSOR | T8, T9 | ON | REDUCTION OF THE AIR PRESSURE |
| GREASE PRESSURE SENSOR | T4, T5 | ON | REDUCTION OF THE GREASE TANK PRESSURE |
| LEVEL SENSOR | T6 | ON | LACK OF A RESIDUAL AMOUNT IN THE GREASE TANK |

FIG. 85

| TEST NO. | 1 | 2 | 3 |
|---|---|---|---|
| CONSTANT PRELOAD (N) | 1870 | 1870 | 1870 |
| AMOUNT INITIALLY SEALED OF GREASE (%) | 1 | 5 | 15 |
| AMOUNT INITIALLY SEALED OF GREASE (cc) | 0.15 | 0.75 | 2.25 |
| COOLING (COOLING OIL TEMPERATURE) | APPLIED (25°C) | APPLIED (25°C) | APPLIED (25°C) |
| BEARING TEMPERATURE (°C) | 42 | 42 | 42 |
| ENDURANCE TIME (hr) | 28.5 | 118.5 | 260 |

FIG. 87

| TEST NO. | 1 | 4 | 5 |
|---|---|---|---|
| CONSTANT PRELOAD (N) | 1870 | 1870 | 1870 |
| AMOUNT INITIALLY SEALED OF GREASE (%) | 1 | 1 | 1 |
| AMOUNT INITIALLY SEALED OF GREASE (cc) | 0.15 | 0.15 | 0.15 |
| COOLING (COOLING OIL TEMPERATURE) | APPLIED (25°C) | APPLIED (20°C) | NOT APPLIED |
| BEARING TEMPERATURE (°C) | 42 | 30 | 62 |
| ENDURANCE TIME (hr) | 28.5 | 56 | 8 |

FIG. 89

| TEST NO. | 2 | 6 | 7 | 8 |
|---|---|---|---|---|
| CONSTANT PRELOAD (N) | 1870 | 2200 | 2600 | 3000 |
| AMOUNT INITIALLY SEALED OF GREASE (%) | 5 | ← | ← | ← |
| AMOUNT INITIALLY SEALED OF GREASE (cc) | 0.75 | ← | ← | ← |
| COOLING (COOLING OIL TEMPERATURE) | APPLIED (25°C) | ← | ← | ← |
| BEARING TEMPERATURE (°C) | 42 | ← | ← | ← |
| ENDURANCE TIME (hr) | 118.5 | 56 | 45 | 29 |

FIG. 112 (a)

|  | PRIOR ART | PRESENT INVENTION |
|---|---|---|
| CONTINUOUS OPERATION TIME | ABNORMAL TEMPERATURE RISE IN 45 HOURS | NO ABNORMAL TEMPERATURE RISE AFTER 100 HOURS |
| RESIDUAL AMOUNT OF THE GREASE IN THE BEARING | REMAINED BY 70% OF THE BEARING SPACE VOLUME | REMAINED BY 30 TO 40% OF THE BEARING SPACE VOLUME |

FIG. 112 (b)

TEST CONDITIONS

| INNER DIAMETER OF THE BEARING | 65mm |
|---|---|
| THE NUMBER OF ROTATION OF THE SPINDLE | 20000rpm |
| TEST TIME | 100 HOURS |
| LUBRICANT | LUBRICANT: GREASE INITIALLY SEALED AMOUNT: 15% OF THE BEARING SPACE VOLUME |
|  | SUPPLY AMOUNT: 0.02cc/7.5min (PER BEARING) |

FIG. 117 (a)   PRIOR ART
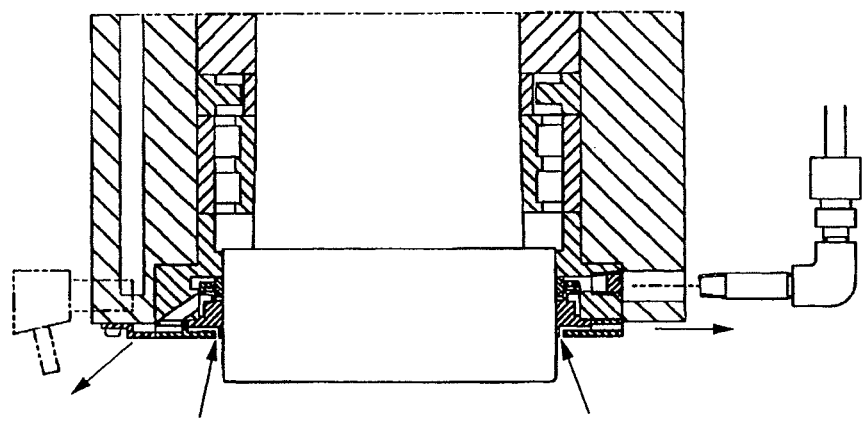
FIG. 117 (b)   PRIOR ART
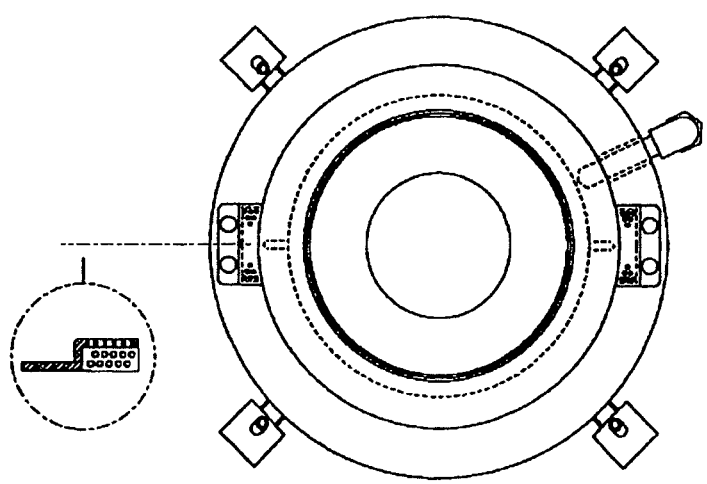

ROLLING BEARING, GREASE SUPPLY SYSTEM, SPINDLE UNIT, GREASE SUPPLY METHOD, AND GREASE SUPPLY PROGRAM

TECHNICAL FIELD

The present invention relates to a rolling bearing for supporting a spindle of a machine tool, a high speed motor, or the like, a grease supply system for lubricating the rolling bearing with grease, and a spindle unit using the same. Also, the present invention relates to a grease supply method and a grease supply program of supplying the grease.

BACKGROUND ART

In order to improve a machining precision, the good characteristics in regarding to the vibration, the noise, etc. are required of the bearing for the machine tool spindle. Also, the grease lubrication that is easy to handle and is effective in an environmental aspect and a cost aspect is required of the bearing for the machine tool spindle to attain a high-speed running performance and a long lifetime.

It is normal that the grease-lubricated rolling bearing for use in the machine tool spindle is lubricated merely with the initially sealed grease not to generate a heat. When the bearing is run at a high speed in the initial stage of the grease filling without the running-in trial of the grease, an abnormal heat generation is caused owing to the jamming or the churning resistance of the grease. Therefore, the grease is brought into its optimum state by executing the running-in trial for several hours.

Recently, the running speed of the machine tool spindle is increased more and more. It is not unusual for the bearing for bearing the spindle to be used in the environment of dmN (=(bearing bore diameter+bearing outside diameter)÷2×rotation speed (rpm)) one million or more. The grease-lubricated rolling bearing tends to have a short lifetime in the high-speed running rather than the rolling bearing that is lubricated with the oil such as the oil air, the oil mist, or the like. In the case of the grease lubrication, the bearing is seized up by the grease degradation prior to the end of the rolling contact fatigue life of the bearing. In the case where the number of revolution is extremely high, the seizure of the bearing is caused in an early stage because the grease is degraded in a short time or the formation of the oil film is insufficient.

For this reason, in order to achieve an enhanced lifetime of the bearing, the method of forming concave portions in the inner ring of the bearing, then storing previously the grease in these concave portions, and then supplying the stored grease to the bearing has been proposed (for example, see JP-A-1-67331, JP-A-4-132220, and JP-A-6-35659).

Also, in order to achieve an enhanced lifetime of the bearing, the method of forming concave portions in the spindle into which the bearing is fitted, then storing previously the grease in these concave portions, and then supplying the grease stored in the concave portions to the bearing has been proposed (for example, see JP-A-6-35653).

Also, in order to overcome such problem, in JP-A-2003-113846, the applicant of this application has proposed the grease-lubricated rolling bearing in which the supply hole is provided in the outer ring and then the grease is supplied via the supply hole in such a manner that a supply amount of grease is set to 0.1 to 4% of a bearing space volume. According to this rolling bearing, the abnormal temperature rise of the bearing can be suppressed in running and thus the generation of the seizure of the bearing can be prevented. Therefore, according to the rolling bearing set forth in JP-A-2003-113846, execution of the running-in trial is not needed because the abnormal temperature rise can be avoided.

In this case, the rolling bearing set forth in JP-A-2003-113846 can be constructed not to generate the abnormal temperature rise by supplying the grease in such a way that a supply amount of grease is set to 0.1 to 4% of the bearing space volume. However, a supply amount of grease is set largely, it is possible that a temperature pulsation is generated.

The evaluation test was made to estimate this temperature pulsation. In the angular contact ball bearing having the bore diameter of 65 mm, it was found that, if the grease in excess of 1% of the bearing space volume (1% of the bearing space volume corresponds to 0.15 cc) is fed with one shot, the temperature pulsation of about 1° C. to 2° C. is generated in an instant when the grease is supplied.

This temperature pulsation does not matter in the normal application that does not demand a precision. However, in the rolling bearing used in the spindle of the machine such as the machine tool oriented toward the mold application, or the like that demands strictly a precision, there is a possibility that the temperature pulsation changes a length of the spindle to exert an influence upon a machining precision.

Also, in order to prevent the excessive feed of the grease during the grease supply, the grease feeding unit for supplying the additional grease only when the abnormality of the bearing is sensed has been proposed (see JP-A-63-53397 and Japanese Patent No. 3167034).

In this case, since the above unit supplies the additional grease after the abnormality was generated in the bearing, it is possible that the bearing has already been damaged at a point of time when the additional grease is supplied. The damage of the bearing causes a reduction in a run-out precision of the machine tool, and thus the machining precision of the machine tool is lowered. Therefore, in order not to cause even slight damage due to the lubrication failure, the normal grease supply system supplies the grease at a predetermined supply interval based on the severest conditions in the environment in which the bearing is used.

However, in the case where the supply system is set to supply the grease at a predetermined supply interval based on the severest conditions in the environment in which the bearing is used, such supply system supplies the excessive grease to the inside of the bearing even when the bearing using conditions are not so severe. Thus, there exists such a problem that the grease is filled excessively in the bearing.

For example, according to the experiment performed by the applicant, when the spindle of 65 mm diameter supported by the bearing is rotated at a rotation speed 22000 min$^{-1}$ without the grease feeding, degradation of the grease was caused in 100 hours and thus the bearing was damaged whereas, when the same spindle is rotated at a rotation speed 18000 min$^{-1}$ without the grease feeding, the bearing was damaged in 1000 hours that is ten times the above case. As a result, the grease supply executed every predetermined interval is ineffective when the using conditions are not severe, which results in a wasteful increase in the supply number of times. In addition, the grease supplied excessively in response to the increase in the supply number of times makes a bearing temperature unstable.

Also, in the above setting, the grease is supplied irrespective of the operating conditions of the bearing. Thus, the grease is also supplied steadily into the bearing that is stopped. Therefore, when the stopped bearing is operated again, the churning resistance of the grease is increased by the added grease and thus a sudden temperature rise is caused.

In addition, as the system for monitoring the discharge condition of the lubricating oil in the lubricating system, systems described in the following are known.

1. The system that stores the lubricating oil in a tank (pump) in the lubricating system, and then monitoring whether or not a pressure of the lubricating oil is within an available pressure range of the lubricating system connected to the valve, by sensing the pressure of the lubricating oil discharged into the valve (fixed-displacement piston pump) (see JP-A-2003-113846).

2. The system that monitors whether or not the lubricating oil is discharged, by sensing a motion of a piston in the mechanical fixed-displacement piston pump (see JP-A-5-87293).

3. The system that heats a part of the lubricating oil that is discharged from the mechanical fixed-displacement piston pump into the piping, and then monitoring the discharge condition of the lubricating oil by sensing a flow of the heated lubricating oil (see JP-UM-B-6-29742).

4. The system that monitors the discharge condition of the grease by sensing a temperature generated when the grease is supplied to the bearing unit (see JP-A-11-270789).

As shown in FIG. 113, in a grease supply system 1640, an air is supplied to a mechanical fixed-displacement piston pump 1642 when a valve (solenoid valve) 1641 is turned ON, and then a fixed displacement piston 1642a is operated to discharge a grease Gr into a piping 1644 that supplies the grease to a bearing 1643. Then, the grease is supplied to the bearing unit in the spindle. Also, when the valve (solenoid valve) 1641 is opened, the air is supplied into a grease tank 1645 to apply a pressure to an in-tank piston 1646.

The air is not supplied to the mechanical fixed-displacement piston pump 1642 when the valve (solenoid valve) 1641 is turned OFF, and then the fixed displacement piston 1642a returns to its home position. At this time, the air used to apply the pressure to the piston in the grease tank is not released because of the presence of a resistance body 1649 provided to the grease tank, so that the grease Gr in the grease tank 1645 is supplied into the mechanical fixed-displacement piston pump 1642.

A minute amount of grease can be supplied intermittently into the bearing unit in a fixed quantity by repeating above operations.

However, when the grease is exhausted in the grease tank that stores the grease to be supplied to the mechanical fixed-displacement piston pump, the grease is not supplied from the mechanical fixed-displacement piston pump. Thus the lubrication failure is generated in the bearing and then the bearing is seized up.

Also, in the case where, when the piston of the mechanical fixed-displacement piston pump is returned, no pressure is applied to the grease in the grease tank because the solenoid valve is turned OFF to feed the grease to the mechanical fixed-displacement piston pump, the grease is not supplied from the grease tank to the mechanical fixed-displacement piston pump. Thus, the grease is not discharged from the mechanical fixed-displacement piston pump. Therefore, there was such a problem that the lubrication failure is generated in the bearing and then the bearing is seized up.

Also, as the grease supply system for use in the general industry, a grease supply system 1650 shown in FIG. 114 gives a resistance-type pneumatically-operated pump type system that supplies the grease by using an external energy given from an external air supply source.

In the grease supply system 1650, the air supply source is connected to one end portion of a grease tank 1651 to communicate with the same and also a grease supply piping 1652 is connected to the other end portion of the grease tank 1651 to communicate with the same. A base end portion of the grease supply piping 1652 is communicated with a discharge port 1653, and a nozzle 1654 is provided to a top end portion of the grease supply piping. The nozzle 1654 is arranged on the side portion of a bearing unit 1655 into which the ball bearing, the cylindrical roller bearing, or the like is installed.

In such grease supply system 1650, when a pressure is applied to a piston 1656 in the grease tank 1651 for a predetermined time, a grease 1657 reserved in the grease tank 1651 is fed to the nozzle 1654 through the discharge port 1653 and the grease supply piping 1652 and then is discharged into a bearing space of the bearing unit 1655 from the nozzle 1654 (for example, see Sanei Tech Inc. "EFD liquid chemical discharge system catalog" (page 4 to page 17)).

As still another configuration of the grease supply system, a grease supply system 1660 shown in FIG. 115 has the similar configuration to that of the grease supply system 1650 shown in FIG. 114, and gives a resistance-type pneumatically-operated pump type system that supplies the grease by using an external energy given from an external air supply source.

In the grease supply system 1660, the air supply source is connected to one end portion of a grease tank 1661 to communicate with the same and also a grease supply piping 1662 is connected to the other end portion of the grease tank 1661 to communicate with the same. A base end portion of the grease supply piping 1662 is communicated with a discharge port 1663 of the grease tank 1661, and a top end portion is connected to a grease supply hole 1667, which is formed in the radial direction of an outer ring 1666 in a bearing unit 1665 into which the ball bearing, the cylindrical roller bearing, or the like is installed, to communicate with the same.

In such grease supply system 1660, when a pressure is applied to a piston 1668 in the grease tank 1661 for a predetermined time, a grease 1669 reserved in the grease tank 1661 is fed through the discharge port 1663, the grease supply piping 1662, and the grease supply hole 1667 and then is discharged into a bearing space of the bearing unit 1665 from the outside diameter portion of the outer ring through the grease supply hole 1667 (for example, see Sanei Tech Inc. "EFD liquid chemical discharge system catalog" (page 4 to page 17)).

As yet still another configuration of the grease supply system, a grease supply system 1670 shown in FIG. 116 gives a mechanically-operated pump type system that supplies the grease by using an external energy generated by a prime mover such as a motor, or the like.

In the grease supply system 1670, a motor 1672 is installed into a grease tank 1671 and an external thread 1673 is provided on an output shaft of the motor 1672. Then, an internal thread 1675 of a piston 1674 is screwed on the external thread 1673 of the output shaft.

A grease supply piping 1676 is connected to an end portion of the grease tank 1671 to communicate with the same, and also a base end portion of the grease supply piping 1676 is communicated with a discharge port 1677 of the grease tank 1671. A nozzle 1678 is provided to a top end portion of the grease supply piping. The nozzle 1678 is arranged on the side portion of a bearing unit 1679 into which the ball bearing, the cylindrical roller bearing, or the like is installed.

In such grease supply system 1670, the output shaft of the motor is turned when an electric current is supplied to the motor 1672, then the piston 1674 is moved forward in the grease tank 1671 by the turning of the output shaft, and then a pressure is applied to a grease 1680 in the grease tank 1671. Then, the grease 1680 is fed to the nozzle 1678 through the discharge port 1677 and the grease supply piping 1676, and then is discharged into a bearing space of the bearing unit 1679 from the nozzle 1678. If the grease supply piping 1676 is connected to the grease supply hole, which is formed in the bearing unit 1679 in the diameter direction of the outer ring, in the same manner as shown in FIG. 115 to communicate with the same, in some cases the grease 1680 is discharged from the outside diameter portion of the outer ring into the bearing space (for example, see the ING Corporation "Automatic Continuous Grease Feeder made in Germany" perma (page 2 to page 4)).

However, in the grease supply systems 1650, 1660, 1670, a discharge quantity of grease is largely varied according to the conditions such as an inner diameter and a length of the piping extended from the grease pressurizing portion to the bearing, a shape of the nozzle, a temperature, etc. Therefore, a time required to apply a pressure to the grease must be controlled/adjusted every time when these conditions are changed. As a result, there existed the problem that it is difficult to execute the stable discharge of the grease.

Also, in the grease supply system 1670, a residual pressure still remains for a long time in the grease remained in the piping from the grease pressurizing portion to the bearing, and thus such grease tends to flow though an amount of the grease is minute. Therefore, the flow of the grease is different between the inner diameter portion and its neighborhood and the center portion and its neighborhood in the piping. Also, if the grease is kept in such condition for a long time, component separation of the grease is caused and thus the greases having a different consistency respectively are present in the piping. As a result, there existed the problem that it is impossible to discharge the grease in a fixed quantity.

Also, in the grease supply system 1670, depending on the shape of the grease supply piping 1676 on the latter part of the discharge port 1677, the grease 1680 is not discharged because of the resistance in the pipe even though the piston 1674 is operated. Thus, it is likely that the grease tank 1671 should be expanded by the pressure.

In addition, in JP-A-2000-288870, the technology to manage the contamination such that the extraneous material such as dust, liquid, or the like does not enter into the bearing portion of the spindle unit is set forth. However, there is a limit to the lifetime of the grease even if such management is applied, and thus the long lifetime similar to that obtained when the oil air lubrication or the oil mist lubrication is applied cannot be obtained.

Also, according to the technology in JP-A-2003-113846 that the applicant of this application has already proposed, the lifetime of the grease is prolonged, nevertheless the temperature rise of the outer ring becomes 70 to 80° C. at a dmN 1,800,000 level when no cooling is applied. Thus, it is possible that the seizure of the bearing is brought about due to the oxidative degradation of the grease or the defective formation of the oil film.

In the grease for the high-speed running, the base oil having a viscosity equivalent to VG22 is often used to suppress the heat generation. In the high-speed running, Isoflex NBU15 manufactured by NOK Crewbar Inc. is normally used for the machine tool spindle. This grease has a base oil viscosity of 20 mm$^2$/s (40° C.). When a bearing temperature becomes 70 to 80° C., a kinetic viscosity of the base oil is 6 to 8 mm$^2$/s and thus it is difficult to keep the oil film.

Also, in the spindle unit of the machine tool, if the cutting fluid enters into the bearing in the spindle unit from the outside, a lubricating performance of the spindle bearing is deteriorated to cause the seizure of the bearing. Therefore, the labyrinth seal shown in FIG. 117 or the air seal is arranged as the cutting fluid entering preventing means in the cutting fluid entering area extended from a clearance between the spindle and the front end of the housing to the bearing (for example, see JP-UM-A-4-90770, JP-A-2002-239867).

However, these cutting fluid entering preventing means cannot completely prevent the entering of the cutting fluid. Therefore, as shown in FIG. 118, the bearing for sensing the cutting fluid entering into the bearing by providing a cutting fluid sensor to the bearing has been provided (for example, see JP-A-2002-206528).

However, in JP-UM-A-4-90770, there existed the problem that the cutting fluid enters into the inside of the spindle unit. Also, in JP-A-2002-239867, according to the method of exhausting the extraneous matter from the drain hole by the rotation of the spindle, there existed the problem that the exhausting capability is lowered when the rotation speed is slow. In addition, in JP-A-2002-206528, according to the method of sensing the entering of the cutting fluid by the sensor provided to the inside of the bearing, the cutting fluid is sensed after the cutting fluid has already entered into the inside of the bearing. Thus, there existed the problem that either the seizure of the bearing occurs or the maintenance such as exchange, decomposition/rinsing, etc. of the bearing is needed. In particular, many instances were found in the grease lubrication where the grease that was sealed once is rinsed out by the cutting fluid when the cutting fluid enters into the bearing and thus the bearing is damaged.

Further, as shown in FIG. 119, a bearing unit 1701 is proposed in which exhausted lubricant storage spaces 1712 used to exhaust the lubricant on the inside of the bearing to the outside of the bearing are formed in an outer ring spacer 1711.

This bearing unit 1701 is constructed such that the lubricant reserved in the exhaust spaces 1714, 1712 can be sucked periodically.

In this case, a reference numeral 1715 denotes a grease supply hole, 1716 a housing, 1717 an inner ring spacer, 1718 a ball, 1719 an outer ring, and 1720 an inner ring.

Also, a bearing unit 1702 shown in FIG. 120 is constructed in such a fashion that a sealing member 1721 is fitted onto one side of a bearing 1713 and also the lubricant flows to a wider space 1722 on the opposite side to the sealing member 1721. Here, a reference numeral 1723 denotes an outer ring spacer.

However, since the above bearing unit 1701, 1702 (see FIG. 119 and FIG. 120) is constructed to push out the lubricant to the outside of the bearing unit 1701, 1702 by supplying further the lubricant into the bearing space that has already been filled with the lubricant by the continuous supply, a force of exhausting the lubricant to the outside of the bearing is small.

Therefore, the storage spaces 1712 formed in the outer ring spacer 1711 cannot be filled with the exhausted lubricant. As a result, there existed the problem that it is difficult to continue to supply the lubricant for a long time.

Besides, there also existed the problem that, when the exhaust of the lubricant to the outside of the bearing unit 1701, 1702 is performed by the suction applied from the outside of the bearing unit, it is difficult to remove completely the lubricant in the bearing unit 1701, 1702.

Also, as shown in FIG. 121, a method of supplying the grease to a bearing 1752, in which an outer ring 1753 is fitted into a housing 1751, from the outside may be considered.

By way of example, a bearing grease supply system 1750 in which a grease filling hole 1754 is passed through the housing 1751 and a supply hole 1755 is passed through the outer ring 1753 to align with the grease filling hole 1754 is known.

According to the bearing grease supply system 1750, since the grease supply system (not shown) is connected to the grease filling hole 1754 via the grease supply piping, the grease can be filled into the bearing 1752 from the grease supply system via the grease supply piping, the grease filling hole 1754, and the supply hole 1755. In this case, according to the above configuration, since a positional alignment between the supply hole 1755 and the grease filling hole 1754 is needed, it takes much time and labor to incorporate the bearing into the housing.

For this reason, such a configuration may be employed that the supply hole, which supplies the grease into the bearing, may be formed in the outer ring and also either the annular groove containing the supply hole may be formed on the outer periphery of the outer ring or the annular groove facing to the supply hole may be formed on the inner periphery of the housing, so that a positional alignment between the housing and the bearing in assembling may be eliminated. In the case of the above configuration, in order to supply the grease being supplied from the grease filling hole in the housing from the outer ring supply hole to the inside of the bearing via the annular groove, following three respects are important.

(i) A relationship between a cross section of the annular groove and a peripheral length of the cross section of the annular groove.

(ii) A value of a clearance between the housing and the bearing outer ring.

(iii) A length of an outer surface, which contacts the housing in the axial direction, of the bearing outer ring except the annular groove.

When a value of (i) is small, the grease acts as a resistance when such grease passes through the annular groove. Therefore, the grease does not reach the supply hole in the outer ring and thus the grease cannot be supplied to the inside of the bearing.

When a value of (ii) is large, the grease flowing through the annular groove leaks from the clearance between the housing and the bearing outer ring and then is exhausted to the outside of the bearing. Therefore, the grease is not supplied from the supply hole in the outer ring to the inside of the bearing.

When a value of (iii) is small, the grease flowing through the annular groove leaks from the clearance between the housing and the bearing outer ring and then is exhausted to the outside of the bearing. Therefore, the grease is not supplied from the supply hole in the outer ring to the inside of the bearing.

The present invention has been made in view of the above circumstances, it is an object of the present invention to provide a rolling bearing capable of running at a high speed and enhancing a lifetime of the bearing by supplying a grease, a grease supply system, a spindle unit, a grease supply method, and a grease supply program.

In particular, the present invention provides a rolling bearing, a grease supply system, a spindle unit, a grease supply method, and a grease supply program, which are capable of suppressing a temperature pulsation upon supplying the grease, lessening the workload of the operator because the fitting operation of the bearing can be completed in a short time, and executing a quantitative supply to discharge the grease intermittently in a minute and predetermined quantity without the influence of the piping.

Also, it is another object of the present invention to provide a spindle unit capable of sensing an entering of a cutting fluid into the inside of the spindle unit before the cutting fluid enters into the inside of the bearing, and thus capable of maintaining stably the lubricating performance of the spindle bearing for a long time not to stop the running of the machine for a long time.

In addition, it is still another object of the present invention to provide a spindle unit capable of exhausting the supplied lubricant continuously and executing stably the continuous running for a long time, and capable of exhausting the lubricant to the outside of the spindle unit without fail and keeping the good lubricated condition by executing the lubricant supply that makes easy and stable maintenance possible, and in turn capable of attaining an enhanced lifetime of the bearing.

DISCLOSURE OF THE INVENTION

The objects of the present invention can be achieved by configurations described in the following.

(1) A spindle unit comprising:

a rolling bearing including an outer ring having an outer ring raceway on an inner peripheral surface, an inner ring having an inner ring raceway on an outer peripheral surface, and rolling elements provided rollably between the outer ring raceway and the inner ring raceway, whereby a spindle is borne rotatably in a housing; and a grease supply system for supplying a grease to an inside of the rolling bearing;

wherein the grease supply system supplies the grease such that a supply amount in one shot is set to 0.004 cc to 0.1 cc.

(2) A spindle unit according to (1), wherein the grease supply system contains a supply hole provided in the outer ring.

(3) A spindle unit according to (1), further comprising an outer ring spacer;

wherein the grease supply system contains a supply hole provided in the outer ring spacer.

(4) A spindle unit according to (1), wherein the grease supply system contains a supply hole provided in the housing.

(5) A spindle unit according to (1), further comprising at least one rotating body arranged in vicinity of a side surface of the inner ring or the outer ring; and wherein the grease is exhausted to an outside of the rolling bearing by a rotation of the rotating body.

(6) A spindle unit according to (5), wherein a storage space for storing the exhausted grease is provided in the housing.

(7) A spindle unit according to (1), further comprising at least one exhaust hole for exhausting the grease to an outside of the spindle unit; and wherein the grease is stored in the exhaust hole.

(8) A spindle unit according to any one of (5) to (7), wherein the rotating body is composed of a collar that is formed in at least one of an inner ring spacer, the inner ring, and a cage of the rolling bearing.

(9) A spindle unit according to (7) or (8), wherein the grease is exhausted by pouring another fluid different from the grease into the exhaust hole from an outside.

(10) A spindle unit according to (1), further comprising a rotation speed sensor for sensing a rotation speed of the spindle; and wherein the grease supply system supplies the grease into an inside of the rolling bearing in response to the rotation speed.

(11) A spindle unit according to (10), wherein the grease supply system divides the rotation speed into a plurality of areas to assign an addend to the plurality of areas respectively, then calculates an integrated value by integrating the addend corresponding to the measured rotation speed every unit time, and then supplies the grease when the integrated value exceeds a predetermined value.

(12) A spindle unit according to (11), wherein the grease supply system resets the integrated value at a time of grease supply, and integrates a number of resets of the integrated value.

(13) A spindle unit according to (11) or (12), wherein the grease supply system sets the addend to 0 and does not executes an integration when the spindle is stopped.

(14) A spindle unit according to any one of (10) to (13), wherein the grease supply system controls the rotation speed of the spindle smaller than a predetermined rotation speed when a residual amount of grease in the grease supply system is reduced smaller than a predetermined value.

(15) A spindle unit according to any one of (11) to (13), wherein the grease supply system controls the rotation speed of the spindle smaller than a predetermined rotation speed when a residual amount of grease in the grease supply system is reduced smaller than a predetermined value, and the predetermined rotation speed belongs to a rotation speed area that is one rank lower than a maximum rotation speed area in the plurality of areas.

(16) A spin unit according to (1), wherein the grease supply system includes a mechanical fixed-displacement piston pump having a check valve and a fixed-displacement piston to discharge the grease, a grease tank for storing the grease, an in-grease-tank piston for pressurizing the grease in the grease tank, and a sensor provided to the grease tank to monitor a residual amount of grease.

(17) A spindle unit according to (16), wherein the sensor has a magnet that is fitted to the in-grease-tank piston.

(18) A spindle unit according to (16) or (17), further comprising a sensor for monitoring a pressure of the grease in the grease tank or a pressure of the grease in a grease piping that connects the mechanical fixed-displacement piston pump and the grease tank.

(19) A spindle unit according to any one of (16) or (18), further comprising a mechanism for holding a pressure applied to the in-grease-tank piston for a predetermined time to pressurize the grease in the grease tank in a state that the fixed-displacement piston returns to a home position after the mechanical fixed-displacement piston pump operates to discharge the grease.

(20) A spindle unit according to any one of (16) to (19), wherein the sensor controls an upper limit of the rotation speed of the spindle when the sensor senses an abnormality.

(21) A spindle unit according to (1), wherein the grease supply system includes a mechanical fixed-displacement piston pump having a grease tank for storing the grease, a cylinder for containing the grease fed from the grease tank by a predetermined amount, a fixed-displacement piston moved reciprocally in the cylinder to discharge the grease contained in the cylinder in a predetermined amount to a grease supply piping, and a check valve arranged onto an end portion of the cylinder.

(22) A spindle unit according to (21), wherein the mechanical fixed-displacement piston pump has a valve for supplying a medium into the cylinder, and the fixed-displacement piston is operated by the medium supplied via the valve.

(23) A spindle unit according to (21) or (22), wherein the grease supply piping is formed of a Teflon tube.

(24) A spindle unit according to (1), further comprising a cooling means for cooling a predetermined location by supplying a cooling fluid to an inside of the housing; and a motor having a rotor provided to the spindle and a stator provided to an inner peripheral surface of the housing to oppose to the rotor;

wherein the spindle is operated by the motor, and the cooling means cools the stator and also cools at least the outer ring of the rolling bearing.

(25) A spindle unit according to (24), wherein the cooling means cools the spindle by supplying the cooling fluid to an inside of the spindle and passing the cooling fluid through the spindle in a longitudinal direction.

(26) A spindle unit according to (24) or (25), further comprising a cooling fluid recovering means for recovering the cooling fluid exhausted from the spindle and the housing.

(27) A spindle unit according to (1), wherein the rolling bearing includes at least one supply hole formed in the outer ring to supply the grease to an inside of the rolling bearing, and an annular groove formed on an outer periphery of the outer ring to contain the supply hole, and a value obtained by dividing a sectional area ($mm^2$) of the annular groove by a peripheral length (mm) of a cross section of the annular groove is set to 0.25 mm or more.

(28) A spindle unit according to (1), wherein the rolling bearing includes at least one supply hole formed in the outer ring to supply the grease to an inside of the rolling bearing, the housing includes an annular groove formed on an inner periphery of the housing to face to the supply hole, and a value obtained by dividing a sectional area ($mm^2$) of the annular groove by a peripheral length (mm) of a cross section of the annular groove is set to 0.25 mm or more.

(29) A spindle unit according to (27) or (28), wherein a pair of outer annular grooves are formed on an outer periphery of the outer ring or an inner periphery of the housing on both sides of the supply hole in an axial direction, and an O ring is fitted into the pair of outer annular grooves respectively.

(30) A spindle unit according to (27) or (28), wherein a clearance between the inner periphery of the housing and the outer periphery of the outer ring is set to 30 μm or less, and a length of a contact portion between an outer diameter surface of the outer ring and the housing in the axial direction is set to 1 mm or more.

(31) A spindle unit according to any one of (1) to (30), wherein the spindle is a machine tool spindle.

(32) A spindle unit according to any one of (1) to (30), wherein the spindle is a high-speed motor spindle.

(33) A spindle unit comprising:

a rolling bearing including an outer ring having an outer ring raceway on an inner peripheral surface, an inner ring having an inner ring raceway on an outer peripheral surface, and rolling elements provided rollably between the outer ring raceway and the inner ring raceway, whereby a spindle is borne rotatably in a housing; and a lubricant supplying path for supplying a lubricant to an inside of the rolling bearing from an outside; and a rotating body arranged in vicinity of a side surface of the inner ring or the outer ring;

wherein the lubricant is exhausted to an outside of the rolling bearing by a rotation of the rotating body.

(34) A spindle unit according to (1), wherein a storage space for storing the exhausted lubricant is provided to the housing.

(35) A spindle unit according to (34), further comprising at least one exhaust hole for exhausting the lubricant from the storage space to an outside of the spindle unit; and wherein the lubricant is stored in the exhaust hole.

(36) A spindle unit according to (34) or (35), wherein the rotating body is composed of a collar that is formed in at least one of an inner ring spacer, the inner ring, and a cage of the rolling bearing.

(37) A spindle unit according to any one of (34) to (36), wherein the rotating body is composed of a collar that is formed in at least one of an inner ring spacer, the inner ring, and a cage of the rolling bearing.

(38) A spindle unit according to any one of (33) to (37), wherein the spindle is a machine tool spindle.

(39) A spindle unit according to any one of (33) to (37), wherein the spindle is a high-speed motor spindle.

(40) A spindle unit comprising a cutting fluid sensor provided to a cutting fluid entering area extended from a clearance between a spindle and a front end of a housing to a rolling bearing.

(41) A spindle unit according to (40), wherein the cutting fluid sensor is provided in an area between a labyrinth seal and the rolling bearing.

(42) A spindle unit according to (40) or (41), wherein a drain path is opened in the cutting fluid entering area, and the cutting fluid sensor is provided in the drain path.

(43) A spindle unit according to any one of (40) to (41), wherein an exhaust valve is provided to the drain path.

(44) A spindle unit according to (43), wherein the exhaust valve is operated based on a sensed signal of the cutting fluid sensor to exhaust the cutting fluid from the cutting fluid entering area.

(45) A spindle unit according to any one of (40) to (44), wherein a lubricant supply hole is formed in the rolling bearing, then the lubricant supply hole is connected to a lubricant supply system, and then the lubricant supply system is operated based on a sensed signal of the cutting fluid sensor to supply the lubricant to the rolling bearing.

(46) A spindle unit according to (40), wherein the spindle unit is used in a machine tool that has a function of limiting conditions to running conditions, in which the rolling bearing is not damaged, in response to a signal of the cutting fluid sensor.

(47) A spindle unit according to (40) to (46), further comprising a warning means for displaying a warning message based on a sensed signal of the cutting fluid sensor.

(48) A spindle unit comprising:
a housing onto which a rolling bearing is fitted;
a spindle passed through the rolling bearing;
a grease supply system for supplying a grease to a bearing space of the rolling bearing to lubricate the bearing with the grease; and
a cooling means for cooling a predetermined location by supplying a cooling fluid to an inside of the housing;
wherein the spindle is operated by a motor that has a rotor provided to the spindle and a stator provided to an inner peripheral surface of the housing to oppose to the rotor, and
wherein the cooling means cools the stator and cools at least a fixed-side bearing of the rolling bearing.

(49) A spindle unit according to (48), wherein the cooling means cools the spindle by supplying the cooling fluid to an inside of the spindle and passing the cooling fluid through the spindle in a longitudinal direction.

(50) A spindle unit according to (48) or (49), further comprising a cooling fluid recovering means for recovering the cooling fluid exhausted from the spindle and the housing.

(51) A spindle unit according to any one of (48) to (50), wherein the spindle is a machine tool spindle.

(52) A spindle unit according to any one of (48) to (50), wherein the spindle is a high-speed motor spindle.

(53) A grease supply system comprising:
a grease supply mechanism for supplying a grease to an inside of a rolling bearing that has an outer ring having an outer ring raceway on an inner peripheral surface, an inner ring having an inner ring raceway on an outer peripheral surface, rolling elements provided rollably between the outer ring raceway and the inner ring raceway; and wherein the grease supply mechanism supplies the grease such that a supply amount in one shot is set to 0.004 cc to 0.1 cc.

(54) A grease supply system according to (53), wherein the grease supply mechanism contains a supply hole provided to the outer ring.

(55) A grease supply system according to (53), wherein the grease supply mechanism contains a supply hole provided to an outer ring spacer in vicinity of the rolling bearing.

(56) A grease supply system according to (53), wherein the rolling bearing is a roller bearing in which the rolling elements are rollers.

(57) A grease supply system according to (53), wherein the rolling bearing is an angular contact ball bearing that has a contact angle and has balls as the rolling elements, and
the grease supply mechanism contains a supply hole that is opened to a location that is deviated from contact portions between the outer ring raceway and the balls.

(58) A grease supply system according to any one of (53) to (57), wherein a diameter of the supply hole is set in a range of 0.1 to 5 mm.

(59) A grease supply system according to (53), wherein the rolling bearing bears rotatably the spindle, and
further comprising a controlling means for controlling a supply timing to supply the grease in response to a rotation speed of the spindle.

(60) A grease supply system according to (59), wherein the controlling means divides the rotation speed into a plurality of areas to assign an addend to the plurality of areas respectively, then calculates an integrated value by integrating the addend corresponding to the measured rotation speed every unit time, and then instructs the grease supply mechanism to supply the grease when the integrated value exceeds a predetermined value.

(61) A grease supply system according to (60), wherein the controlling means resets the integrated value at a time of grease supply, and integrates a number of resets of the integrated value.

(62) A grease supply system according to (60) or (61), wherein the controlling means sets the addend to 0 and does not executes an integration when the spindle is stopped.

(63) A grease supply system according to any one of (59) to (62), wherein the controlling means controls the rotation speed of the spindle smaller than a predetermined rotation speed when a residual amount of grease in the grease supply system is reduced smaller than a predetermined value.

(64) A grease supply system according to any one of (60) to (62), wherein the controlling means controls the rotation speed of the spindle smaller than a predetermined rotation speed when a residual amount of grease in the grease supply system is reduced smaller than a predetermined value, and
the predetermined rotation speed belongs to a rotation speed area that is one rank lower than a maximum rotation speed area in the plurality of areas.

(65) A grease supply system according to (53), wherein the grease supply mechanism includes a mechanical fixed-displacement piston pump having a check valve and a fixed-displacement piston to discharge the grease, a grease tank for storing the grease, an in-grease-tank piston for pressurizing the grease in the grease tank, and a sensor provided to the grease tank to monitor a residual amount of grease.

(66) A grease supply system according to (65), wherein the sensor has a magnet that is fitted to the in-grease-tank piston.

(67) A grease supply system according to (65) or (66), further comprising a sensor for monitoring a pressure of the grease in the grease tank or a pressure of the grease in a grease piping that connects the mechanical fixed-displacement piston pump and the grease tank.

(68) A grease supply system according to any one of (65) to (67), further comprising a mechanism for holding a pressure applied to the in-grease-tank piston for a predetermined time to pressurize the grease in the grease tank in a state that the fixed-displacement piston returns to a home position after the mechanical fixed-displacement piston pump operates to discharge the grease.

(69) A grease supply system according to (53), wherein the grease supply mechanism includes a mechanical fixed-displacement piston pump having a grease tank for storing the grease, a cylinder for containing the grease fed from the grease tank by a predetermined amount, a fixed-displacement piston moved reciprocally in the cylinder to discharge the grease contained in the cylinder in a predetermined amount to a grease supply piping, and a check valve arranged onto an end portion of the cylinder.

(70) A grease supply system according to (69), wherein the mechanical fixed-displacement piston pump has a valve for supplying a medium into the cylinder, and the fixed-displacement piston is operated by the medium supplied via the valve.

(71) A grease supply system according to (69) or (70), wherein the grease supply piping is formed of a Teflon tube.

(72) A grease supply system according to (53), wherein the grease supply mechanism includes at least one supply hole formed in the outer ring to supply the grease to an inside of the rolling bearing, and an annular groove formed on an outer periphery of the outer ring to contain the supply hole, and a value obtained by dividing a sectional area ($mm^2$) of the annular groove by a peripheral length (mm) of a cross section of the annular groove is set to 0.25 mm or more.

(73) A grease supply system according to (53), wherein the grease supply mechanism includes at least one supply hole formed in the outer ring to supply the grease to an inside of the rolling bearing, and an annular groove formed on an inner periphery of the housing, which supports the spindle via the rolling bearing, to face to the supply hole, and a value obtained by dividing a sectional area ($mm^2$) of the annular groove by a peripheral length (mm) of a cross section of the annular groove is set to 0.25 mm or more.

(74) A grease supply system according to (72) or (73), wherein a pair of outer annular grooves are formed on an outer periphery of the outer ring or an inner periphery of the housing on both sides of the supply hole in an axial direction, and an O ring is fitted into the pair of outer annular grooves respectively.

(75) A grease supply system according to (72) or (73), wherein a clearance between the inner periphery of the housing and the outer periphery of the outer ring is set to 30 μm or less, and a length of a contact portion between an outer diameter surface of the outer ring and the housing in the axial direction is set to 1 mm or more.

(76) A machine tool spindle unit using the grease supply system set forth in any one of (53) to (75).

(77) A high-speed motor spindle unit using the grease supply system set forth in any one of (53) to (75).

(78) A grease supply system comprising:

a grease supply mechanism for supplying an additional grease to an inside of a rolling bearing that bears rotatably a spindle; and a controlling means for controlling a supply timing at which the grease supply mechanism supplies the additional grease in response to a rotation speed of the spindle.

(79) A grease supply system according to (78), wherein the controlling means divides the rotation speed into a plurality of areas to assign an addend to the plurality of areas respectively, then calculates an integrated value by integrating the addend corresponding to the measured rotation speed every unit time, and then instructs the grease supply mechanism to supply the additional grease when the integrated value exceeds a predetermined value.

(80) A grease supply system according to (79), wherein the controlling means resets the integrated value at a time of grease supply, and integrates a number of resets of the integrated value.

(81) A grease supply system according to (79) or (80), wherein the controlling means sets the addend to 0 and does not executes an integration when the spindle is stopped.

(82) A grease supply system according to any one of (78) to (81), wherein the controlling means controls the rotation speed of the spindle smaller than a predetermined rotation speed when a residual amount of grease in the grease supply system is reduced smaller than a predetermined value.

(83) A grease supply system according to any one of (79) to (81), wherein the controlling means controls the rotation speed of the spindle smaller than a predetermined rotation speed when a residual amount of grease in the grease supply system is reduced smaller than a predetermined value, and the predetermined rotation speed belongs to a rotation speed area that is one rank lower than a maximum rotation speed area in the plurality of areas.

(84) A machine tool spindle unit using the grease supply system set forth in any one of (78) to (83).

(85) A high-speed motor spindle unit using the grease supply system set forth in any one of (78) to (83).

(86) A grease supply method of supplying an additional grease to a grease-lubricated rotating body, comprising:

a step of dividing a rotation speed into a plurality of areas;

a step of assigning an addend to the plurality of areas respectively;

a step of measuring an actual rotation speed of the rotating body every unit time;

a step of deciding to which area of the plurality of areas the actual rotation speed belongs;

a step of calculating an integrated value by integrating the addend corresponding to the area that contains the actual rotation speed; and a step of issuing an instruction to supply an additional grease when the integrated value exceeds a predetermined value.

(87) A grease supply method according to (86), wherein the integrated value is reset at a time of grease supply, and a number of resets of the integrated value is integrated.

(88) A grease supply method according to (86) or (87), wherein the addend is set to 0 and an integration is not executed when the spindle is stopped.

(89) A grease supply method according to any one of (86) to (88), further comprising a step of controlling the actual rotation speed smaller than a predetermined rotation speed when a residual amount of grease is reduced smaller than a predetermined value.

(90) A grease supply method according to (89), wherein the predetermined value of the actual rotation speed belongs to a rotation speed area that is one rank lower than a maximum rotation speed area in the plurality of areas.

(91) A machine tool spindle unit using the grease supply method set forth in any one of (86) to (90).

(92) A high-speed motor spindle unit using the grease supply method set forth in any one of (86) to (90).

(93) A grease supply program of supplying an additional grease to a grease-lubricated rotating body, and causing a computer to execute a step of dividing a rotation speed into a plurality of areas, a step of assigning an addend to the plurality of areas respectively, a step of measuring an actual rotation speed of the rotating body every unit time, a step of deciding to which area of the plurality of areas the actual rotation speed belongs, a step of calculating an integrated value by integrating the addend corresponding to the area that contains the actual rotation speed, and a step of issuing an instruction to supply an additional grease when the integrated value exceeds a predetermined value.

(94) A grease supply program according to (93), wherein the integrated value is reset at a time of grease supply, and a number of resets of the integrated value is integrated.

(95) A grease supply program according to (93) or (94), wherein the addend is set to 0 and an integration is not executed when the spindle is stopped.

(96) A grease supply program according to any one of (93) to (95), wherein further comprising a step of controlling the actual rotation speed smaller than a predetermined rotation speed when a residual amount of grease is reduced smaller than a predetermined value.

(97) A grease supply program according to (96), wherein the predetermined value of the actual rotation speed belongs to a rotation speed area that is one rank lower than a maximum rotation speed area in the plurality of areas.

(98) A machine tool spindle unit using the grease supply program set forth in any one of (93) to (97).

(99) A high-speed motor spindle unit using the grease supply program set forth in any one of (93) to (97).

(100) A grease supply system comprising:

a mechanical fixed-displacement piston pump having a check valve and a fixed-displacement piston to discharge the grease;

a grease tank for storing the grease;

an in-grease-tank piston for pressurizing the grease in the grease tank; and a sensor provided to the grease tank to monitor a residual amount of grease.

(101) A grease supply system according to (100), wherein the sensor has a magnet that is fitted to the in-grease-tank piston.

(102) A grease supply system according to (100) or (101), further comprising a mechanism for holding a pressure applied to the in-grease-tank piston for a predetermined time to pressurize the grease in the grease tank in a state that the fixed-displacement piston returns to a home position after the mechanical fixed-displacement piston pump operates to discharge the grease.

(103) A grease supply system according to any one of (100) to (102), further comprising a mechanism for holding a pressure applied to the in-grease-tank piston for a predetermined time to pressurize the grease in the grease tank in a state that the fixed-displacement piston returns to a home position after the mechanical fixed-displacement piston pump operates to discharge the grease.

(104) A machine tool spindle unit using the grease supply system set forth in any one of (100) to (103)).

(105) A high-speed motor spindle unit using the grease supply system set forth in any one of (100) to (103).

(106) A spindle unit according to (104) or (105), wherein the sensor controls an upper limit of a rotation speed when the sensor senses an abnormality.

BRIEF DESCRIPTION OF THE DRAWINGS

FIG. 36(a) is a sectional view showing a twenty-seventh embodiment according to the present invention, and FIG. 36(b) is a side view of FIG. 36(a);

FIG. 37(a) is a sectional view showing a twenty-eighth embodiment according to the present invention, and FIG. 37(b) is a side view of FIG. 37(a);

FIG. 38(a) is a sectional view showing a twenty-ninth embodiment according to the present invention, and FIG. 38(b) is a side view of FIG. 38(a);

FIG. 60 is a view showing a control method of the grease supply system according to the thirty-fourth embodiment in FIG. 59;

FIG. 63 is a view showing a control method of the grease supply system of the present invention in FIG. 62;

FIG. 65 is a view showing a control method of the grease supply system of the present invention in FIG. 64;

FIG. 85 is a view showing test conditions in Example of the present invention;

FIG. 87 is a view showing test conditions in Example of the present invention;

FIG. 89 is a view showing test conditions in Example of the present invention;

FIG. 112 is a view showing test results in the present invention and the prior art;

FIG. 117 is a sectional view showing a pertinent portion of a spindle unit in the prior art;

FIG. 120 is a sectional view showing another example in the prior art; and

FIG. 121 is a sectional view showing a grease supply system in the prior art.

BEST MODE FOR CARRYING OUT THE INVENTION

Embodiments of the present invention will be explained with reference to the drawings hereinafter.

First Embodiment

Figure 1:
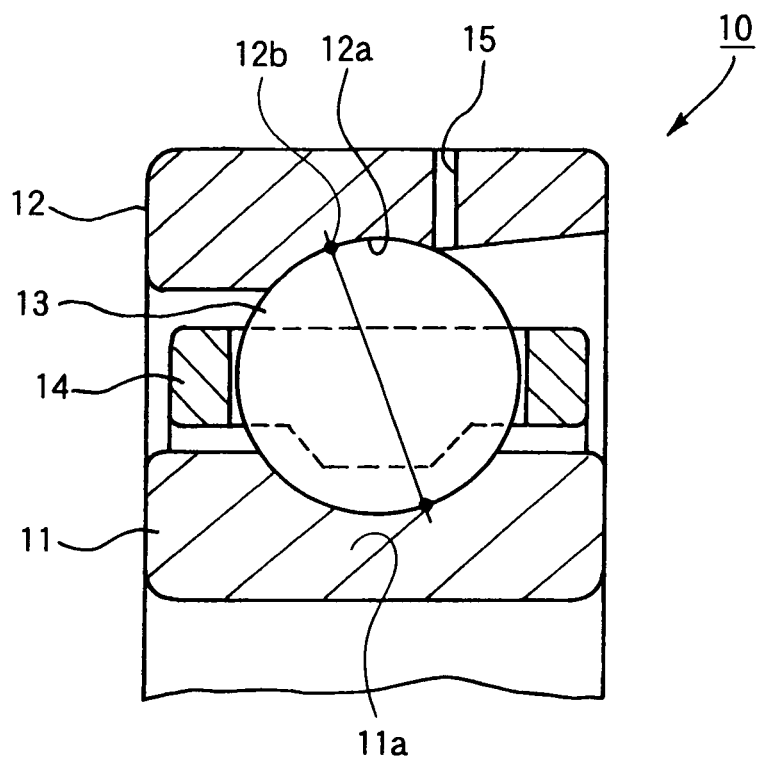
FIG. 1 is a sectional view showing a first embodiment according to the present invention.

An angular contact ball bearing 10 of a first embodiment according to the present invention shown in FIG. 1 includes an inner ring 11 having an inner ring raceway 11a on its outer peripheral surface, an outer ring 12 having an outer ring raceway 12a on its inner peripheral surface, a plurality of balls 13 arranged along the inner ring raceway 11a and the outer ring raceway 12a formed between the inner and outer rings 11, 12, and a cage 14 for holding the balls 13 in the circumferential direction at an equal interval. The angular contact ball bearing 10 of the present embodiment is an outer ring counterbored bearing used for bearing the spindle of the machine tool.

In the present embodiment, a supply hole 15 serving as a grease supply system (or a grease supply mechanism) of the present invention that passes through the outer ring 12 in the radial direction is provided on the counterbored side (the right side in FIG. 1) of the outer ring 12. The supply hole 15 has a circular cross section that has a diameter of 0.1 to 5 mm. The supply hole 15 is opened on the inner diameter surface of the outer ring 12 in the location that is adjacent to the outer ring raceway 12a.

The supply hole 15 may be provided in plural locations that are spaced apart in the peripheral direction of the outer ring 12. Also, the supply hole 15 may be provided on the side where a contact portion 12b is located. In this case, the supply hole 15 may be provided to the location other than the contact portion 12b.

The grease whose amount is set to 10 to 20% of a bearing space volume is initially sealed into a bearing space of the angular contact ball bearing 10. Here, the "bearing space volume" means a volume that is derived by subtracting volumes of the rolling elements and a volume of the cage from a space between the outer ring inner diameter and the inner ring outer diameter. Then, a following grease supply method is applied in operation of the bearing. In other words, the grease shot is applied via the supply hole 15 at appropriate timings (intermittently, periodically) to feed the grease of 0.004 cc to 0.1 cc as a supply amount at a time. If a variation in the grease shot is considered, an upper limit of a supply amount of grease in each shot is set to 0.12 cc. Also, it is preferable that, if it is considered to prevent the occurrence of the temperature pulsation, a supply amount of grease in each shot should be set to 0.01 cc to 0.03 cc. In the case where the grease shot is applied within the above range, generation of the abnormal temperature rise and damage of the bearing due to the degradation of the grease or the insufficient formation of the oil film is can be prevented, and also the temperature pulsation during the supply of the grease can be suppressed. Thus, degradation of an axial precision of the machine tool into which the angular contact ball bearing 10 is fitted can be prevented.

Second Embodiment

Figure 2:
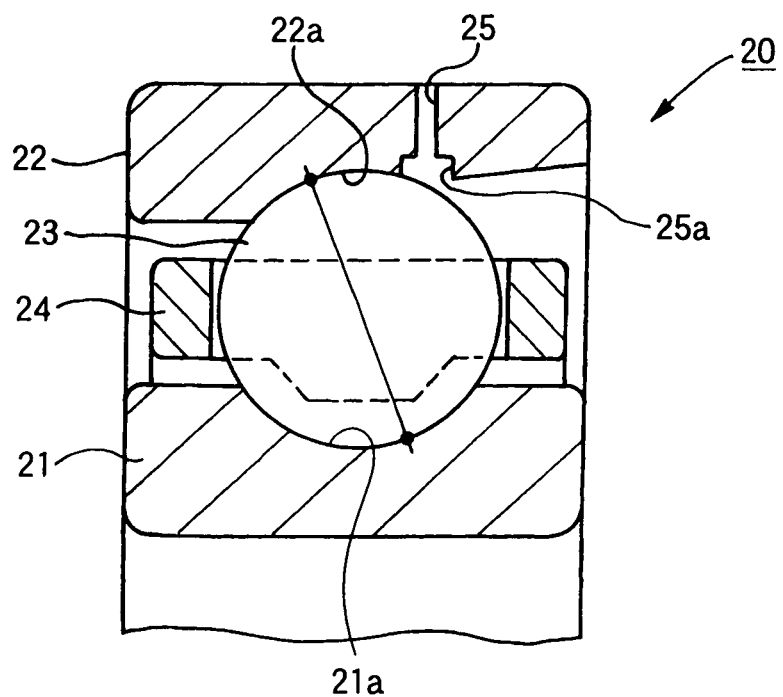
FIG. 2 is a sectional view showing a second embodiment according to the present invention.

An angular contact ball bearing 20 of a second embodiment according to the present invention shown in FIG. 2 includes an inner ring 21, an outer ring 22, a plurality of balls 23 arranged between an inner ring raceway 21a of the inner ring 21 and an outer ring raceway 22a of the outer ring 22, and a cage 24 for holding the balls 23 in the circumferential direction at an equal interval.

In the present embodiment, a supply hole 25 serving as a grease supply system (or grease supply mechanism) that passes through the outer ring 22 in the radial direction is provided on the counterbored side (the right side in FIG. 2) of the outer ring 22. A grease reservoir 25a is formed in the supply hole 25 on the inner diameter surface side of the outer ring. A sectional area of the grease reservoir 25a is larger than a sectional area of other portions of the supply hole 25. The supply hole 25 has a stepped cylindrical space because it has the grease reservoir 25a. The grease reservoir 25a is positioned in a location adjacent to the outer ring raceway 22a on the inner diameter surface of the outer ring 22. In other embodiments explained in the following, the supply hole may also have the grease reservoir.

The grease whose amount is set to 10 to 20% of the bearing space volume is initially sealed into a bearing space of the angular contact ball bearing 20. Then, a following grease supply method is applied in operation of the bearing. In other words, the grease shot is applied via the supply hole 25 at appropriate timings (intermittently, periodically) to feed the grease of 0.004 cc to 0.1 cc as a supply amount at a time. If a variation in the grease shot is considered, an upper limit of a supply amount of grease in each shot is set to 0.12 cc. Also, it is preferable that, if it is considered to prevent the occurrence of the temperature pulsation, a supply amount of grease in each shot should be set to 0.01 cc to 0.03 cc. In the case where the grease shot is applied within the above range, generation of the abnormal temperature rise and damage of the bearing due to the degradation of the grease or the insufficient formation of the oil film is can be prevented, and also the temperature pulsation during the supply of the grease can be suppressed. Thus, degradation of an axial precision of the machine tool into which the angular contact ball bearing 20 is fitted can be prevented.

Third Embodiment

Figure 3:
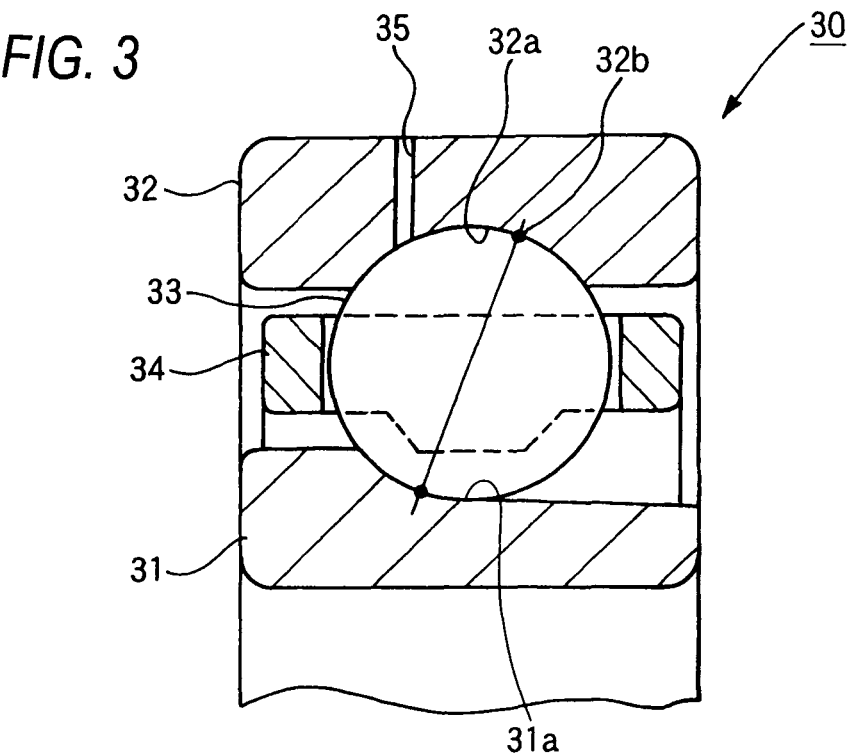
FIG. 3 is a sectional view showing a third embodiment according to the present invention.

An angular contact ball bearing 30 of a third embodiment according to the present invention shown in FIG. 3 includes an inner ring 31, an outer ring 32, a plurality of balls 33 arranged between an inner ring raceway 31a of the inner ring 31 and an outer ring raceway 32a of the outer ring 32, and a cage 34 for holding the balls 33 in the circumferential direction at an equal interval. The angular contact ball bearing 30 of the present embodiment is an inner ring counterbored bearing.

In the present invention, a supply hole 35 serving as a grease supply system (or grease supply mechanism) that passes through the outer ring 32 in the radial direction is opened on the outer ring raceway 32a of the outer ring 32 on the side opposite to the side where a contact portion 32b is located (the right side in FIG. 3). Also, the supply hole 35 may be provided on the side where the contact portion 32b is located. In this case, the supply hole 35 may be provided to the location other than the contact portion 32b.

The grease whose amount is set to 10 to 20% of the bearing space volume is initially sealed into a bearing space of the angular contact ball bearing 30. Then, a following grease supply method is applied in operation of the bearing. In other words, the grease shot is applied via the supply hole 35 at appropriate timings (intermittently, periodically) to feed the grease of 0.004 cc to 0.1 cc as a supply amount at a time. If a variation in the grease shot is considered, an upper limit of a supply amount of grease in each shot is set to 0.12 cc. Also, it is preferable that, if it is considered to prevent the occurrence of the temperature pulsation, a supply amount of grease in each shot should be set to 0.01 cc to 0.03 cc. In the case where the grease shot is applied within the above range, generation of the abnormal temperature rise and damage of the bearing due to the degradation of the grease or the insufficient formation of the oil film is can be prevented, and also the temperature pulsation during the supply of the grease can be suppressed. Thus, degradation of an axial precision of the machine tool into which the angular contact ball bearing 30 is fitted can be prevented.

Fourth Embodiment

Figure 4:
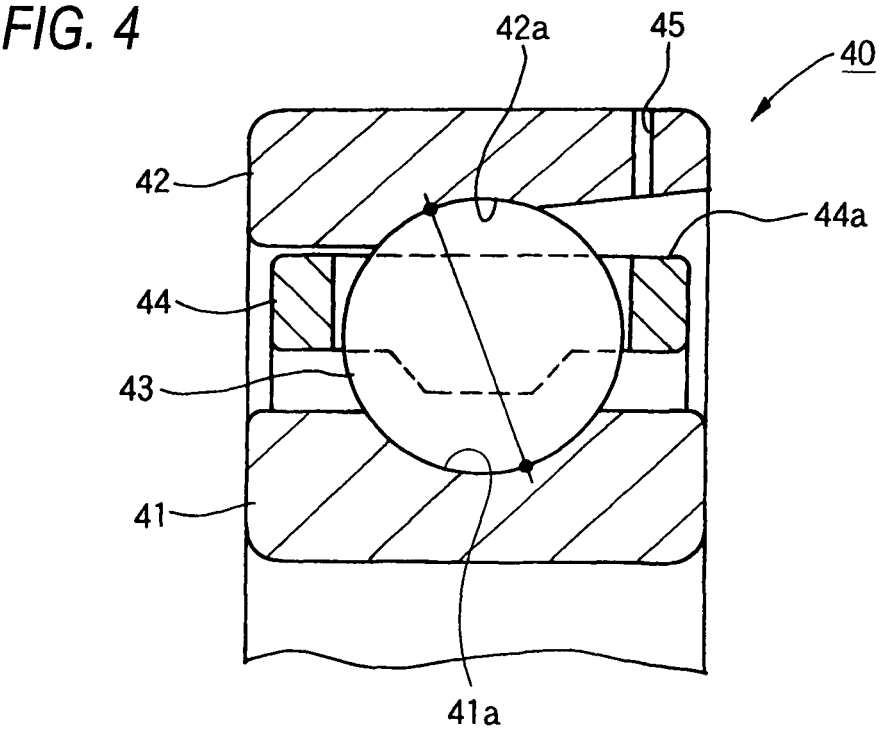
FIG. 4 is a sectional view showing a fourth embodiment according to the present invention.

An angular contact ball bearing 40 of a fourth embodiment according to the present invention shown in FIG. 4 includes an inner ring 41, an outer ring 42, a plurality of balls 43 arranged between an inner ring raceway 41a of the inner ring 41 and an outer ring raceway 42a of the outer ring 42, and a cage 44 guided by the outer ring. The angular contact ball bearing 40 of the present embodiment is an outer ring counterbored bearing.

In the present invention, a supply hole 45 serving as a grease supply system (or grease supply mechanism) that passes through the outer ring 42 in the radial direction is provided to the counterbored side of the outer ring 42 (the right side in FIG. 4). The supply hole 45 is opened toward a guide surface 44a on one of the cage 44 (the right side in FIG. 4).

The grease whose amount is set to 10 to 20% of the bearing space volume is initially sealed into a bearing space of the angular contact ball bearing 40. Then, a following grease supply method is applied in operation of the bearing. In other words, the grease shot is applied via the supply hole 45 at appropriate timings (intermittently, periodically) to feed the grease of 0.004 cc to 0.1 cc as a supply amount at a time. If a variation in the grease shot is considered, an upper limit of a supply amount of grease in each shot is set to 0.12 cc. Also, it is preferable that, if it is considered to prevent the occurrence of the temperature pulsation, a supply amount of grease in each shot should be set to 0.01 cc to 0.03 cc. In the case where the grease shot is applied within the above range, generation of the abnormal temperature rise and damage of the bearing due to the degradation of the grease or the insufficient formation of the oil film is can be prevented, and also the temperature pulsation during the supply of the grease can be suppressed. Thus, degradation of an axial precision of the machine tool into which the angular contact ball bearing 40 is fitted can be prevented.

Fifth Embodiment

Figure 5:
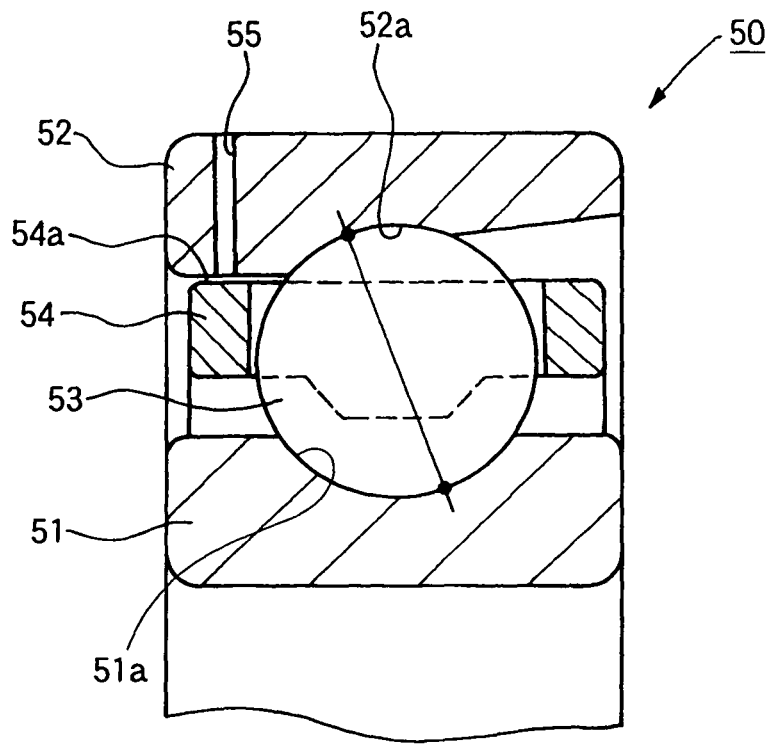
FIG. 5 is a sectional view showing a fifth embodiment according to the present invention.

An angular contact ball bearing 50 of a fifth embodiment according to the present invention shown in FIG. 5 includes an inner ring 51, an outer ring 52, a plurality of balls 53 arranged between an inner ring raceway 51a of the inner ring 51 and an outer ring raceway 52a of the outer ring 52, and a cage 54 guided by the outer ring. The angular contact ball bearing 50 of the present embodiment is an outer ring counterbored bearing.

In the present invention, a supply hole 55 serving as a grease supply system (or grease supply mechanism) that passes through the outer ring 52 in the radial direction is provided to the anti-counterbored side of the outer ring 52 (the left side in FIG. 5). The supply hole 55 is opened toward a guide surface 54a on one side of the cage 54 (the left side in FIG. 5).

The grease whose amount is set to 10 to 20% of the bearing space volume is initially sealed into a bearing space of the angular contact ball bearing 50. Then, a following grease supply method is applied in operation of the bearing. In other words, the grease shot is applied via the supply hole 55 at appropriate timings (intermittently, periodically) to feed the grease of 0.004 cc to 0.1 cc as a supply amount at a time. If a variation in the grease shot is considered, an upper limit of a supply amount of grease in each shot is set to 0.12 cc. Also, it is preferable that, if it is considered to prevent the occurrence of the temperature pulsation, a supply amount of grease in each shot should be set to 0.01 cc to 0.03 cc. In the case where the grease shot is applied within the above range, generation of the abnormal temperature rise and damage of the bearing due to the degradation of the grease or the insufficient formation of the oil film is can be prevented, and also the temperature pulsation during the supply of the grease can be suppressed. Thus, degradation of an axial precision of the machine tool into which the angular contact ball bearing 50 is fitted can be prevented.

Sixth Embodiment

Figure 6:
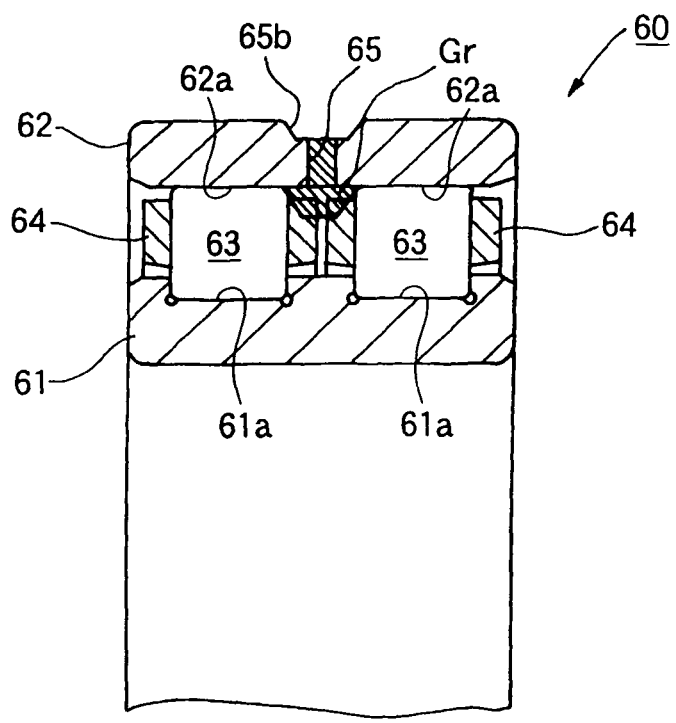
FIG. 6 is a sectional view showing a sixth embodiment according to the present invention.

A double row cylindrical roller bearing 60 of a sixth embodiment according to the present invention shown in FIG. 6 includes an inner ring 61, an outer ring 62, a plurality of cylindrical rollers 63 arranged between an inner ring raceway 61a of the inner ring 61 and an outer ring raceway 62a of the outer ring 62 in double rows, and cages 64 for holding the cylindrical rollers 63 in the circumferential direction at an equal interval in each row. The double row cylindrical roller bearing 60 of the present embodiment is a rolling bearing for bearing the spindle of the machine tool.

In the present embodiment, a supply hole 65 serving as a grease supply system (or grease supply mechanism) that passes through the outer ring 62 in the radial direction is provided to a center portion of the outer ring 62 in the axial direction. The supply hole 65 has a circular cross section that has a diameter of 0.1 to 5 mm. The supply hole 65 is opened toward portions, which are positioned between the cylindrical rollers 63 in double rows, of respective cages 64.

In the present embodiment, a groove 65b that communicates with the supply hole 65 is provided to the center portion of the outer diameter surface of the outer ring in the axial direction. Thus, the shot of the grease Gr into the supply hole 65 is made easy. In this case, the groove 65b may be omitted.

The grease whose amount is set to 8 to 15% of the bearing space volume is initially sealed into a bearing space of the cylindrical roller bearing 60. Then, a following grease supply method is applied in operation of the bearing. In other words, the grease Gr is shot via the supply hole 65 at appropriate timings (intermittently, periodically) to feed the grease of 0.004 cc to 0.1 cc as a supply amount in one row at a time. If a variation in the grease shot is considered, an upper limit of a supply amount of grease in each shot is set to 0.12 cc. Also, since the temperature pulsation is caused in the cylindrical roller bearing more conspicuously than the angular contact ball bearing, a supply amount of grease in one shot must be reduced smaller than a supply amount to the angular contact ball bearing. Therefore, in the case of the cylindrical roller bearing, it is particularly preferable that a supply amount of grease in each shot should be set to 0.005 cc to 0.02 cc in one row.

The grease Gr that is shot toward the cages 64 is coated uniformly on circumferences of the raceway surfaces of the inner and outer rings together with the rotation of the bearing. In this manner, new oil films are formed by the shot grease Gr. The grease is scraped out to the outside of the rolling contact surface except a lowest minimum amount of grease to form an embankment-like shape. The base oil leaks from such grease in minute quantity to lubricate the rolling contact surfaces and the guide surfaces of the cages. In the case where the grease shot is applied within the above range, the temperature pulsation during the supply of the grease can be suppressed and also degradation of an axial precision of the machine tool into which the double row cylindrical roller bearing 60 is fitted can be prevented.

Seventh Embodiment

Figure 7:
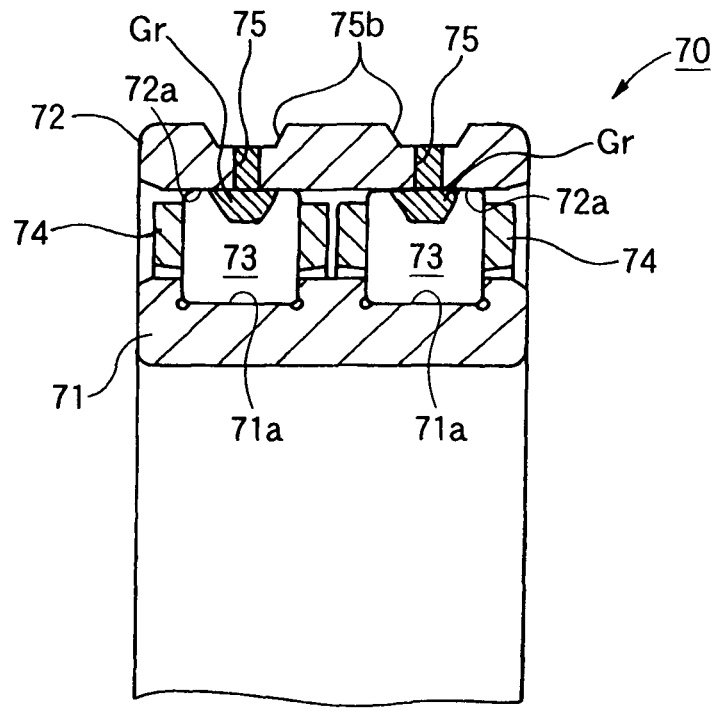
FIG. 7 is a sectional view showing a seventh embodiment according to the present invention.

A double row cylindrical roller bearing 70 of a seventh embodiment according to the present invention shown in FIG. 7 includes an inner ring 71, an outer ring 72, a plurality of cylindrical rollers 73 arranged between an inner ring raceway 71a of the inner ring 71 and an outer ring raceway 72a of the outer ring 72 in double rows, and cages 74 for holding the cylindrical rollers 73 in the circumferential direction at an equal interval in each row.

In the present embodiment, a plurality (here, two) of supply holes 75 each serving as a grease supply system (or grease supply mechanism) that passes through the outer ring 72 in the radial direction are provided to the outer ring 72, when viewed along the axial direction. The supply hole 75 is opened toward the rolling contact surface of the cylindrical roller 73 in each row. A groove 75b is provided on the outer diameter surface of the outer ring in double rows.

The grease whose amount is set to 8 to 15% of the bearing space volume is initially sealed into a bearing space of the cylindrical roller bearing 70. Then, a following grease supply method is applied in operation of the bearing. In other words, the grease Gr is shot via the supply holes 75 at appropriate timings (intermittently, periodically) to feed the grease of 0.004 cc to 0.1 cc as a supply amount in one row at a time. If a variation in the grease shot is considered, an upper limit of a supply amount of grease in each shot is set to 0.12 cc. Since the temperature pulsation is caused in the cylindrical roller bearing more conspicuously than the angular contact ball bearing, a supply amount of grease in one shot must be reduced smaller than a supply amount to the angular contact ball bearing. Therefore, in the case of the cylindrical roller bearing, it is particularly preferable that a supply amount of grease in each shot should be set to 0.005 cc to 0.02 cc in one row. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the machine tool into which the double row cylindrical roller bearing 70 is fitted can be prevented.

Eighth Embodiment

Figure 8:
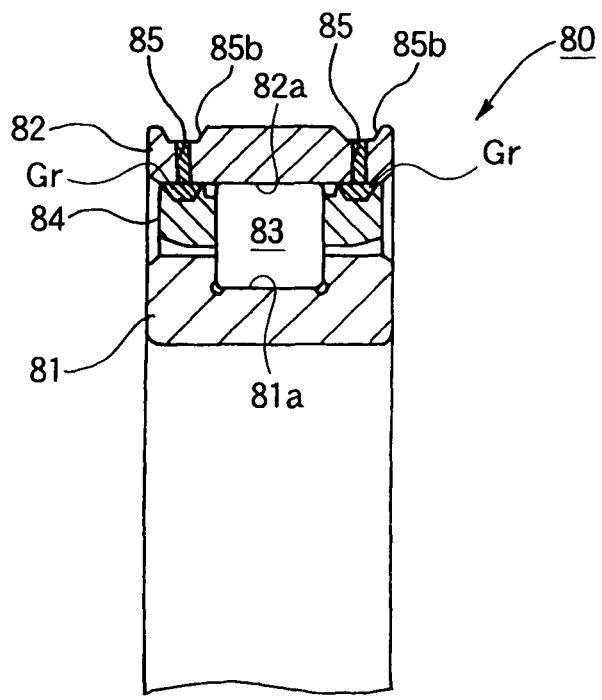
FIG. 8 is a sectional view showing an eighth embodiment according to the present invention.

A single row cylindrical roller bearing 80 of an eighth embodiment according to the present invention shown in FIG. 8 includes an inner ring 81, an outer ring 82, a plurality of cylindrical rollers 83 arranged between an inner ring raceway 81a of the inner ring 81 and an outer ring raceway 82a of the outer ring 82, and a cage 84 guided by the outer ring.

In the present embodiment, two supply holes 85 each serving as a grease supply system (or grease supply mechanism) that passes through the outer ring 82 in the radial direction are provided to the outer ring 82, when viewed along the axial direction. Each supply hole 85 is opened toward the guide surface, which is positioned on both sides of the cylindrical rollers 83 in the axial direction, of the cage 84. A groove 85b is provided on the outer diameter surface of the outer ring in double rows.

Although not shown, such a configuration may be employed that a supply hole that is opened toward the guide surface of the cage on one side is provided, when viewed along the axial direction.

The grease whose amount is set to 8 to 15% of the bearing space volume is initially sealed into a bearing space of the cylindrical roller bearing 80. Then, a following grease supply method is applied in operation of the bearing. In other words, the grease Gr is shot via the supply holes 85 at appropriate timings (intermittently, periodically) to feed the grease of 0.004 cc to 0.1 cc as a supply amount at a time. If a variation in the grease shot is considered, an upper limit of a supply amount of grease in each shot is set to 0.12 cc. Since the temperature pulsation is caused in the cylindrical roller bearing more conspicuously than the angular contact ball bearing, a supply amount of grease in one shot must be reduced smaller than a supply amount to the angular contact ball bearing. Therefore, in the case of the cylindrical roller bearing, it is particularly preferable that a supply amount of grease in each shot should be set to 0.005 cc to 0.02 cc. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the machine tool into which the single row cylindrical roller bearing 80 is fitted can be prevented.

Ninth Embodiment

Figure 9:
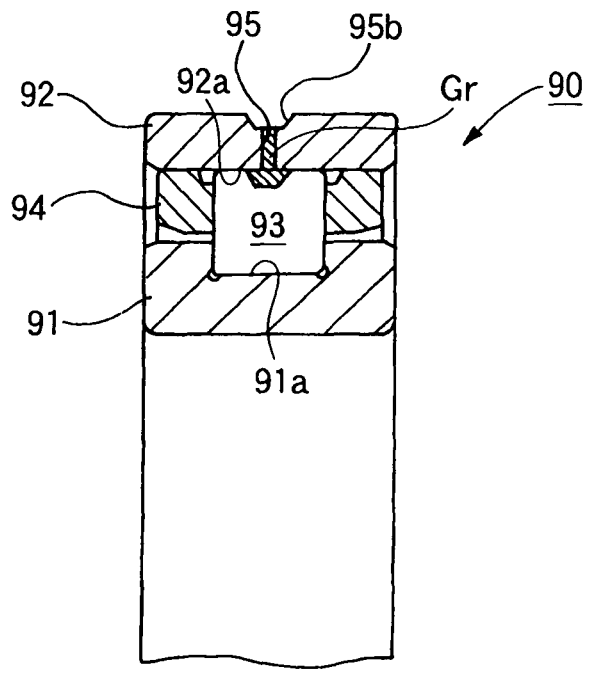
FIG. 9 is a sectional view showing a ninth embodiment according to the present invention.

A single row cylindrical roller bearing 90 of a ninth embodiment according to the present invention shown in FIG. 9 includes an inner ring 91, an outer ring 92, a plurality of cylindrical rollers 93 arranged between an inner ring raceway 91a of the inner ring 91 and an outer ring raceway 92a of the outer ring 92, and a cage 94 guided by the outer ring.

In the present embodiment, a supply hole 95 serving as a grease supply system (or grease supply mechanism) that passes through the outer ring 92 in the radial direction is provided to a center portion of the outer ring 92 in the axial direction. The supply hole 95 is opened toward the rolling contact surfaces of the cylindrical rollers 93. A groove 95b is provided in the center portion of the outer diameter surface of the outer ring in the axial direction.

The grease whose amount is set to 8 to 15% of the bearing space volume is initially sealed into a bearing space of the cylindrical roller bearing 90. Then, a following grease supply method is applied in operation of the bearing. In other words, the grease Gr is shot via the supply holes 95 at appropriate timings (intermittently, periodically) to feed the grease of 0.004 cc to 0.1 cc as a supply amount at a time. If a variation in the grease shot is considered, an upper limit of a supply amount of grease in each shot is set to 0.12 cc. Since the temperature pulsation is caused in the cylindrical roller bearing more conspicuously than the angular contact ball bearing, a supply amount of grease in one shot must be reduced smaller than a supply amount to the angular contact ball bearing. Therefore, in the case of the cylindrical roller bearing, it is particularly preferable that a supply amount of grease in each shot should be set to 0.005 cc to 0.02 cc. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the machine tool into which the single row cylindrical roller bearing 90 is fitted can be prevented.

Tenth Embodiment

Figure 10:
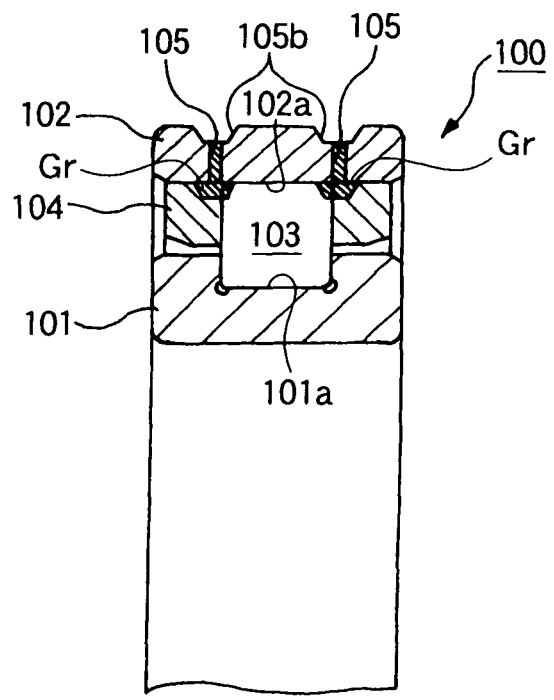
FIG. 10 is a sectional view showing a tenth embodiment according to the present invention.

A single row cylindrical roller bearing 100 of a tenth embodiment according to the present invention shown in FIG. 10 includes an inner ring 101, an outer ring 102, a plurality of cylindrical rollers 103 arranged between an inner ring raceway 101a of the inner ring 101 and an outer ring raceway 102a of the outer ring 102, and a cage 104 guided by the outer ring.

In the present embodiment, two supply holes 105 each serving as a grease supply system (or grease supply mechanism) that passes through the outer ring 102 in the radial direction are provided to the outer ring 102, when viewed along the axial direction. Each supply hole 105 is opened toward the portion between both end faces of the cylindrical rollers 103 and the guide surface of the cage 104 in the axial direction. A groove 105b is provided on the outer diameter surface of the outer ring in double rows.

Although not shown, such a configuration may be employed that a supply hole is provided, when viewed along the radial direction.

The grease whose amount is set to 8 to 15% of the bearing space volume is initially sealed into a bearing space of the cylindrical roller bearing 100. Then, a following grease supply method is applied in operation of the bearing. In other words, the grease Gr is shot via the supply holes 105 at appropriate timings (intermittently, periodically) to feed the grease of 0.004 cc to 0.1 cc as a supply amount at a time. If a variation in the grease shot is considered, an upper limit of a supply amount of grease in each shot is set to 0.12 cc. Since the temperature pulsation is caused in the cylindrical roller bearing more conspicuously than the angular contact ball bearing, a supply amount of grease in one shot must be reduced smaller than a supply amount to the angular contact ball bearing. Therefore, in the case of the cylindrical roller bearing, it is particularly preferable that a supply amount of grease in each shot should be set to 0.005 cc to 0.02 cc. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the machine tool into which the single row cylindrical roller bearing 100 is fitted can be prevented.

Eleventh Embodiment

Figure 11:
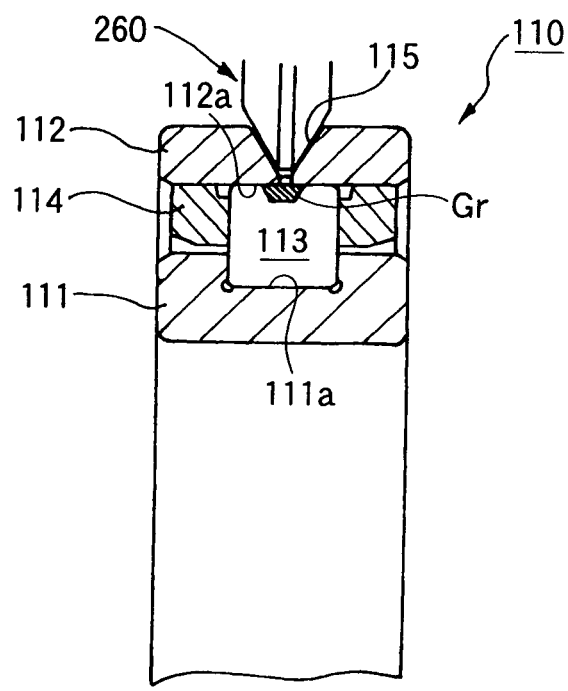
FIG. 11 is a sectional view showing an eleventh embodiment according to the present invention.

A single row cylindrical roller bearing 110 of an eleventh embodiment according to the present invention shown in FIG. 11 includes an inner ring 111, an outer ring 112, a plurality of cylindrical rollers 113 arranged between an inner ring raceway 111a of the inner ring 111 and an outer ring raceway 112a of the outer ring 112, and a cage 114 guided by the outer ring.

In the present embodiment, a supply hole 115 serving as a grease supply system (or grease supply mechanism) that passes through the outer ring 112 in the radial direction is provided in a center portion of the outer ring 112 in the axial direction. The supply hole 115 is formed into a taper shape, which is suited to a taper shape of a top end of a nozzle 260 to shoot the grease and in which a diameter is reduced gradually from the outer diameter surface side to the inner diameter surface side. That is, the supply hole 115 is formed as a frustum-of-circular-cone space. The supply hole 115 is opened toward the rolling contact surface of the cylindrical rollers 113.

The grease whose amount is set to 8 to 15% of the bearing space volume is initially sealed into a bearing space of the cylindrical roller bearing 110. Then, a following grease supply method is applied in operation of the bearing. In other words, the grease Gr is shot via the supply hole 115 at appropriate timings (intermittently, periodically) to feed the grease of 0.004 cc to 0.1 cc as a supply amount at a time. If a variation in the grease shot is considered, an upper limit of a supply amount of grease in each shot is set to 0.12 cc. Since the temperature pulsation is caused in the cylindrical roller bearing more conspicuously than the angular contact ball bearing, a supply amount of grease in one shot must be reduced smaller than a supply amount to the angular contact ball bearing. Therefore, in the case of the cylindrical roller bearing, it is particularly preferable that a supply amount of grease in each shot should be set to 0.005 cc to 0.02 cc. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the machine tool into which the single row cylindrical roller bearing 110 is fitted can be prevented.

Twelfth Embodiment

Figure 12:
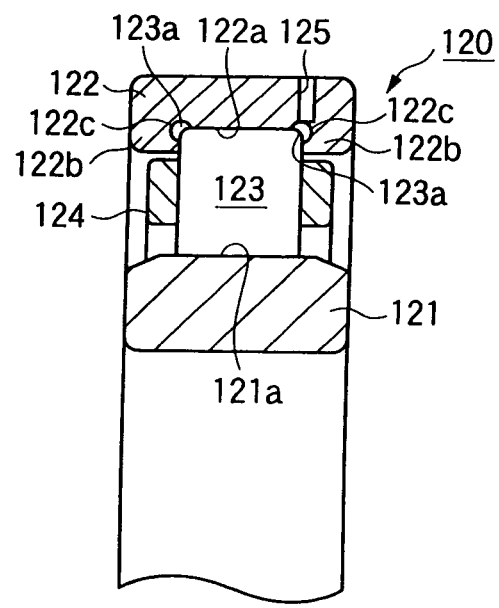
FIG. 12 is a sectional view showing a twelfth embodiment according to the present invention.

A single row cylindrical roller bearing 120 of a twelfth embodiment according to the present invention shown in FIG. 12 includes an inner ring 121, an outer ring 122 having two collars 122b, cylindrical rollers 123 arranged between an inner ring raceway 121a of the inner ring 121 and an outer ring raceway 122a of the outer ring 122, and a cage 124 guided by the outer ring.

The cylindrical rollers 123 are arranged rollably along the outer ring raceway 122a formed between the collars 122b acting as inner peripheral surfaces of the outer ring 122 and the inner ring raceway 121a formed on an outer peripheral surface of the inner ring 121. A clearance portion 122c as a concave portion is provided to both end portions of the outer ring raceway 122a in positions that oppose to edge portions 123a of the cylindrical rollers 123 to avoid the interference with the edge portions 123a.

In the present embodiment, a supply hole 125 serving as a grease supply system (or grease supply mechanism) that passes through the outer ring 122 in the radial direction and is communicated with one of the clearance portions 122c on the outer ring 122 is provided. The additional grease is supplied to the clearance portions 122c on the inside of the rolling bearing 120 from the outside via the supply hole 125 in the radial direction.

The grease whose amount is set to 8 to 15% of the bearing space volume is initially sealed into a bearing space of the cylindrical roller bearing 120. Then, a following grease supply method is applied in operation of the bearing. In other words, the grease Gr is shot via the supply hole 125 at appropriate timings (intermittently, periodically) to feed the grease of 0.004 cc to 0.1 cc as a supply amount at a time. The supplied grease is caused to fit with the overall interior of the bearing according to the rolling of the cylindrical rollers 123 and to supplement the lack of the grease.

If a variation in the grease shot is taken account, an upper limit of a supply amount of grease in each shot is set to 0.12 cc. Since the temperature pulsation is caused in the cylindrical roller bearing more conspicuously than the angular contact ball bearing, a supply amount of grease in one shot must be reduced smaller than a supply amount to the angular contact ball bearing. Therefore, in the case of the cylindrical roller bearing, it is particularly preferable that a supply amount of grease in each shot should be set to 0.005 cc to 0.02 cc. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the machine tool into which the single row cylindrical roller bearing 120 is fitted can be prevented.

Thirteenth Embodiment

Figure 13:
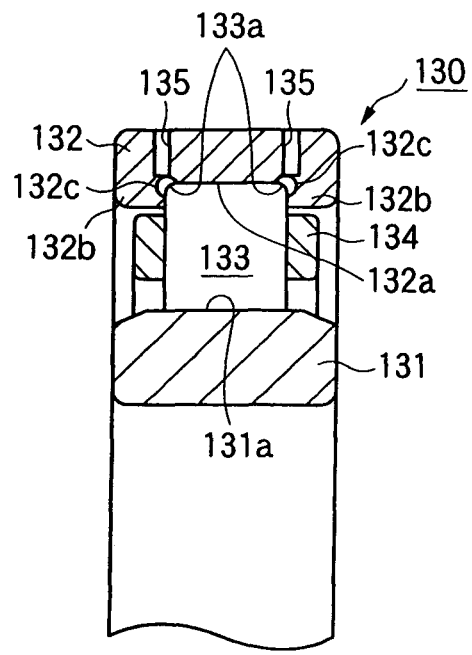
FIG. 13 is a sectional view showing a thirteenth embodiment according to the present invention.

A single row cylindrical roller bearing 130 of a thirteenth embodiment according to the present invention shown in FIG. 13 includes an inner ring 131, an outer ring 132 having two collars 132b, two cylindrical rollers 133 arranged between an inner ring raceway 131a of the inner ring 131 and an outer ring raceway 132a of the outer ring 132, and a cage 134 guided by the outer ring.

The cylindrical rollers 133 are arranged rollably along the outer ring raceway 132a formed between the collars 132b acting as inner peripheral surfaces of the outer ring 132 and the inner ring raceway 131a formed on an outer peripheral surface of the inner ring 131. A clearance portion 132c as a concave portion is provided to both end portions of the outer ring raceway 132a in positions that oppose to edge portions 133a of the cylindrical rollers 133 to avoid the interference with the edge portions 133a.

In the present embodiment, two supply holes 135 each serving as a grease supply system (or grease supply mechanism) that passes through the outer ring 132 in the radial direction and is communicated with one of the clearance portions 132c on the outer ring 132 respectively is provided. The additional grease is supplied to the clearance portions 132c on the inside of the rolling bearing 130 from the outside via the supply holes 135 in the radial direction.

The grease whose amount is set to 8 to 15% of the bearing space volume is initially sealed into a bearing space of the cylindrical roller bearing 130. Then, a following grease supply method is applied in operation of the bearing. In other words, the grease Gr is shot via the supply holes 135 at appropriate timings (intermittently, periodically) to feed the grease of 0.004 cc to 0.1 cc as a supply amount at a time. The supplied grease is caused to fit with the overall interior of the bearing according to the rolling of the cylindrical rollers 133 and to supplement the lack of the grease.

If a variation in the grease shot is considered, an upper limit of a supply amount of grease in each shot is set to 0.12 cc. Since the temperature pulsation is caused in the cylindrical roller bearing more conspicuously than the angular contact ball bearing, a supply amount of grease in one shot must be reduced smaller than a supply amount to the angular contact ball bearing. Therefore, in the case of the cylindrical roller bearing, it is particularly preferable that a supply amount of grease in each shot should be set to 0.005 cc to 0.02 cc. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the machine tool into which the single row cylindrical roller bearing 130 is fitted can be prevented.

Fourteenth Embodiment

Figure 14:
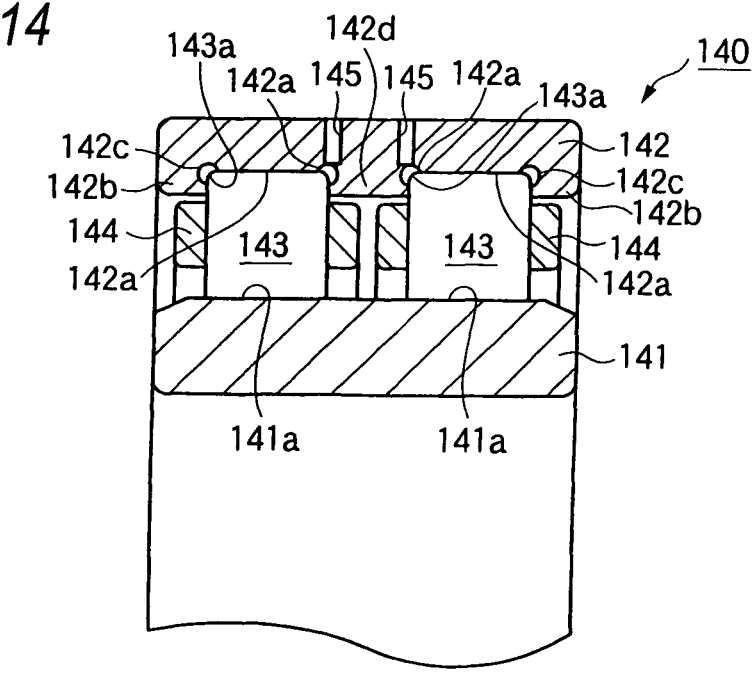
FIG. 14 is a sectional view showing a fourteenth embodiment according to the present invention.

A double row cylindrical roller bearing 140 of a fourteenth embodiment according to the present invention shown in FIG. 14 includes an inner ring 141, an outer ring 142, cylindrical rollers 143 arranged between an inner ring raceway 141a of the inner ring 141 and an outer ring raceway 142a of the outer ring 142, and a cage 144 guided by the outer ring.

The outer ring 142 has two collars 142b formed on both ends in the axial direction and a collar 142d formed on a center of an inner diameter surface. Two outer ring raceways 142a are formed between the collars 142b and the collar 142d respectively.

Two cylindrical rollers 143 are arranged rollably along two outer ring raceways 142a and the inner ring raceway 141a formed on an outer peripheral surface of the inner ring 141 respectively. A clearance portion 142c as a concave portion is provided to both end portions of respective outer ring raceways 142a in positions that oppose to edge portions 143a of the cylindrical rollers 143 to avoid the interference with the edge portions 143a.

In the present embodiment, two supply holes 145 each serving as a grease supply system (or grease supply mechanism) that passes through the outer ring 142 in the radial direction and is communicated with one of the clearance portions 142c provided to both end portions of respective outer ring raceways 142a are provided. The additional grease is supplied to the clearance portions 142c on the inside of the rolling bearing 140 from the outside via the supply holes 145 in the radial direction.

The grease whose amount is set to 8 to 15% of the bearing space volume is initially sealed into a bearing space of the cylindrical roller bearing 140. Then, a following grease supply method is applied in operation of the bearing. In other words, the grease Gr is shot via the supply holes 145 at appropriate timings (intermittently, periodically) to feed the grease of 0.004 cc to 0.1 cc as a supply amount at a time every row. The supplied grease is caused to fit with the overall interior of the bearing according to the rolling of the cylindrical rollers 143 and to supplement the lack of the grease.

If a variation in the grease shot is considered, an upper limit of a supply amount of grease in each shot is set to 0.12 cc. Since the temperature pulsation is caused in the cylindrical roller bearing more conspicuously than the angular contact ball bearing, a supply amount of grease in one shot must be reduced smaller than a supply amount to the angular contact ball bearing. Therefore, in the case of the cylindrical roller bearing, it is particularly preferable that a supply amount of grease in each shot should be set to 0.005 cc to 0.02 cc every row. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the machine tool into which the double row cylindrical roller bearing 140 is fitted can be prevented.

Fifteenth Embodiment

Figure 15:
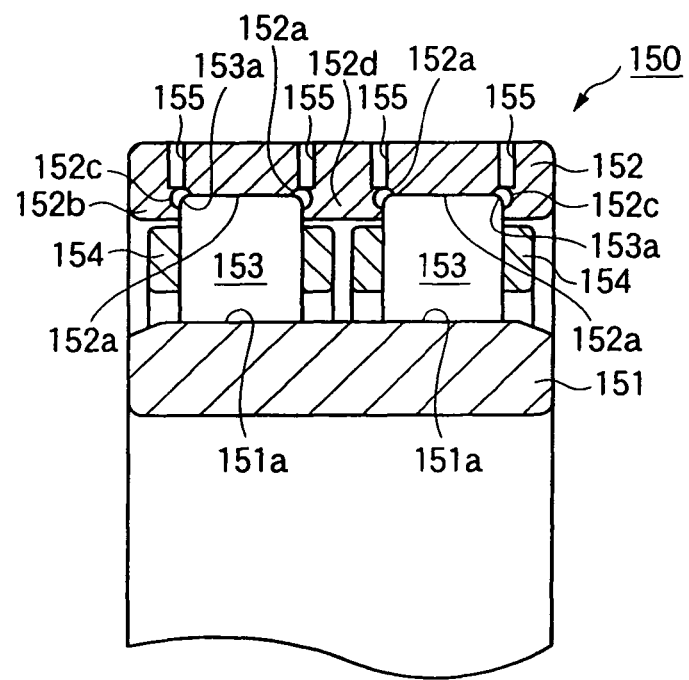
FIG. 15 is a sectional view showing a fifteenth embodiment according to the present invention.

A double row cylindrical roller bearing 140 of a fifteenth embodiment according to the present invention shown in FIG. 15 includes an inner ring 151, an outer ring 152, cylindrical rollers 153 arranged between an inner ring raceway 151a of the inner ring 151 and an outer ring raceway 152a of the outer ring 152, and a cage 154 guided by the outer ring.

The outer ring 152 has two collars 152b formed on both ends in the axial direction and a collar 152d formed on a center of an inner diameter surface. Two outer ring raceways 152a are formed between the collars 152b and the collar 152d respectively.

Two cylindrical rollers 153 are arranged rollably along two outer ring raceways 152a and the inner ring raceway 151a formed on an outer peripheral surface of the inner ring 151 respectively. A clearance portion 152c as a concave portion is provided to both end portions of respective outer ring raceways 152a in positions that oppose to edge portions 153a of the cylindrical rollers 153 to avoid the interference with the edge portions 153a.

In the present embodiment, four supply holes 155 each serving as a grease supply system (or grease supply mechanism) that passes through the outer ring 152 in the radial direction and is communicated with one of the clearance portions 152c provided to both end portions of respective outer ring raceways 152a respectively are provided. The additional grease is supplied to the clearance portions 152c on the inside of the rolling bearing 150 from the outside via the supply holes 155 in the radial direction.

The grease whose amount is set to 8 to 15% of the bearing space volume is initially sealed into a bearing space of the cylindrical roller bearing 150. Then, a following grease supply method is applied in operation of the bearing. In other words, the grease Gr is shot via the supply holes 155 at appropriate timings (intermittently, periodically) to feed the grease of 0.004 cc to 0.1 cc as a supply amount at a time every row. The supplied grease is caused to fit with the overall interior of the bearing according to the rolling of the cylindrical rollers 153 and to supplement the lack of the grease.

If a variation in the grease shot is considered, an upper limit of a supply amount of grease in each shot is set to 0.12 cc. Since the temperature pulsation is caused in the cylindrical roller bearing more conspicuously than the angular contact ball bearing, a supply amount of grease in one shot must be reduced smaller than a supply amount to the angular contact ball bearing. Therefore, in the case of the cylindrical roller bearing, it is particularly preferable that a supply amount of grease in each shot should be set to 0.005 cc to 0.02 cc every row. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the machine tool into which the double row cylindrical roller bearing 150 is fitted can be prevented.

In this case, some of the rolling bearings shown in FIG. 1 to FIG. 15 have the groove provided on the outer diameter surface of the outer ring and remaining ones have no groove. Such groove may be provided either to all the rolling bearings or to no rolling bearing.

Also, the O ring may be provided to the outer diameter surface of the outer ring or the inner diameter surface of the housing to prevent the leakage of the grease.

Figure 16:
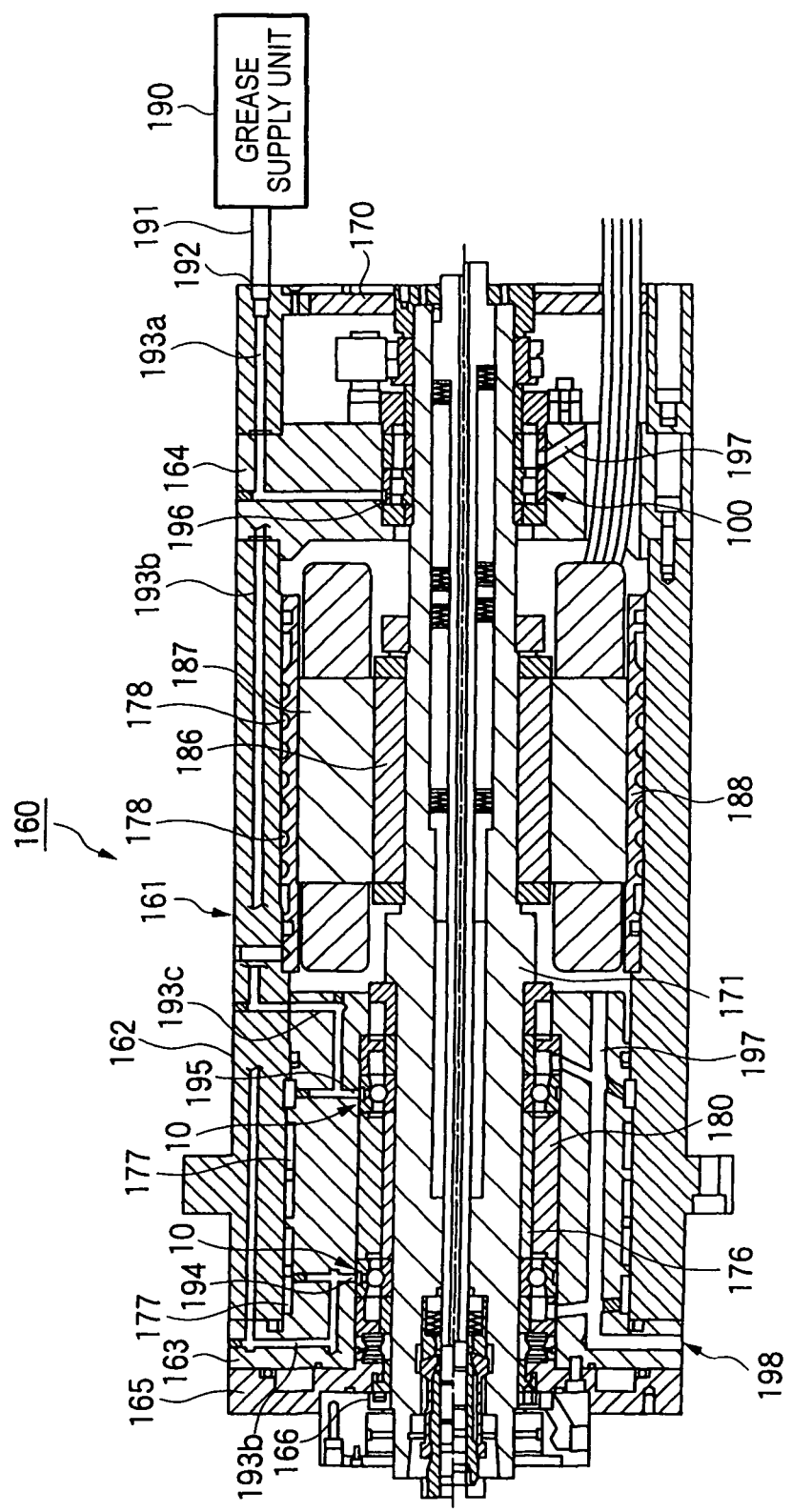
FIG. 16 is a sectional view showing a spindle unit constructed by using the rolling bearing recited in first to fifteenth embodiments according to the present invention.

FIG. 16 is a view showing a spindle unit 160 constructed as a machine tool spindle unit by using the rolling bearing recited in first to fifteenth embodiments according to the present invention. This spindle unit 160 supports a spindle 171 in a spindle housing 161 by using the angular contact ball bearing 10 with the outer ring groove in the first embodiment and the cylindrical roller bearing 100 with one supply hole on one side in the tenth embodiment. The spindle unit in FIG. 16 employs different type bearings for the sake of illustration, but such spindle unit may employ only the same type bearings.

The spindle housing 161 has a housing main body 162, a front-side bearing housing 163 fitted into a front end (the left side in FIG. 16) of the housing main body 162 and fixed thereto, and a rear-side bearing housing 164 fitted into a rear end (the right side in FIG. 16) of the housing main body 162 and fixed thereto. An outer ring pressing member 165 and an inner ring pressing member 166 are provided to an end portion of the front-side bearing housing 163. A labyrinth is formed between the outer ring pressing member 165 and the inner ring pressing member 166. A rear end face of the spindle housing 161 is covered with a cover 170.

The spindle 171 is fitted into two rolling bearings 10, 10 (equivalent to that shown in FIG. 1), which are fitted onto the front-side bearing housing 163, and one cylindrical roller bearing 100 (equivalent to that with one supply hole shown in FIG. 10), which is fitted onto the rear-side bearing housing 164, and thus is supported rotatably by the spindle housing 161. An outer ring spacer 180 is arranged between the outer rings 12, 12 of two rolling bearings 10, 10, and also an inner ring spacer 176 is arranged between the inner rings 11, 11 thereof.

A rotor 186 is fitted onto an almost center portion of the spindle 171 in the axial direction and fixed thereto. A stator 187 is arranged coaxially away from an outer peripheral surface of the rotor 186 at a predetermined distance. The stator 187 is fixed to the housing main body 162 via a stator fixing member 188 that is arranged on the outer peripheral surface side of the stator 187. A plurality of grooves 178 are formed between the housing main body 162 and the stator fixing member 188 along the peripheral direction of the spindle 171. A coolant for cooling the stator 187 is caused to flow through a plurality of grooves 178.

Similarly, a plurality of grooves 177 through which a coolant flows to cool the housing and the bearing are formed in portions, which are located on to the outer circumferential sides of the angular contact ball bearings 10, 10, between the housing main body 162 and the front-side bearing housing 163.

Three grease supply ports 192 to which the grease is supplied to execute the grease feeding to the bearings 10, 10, 100 respectively are opened on a rear end face of the spindle housing 161 along the circumferential direction (only one port is illustrated in FIG. 16). These three grease supply ports 192 are communicated with grease supply paths 193$a$, 193$b$, 193$c$, which are formed in the housing main body 162, the front-side bearing housing 163, and the rear-side bearing housing 164, respectively (for convenience, the grease supply paths 193$a$, 193$b$, 193$c$ are illustrated on the same cross section in FIG. 16). Thus, the spindle unit 160 of the present embodiment is constructed in such a fashion that the grease can be supplied from a grease supply unit 190 provided on the outside to the inside of the spindle housing 161 via a grease supply piping 191.

The grease supply path 193$a$ is communicated with an opening 196 that is formed to correspond to the outer ring side of the single row cylindrical roller bearing 100. The grease supply path 193$b$ is communicated with an opening 194 that is formed to correspond to the outer ring side of the angular contact ball bearing 10 arranged on the front side (the left side in FIG. 16). The grease supply path 193$c$ is communicated with an opening 195 that is formed to correspond to the outer ring side of the angular contact ball bearing 10 arranged on the rear side (the center in FIG. 16). Thus, the grease supplied from the grease supply unit 190 is supplied independently to the outer ring sides of respective bearings 10, 10, 100. The openings 194, 195, 196 are communicated with the supply holes 15, 15, 105 shown in FIG. 1 and FIG. 9, whereby the grease is supplied to the insides of the bearing spaces independently via the supply holes 15, 15, 105.

The grease supply unit 190 is constructed to feed the grease independently to respective bearings 10, 10, 100. In other words, the grease supply unit 190 shoots the grease Gr to each of the bearings 10, 10, 100 at appropriate timings (intermittently, periodically) to feed the grease of 0.004 cc to 0.1 cc as a supply amount at a time. The supplied grease is caused to fit with the overall interiors of the bearings 10 and 100 according to the rolling of the balls 13 in the bearing 10 and the rollers 103 in the bearing 100 and to supplement the lack of the grease. Here, in the case of the angular contact ball bearing, it is preferable that a supply amount of grease in each shot should be set to 0.01 cc to 0.03 cc. Also, in the case of the cylindrical roller bearing, it is preferable that a supply amount of grease in each shot should be set to 0.005 cc to 0.02 cc. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the spindle unit into which respective bearings 10, 10, 100 are fitted can be prevented.

In the present embodiment, a grease exhaust path 197 that is communicated with the insides of the bearing spaces of the bearings 10, 10, 100 is formed in the front-side bearing housing 163 and the rear-side bearing housing 164. The grease is exhausted from an outer-periphery-side opening 198 of the grease exhaust path 197 to the outside of the machine via the grease exhaust path 197.

In the spindle unit of the present invention, the ball bearing 10 in the first embodiment and the roller bearing 100 in the tenth embodiment are mentioned as an example. It is of course that the bearings in other embodiments 2 to 9 or 11 to 15 or any combination of these bearings may be used alternately.

Also, it is needless to say that the similar advantages can be expected by providing similar supply holes in the outer rings of other bearings.

Sixteenth Embodiment

Figure 17:
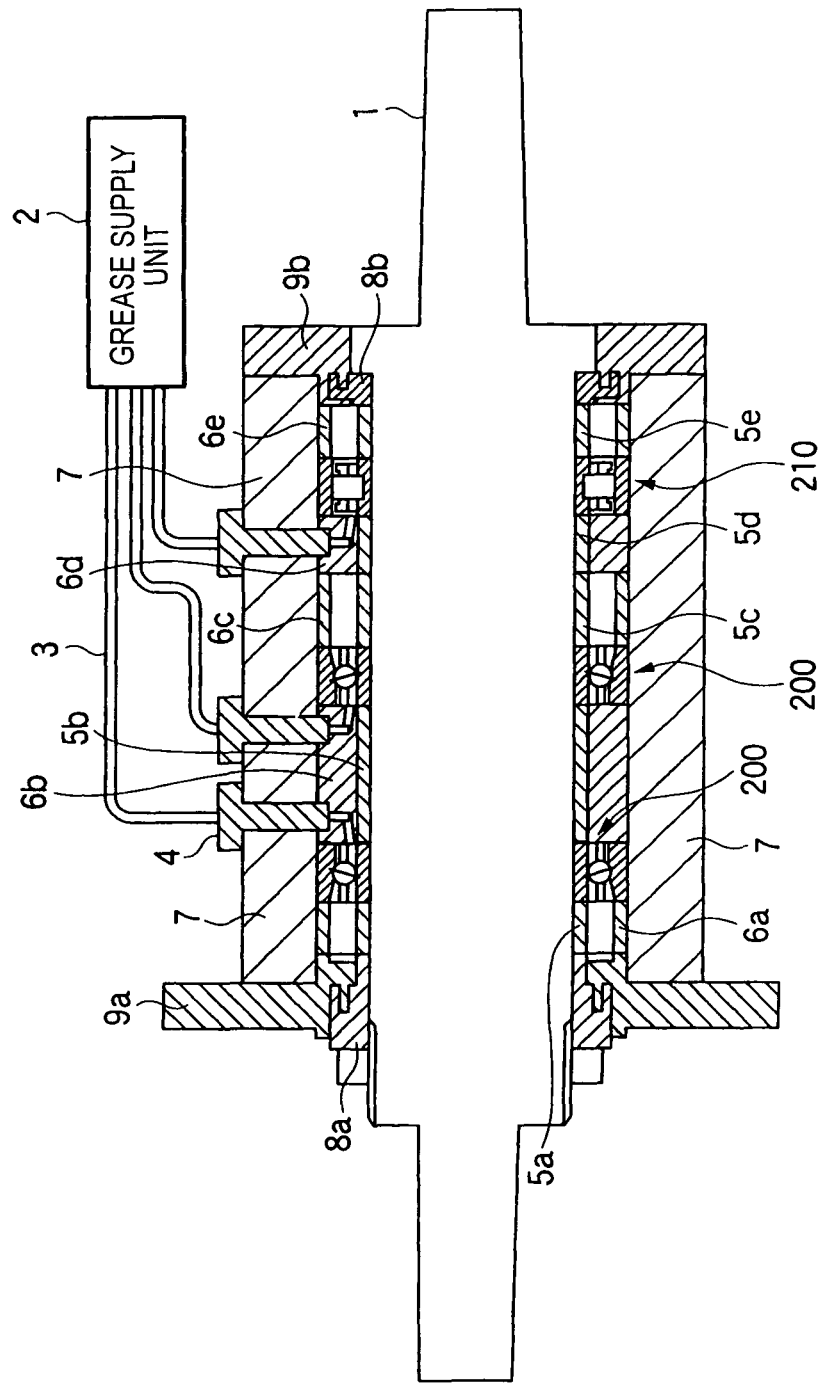
FIG. 17 is a sectional view showing a spindle unit constructed by using rolling bearings set forth in sixteenth and seventeenth embodiments according to the present invention.

FIG. 17 is a view showing a spindle unit constructed as a machine tool spindle unit by using rolling bearings 200 and 210 according to sixteenth and seventeenth embodiments explained hereunder. Now, the spindle unit shown in FIG. 17 employs different type bearings for the purpose of illustration, but such spindle unit may be constructed by using only the same type bearings.

The bearings 200 and 210 are fitted onto a spindle 1 and fitted into a housing 7. The spindle 1 can be rotated in the housing 7 via the rolling bearings 200 and 210. When viewed from the left in FIG. 17, inner ring spacers 5a, 5b, 5c, 5d, 5e arranged along the spindle 1 and outer ring spacers 6a, 6b, 6c, 6d, 6e arranged along the housing 7 are arranged sequentially between respective inner rings and between respective outer rings of the bearings 200 and 210 respectively.

Inner ring pressing members 8a, 8b and outer ring pressing members 9a, 9b are arranged to both ends of the inner ring spacers 5a, 5e and the outer ring spacers 6a, 6e in the axial direction respectively to apply a preload to respective bearings via respective spacers. Although not shown, a clearance is formed between the inner ring pressing member 8a and the outer ring pressing member 9a and between the inner ring pressing member 8b and the outer ring pressing member 9b to construct the labyrinth between both pressing members.

Figure 18:
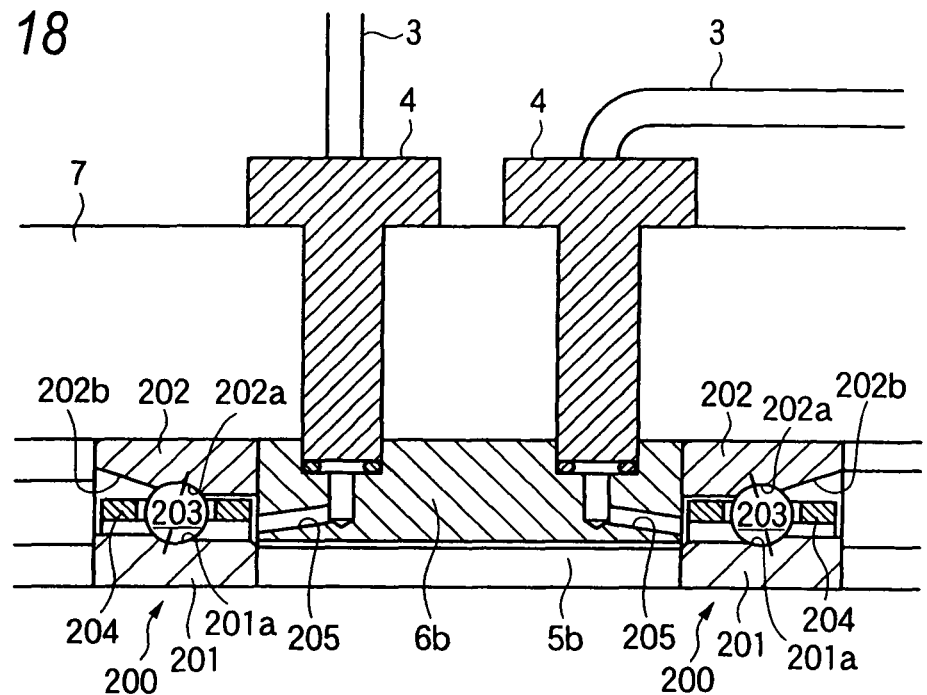
FIG. 18 is an enlarged sectional view of the spindle unit shown in FIG. 17 and showing a sixteenth embodiment of the present invention.

FIG. 18 is an enlarged sectional view of the spindle unit shown in FIG. 17. Here, the angular contact ball bearing 200 according to the sixteenth embodiment of the present invention and its peripheral structure will be explained hereunder.

Each angular contact ball bearing 200 shown in FIG. 18 includes an inner ring 201, an outer ring 202, a plurality of balls 203 arranged between an inner ring raceway 201a of the inner ring 201 and an outer ring raceway 202a of the outer ring 202, and a cage 204 for holding the balls 203 at an equal interval in the circumferential direction. The outer ring 202 has a taper portion 202b, which holds the balls 203 so as to keep a contact angle, on one side of the axial direction. In the following, one side of the axial direction in which the taper portion is formed is called the front side and the other side of the axial direction is called the back side.

In the present embodiment, the grease supply outer ring spacer 6b is arranged between the angular contact ball bearings 200. Two grease supply nozzles 4 that are passed through the housing 7 are inserted into the grease supply outer ring spacer 6b and then fixed thereto. The additional grease is supplied from an external grease supply unit 2 to the grease supply nozzles 4 via a supply piping 3 respectively.

The grease supply outer ring spacer 6b has supply holes 205 each serving as a grease supply system (or grease supply mechanism) that supplies the additional grease from a top end of the nozzle 4 to the inside of the angular contact ball bearing 200. The supply hole 205 has a circular cross section whose diameter is 0.1 to 5 mm, and is opened toward the inside of the bearing 200 (the inner side than the cage 204) in the axial direction. The supply hole 205 supplies the additional grease to a space between the inner ring 201 and the outer ring 202 from the back side in the axial direction. The grease is mainly supplied to the inner diameter side than the cage 204.

In this case, the supply hole 205 may be provided to plural locations of the grease supply outer ring spacer 6b at an interval in the radial direction. Also, preferably the grease should be supplied mainly to the inner diameter side than the cage 204, but such grease may be supplied to the outer diameter side.

The grease whose amount is set to 10 to 20% of the bearing space volume is initially sealed into a bearing space of the angular contact ball bearing 200. Then, after the running of the bearing is started, the grease supply unit 2 shoots the grease Gr via the supply holes 205 at appropriate timings (intermittently, periodically) to feed the grease of 0.004 cc to 0.1 cc as a supply amount at a time. The supplied grease is caused to fit with the overall interior of the angular contact ball bearing 200 together with the rolling of the balls 203 in the angular contact ball bearing 200 and to supplement the lack of the grease. Here, it is preferable that a supply amount of grease in each shot should be set to 0.01 cc to 0.03 cc. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the spindle unit onto which the angular contact ball bearing 200 is fitted can be prevented.

Seventeenth Embodiment

Figure 19:
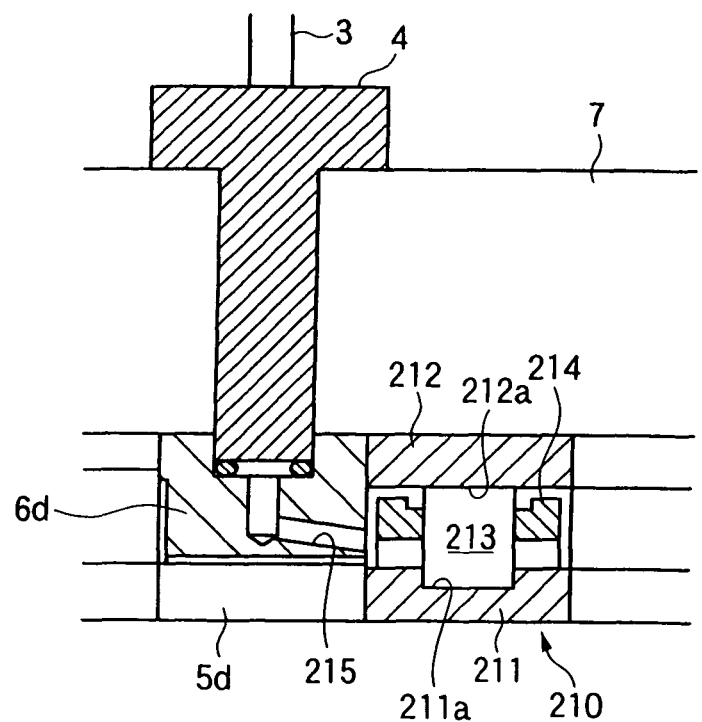
FIG. 19 is an enlarged sectional view of the spindle unit shown in FIG. 17 and showing a seventeenth embodiment of the present invention.

FIG. 19 is an enlarged sectional view of the spindle unit shown in FIG. 17. Here, a single row cylindrical roller bearing 210 according to a seventeenth embodiment of the present invention will be explained hereunder.

The single row cylindrical roller bearing 210 includes an inner ring 211, an outer ring 212, cylindrical rollers 213 arranged between a inner ring raceway 211a of the inner ring 211 and an outer ring raceway 212a of the outer ring 212, and a cage 214 for holding the balls 203 at an equal interval in the circumferential direction.

In the present embodiment, the grease supply outer ring spacer 6d is arranged adjacent to the cylindrical roller bearing 210 in the axial direction. The grease supply nozzle 4 that is passed through the housing 7 is inserted into the grease supply outer ring spacer 6d and then fixed thereto. The additional grease is supplied from the external grease supply unit 2 to the grease supply nozzle 4 via the supply piping 3.

The grease supply outer ring spacer 6d has a supply hole 215 serving as a grease supply system (or grease supply mechanism) that supplies the additional grease from the top end of the nozzle 4 to the inside of the bearing 210. The supply hole 215 has a circular cross section whose diameter is 0.1 to 5 mm, and is opened toward the inside of the bearing 210 (the inner side than the cage 214) in the axial direction. The supply hole 215 supplies the additional grease to a space between the inner ring 211 and the outer ring 212 from the back side in the axial direction. The grease is mainly supplied to the inner diameter side than the cage 214.

In this case, the supply hole 215 may be provided to plural locations of the grease supply outer ring spacer 6d at an interval in the radial direction. Also, it is preferable that the grease should be supplied mainly to the inner diameter side than the cage 214, but such grease may be supplied to the outer diameter side.

The grease whose amount is set to 10 to 20% of the bearing space volume is initially sealed into a bearing space of the cylindrical roller bearing 210. Then, after the running of the bearing is started, the grease supply unit 2 shoots the grease Gr via the supply holes 215 at appropriate timings (intermittently, periodically) to feed the grease of 0.004 cc to 0.1 cc as a supply amount at a time. The supplied grease is caused to fit with the overall interior of the cylindrical roller bearing 210 together with the rolling of the rollers 213 in the cylindrical roller bearing 210 and to supplement the lack of the grease. Here, it is preferable that a supply amount of grease in each shot should be set to 0.005 cc to 0.02 cc. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the spindle unit onto which the cylindrical roller bearing 210 is fitted can be prevented.

Figure 20:
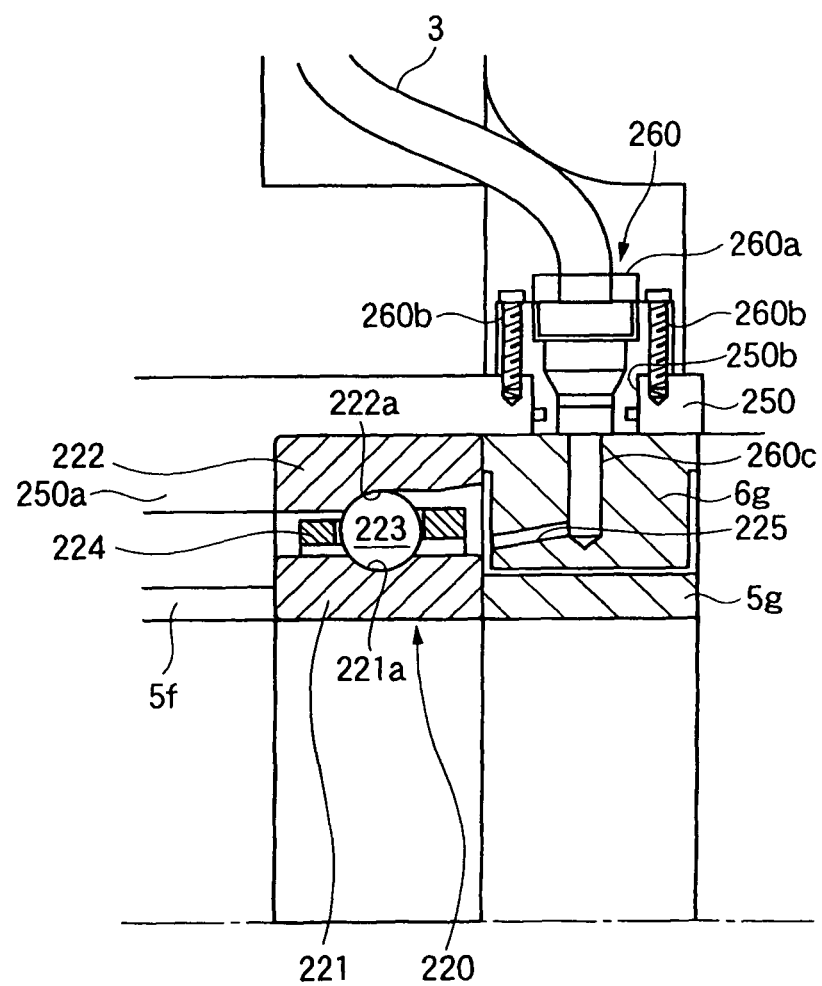
FIG. 20 is a sectional view showing a first variation of the sixteenth embodiment according to the present invention.

FIG. 20 is an enlarged sectional view of a spindle unit according to a first variation of the sixteenth embodiment.

An angular contact ball bearing 220 used in the present variation includes an inner ring 221 fitted onto the spindle, an outer ring 222 fitted into a housing 250, balls 223 arranged rollably between an inner ring raceway 221a of the inner ring 221 and an outer ring raceway 222a of the outer ring 222, and a cage 224 for holding the balls 223.

The housing 250 has a convex portion 250a projected inwardly in the radial direction. The outer ring 222 of the bearing 220 comes into contact with the convex portion 250a on the back side in the axial direction. An inner ring spacer 5f that faces to the convex portion 250a in the axial direction is arranged on the back side of the inner ring 221 in the axial direction.

Meanwhile, a grease supply outer ring spacer 6g is provided on the front side of the outer ring 222 in the axial direction. The grease supply outer ring spacer 6g faces to an inner ring spacer 5g in the radial direction. An opening 250b via which a grease supply nozzle 260 is inserted into the grease supply outer ring spacer 6g is formed in the housing 250 in a position that corresponds to an outer diameter surface of the grease supply outer ring spacer 6g. A base portion 260a of the grease supply nozzle 260 is fixed onto an outer diameter surface of the housing 250 by a fixing member 260b such as a screw, or the like. A top end portion 260c extended from the base portion 260a is inserted into the grease supply outer ring spacer 6g.

The grease supply outer ring spacer 6g has a supply hole 225 serving as a grease supply system (or a grease supply mechanism) that supplies the additional grease from the top end portion 260c of the grease supply nozzle 260 to the inside of the bearing 220. The supply hole 225 has a circular cross section whose diameter is 0.1 to 5 mm. The supply hole 225 supplies the additional grease to a space between the inner ring 221 and the outer ring 222 from the front side in the axial direction. An amount of additional grease is set to 0.004 cc to 0.1 cc as a supply amount at a time. It is preferable that a supply amount of additional grease in each shot should be set to 0.01 cc to 0.03 cc. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the spindle unit onto which the angular contact ball bearing 220 is fitted can be prevented.

In this case, the supply hole 225 may be provided in plural positions of the grease supply outer ring spacer 6g at an interval in the radial direction.

Figure 21:
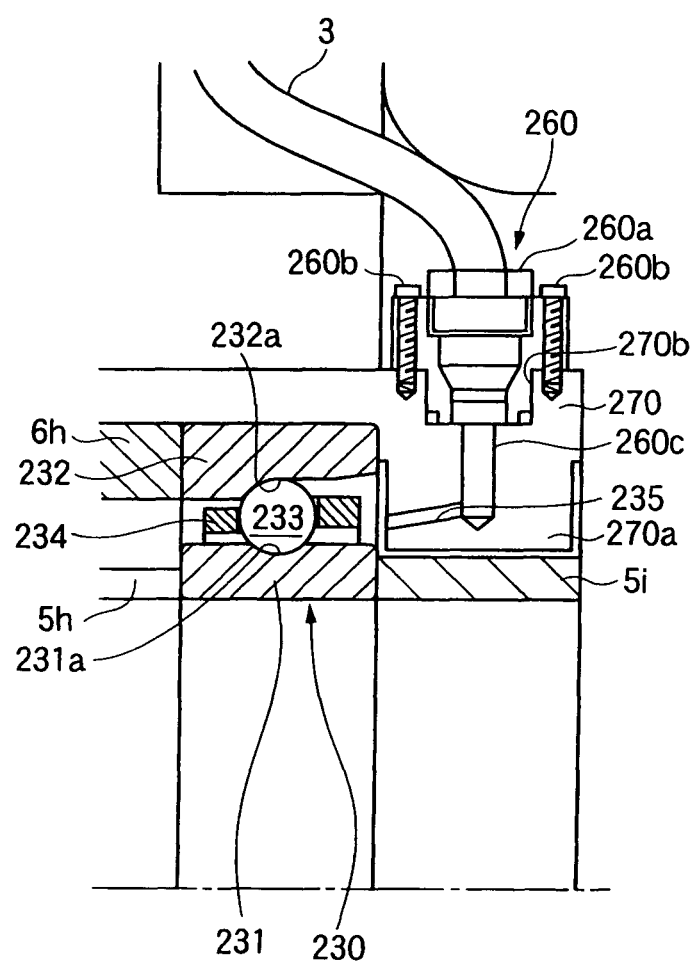
FIG. 21 is a sectional view showing a second variation of the sixteenth embodiment according to the present invention.

FIG. 21 is an enlarged sectional view showing a spindle unit according to a second variation of the sixteenth embodiment.

An angular contact ball bearing 230 used in the present variation includes an inner ring 231 fitted onto the spindle, an outer ring 232 fitted into a housing 270, balls 233 arranged rollably between an inner ring raceway 231a of the inner ring 231 and an outer ring raceway 232a of the outer ring 232, and a cage 234 for holding the balls 233.

The housing 270 has a convex portion 270a projected inwardly in the radial direction. The outer ring 232 of the bearing 230 comes into contact with the convex portion 270a on the front side in the axial direction. An inner ring spacer 5i that faces to the convex portion 270a in the radial direction is arranged on the front side of the inner ring 231. Meanwhile, an inner ring spacer 5h and an outer ring spacer 6h are provided on the back side of the outer ring 232 in the axial direction so as to oppose to each other.

An opening 270b via which the grease supply nozzle 260 is inserted into the convex portion 270a is formed on an outer diameter surface of the housing 270 on the opposite side to the convex portion 270a. The base portion 260a of the grease supply nozzle 260 is fixed onto an outer diameter surface of the housing 270 by the fixing member 260b such as the screw, or the like. The top end portion 260c extended from the base portion 260a is inserted into the inside of the convex portion 270a.

The convex portion 270a has a supply hole 235 serving as a grease supply system (or a grease supply mechanism) that supplies the additional grease from the top end portion 260c of the grease supply nozzle 260 to the inside of the bearing 230. The supply hole 235 has a circular cross section whose diameter is 0.1 to 5 mm. The supply hole 235 supplies the additional grease to a space between the inner ring 231 and the outer ring 232 on the front side in the axial direction. An amount of additional grease of 0.004 cc to 0.1 cc is fed at a time as a supply amount. It is preferable that a supply amount of additional grease in each shot should be set to 0.01 cc to 0.03 cc. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the spindle unit onto which the angular contact ball bearing 230 is fitted can be prevented. In this case, the supply hole 235 may be provided in plural positions of the convex portion 270a at an interval in the radial direction.

Figure 22:
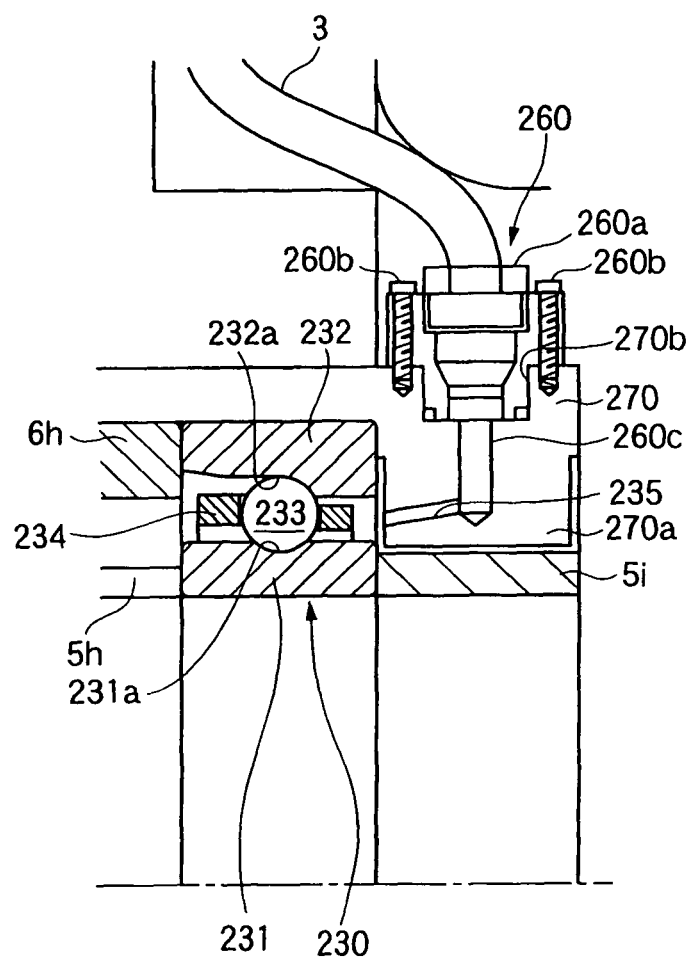
FIG. 22 is a sectional view showing a third variation of the sixteenth embodiment according to the present invention.

Also, FIG. 22 is an enlarged sectional view of a spindle unit according to a third variation of the sixteenth embodiment.

In the present variation, the front side and the back side of the angular contact ball bearing 230 in the second variation are exchanged mutually. The convex portion 270a of the housing 270 is provided on the back side of the angular contact ball bearing 230 in the axial direction. Other configurations are similar to those shown in FIG. 21.

In the present variation, the additional grease is supplied from the supply hole 235 formed in the convex portion 270a to the space between the inner ring 231 and the outer ring 232 on the back side in the axial direction. An amount of additional grease of 0.004 cc to 0.1 cc is fed at a time as a supply amount. It is preferable that a supply amount of additional grease in each shot should be set to 0.01 cc to 0.03 cc. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the spindle unit onto which the angular contact ball bearing 230 is fitted can be prevented.

Figure 23:
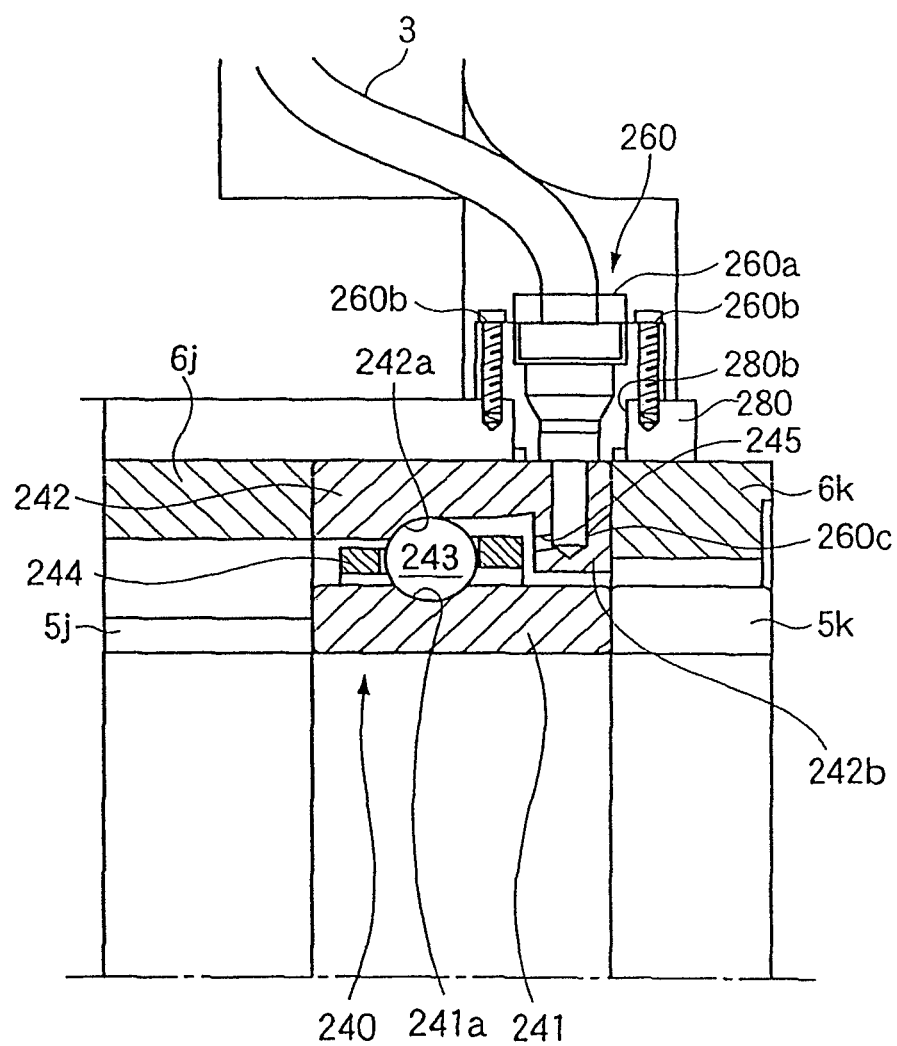
FIG. 23 is a sectional view showing a fourth variation of the sixteenth embodiment according to the present invention.

FIG. 23 is an enlarged sectional view of a spindle unit according to a fourth variation of the sixteenth embodiment.

An angular contact ball bearing 240 used in the present variation includes an inner ring 241 fitted onto the spindle, an outer ring 242 fitted into a housing 280, balls 243 arranged rollably between an inner ring raceway 241a of the inner ring 241 and an outer ring raceway 242a of the outer ring 242, and a cage 244 for holding the balls 243. A convex portion 242b that is projected inwardly from a taper portion in the radial direction is formed on an end portion of the outer ring 242 on the front side.

The outer ring 242 of the bearing 240 comes into contact with an outer ring spacer 6k on the front side in the axial direction, i.e., via the convex portion 242b and also comes into contact with an outer ring spacer 6j on the back side in the axial direction. Inner ring spacers 5j and 5k that face to the outer ring spacers 6j and 6k in the radial direction respectively are arranged on the back side and the front side of the inner ring 241 respectively.

The housing 280 has an opening 280b via which the grease supply nozzle 260 is inserted into the convex portion 242b is formed on an outer diameter surface of the outer ring 242 on the opposite side to the convex portion 242b. The base portion 260a of the grease supply nozzle 260 is fixed onto an outer diameter surface of the housing 280 by the fixing member 260b such as the screw, or the like. The top end portion 260c extended from the base portion 260a is inserted into the inside of the convex portion 242b of the outer ring 242 via the opening 280b.

The convex portion 242b has a supply hole 245 serving as a grease supply system (or a grease supply mechanism) that supplies the additional grease from the top end portion 260c of the grease supply nozzle 260 to the inside of the bearing 240. The supply hole 245 has a circular cross section whose diameter is 0.1 to 5 mm. The supply hole 245 supplies the additional grease to a space between the inner ring 241 and the outer ring 242 on the front side in the axial direction. An amount of additional grease of 0.004 cc to 0.1 cc is fed at a time as a supply amount. It is preferable that a supply amount of additional grease in each shot should be set to 0.01 cc to 0.03 cc. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the spindle unit onto which the angular contact ball bearing 240 is fitted can be prevented.

In this case, the supply hole 245 may be provided in plural positions of the convex portion 242b at an interval in the radial direction.

Figure 24:
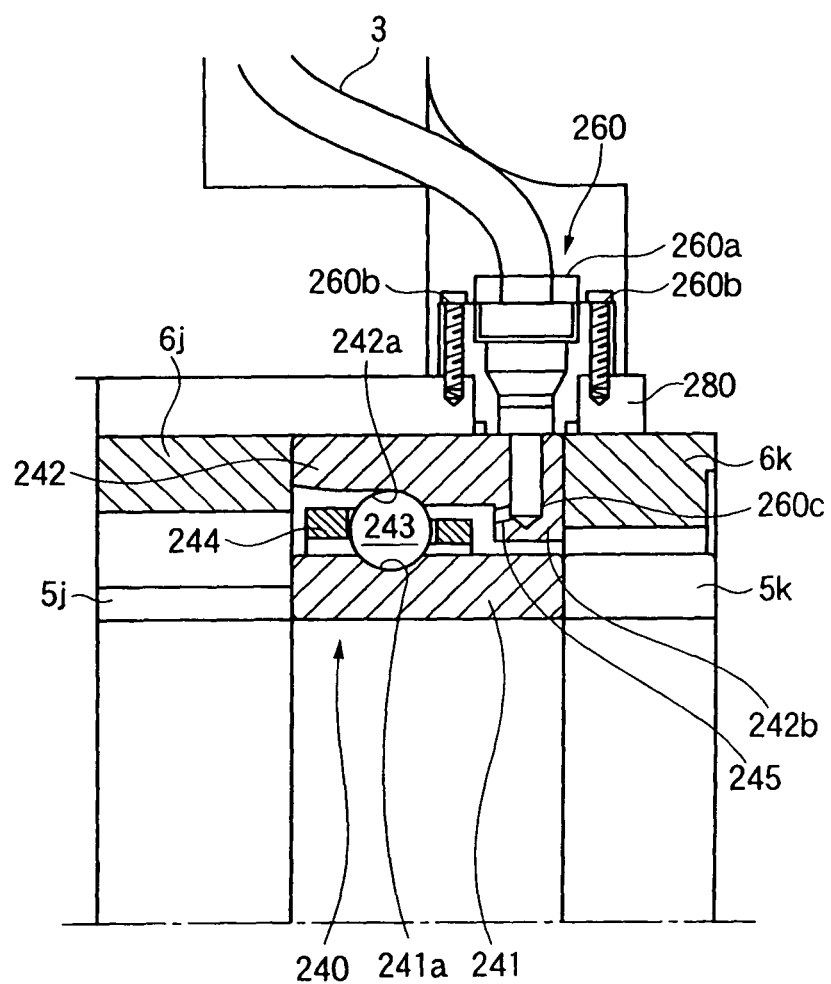
FIG. 24 is a sectional view showing a fifth variation of the sixteenth embodiment according to the present invention.

Also, FIG. 24 is an enlarged sectional view of a spindle unit according to a fifth variation of the sixteenth embodiment.

The present variation is a variation of the outer ring 242 of the angular contact ball bearing 240 in the fourth variation, in which the convex portion 242b of the outer ring 242 is formed on the back side of the angular contact ball bearing 240 in the axial direction. Other configurations are similar to those shown in FIG. 23.

In the present variation, the additional grease is supplied from the supply hole 245 formed in the convex portion 242b to the space between the inner ring 241 and the outer ring 242 on the back side in the axial direction. An amount of additional grease is set to 0.004 cc to 0.1 cc as a supply amount at a time. It is preferable that a supply amount of additional grease in each shot should be set to 0.01 cc to 0.03 cc. In the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the spindle unit onto which the angular contact ball bearing 240 is fitted can be prevented.

With the above configurations given in the sixteenth and seventeenth embodiments and the variations 1 to 5 of the sixteenth embodiment, the additional grease can be supplied to the inside of the bearing in the axial direction.

Also, it is needless to say that the similar advantages can be expected in other bearings by providing the similar supply hole.

Also, either a timing at which the spindle is stopped or a timing at which the spindle is running may be selected as the grease shooting timing.

The experiments on a supply amount of grease into the rolling bearing were performed as follows.

Example 1

The durability test was conducted by using a single row cylindrical roller bearing having an inner ring inner diameter 70 mm, an outer ring outer diameter 110 mm, and a width 20 mm (manufactured by NSK, a bearing designation N1014). The grease used in the durability test was Isoflex NBU15 (manufactured by NOK Crewbar Inc.), and an amount sealed of initial grease was set to 10% of the bearing space volume. The test condition was set to dmN=1,500,000.

In this durability test, three bearings were prepared and the grease was supplied to respective bearings by 0.01 cc, 0.004 cc, and 0.002 cc every 6 hours after the durability test was started. As a result, the bearing was seized up in its early stage when the grease of 0.002 cc was supplied. In contrast, when the grease of 0.004 cc or 0.01 cc was supplied, no trouble, failure, etc. were caused even after 1000 hours elapsed from the start of the durability test. It was found from the above results that, if the grease of 0.004 cc or more is fed with one shot, no problem arises in the durability of the rolling bearing.

Example 2

In order to confirm a relationship between a supply amount of grease and the pulsation of the temperature, the temperature pulsation confirmation test was conducted by using angular contact ball bearings 340, 350 each having an inner ring inner diameter 65 mm, an outer ring outer diameter 100 mm, a width 18 mm, a ball diameter 7.144 mm, and a contact angle 18°. The grease used in the temperature pulsation confirmation test was Isoflex NBU15 (manufactured by NOK Crewbar Inc.), and an amount sealed of initial grease was set to 15% of the bearing space volume. The test condition was set to dmN=1,800,000.

Figure 25:
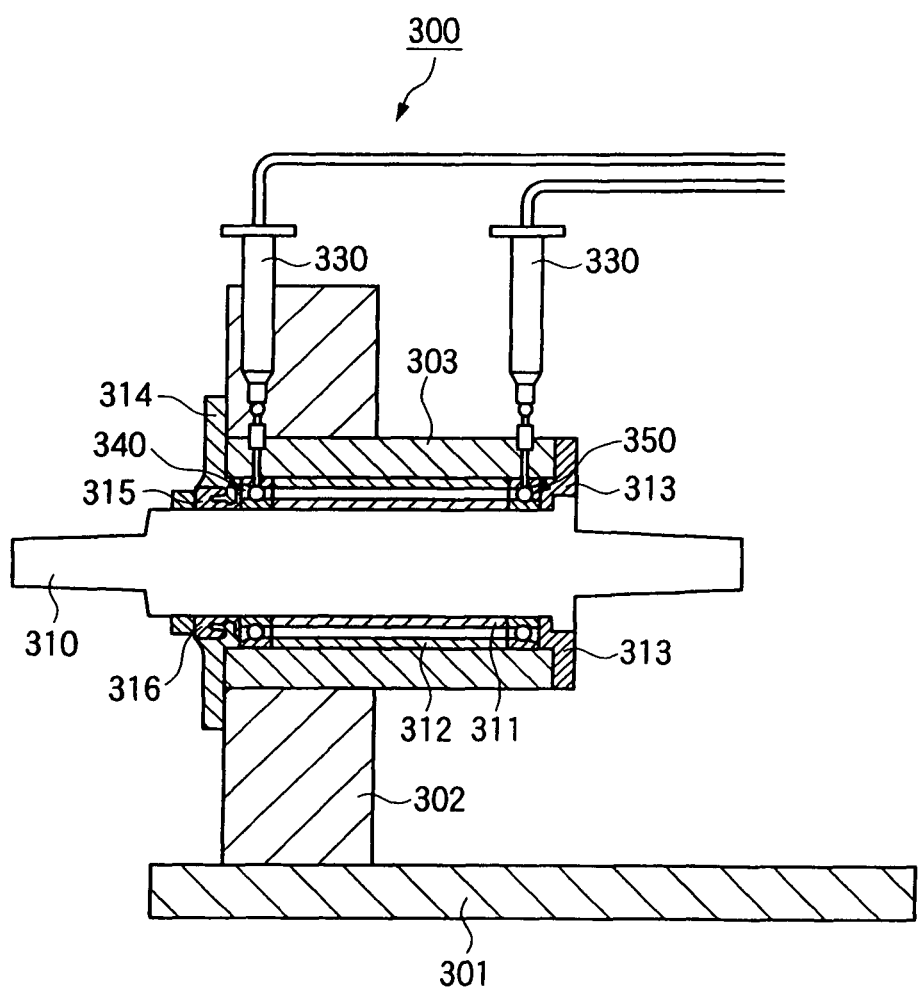
FIG. 25 is a view showing a test spindle unit used in a temperature pulsation confirmation test in Example 2.

This temperature pulsation confirmation test was conducted by using a test spindle unit 300 shown in FIG. 25. The test spindle unit 300 had such a configuration that a housing main body 303 is supported by a housing block 302 placed on a supporting table 301. The angular contact ball bearings 340, 350 were fitted into the housing main body 303 to construct a back-to-back arrangement mutually. The angular contact ball bearing 340 was fitted onto a spindle 310 to support this spindle 310 rotatably.

An inner ring spacer 311 was provided between inner rings of the angular contact ball bearings 340, 350, and an outer ring spacer 312 was provided between outer rings of the angular contact ball bearings 340, 350. Also, a rear end outer ring pressing 313 was provided to the rear end side of the angular contact ball bearing 350 in the axial direction (the right side in FIG. 25).

Also, an outer ring pressing member 314 and an inner ring pressing member 315 were provided to the front end side of the angular contact ball bearing 340 in the axial direction (the left side in FIG. 25). The angular contact ball bearings 340, 350 were pushed against the rear end outer ring pressing 313 side by the outer ring pressing member 314 and the inner ring pressing member 315 in the axial direction.

Figure 26:
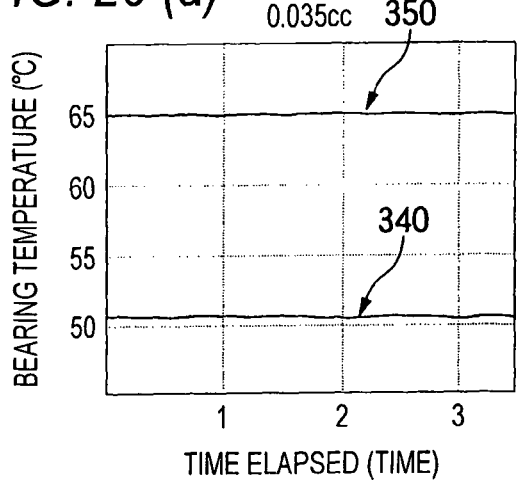
FIG. 26 is graphs showing results of the temperature pulsation confirmation test in Example 2, wherein (a) shows the case where a supply amount of grease is 0.035 cc, (b) shows the case where a supply amount of grease is 0.10 cc, (c) shows the case where a supply amount of grease is 0.15 cc, (d) shows the case where a supply amount of grease is 0.30 cc, and (e) shows the case where a supply amount of grease is 0.60 cc.
Figure 26:
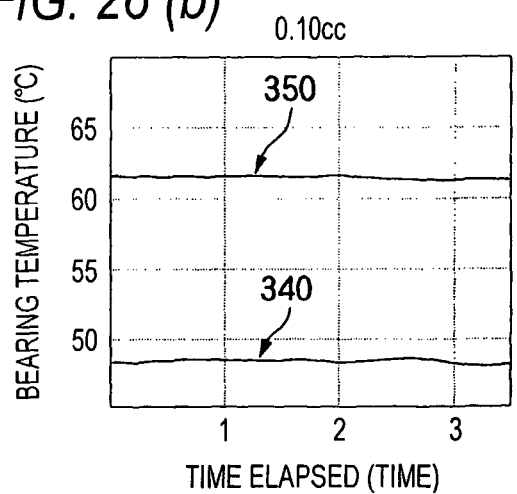
Figure 26:
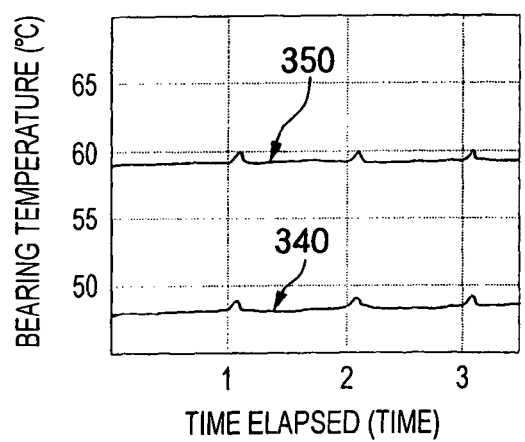
Figure 26:
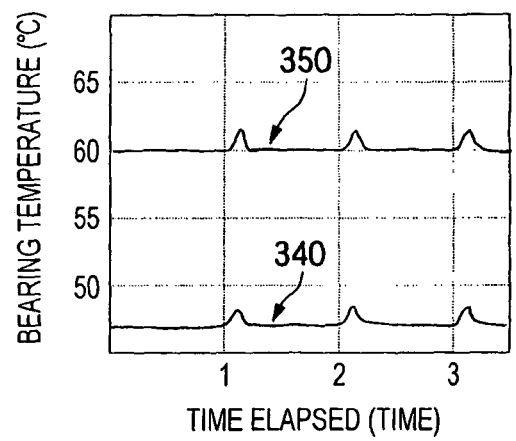
Figure 26:
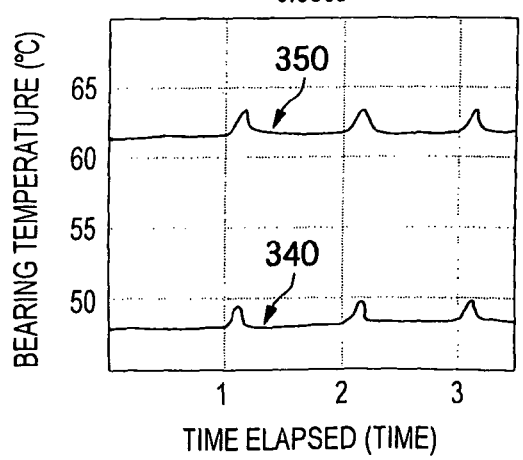

Nozzle members 330, 330 were fitted to the housing 303 to correspond to the angular contact ball bearings 340, 350. The nozzle members 330, 330 supplied the grease from holes, which are provided in the outer rings of the angular contact ball bearings 340, 350, to the bearing space. In this temperature pulsation confirmation test, the grease was supplied every one hour after the test is started. The test was conducted five times in total while setting an amount of grease being supplied to each spindle in each grease shot to 0.035 cc, 0.10 cc, 0.15 cc, 0.30 cc, and 0.60 cc respectively. FIG. 26 is graphs showing results of the temperature pulsation confirmation test, wherein (a) shows the case where a supply amount of grease is 0.035 cc, (b) shows the case where a supply amount of grease is 0.10 cc, (c) shows the case where a supply amount of grease is 0.15 cc, (d) shows the case where a supply amount of grease is 0.30 cc, and (e) shows the case where a supply amount of grease is 0.60 cc.

As shown in FIG. 26($a$),($b$), when a supply amount of grease was set to 0.035 cc or 0.10 cc, a bearing temperature of the angular contact ball bearings 340, 350 was not changed at all by executing the grease supply. However, as shown in FIG. 26($c$), when a supply amount of grease was set to 0.15 cc, it was found that a temperature of the angular contact ball bearings 340, 350 is increased by about 1° C. every time the grease is supplied. Similarly, as shown in FIG. 26($d$),($e$), when a supply amount of grease was set to 0.30 cc or 0.60 cc, it was found that the temperature of the angular contact ball bearings 340, 350 is increased by about 1 to 2° C. every time when the grease is supplied.

Here, a temperature in a steady state before the grease supply was different in the angular contact ball bearings 340, 350. It may be concluded that such temperature difference in the steady state depends on differences in peripheral structures between the angular contact ball bearing 340 and the angular contact ball bearing 350, e.g., difference in a distance from the housing block 302, difference in a heat suppressing rate generated due to a positional relationship with a cooling system (not shown), etc.

In any event, it may be considered that, when a supply amount of grease exceeds 0.15 cc, as shown in FIG. 26($c$) to FIG. 26($e$), the heat generation of the bearing is caused in the angular contact ball bearing 340 or the angular contact ball bearing 350 by the churning resistance, or the like of the supplied grease and therefore the temperature rise of the bearing, i.e., the temperature pulsation is caused. As a result, it was found that, if the grease of 0.1 cc or less is fed with one shot, the stable grease supply can be attained not to generate the temperature pulsation.

As described above, according to the first to seventeenth embodiments, since the new grease is supplied before the grease is degraded in its early stage and thus the bearing is broken down, the rolling bearing that is excellent in a high-speed running performance and has a prolonged lifetime can be provided although the grease lubrication is applied. Also, since the grease is supplied to the rolling bearing to feed a supply amount of 0.004 cc to 0.1 cc in each shot, the rolling bearing in which the temperature pulsation is not generated during the supply of the grease, and the machine tool spindle unit and the high-speed motor spindle unit using the same can be provided. In this manner, in the case where the grease shot is applied within the above range, generation of the abnormal temperature rise and damage of the bearing due to the degradation of the grease or the insufficient formation of the oil film is can be prevented, and the temperature pulsation during the supply of the grease can be suppressed, and also degradation of an axial precision of the machine tool onto which the bearing is fitted can be prevented.

According to the above embodiments, since the new grease is supplied from the outer ring side (the radial direction) or the outer ring spacer side (the axial direction) before the bearing is damaged due to the early degradation of the grease of the insufficient formation of the oil film, enhancement of the bearing lifetime can be attained. When the grease is supplied from the outer ring side, such grease is supplied from the outer ring inner diameter surface into the bearing space through the supply hole. In contrast, when the grease is supplied from the outer ring spacer side, such grease is supplied directly into the bearing space through the supply hole in the axial direction. It is preferable that the grease should be supplied toward the inner diameter side rather than the outer diameter when the grease is supplied from the outer ring spacer side. The supplied grease is adhered onto the rolling elements and the cage, and then is caused to fit with the overall interior of the bearing according to the rotation of the rolling elements and the cage.

Normally, in the case of the angular contact ball bearing that is incorporated into the spindle of the machine tool, an amount sealed of initial grease is set to 10% to 20% of the bearing space volume as a criterion. In contrast, in the case of the cylindrical roller bearing that is incorporated into the spindle of the machine tool, an amount sealed of initial grease is set to 8% to 15% of the bearing space volume as a criterion. This difference is derived from requests to reduce a time required for the initial running-in trial of the grease and to suppress the temperature rise. In particular, in the case of the cylindrical roller bearing, often the grease is jammed in the rolling roller during the initial running-in trial of the grease to generate the abnormal temperature rise. In the worst case, the seizure of the bearing is caused.

However, since a supply amount of grease in each shot is set to 0.004 cc to 0.1 cc like the above configuration, the abnormal temperature rise can be avoided and a necessity for the running-in trial can be neglected. In addition, since a supply amount of grease in one shot is set to 0.004 cc to 0.1 cc in the rolling bearing having the above configuration, the temperature pulsation can be suppressed and a machining precision of the machine tool spindle unit to which the rolling bearing is applied can be kept at a high level.

For instance, in the case where the bearing has a contact angle and the balls are used as the rolling element like the angular contact ball bearing, the supply hole is opened on the inner diameter surface of the outer ring in the location deviated from the side on which the contact portion of the raceway groove is present and then a supply amount of grease fed at a time via the supply hole is set to 0.004 cc to 0.1 cc. Therefore, the damage and the temperature pulsation during the running can be prevented.

If a diameter of the supply hole is set in a range of 0.1 to 5 mm, a predetermined amount of grease can be supplied smoother. In other words, neither the supply hole is plugged with the grease nor the grease is supplied excessively. In this case, the supply hole is not limited to a circular cross section. For example, the supply hole may be formed to have a rectangular cross section or a polygonal cross section that has a sectional area equivalent to the circular cross section whose diameter is 0.1 to 5 mm.

In the above embodiment, the enhanced lifetime can be attained even in the environment in which dmN is set to 1,000,000 or more.

Eighteenth Embodiment

Next, eighteenth to twenty-ninth embodiments according to the present invention will be explained in detail with reference to the drawings hereunder. In FIG. 28 et seq. showing respective embodiments described in the following, the same symbols or like symbols are affixed to the same or like portions to the members, etc. explained in FIG. 27 and thus their explanations will be simplified or omitted herein.

As shown in FIG. 27(a)(b), in a grease supply system 410 of an eighteenth embodiment, an inner ring 412 of a bearing (ball bearing) 411 is fitted onto a spindle 413 and an outer ring 414 of the bearing 411 is fitted into a housing 415, a grease filling hole 416 is formed to pass through the housing 415, a supply hole 417 serving as a grease supply system (grease supply mechanism) is formed to pass through the outer ring 414 of the bearing 411 and align with the grease filling hole 416, an annular groove 418 containing the supply hole 417 is formed on an outer periphery 414A of the outer ring 414, and a clearance L between the housing 415 and the outer ring 414 is set to 30 μm or less.

According to the bearing grease supply system 410 in the eighteenth embodiment, the annular groove 418 containing the supply hole 417 is formed on the outer periphery 414A of the outer ring 414. Therefore, the grease supplied to the grease filling hole 416 in the housing 415 flows into the annular groove 418, and then the grease flowing into the annular groove 418 flows into the supply hole 417 in the outer ring 414.

Then, the grease flowing into the supply hole 417 flows into the inside of the bearing 411. In this manner, the grease fed to the grease filling hole 416 in the housing 415 can be supplied to the inside of the bearing 411 via the annular groove 418.

Also, the annular groove 418 containing the supply hole 417 is formed on the outer periphery 414A of the outer ring 414. Therefore, when the bearing 411 is fitted into the housing 415, the grease filling hole 416 and the supply hole 417 are communicated with each other via the annular groove 418 without alignment between the supply hole 417 in the outer ring 414 and the grease filling hole 416 in the housing 415.

As a result, the bearing 411 can be fitted into the housing 415 not to take operator's time, the fitting operation can be simplified, and the workload of the operator can be lessened.

In addition, the clearance L between the housing 415 and the outer ring 414 is set to 30 μm or less. Therefore, such clearance between the housing 415 and the outer ring 414 can be set small.

As a result, the grease flowing into the annular groove 418 can be prevented from flowing out from the clearance L between the housing 415 and the outer ring 414, so that it can be prevented that the supplied grease flows out of the bearing 411.

Nineteenth Embodiment

As shown in FIG. 28(a)(b), in a grease supply system 420 of a nineteenth embodiment, the inner ring 412 of the bearing 411 is fitted onto the spindle 413 and the outer ring 414 of the bearing 411 is fitted into the housing 415, the grease filling hole 416 is formed to pass through the housing 415, the supply hole 417 is formed to pass through the outer ring 414 of the bearing 411 and align with the grease filling hole 416, and an annular groove 421 facing to the supply hole 417 is formed on an inner periphery 415A of the housing 415.

According to the bearing grease supply system 420 in the nineteenth embodiment, the annular groove 421 facing to the supply hole 417 is formed on the inner periphery 415A of the housing 415. Therefore, the grease supplied to the grease filling hole 416 in the housing 415 flows into the annular groove 421, and then the grease flowing into the annular groove 421 flows into the supply hole 417 in the outer ring 414.

Then, the grease flowing into the supply hole 417 flows into the inside of the bearing 411. In this manner, the grease fed to the grease filling hole 416 in the housing 415 can be supplied to the inside of the bearing 411 via the annular groove 421.

Also, the annular groove 421 facing to the supply hole 417 is formed on the inner periphery 415A of the outer ring 414. Therefore, when the bearing 411 is fitted into the housing 415, the grease filling hole 416 and the supply hole 417 are communicated with each other via the annular groove 421 without alignment between the grease filling hole 416 in the housing 415 and the supply hole 417 in the outer ring 414.

As a result, the bearing 411 can be fitted into the housing 415 not to take operator's time, the fitting operation can be simplified, and the workload of the operator can be lightened.

Twentieth Embodiment

As shown in FIG. 29(a)(b), in a grease supply system 430 of a twentieth embodiment, the inner ring 412 of the bearing 411 is fitted onto the spindle 413 and the outer ring 414 of the bearing 411 is fitted into the housing 415, the grease filling hole 416 is formed to pass through the housing 415, the supply hole 417 is formed to pass through the outer ring 414 of the bearing 411 and align with the grease filling hole 416, the annular groove 418 containing the supply hole 417 is formed on the outer periphery 414A of the outer ring 414, a pair of outer annular grooves 431 are formed on the outer periphery 414A of the outer ring 414 on both sides of the supply hole 417, and an O ring 432 is fitted into a pair of outer annular grooves 431.

According to the bearing grease supply system 430 in the twentieth embodiment, the advantages similar to those of the bearing grease supply system 410 in the eighteenth embodiment can be achieved.

In addition, according to the bearing grease supply system 430 in the twentieth embodiment, if the grease flowing into the annular groove 418 flows out of the clearance L between the housing 415 and the outer ring 414 by any chance, such grease can be sealed by a pair of O rings 432 and thus the outflow of the grease to the outside of the bearing 411 can be prevented.

Twenty-First Embodiment

Figure 30:
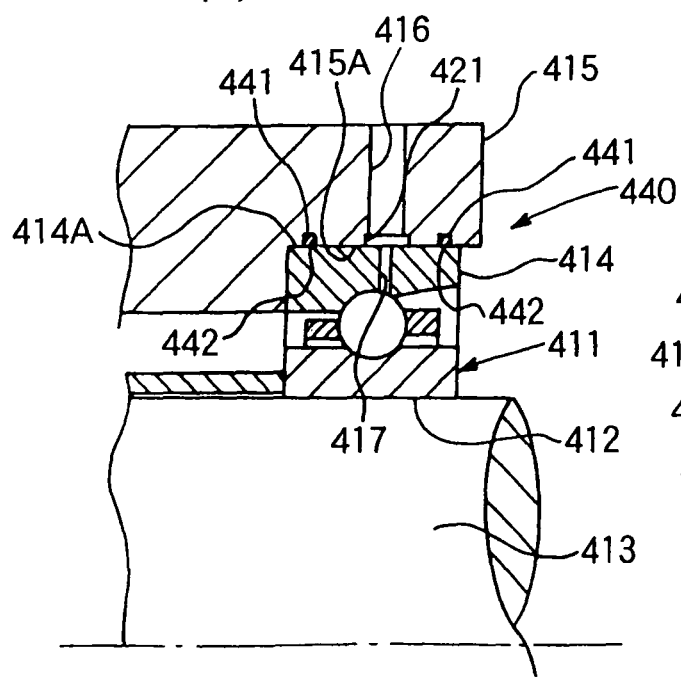
FIG. 30(a) is a sectional view showing a twenty-first embodiment according to the present invention.
FIG. 30(b) is a plan view of an inner periphery of the housing in FIG. 30(a)
Figure 30:
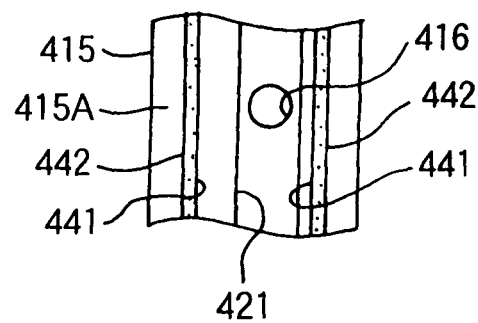

As shown in FIG. 30(a)(b), in a grease supply system 440 of a twenty-first embodiment, the inner ring 412 of the bearing 411 is fitted onto the spindle 413 and the outer ring 414 of the bearing 411 is fitted into the housing 415, the grease filling hole 416 is formed to pass through the housing 415, the supply hole 417 is formed to pass through the outer ring 414 of the bearing 411 and align with the grease filling hole 416, the annular groove 421 facing to the supply hole 417 is formed on the inner periphery 415A of the housing 415, a pair of outer annular grooves 441 are formed on the inner periphery 415A of the housing 415 on both sides of the grease filling hole 416, and an O ring 442 is fitted into a pair of outer annular grooves 441.

According to the bearing grease supply system 440 in the twenty-first embodiment, the advantages similar to those of the bearing grease supply system 420 in the nineteenth embodiment can be achieved.

Twenty-Second Embodiment

Figure 31:
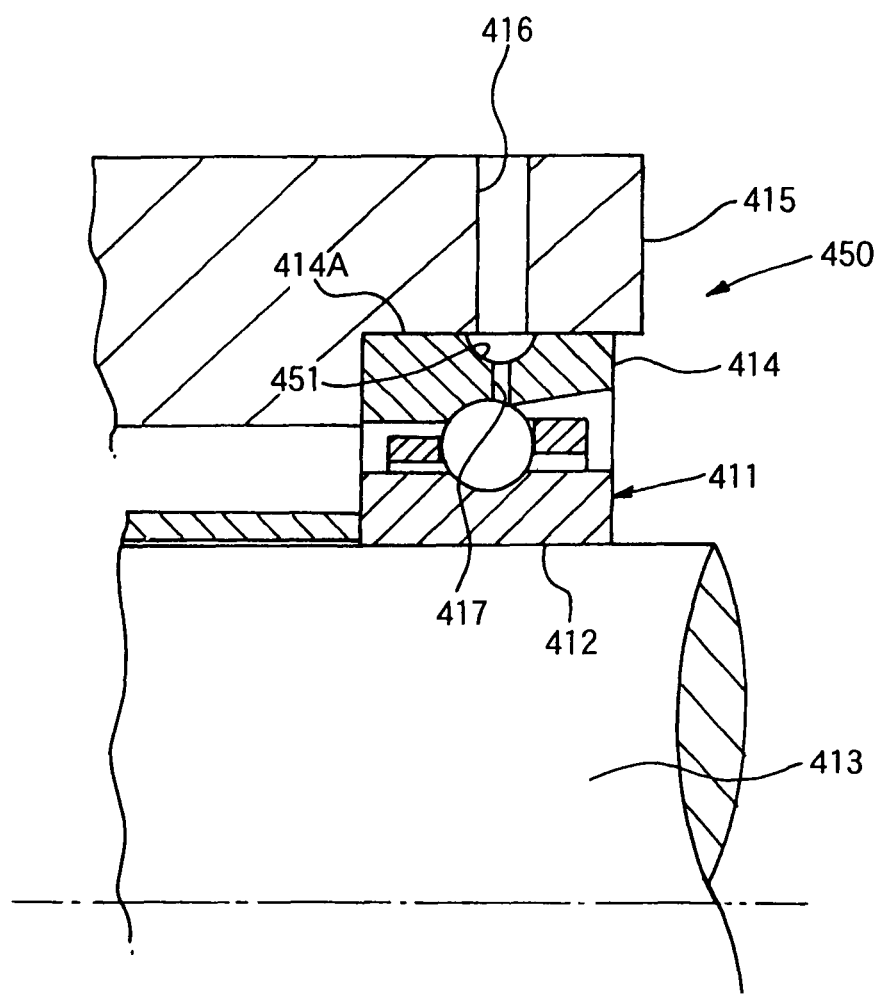
FIG. 31 is a sectional view showing a twenty-second embodiment of a bearing grease supply system according to the present invention.

As shown in FIG. 31, a bearing grease supply system 450 in a twenty-second embodiment is merely different from the bearing grease supply system 410 in the eighteenth embodiment in that an annular groove 451 formed on the outer periphery 414A of the outer ring 414 to contain the supply hole 417 has a circular-arc or curved cross section. Other configurations are similar to those in the eighteenth embodiment.

According to the bearing grease supply system 450 in the twenty-second embodiment, the advantages similar to those of the bearing grease supply system 410 in the eighteenth embodiment can be achieved.

Twenty-Third Embodiment

Figure 32:
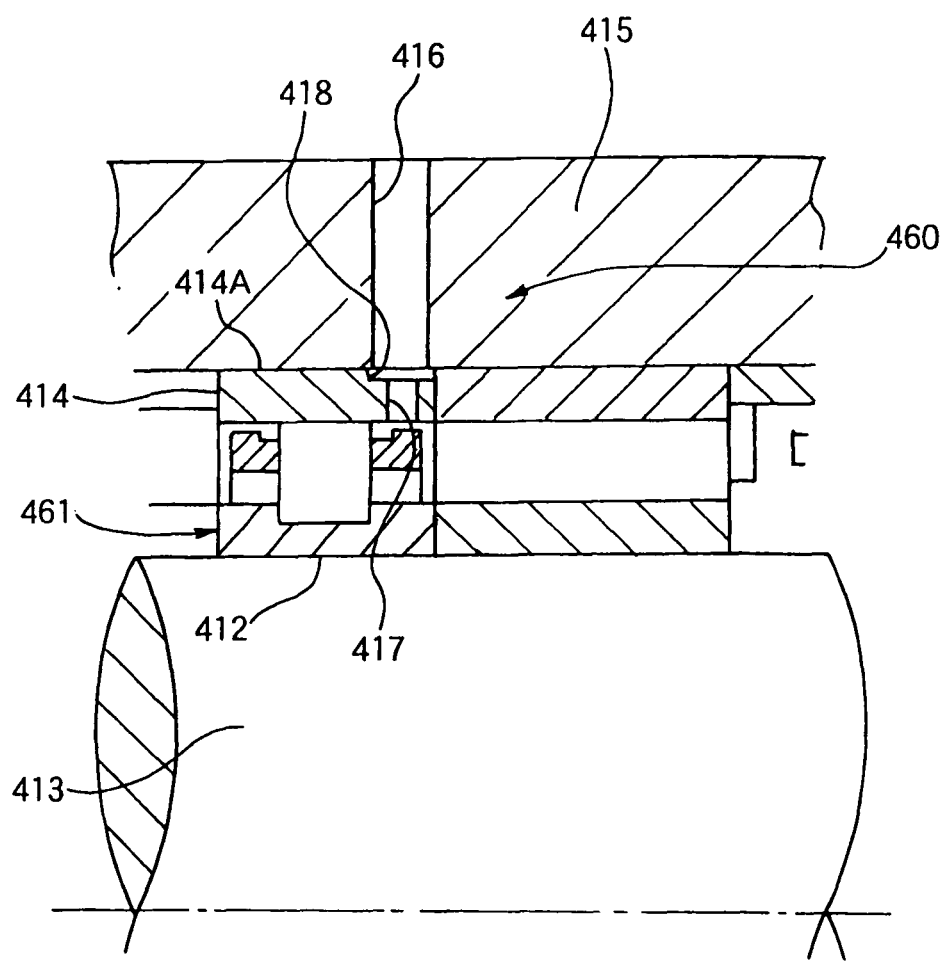
FIG. 32 is a sectional view showing a twenty-third embodiment of a bearing grease supply system according to the present invention.

As shown in FIG. 32, a bearing grease supply system 460 in a twenty-third embodiment is only different from the bearing grease supply system 410 in the eighteenth embodiment in that a rolling bearing 461 such as the cylindrical roller, or the like is employed. Other configurations are similar to those in the eighteenth embodiment.

According to the bearing grease supply system 460 in the twenty-third embodiment, the advantages similar to those of the bearing grease supply system 410 in the eighteenth embodiment can be achieved.

Twenty-Fourth Embodiment

Figure 33:
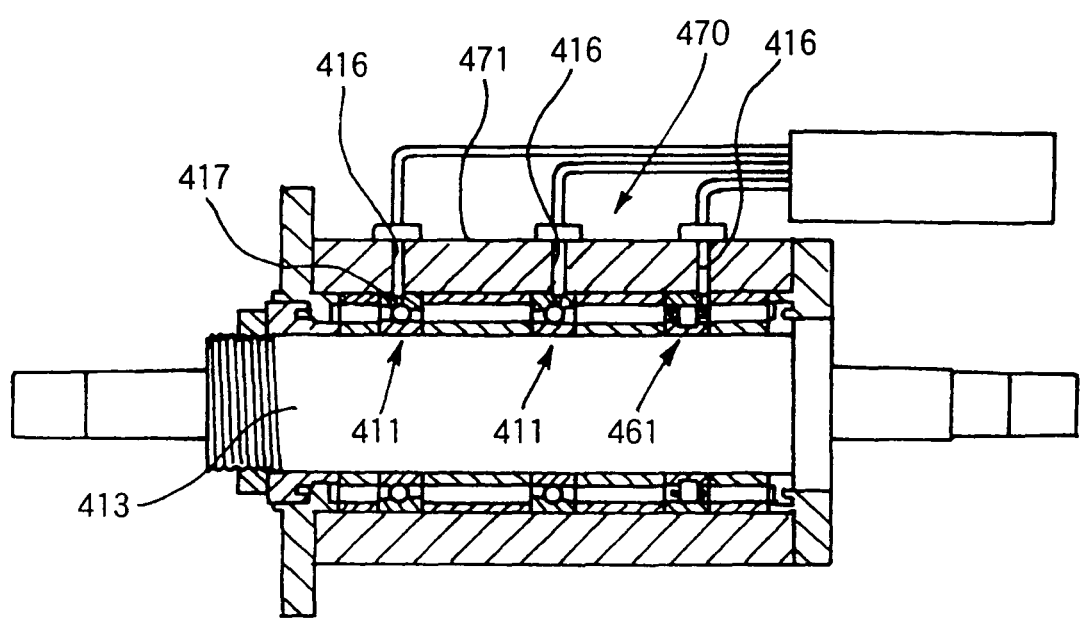
FIG. 33 is a sectional view showing a twenty-fourth embodiment of a bearing grease supply system according to the present invention.

As shown in FIG. 33, a bearing grease supply system 470 in a twenty-fourth embodiment is applied to an overall spindle 471 that is supported by the bearing 411 and the bearing 461. The advantages similar to those of the bearing grease supply system 410 in the eighteenth embodiment can be achieved.

Twenty-Fifth Embodiment

Figure 34:
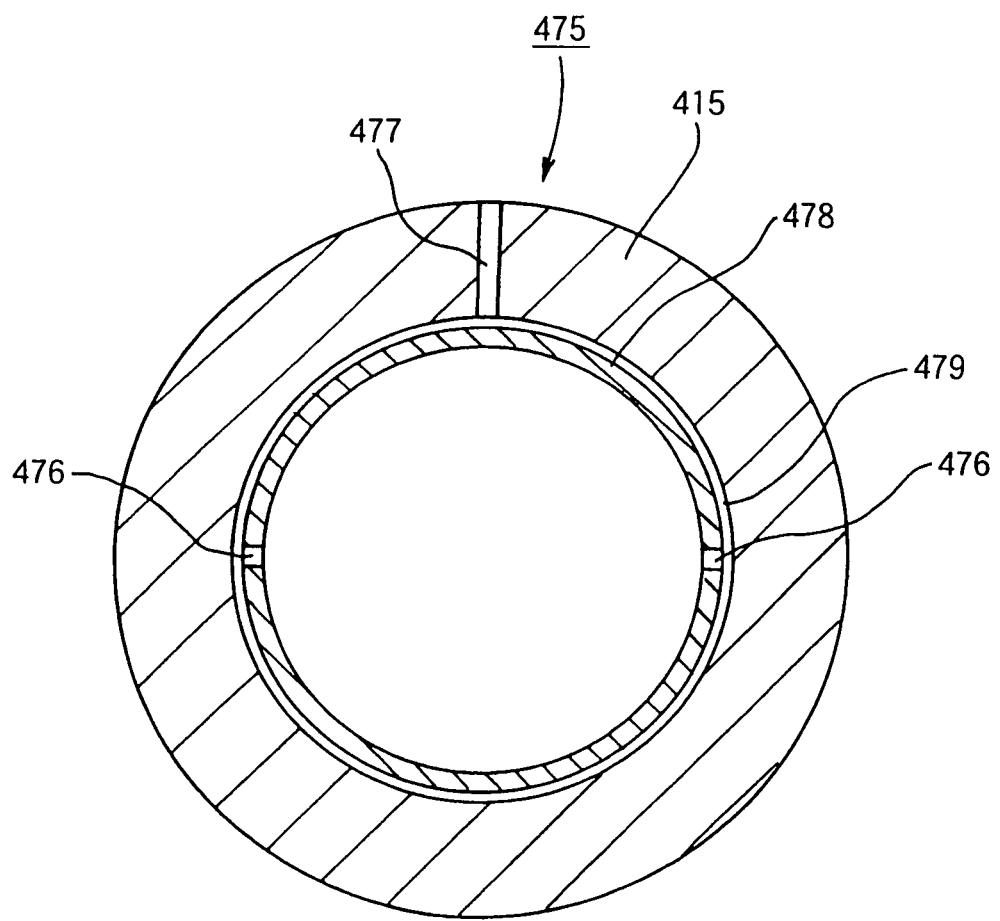
FIG. 34 is a sectional view showing a twenty-fifth embodiment according to the present invention.

As shown in FIG. 34, a bearing grease supply system 475 in a twenty-fifth embodiment has two outer ring supply holes 476 or more serving as a grease supply system (or a grease supply mechanism). In FIG. 34, a symbol 477 denotes a grease filling hole, 478 denotes a bearing outer ring, and 479 denotes an annular groove formed on an outer peripheral surface of a bearing outer ring.

In this twenty-fifth embodiment, the probability is high that a distance between the grease filling hole 477 and the outer ring supply hole 476 becomes shorter than the case where one outer ring supply hole 476 is formed.

According to this structure, a distance over which the grease supplied from the grease filling hole 477 flows through the outer ring supply holes 476 and then is supplied from the outer ring supply holes 476 to the inside of the bearing is shortened. Such an advantage can be achieved that the outflow of the grease to the outside of the bearing can be prevented by the resistance given by the groove, etc.

Twenty-Sixth Embodiment

Figure 35:
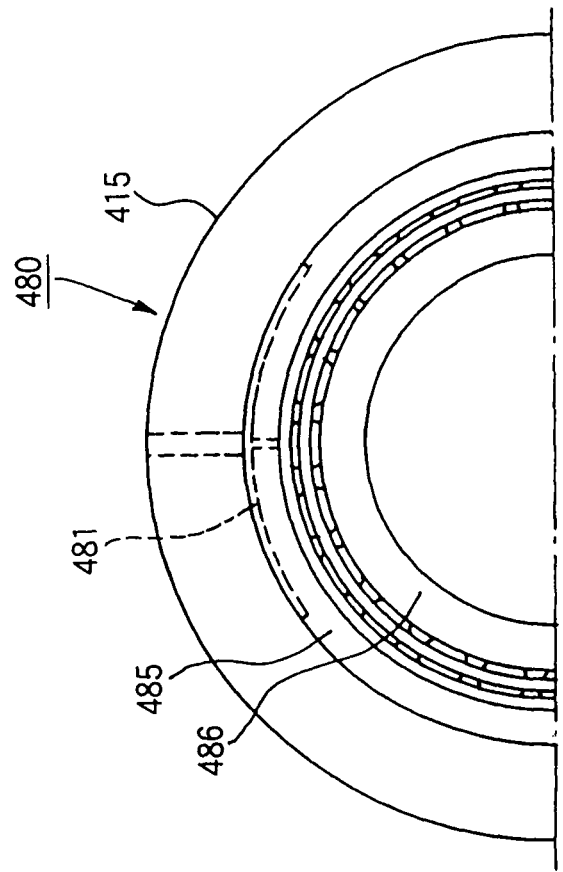
FIG. 35(a) is a sectional view showing a twenty-sixth embodiment according to the present invention.
FIG. 35(b) is a side view of FIG. 35(a)
Figure 35:
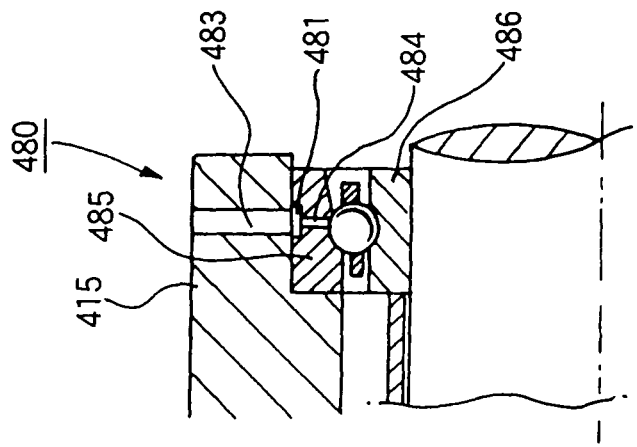

As shown in FIG. 35(a)(b), in a bearing grease supply system 480 in a twenty-sixth embodiment, a grease supplying annular groove 481 is not provided on an outer ring periphery over 360 but the annular groove 481 is provided on a part of the periphery. In this case, the advantages similar to those of the bearing grease supply system 410 in the eighteenth embodiment can also be achieved.

Twenty-Seventh Embodiment

As shown in FIG. 36(a)(b), in a bearing grease supply system 490 in a twenty-seventh embodiment, a notch 491 is provided on the outer periphery in place of the above grease supplying annular groove on the outer ring. In this case, the advantages similar to those of the bearing grease supply system 410 in the eighteenth embodiment can also be achieved.

Twenty-Eighth Embodiment

As shown in FIG. 37(a)(b), in a bearing grease supply system 495 in a twenty-eighth embodiment, a bearing outer ring 485 is sandwiched by the housing 415, the spacers, and the like. Then, a notch 496 is provided on an outer diameter portion of the outer ring 485. In this case, although the grease supply groove is not shaped into the annular shape but the notched shape, the advantages similar to those of the bearing grease supply system 410 in the eighteenth embodiment can also be achieved.

Twenty-Ninth Embodiment

As shown in FIG. 38(a)(b), in a bearing grease supply system 500 in a twenty-ninth embodiment, the bearing outer ring 485 is sandwiched by the housing 415, the spacers, and the like. Then, a grease supply notch 501 is provided to a portion of the outer ring 485, to which an outer ring supply hole 484 to which the grease is supplied is provided.

This grease supply notch 501 is set smaller in diameter than others. In this case, the advantages similar to those of the bearing grease supply system 410 in the eighteenth embodiment can also be achieved.

Here, in above twenty-sixth to twenty-ninth embodiments, the groove and the notch are provided to the outer ring diameter portion. But the notch may be provided to the housing 415. In this case, the similar advantages can also be achieved.

Example 3

Next, a grease supplied state, a fitting time, and a grease leakage in the bearing grease supply system in eighteenth to twenty-ninth embodiments will be explained with reference to Table 1 hereunder.

Figure 27:
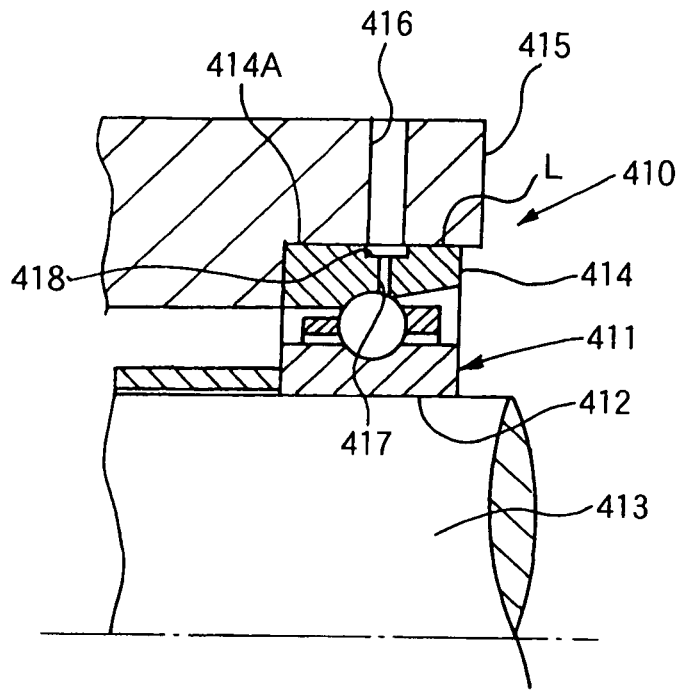
FIG. 27(a) is a sectional view showing an eighteenth embodiment according to the present invention.
FIG. 27(b) is a plan view of an outer periphery of the rolling bearing in FIG. 27(a)
Figure 27:
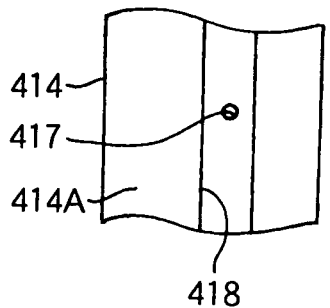
Figure 28:
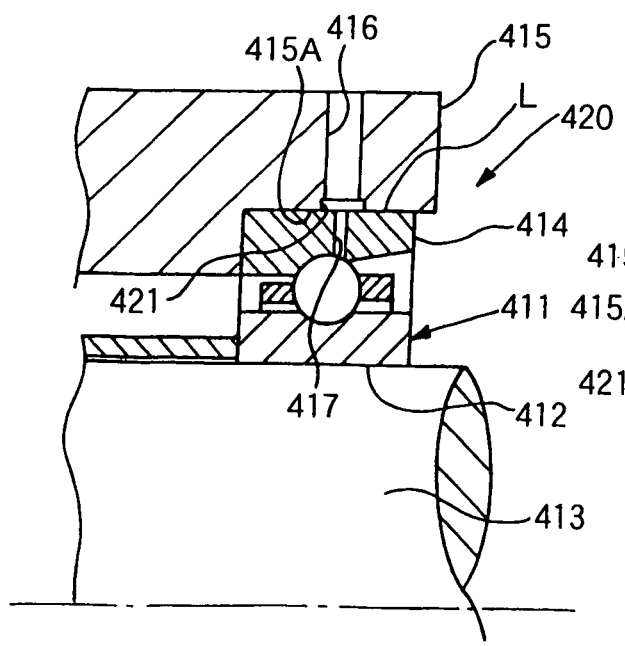
FIG. 28(a) is a sectional view showing a nineteenth embodiment according to the present invention.
FIG. 28(b) is a plan view of an inner periphery of the housing in FIG. 28(a)
Figure 28:
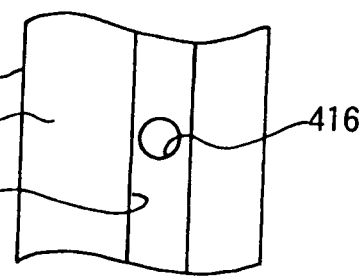
Figure 29:
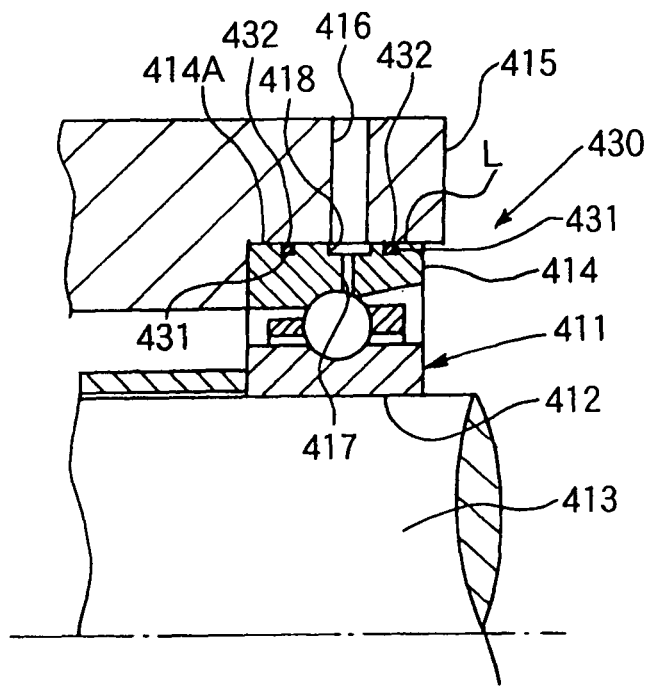
FIG. 29(a) is a sectional view showing a twentieth embodiment according to the present invention.
FIG. 29(b) is a plan view of an outer periphery of the rolling bearing in FIG. 29(a)
Figure 29:
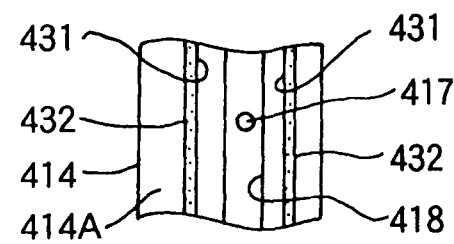
Figure 121:
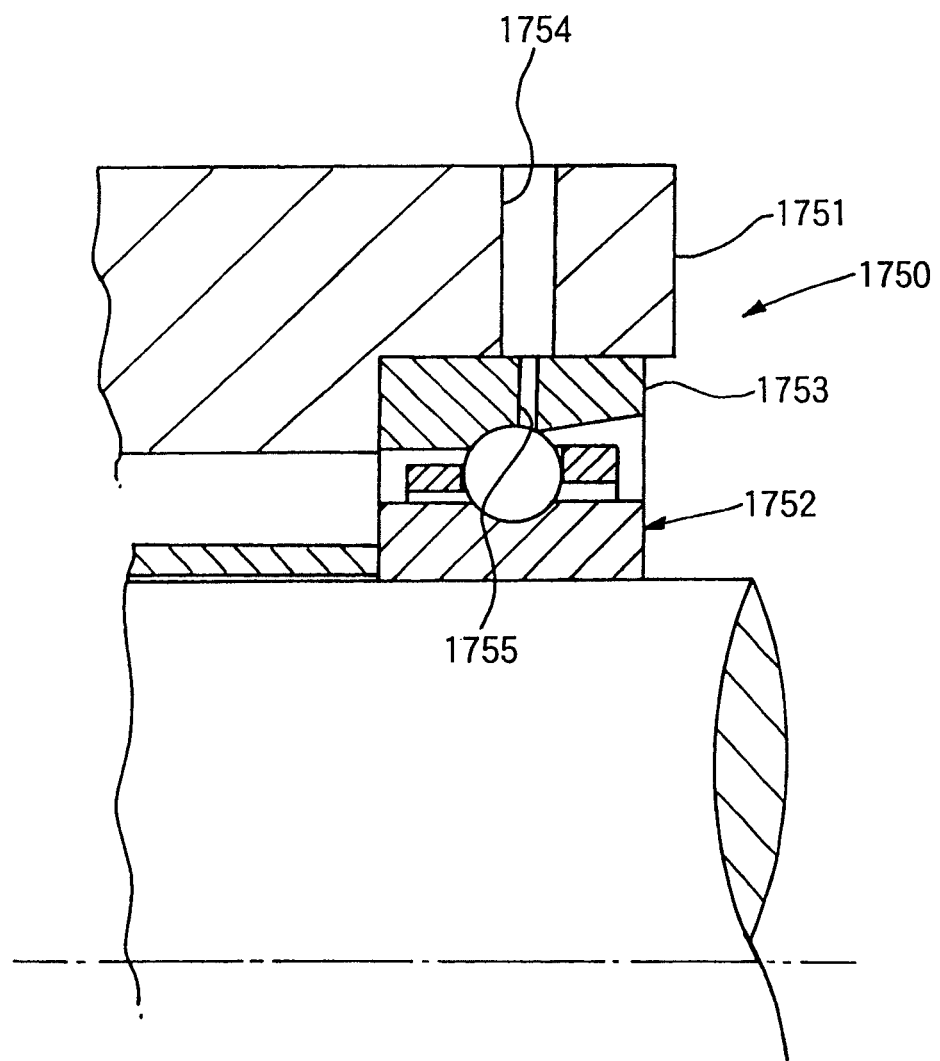

In Table 1, Comparative Example corresponds to the bearing grease supply system 1750 shown in FIG. 121 in which no annular grove is provided between the grease filling hole 1754 and the supply hole 1755, System A corresponds to the bearing grease supply system 410 shown in FIG. 27, System B corresponds to the bearing grease supply system 410 shown in FIG. 27 in which the clearance L is changed into 50 μm, and System C corresponds to the bearing grease supply system 430 shown in FIG. 29.

TABLE 1

|  | Comparative Example | System A | System B | System C |
|---|---|---|---|---|
| Diameter of outer ring supply hole | 1.2 mm | 1.2 mm | 1.2 mm | 1.2 mm |
| Annular groove | Not formed | Formed | Formed | Formed |
| Outer annular groove O ring | Not provided | Not provided | Not provided | Provided |
| Clearance between housing and bearing | 20 μm | 20 μm | 50 μm | 20 μm |
| Actual amount supplied 1-st | 0.048 cc | 0.050 cc | 0.048 cc | 0.050 cc |
| 2-nd | 0.050 cc | 0.048 cc | 0.049 cc | 0.048 cc |
| 3-rd | 0.050 cc | 0.049 cc | 0.050 cc | 0.046 cc |
| Aligning operation time | 20 min | 1 min | 1 min | 1 min |
| Remarks | The fitting time was long | No leakage of grease when the O ring was not used. | No leakage of grease when the O ring was not used. | — |

A supply amount of grease: 0.05 cc

The bearing 411 used in the measurement had inner diameter×outer diameter×width of 65 mm×100 mm×18 mm. The grease was sealed into the annular groove 418 of the outer ring 414 before the bearing 411 was inserted into the housing 415.

In Comparative Example and Systems A to C prepared in this way, the grease of 0.05 cc was supplied to the inside of the bearing under measuring conditions shown in Table 1, and then the grease supplied state was measured.

As a result, it was confirmed that, since the annular groove 418 is formed on the outer periphery of the outer ring of the bearing 411, the aligning operation between the grease filling hole 416 in the housing 415 and the supply hole 417 in the outer ring 414 can be improved from 20 minute in Comparative Example to 1 minute in Systems A to C.

Also, in the case where the clearance L between the housing 415 and the outer ring 414 was set to 50 μm, it was confirmed that, unless a pair of outer annular grooves 431 are formed like the twentieth embodiment shown in FIG. 29 and then the O ring 432 is fitted into the outer annular grooves 431, the grease in no way leaks out from the clearance between the housing 415 and the outer ring 414 and thus such grease can be supplied to the inside of the bearing 411.

Here, the present invention is not limited to the above embodiments, and appropriate variation, improvement, etc. may be applied. And, material, shape, dimension, mode, number, allocation, thickness, etc. of the bearings 411, 461, the outer ring 414, the housing 415, the grease filling hole 416, the supply hole 417, the annular grooves 418, 421, the outer annular grooves 431, 441, the O rings 432, 442, etc. illustrated in the foregoing embodiments are not particularly restricted, and may be selected arbitrarily if they can attain the present invention.

Example 4

Under following test conditions, the evaluation test 1 was carried out to check what relationship exists between an annular groove sectional area A1 (mm$^2$) on the outer peripheral surface of the bearing outer ring and a peripheral length L (mm) of the annular groove cross section when the grease can be supplied to the inside of the bearing.

The results are given in Table 2.

TABLE 2

|  | Test No. | | | | | |
|---|---|---|---|---|---|---|
|  | 1-1 | 1-2 | 1-3 | 1-4 | 1-5 | 1-6 |
| Annular groove shape | FIG. 39(a) | FIG. 39(c) | FIG. 39(d) | FIG. 39(b) | FIG. 39(e) | FIG. 39(f) |
| Annular groove sectional area A1 (mm$^2$) | 2.1 | 2.1 | 1.4 | 1.45 | 1.04 | 1.05 |
|  | 6.6 | 7.4 | 5.4 | 6.6 | 4.2 | 4.4 |
| Annular groove sectional area A1 (mm$^2$)/Peripheral length of annular groove cross section | 0.32 | 0.28 | 0.26 | 0.22 | 0.25 | 0.24 |
| Bearing inside discharge result | ○ | ○ | ○ | X | ○ | X |

The conditions of the evaluation test 1 were given as follows.

The bearing used: inner diameter×outer diameter×width: 65 mm×100 mm×18 mm

Figure 39:
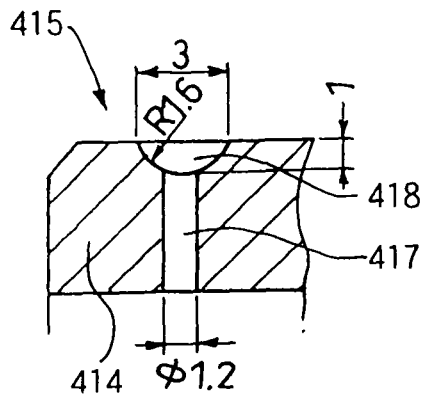
FIG. 39 is a view showing a bearing used in an evaluation test 1 according to the present invention.
Figure 39:
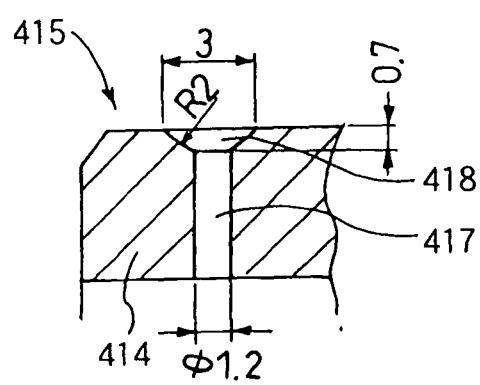
Figure 39:
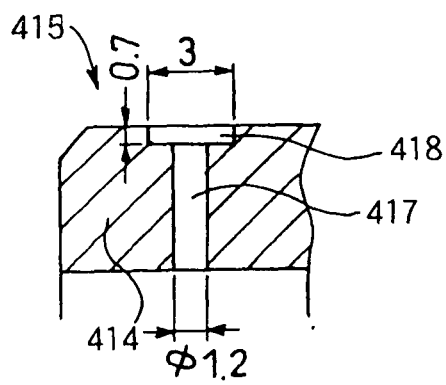
Figure 39:
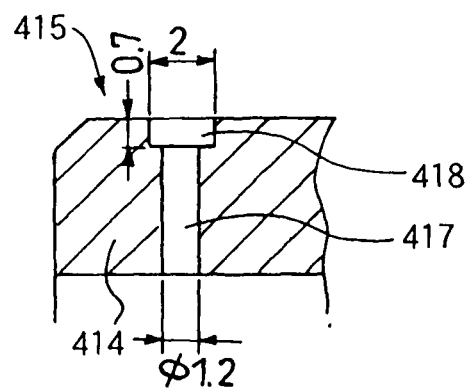
Figure 39:
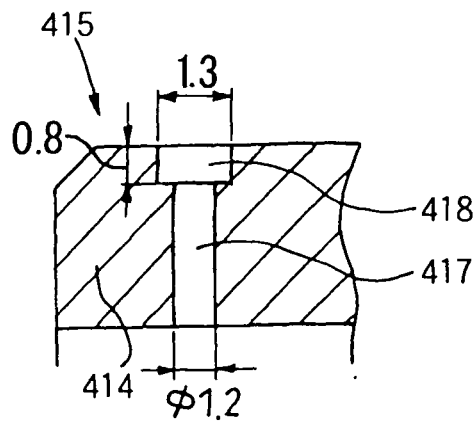
Figure 39:
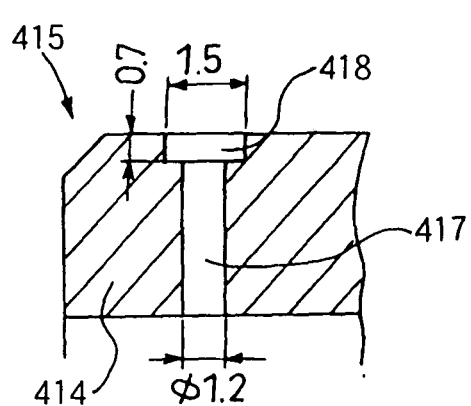

The sectional shape of the annular groove on the outer ring outer diameter surface: 6 shapes in FIG. 39(*a*) to (*f*)

The phase relationship between the grease filling hole in the housing and the supply hole in the outer ring: 180 degree It was confirmed from this Table 2 that, if a value derived by dividing the annular groove sectional area A1 (mm$^2$) by the peripheral length L (mm) of the annular groove cross section is in excess of 0.25 (mm), the grease can be discharged to the inside of the bearing.

Also, the annular groove was formed on the outer peripheral surface of the outer ring of the bearing. But the similar advantages can be achieved by forming the annular groove on the inner peripheral surface of the housing.

Example 5

As shown in FIG. 34, two supply holes were provided in the outer ring such that the supply holes in the outer ring were installed at 90 degree in phase to the grease filling hole in the housing respectively. At this time, under following test conditions, the evaluation test 2 was carried out to check whether or not the grease can be supplied from the grease filling hole to the inside of the bearing via the annular groove in the outer ring and the supply hole in the outer ring.

The results are given in Table 3.

TABLE 3

|  | Test No. | | | | |
|---|---|---|---|---|---|
|  | 2-1 | 2-2 | 2-3 | 2-4 | 2-5 |
| Clearance between outer ring outer diameter surface and housing | 20 | 30 | 40 | 20 | 30 |
| Length S mm (see FIG. 40) | 1 | 1 | 1 | 0.5 | 0.5 |
| Bearing inside discharge result | ○ | ○ | X | ○ | X |

○: discharged
X: not discharged

The conditions of the evaluation test 2 were given as follows.

The bearing tested: inner diameter×outer diameter×width: 70 mm×110 mm×20 mm

The sectional shape of the annular groove on the outer ring outer diameter surface: shape in FIG. 39(*e*)

The clearance between the outer diameter surface of the outer ring and the housing: 20, 30, 40 μm The contact length S between the outer ring outer diameter surface of the bearing and the housing in the axial direction (see FIG. 40): 0.5, 1.0 (mm)

It was confirmed from this Table 3 that, if the clearance between the outer diameter surface of the outer ring and the housing is 30 μm or less and the contact length S between the outer ring outer diameter surface of the bearing and the housing in the axial direction is 1.0 mm or more, the grease can be discharged to the inside of the bearing.

At this time two supply holes were provided in the outer ring such that the supply holes in the outer ring were positioned at 90 degree in phase to the grease filling hole in the housing respectively. But the similar advantages can be achieved by using an angle except 90 degree.

Here, two supply holes were provided in the outer ring of the bearing. The similar advantages to the case where the supply holes were provided in the outer ring such that the supply holes in the outer ring were installed within 90 degree in phase to the grease filling hole in the housing can be achieved by providing one supply hole.

Figure 40:
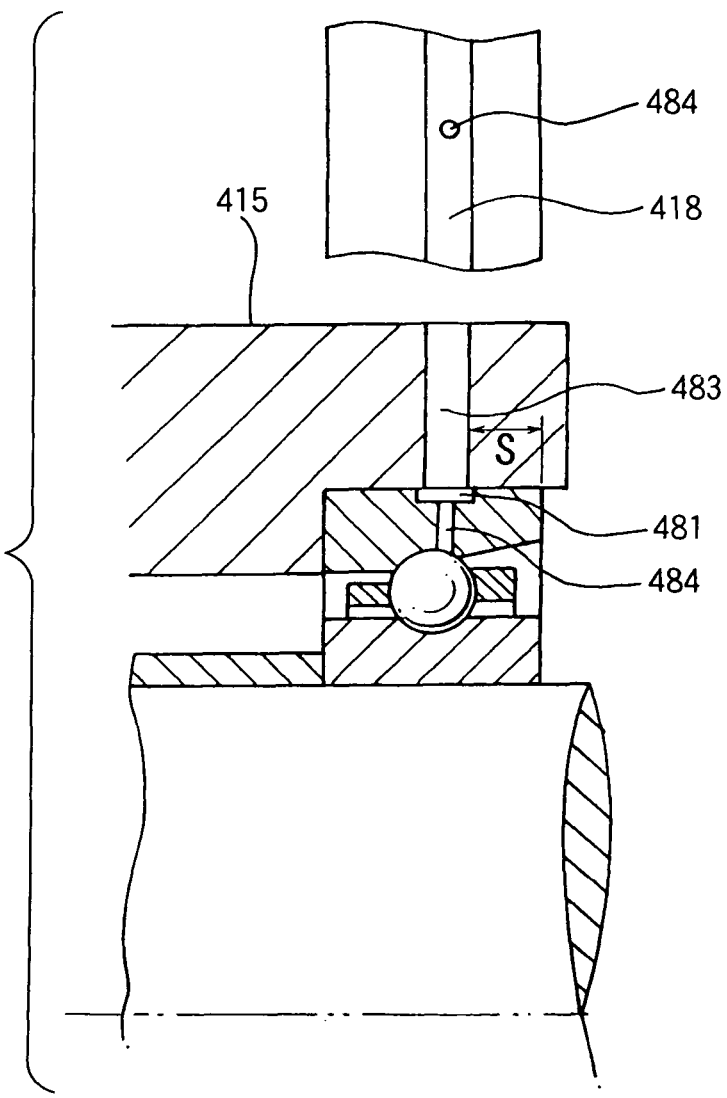
FIG. 40 is a view showing a bearing used in an evaluation test 2 according to the present invention.

Also, the angular contact ball bearing was illustrated in FIG. 40. But the similar advantages can be achieved if the deep groove ball bearing or the roller bearing is employed.

In addition, the annular groove was formed on the outer peripheral surface of the outer ring of the bearing. But the similar advantages can be achieved by forming the annular groove on the inner peripheral surface of the housing.

With the above, according to the eighteenth to twenty-ninth embodiments, either the annular groove facing to the supply hole is formed on the inner periphery of the housing or the annular groove containing the supply hole is formed on the outer periphery of the outer ring. Thus, the grease fed to the grease filling hole in the housing flows into the annular groove and then flows into the supply hole in the outer ring via the annular groove. Then, the grease fed to the supply hole flows into the inside of the bearing. In this manner, the grease fed to the grease filling hole in the housing can be supplied to the inside of the bearing via the annular groove.

Also, in the above embodiments, either the annular groove facing to the supply hole is formed on the inner periphery of the housing or the annular groove containing the supply hole is formed on the outer periphery of the outer ring. Thus, even though the supply hole in the outer ring is not aligned with the grease filling hole in the housing upon fitting the bearing into the housing, the supply hole can be communicated with the grease filling hole via the annular groove. Therefore, since the bearing can be fitted simply into the housing not to take user's time, an improvement of productivity can be achieved.

In addition, in the above embodiments, there is no necessity that the supply hole should be aligned with the grease filling hole upon fitting the bearing into the housing. Therefore, the fitting operation can be simplified and the workload of the operator can be lessened.

Also, in the above embodiments, the outer annular grooves are formed on the outer periphery of the outer ring on both sides of the supply hole, and also the outer annular grooves are formed on the inner periphery of the housing on both sides of the supply hole and then the O ring is fitted into a pair of outer annular grooves respectively. Therefore, the outflow of the grease can be prevented.

Also, in the above embodiments, the clearance between the housing and the outer ring is set to 30 μm or less, and thus such clearance between the housing and the outer ring is reduced. Therefore, the grease flowing into the annular groove can be prevented from flowing out from the clearance between the housing and the outer ring and thus the outflow of the supplied grease to the outside of the bearing can be prevented.

Thirtieth Embodiment

A grease supply system serving as a grease supply system (grease supply mechanism) of a thirtieth embodiment according to the present invention will be explained hereunder.

Figure 41:
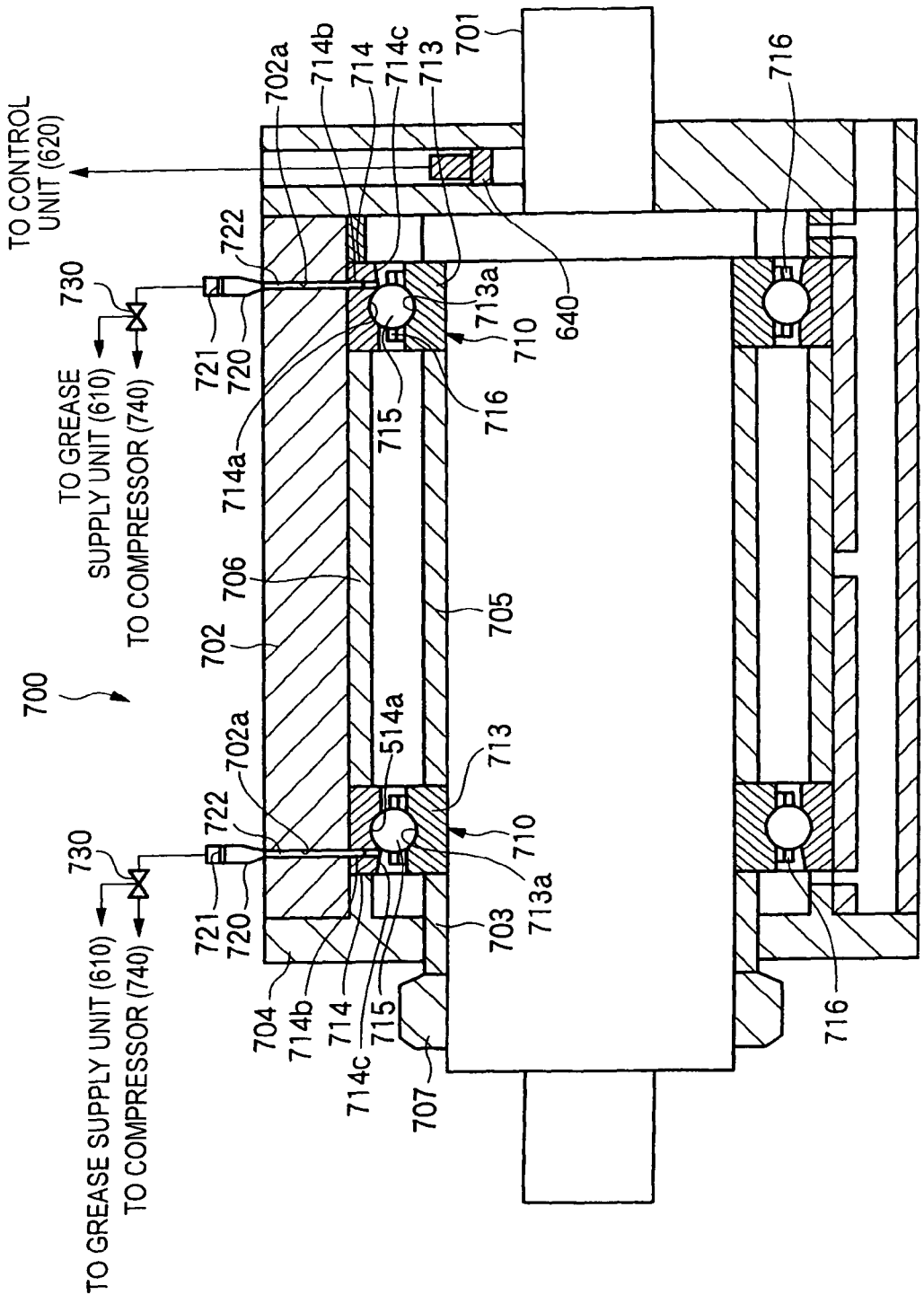
FIG. 41 is a sectional view of a bearing unit of a thirtieth embodiment according to the present invention.

FIG. 41 is a sectional view of a bearing unit 700 constituting a spindle unit of the thirtieth embodiment according to the present invention. The bearing unit 700 includes a spindle 701, a housing 702, and angular contact ball bearings 710, 710 fitted onto the spindle 701 and fitted into the housing 702. The spindle 701 is rotated in the housing 702 via the angular contact ball bearings 710, 710.

The spindle 701 is coupled to a rotating driving mechanism (not shown) such as a motor, or the like, and is rotated by the drive of the rotating driving mechanism. In the present embodiment, a maximum rotation speed of the spindle 701 is set to 22000 min$^{-1}$.

Each angular contact ball bearing 710 includes an inner ring 713, an outer ring 714, balls 715 as the rolling elements, and a cage 716. The inner ring 713 is fitted onto the spindle 701, and has an inner ring raceway 713*a* to guide the balls 715 on the outer periphery side. The outer ring 714 is fitted into the housing 702, and has an outer ring raceway 714*a* to guide the balls 715 on the inner periphery side.

The balls 715 are arranged rollably between the inner ring raceway 713*a* of the inner ring 713 and the outer ring raceway 714*a* of the outer ring 714. The cage 716 holds the balls 715 rollably in the circumferential direction at an equal interval. The outer ring 714 has a taper portion 714*c* on one side in the axial direction. The side on which the taper portion is formed in the axial direction is called the front side and the other side is called the back side. In the present embodiment, a pair of angular contact ball bearings 710, 710 are arranged to oppose their back sides to each other, i.e., to constitute the so-called back-to-back arrangement (DB).

An inner ring spacer 705 and an outer ring spacer 706 that are arranged along the spindle 701 and the housing 702 respectively are arranged between the inner rings 713 and between the outer rings 714 of the angular contact ball bearings 710, 710. The inner ring 713 and the inner ring spacer 705, and the outer rings 714 and the outer ring spacer 706 are energized by inner ring pressing members 703, 707 and an outer ring pressing member 704 to apply a preload to each bearing. A clearance (not shown) is formed between the inner ring pressing member 703 and the outer ring pressing member 704, and the labyrinth is formed between both pressing members.

Grease tanks 720, 720 which reserve the additional grease being supplied to the insides of the angular contact ball bearings 710, 710 are provided on the housing 702. A grease feeding nozzle 722 is communicated with the grease tank 720. The grease feeding nozzle 722 is inserted into a supply hole 714*b*, which is formed in the outer rings 714, 714 of the angular contact ball bearings 710, 710 respectively, via a through hole 702*a* that is formed to pass through the housing 702. A piston 721 is positioned on an upper surface of the additional grease reserved in the inside of the grease tank 720. The additional grease is supplied to the inside of the angular contact ball bearing 710 via the grease feeding nozzle 722 and the supply hole 714b in compliance with an action of the piston 721.

A rotation speed sensor 640 for sensing a rotation speed of the spindle 701 is fitted to the bearing unit 700. The speed sensor 640 is opposed to the spindle 701 to sense a sensed mark such as slit, magnet, projection, or the like formed on this spindle 701 and generate a pulse signal in response to the rotation speed of the spindle 701.

Figure 42:
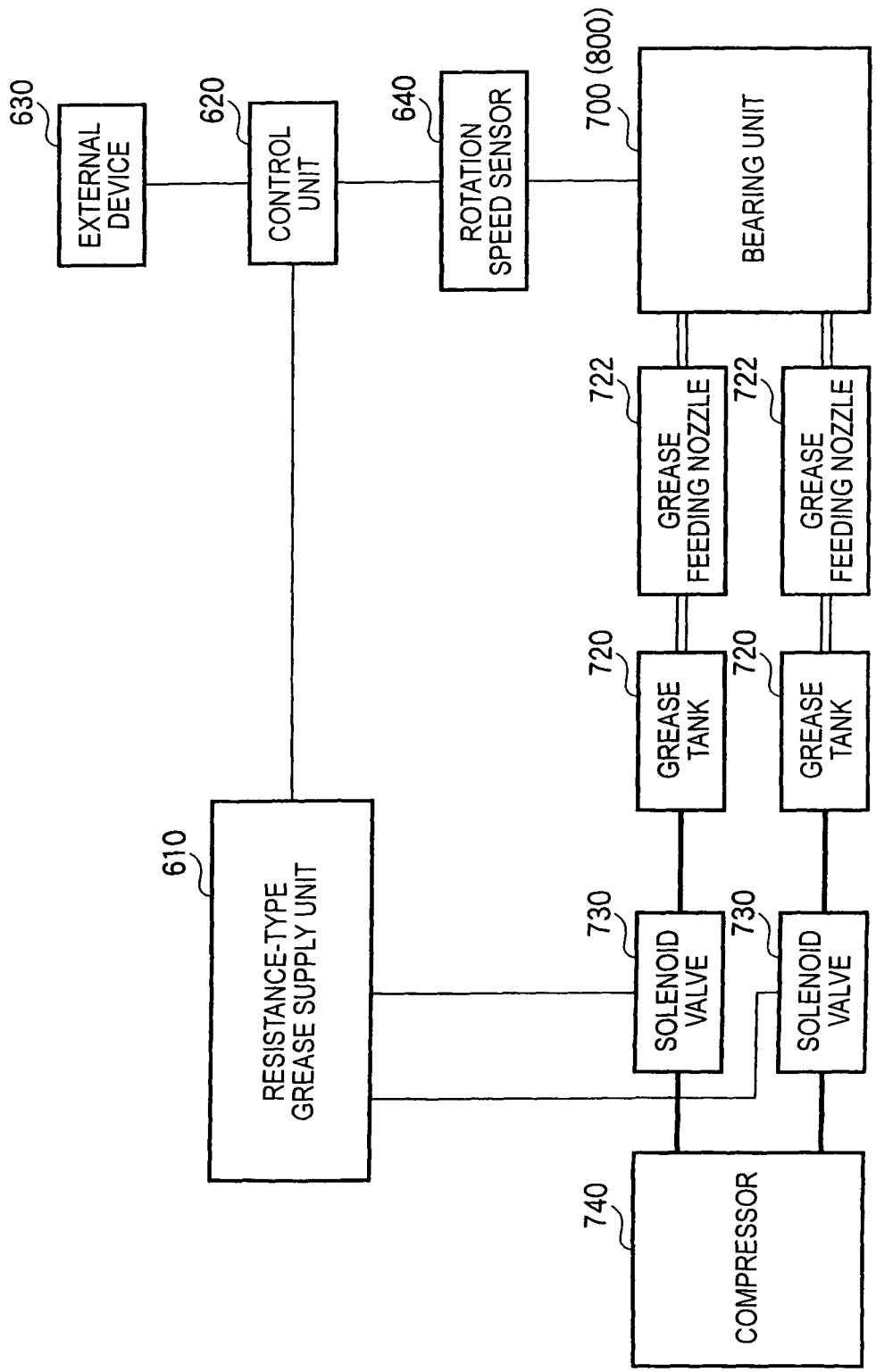
FIG. 42 is a block diagram showing a grease supply system of the thirtieth embodiment according to the present invention.

FIG. 42 is a block diagram showing a grease supply system as a grease supply system of the present embodiment. The present grease supply system includes the resistance-type grease feeding unit 610, a control unit 620 as a controlling means of the present invention, an external device 630, the rotation speed sensor 640, the grease tank 720, the grease feeding nozzle 722, a solenoid valve 730, and a compressor 740.

The resistance-type grease feeding unit 610 controls ON/OFF of the solenoid valves 730, 730 in compliance with the instruction from the control unit 620. When the resistance-type grease feeding unit 610 received the grease supply instruction from the control unit 620, such unit opens the solenoid valves 730, 730 for a predetermined time.

When the solenoid valve 730 is in its opened state, the compressor 740 supplies an air to the grease tanks 720, 720 via the solenoid valves 730, 730 to apply a pressure to the piston 721 in the grease tank 720. The piston 721, when received the pressure, pushes downwardly the grease in the grease tank 720 to supply the additional grease to the inside of the bearing unit 700 via the grease feeding nozzle 722. In contrast, when the solenoid valve 730 is in its closed state, the air fed from the compressor 740 is cut off by the solenoid valve 730. In this case, the pressure is not transferred to the grease tank 720 and thus the additional grease is not supplied to the inside of the bearing unit 700.

Figure 43:
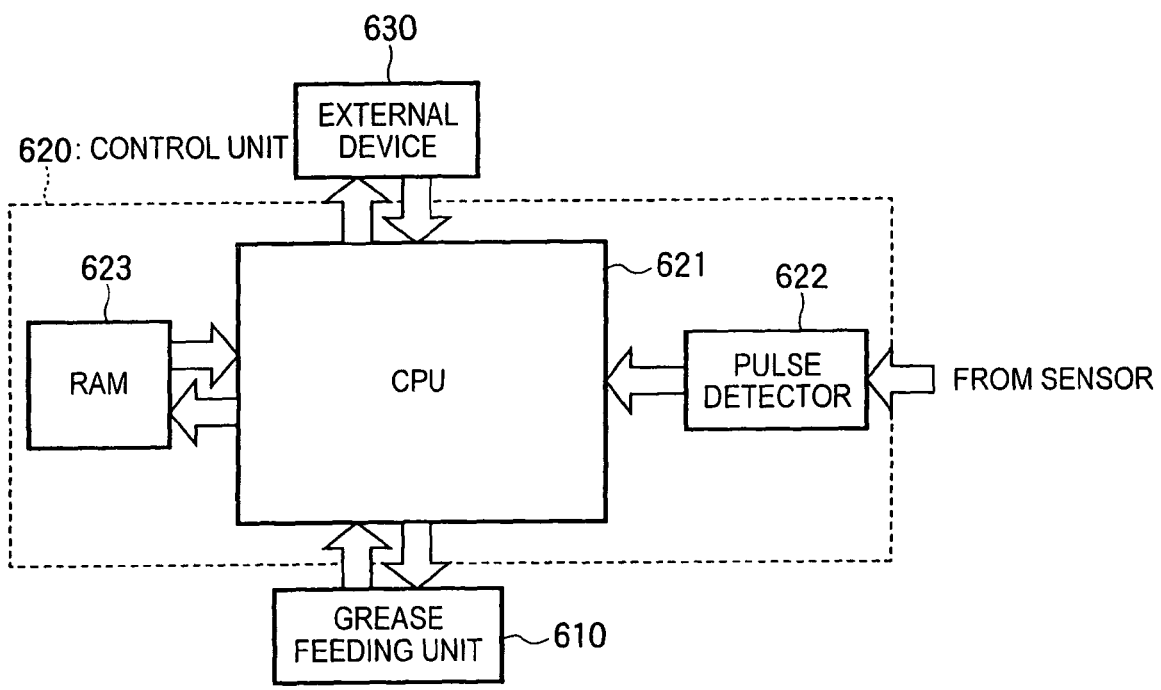
FIG. 43 is a block diagram showing details of a control unit of the thirtieth embodiment according to the present invention.

FIG. 43 is a block diagram showing details of the control unit 620 of the present embodiment. The control unit 620 has a CPU 621, a pulse detector 622, and a RAM 623.

The pulse detector 622 calculates the rotation speed of the spindle 701 of the bearing unit 700 every unit time (1 second in the present embodiment), i.e., in real time based on the pulse signal fed from the rotation speed sensor 640. The pulse detector 622 sends out the calculated rotation speed data of the spindle 701 to the CPU 621 every unit time.

The RAM 623 is a nonvolatile memory portion for storing predetermined programs and the data, and holds stored contents by using an auxiliary power supply such as a battery, or the like when the power supply of the control unit 620 is turned OFF. In the present embodiment, a variable control program of a grease feeding interval is saved in the RAM 623. The external device 630 such as a computer, or the like connected to the control unit 620 can access the RAM 623. The RAM 623 is constructed such that the program, etc. can be rewritten via the external device 630. The external device 630 may be connected via the network such as LAN, the Internet, or the like.

The CPU 621 controls respective portions of the control unit 620 in an integrated manner. The CPU 621 starts the variable control program saved in the RAM 623, and then executes a process to calculate a grease feeding timing in compliance with the variable control program every time when such CPU 621 receives the rotation speed data from the pulse detector 622.

The variable control program in the present embodiment classifies a rotation speed area into three areas, i.e., a "stop area", a "low speed area", and a "high speed area", and has a predetermined addend assigned to the rotation speed areas respectively. More particularly, the "stop area" signifies an area in which the rotation speed of the spindle 701 is 0 $min^{-1}$, the "low speed area" signifies an area in which the rotation speed of the spindle 701 is higher that 0 $min^{-1}$ but lower than 18000 $min^{-1}$, and the "high speed area" signifies an area in which the rotation speed of the spindle 701 is higher that 18000 $min^{-1}$. Here, 0, 1, and 10 are assigned to the "stop area", the "low speed area", and the "high speed area" as the addend respectively.

The CPU 621 decides to which rotation speed area the rotation speed belongs at that point, in compliance with the variable control program every time when the rotation speed of the spindle 701 is given. Then, the addend corresponding to the concerned rotation speed area is added to the integrated value saved in the RAM 623. Then, the CPU 621 sends out the grease feeding instruction to the resistance-type grease feeding unit 610 when the integrated value exceeds a predetermined upper limit.

Here, the upper limit of the integrated value is set to 900000. This value indicates that the supply is executed at 25 hour in the continuous operation in the high speed area. In this case, because the bearing breakdown time at the maximum rotation speed 22000 $min^{-1}$ of the spindle 701 is 100 hour, the upper limit of the integrated value and the addend (10) in the high speed area are decided in such a manner that the grease supply time falls within 20 to 40% of the breakdown time to ensure the safety. Also, while taking account of the fact that the breakdown time at the boundary speed 18000 $min^{-1}$ between the low speed area and the high speed area is 1000 hour, the upper limit of the integrated value and the addend (1) in the low speed area are decided in such a manner that the grease is supplied at 250 hour that corresponds to 25% of the breakdown time when the bearing unit 100 is continuously operated in the low speed area.

Figure 44:
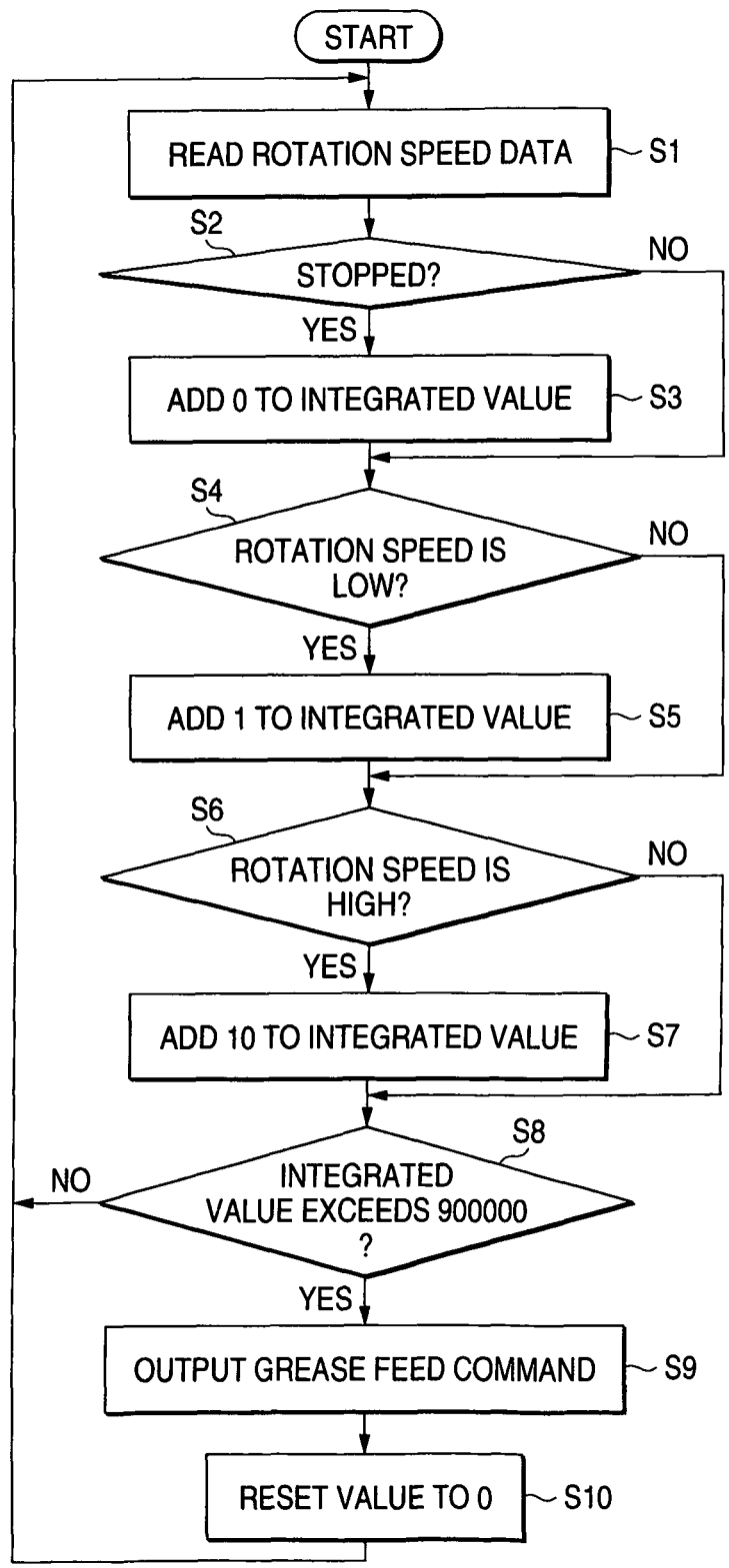
FIG. 44 is a flowchart showing processes of calculating a grease supplying timing in the thirtieth embodiment according to the present invention.

FIG. 44 is a flowchart showing processes of calculating a grease supplying timing in the present embodiment. An algorithm (program) of calculating the grease supplying timing in the present embodiment will be explained hereunder.

The pulse detector 622 in the control unit 620 calculates the rotation speed of the spindle 701 every one second based on the pulse signal from the rotation speed sensor 640, and then sends out the rotation speed data to the CPU 621. The CPU 621 receives the rotation speed data and reads the data (step S1).

After the CPU 621 reads the rotation speed data, first such CPU 621 decides whether or not the spindle 701 is now stopped (step S2). Then, if the spindle 701 is now stopped, the CPU adds 0 to the integrated value saved in the RAM 623 (step S3). Then, the process goes to step S4. In contrast, if the spindle 701 is not now stopped, the process skips over step S3 and goes to step S4.

Then, the CPU 621 decides whether or not the rotation speed of the spindle 701 is in the low speed area (step S4). Then, if the rotation speed is in the low speed area, the CPU adds 1 to the integrated value saved in the RAM 623 (step S5). Then, the process goes to step S6. In contrast, if the rotation speed is not in the low speed area, the process skips over step S5 and goes to step S6.

Then, the CPU 621 decides whether or not the rotation speed of the spindle 701 is in the high speed area (step S6). Then, if the rotation speed is in the high speed area, the CPU adds 10 to the integrated value saved in the RAM 623 (step S7). Then, the process goes to step S8. In contrast, if the rotation speed is not in the high speed area, the process skips over step S7 and goes to step S8.

Then, the CPU 621 checks the integrated value saved in the RAM 623 and then decides whether or not the integrated value exceeds 900000 (step S8). Then, if the integrated value exceeds 900000, the CPU outputs the grease supply command (grease feed command) to the resistance-type grease feeding unit 610 (step S9) and then resets the integrated value to 0 (step S10). Then, the CPU waits the arrival of the subsequent rotation speed data, and thus the process goes back to step S1 to receive such rotation speed data. In contrast, if the integrated value does not exceed 900000, the CPU waits the arrival of the rotation speed data, and thus the process goes back to step S1 to receive such rotation speed data. With the above, the control unit 620 calculates the grease supply timing and then sends out the grease supply command to the resistance-type grease feeding unit 610.

Then, the resistance-type grease feeding unit 610 sends out a valve open signal to the solenoid valves 730, 730 to change the solenoid valves 730, 730 from their closed state to their opened state for a predetermined period of time. When the solenoid valves 730, 730 are brought into their opened state, the air fed from the compressor 740 is supplied to the grease tanks 720, 720 via the solenoid valves 730, 730 to apply the pressure to the pistons 721, 721 in the grease tanks 720, 720. The piston 721, which is received the pressure, pushes down the grease in the grease tank 720 to supply the additional grease to the inside of the bearing unit 700 via the grease feeding nozzle 722. After a predetermined time elapsed, the grease feeding unit 610 brings the solenoid valves 730, 730 into their closed state, and the CPU ends the additional grease supply.

Figure 45:
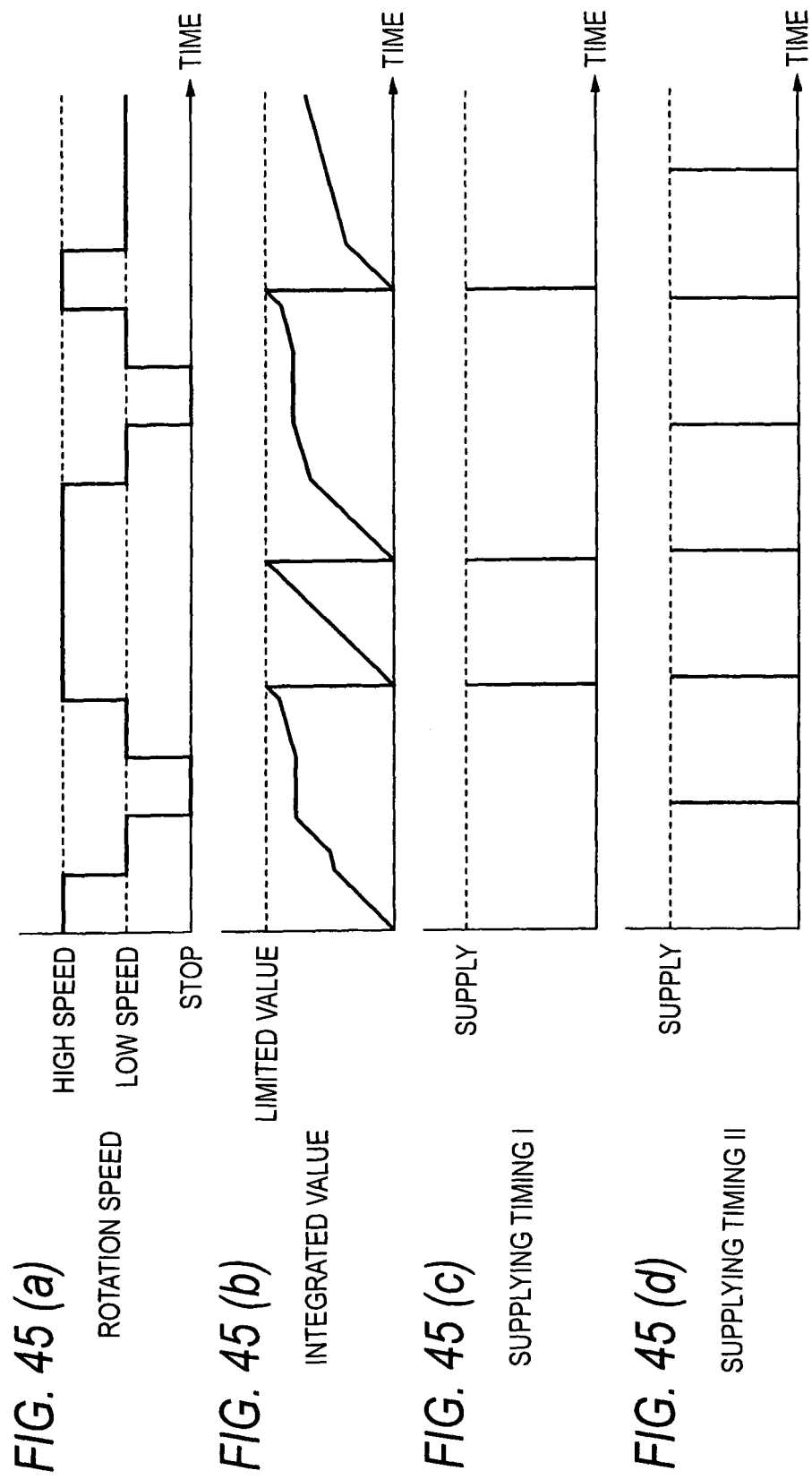
FIG. 45 is a time chart showing a grease supplying operation in the thirtieth embodiment according to the present invention.

FIG. 45 is a time chart showing a grease supplying operation in the present embodiment. FIG. 45(*a*) is a view showing the change of the rotation speed in time, FIG. 45(*b*) is a view showing the change of the integrated value in time, FIG. 45(*c*) is a view showing a supplying timing decided based on the algorithm of calculating the grease supply timing in the present embodiment, and FIG. 45(*d*) is a view showing a supplying timing when the supply is executed every predetermined interval (25 hour).

As can be seen from FIG. 45(*a*) and FIG. 45(*b*), an increasing gradient of the integrated value is sharp when the rotation speed of the spindle 701 is in the high speed area, while an increasing gradient of the integrated value is gentle when the rotation speed of the spindle 701 is in the low speed area. Also, the integrated value is not increased when the spindle 701 is stopped. In other words, the grease supply interval becomes short since an increase of the integrated value is accelerated when the rotation speed is high, while the grease supply interval becomes long since an increase of the integrated value is decelerated when the rotation speed is low. Also, the grease is not supplied when the spindle 701 is not rotated.

Also, according to the comparison between FIG. 45(*c*) and FIG. 45(*d*), the grease is supplied in response to the rotation speed of the spindle 701 in the present embodiment, while the grease is supplied periodically irrespective of a magnitude of the rotation speed or the presence or absence of the rotation in case the grease is supplied every predetermined time. It is understood that, in the present embodiment, the grease is supplied appropriately in response to the rotation frequency of the bearing unit, i.e., the degraded state of the grease whereas, in the prior art, the grease is supplied regardless of the degraded state of the grease. In this manner, according to the present embodiment, the number of times of the supply can be reduced rather than the prior art and the grease can be supplied at an appropriate timing.

With the above, according to the present embodiment, the rotation speed of the spindle 701 is read every 1 second. The rotation speed area is classified into three areas, i.e., the "stop area", the "low speed area", and the "high speed area" in response to the rotation speed, and the addend that corresponds to each speed area is added to the integrated value. Then, the control unit 620 instructs the resistance-type grease feeding unit 610 to supply the additional grease only when the integrated value exceeds a predetermined value. Therefore, it is possible to supply the grease appropriately in response to the rotation frequency of the bearing unit, i.e., the degraded state of the grease. Also, the control unit 620 does not increase the integrated value by adding 0 to the integrated value when the spindle 701 is rotated. Thus, such a waste is not generated that the grease is supplied when the spindle 701 is in its non-rotated state. Therefore, a wasteful heat generation due to the churning resistance of the excessive grease can be suppressed. As a result, the failure such as the seizure of the bearing owing to the abnormal temperature rise can be prevented beforehand, a high fitting precision of the spindle 701 can be maintained, and the enhanced lifetime of the bearing can be attained.

In the present embodiment, the resistance-type grease feeding unit is used as the grease feeding unit. But the present invention is not limited to this, and any unit may be employed if such unit can supply the grease to the bearings 710, 710 when the integrated value exceeds a predetermined value. For example, a fixed-displacement discharge type grease feeding unit, or the like may be employed.

Also, in the present embodiment, the back-to-back arrangement type angular contact ball bearings 710, 710 is used. But the present invention is not limited to this, and a face-to-face arrangement type angular contact ball bearing may be employed. Also, other rolling bearings such as other type ball bearings, other roller bearings, etc. may be employed.

Also, in the present embodiment, the values 10, 1, 0 are set as the addend in the high speed area, the low speed area, and the stop area respectively. But the present invention is not limited to these values, and appropriate desired values may be set in answer to the used condition of the spindle 701 and the bearing 710. Also, the maximum value of the integrated value may be set to the desired value in view of the used condition, the durability, and the like.

Also, in the present embodiment, the rotation speed is calculated every 1 second. But the time interval may be set to the desired value.

Thirty-First Embodiment

A grease supply system as a grease supply system in a thirty-first embodiment according to the present invention will be explained hereunder. In this case, in the present embodiment, explanations of the same elements as those set forth in the thirtieth embodiment will be omitted appropriately to avoid the duplication.

In the present embodiment, a structure of the grease supply system is identical to that of the thirtieth embodiment. In the present embodiment, the variable control program for the grease supply timing that is started/executed in the control unit 620 is partially different.

The variable control program in the present embodiment classifies the rotation speed area into four areas, i.e., a "stop area", a "low speed area", a "middle speed area", and a "high speed area", and has a predetermined addend assigned to the rotation speed areas respectively. More particularly, the "stop area" signifies an area in which the rotation speed of the spindle 701 is 0 min$^{-1}$, the "low speed area" signifies an area in which the rotation speed of the spindle 701 is higher that 0 min$^{-1}$ but lower than 14000 min$^{-1}$, the "middle speed area" signifies an area in which the rotation speed of the spindle 701 is higher that 14000 min$^{-1}$ but lower than 18000 min$^{-1}$, and the "high speed area" signifies an area in which the rotation speed of the spindle 701 is higher that 18000 min$^{-1}$. Here, 0, 0.1, 1, and 10 are assigned to the "stop area", the "low speed area", the "middle speed area", and the "high speed area" as the addend respectively.

The CPU 621 decides to which rotation speed area the rotation speed belongs at that point, in compliance with the variable control program every time when the rotation speed of the spindle 701 is given. Then, the addend corresponding to the concerned rotation speed area is added to the integrated value saved in the RAM 623. Then, the CPU 621 sends out the grease feeding instruction to the resistance-type grease feeding unit 610 when the integrated value exceeds a predetermined upper limit. Here, like the thirtieth embodiment, the upper limit of the integrated value is set to 900000.

Figure 46:
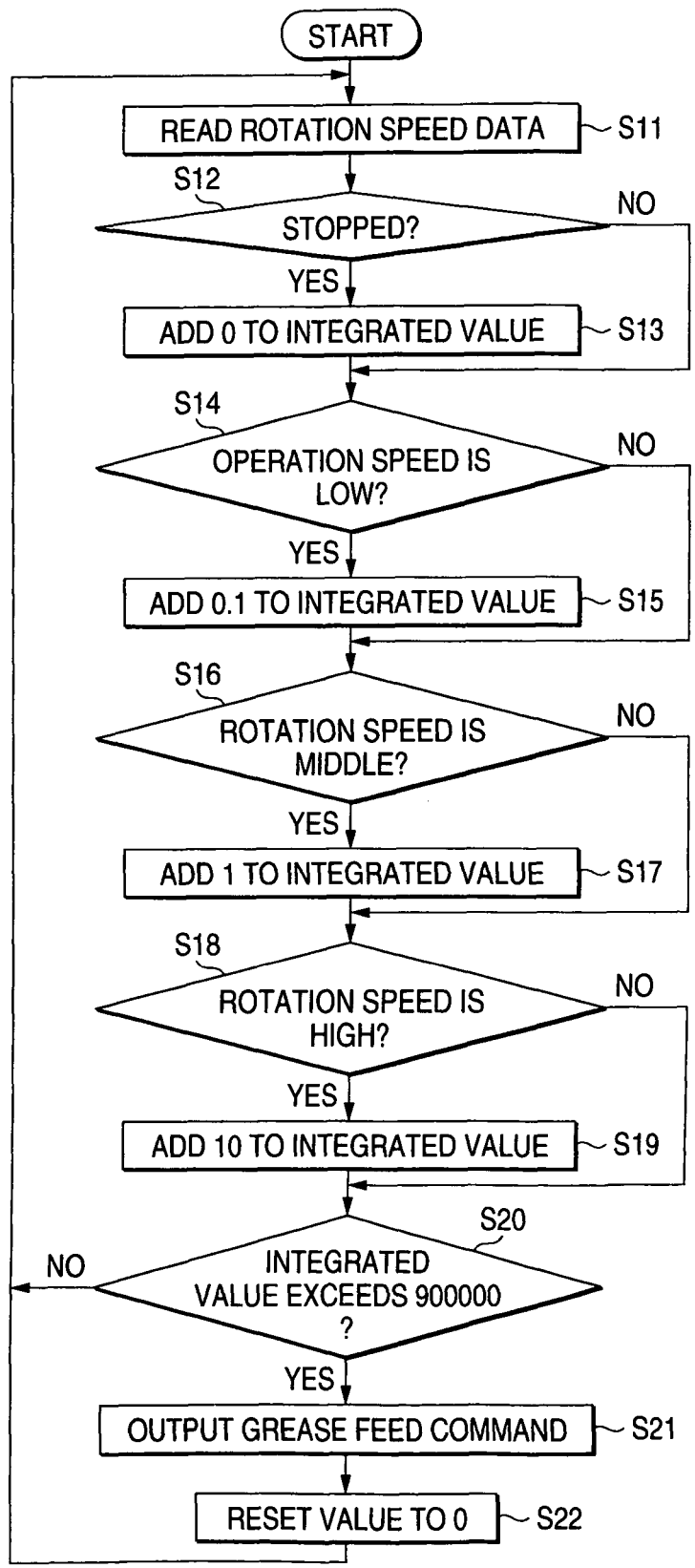
FIG. 46 is a flowchart showing processes of calculating a grease supplying timing in a thirty-first embodiment according to the present invention.

FIG. 46 is a flowchart showing processes of calculating a grease supplying timing in the present embodiment. An algorithm of calculating the grease supplying timing in the present embodiment will be explained hereunder.

The pulse detector 622 in the control unit 620 calculates the rotation speed of the spindle 701 every one second based on the pulse signal from the rotation speed sensor 640, and then sends out the rotation speed data to the CPU 621. The CPU 621 receives the rotation speed data and reads the data (step S11).

After the CPU 621 reads the rotation speed data, first such CPU 621 decides whether or not the spindle 701 is now stopped (step S12). Then, if the spindle is now stopped, the CPU adds 0 to the integrated value saved in the RAM 623 (step S13). Then, the process goes to step S14. In contrast, if the spindle is not now stopped, the process skips over step S13 and goes to step S14.

Then, the CPU 621 decides whether or not the rotation speed of the spindle 701 is in the low speed area (step S14). Then, if the rotation speed is in the low speed area, the CPU adds 0.1 to the integrated value saved in the RAM 623 (step S15). Then, the process goes to step S16. In contrast, if the rotation speed is not in the low speed area, the process skips over step S15 and goes to step S16.

Then, the CPU 621 decides whether or not the rotation speed of the spindle 701 is in the middle speed area (step S16). Then, if the rotation speed is in the middle speed area, the CPU adds 1 to the integrated value saved in the RAM 623 (step S17). Then, the process goes to step S18. In contrast, if the rotation speed is not in the middle speed area, the process skips over step S17 and goes to step S18.

Then, the CPU 621 decides whether or not the rotation speed of the spindle 701 is in the high speed area (step S18). Then, if the rotation speed is in the high speed area, the CPU adds 10 to the integrated value saved in the RAM 623 (step S19). Then, the process goes to step S20. In contrast, if the rotation speed is not in the high speed area, the process skips over step S19 and goes to step S20.

Then, the CPU 621 checks the integrated value saved in the RAM 623 and then decides whether or not the integrated value exceeds 900000 (step S20). Then, if the integrated value exceeds 900000, the CPU outputs the grease supply command (grease feed command) to the resistance-type grease feeding unit 610 (step S21) and then resets the integrated value to 0 (step S22). Then, the CPU waits the arrival of the subsequent rotation speed data, and thus the process goes back to step S11 to receive such rotation speed data. In contrast, if the integrated value does not exceed 900000, the CPU waits the arrival of the rotation speed data, and thus the process goes back to step S11 to receive such rotation speed data.

With the above, the control unit 620 calculates the grease supply timing and then sends out the grease supply command to the resistance-type grease feeding unit 610.

Then, the resistance-type grease feeding unit 610 sends out a valve open signal to the solenoid valves 730, 730 to change the solenoid valves 730, 730 from their closed state to their opened state for a predetermined period of time. When the solenoid valves 730, 730 are brought into their opened state, the air fed from the compressor 740 is supplied to the grease tanks 720, 720 via the solenoid valves 730, 730 to apply the pressure to the pistons 721, 721 in the grease tanks 720, 720. The piston 721, which is received the pressure, pushes down the grease in the grease tank 720 to supply the additional grease to the inside of the bearing unit 700 via the grease feeding nozzle 722. After a predetermined time elapsed, the grease feeding unit 610 brings the solenoid valves 730, 730 into their closed state, and the CPU ends the additional grease supply.

Figure 47:
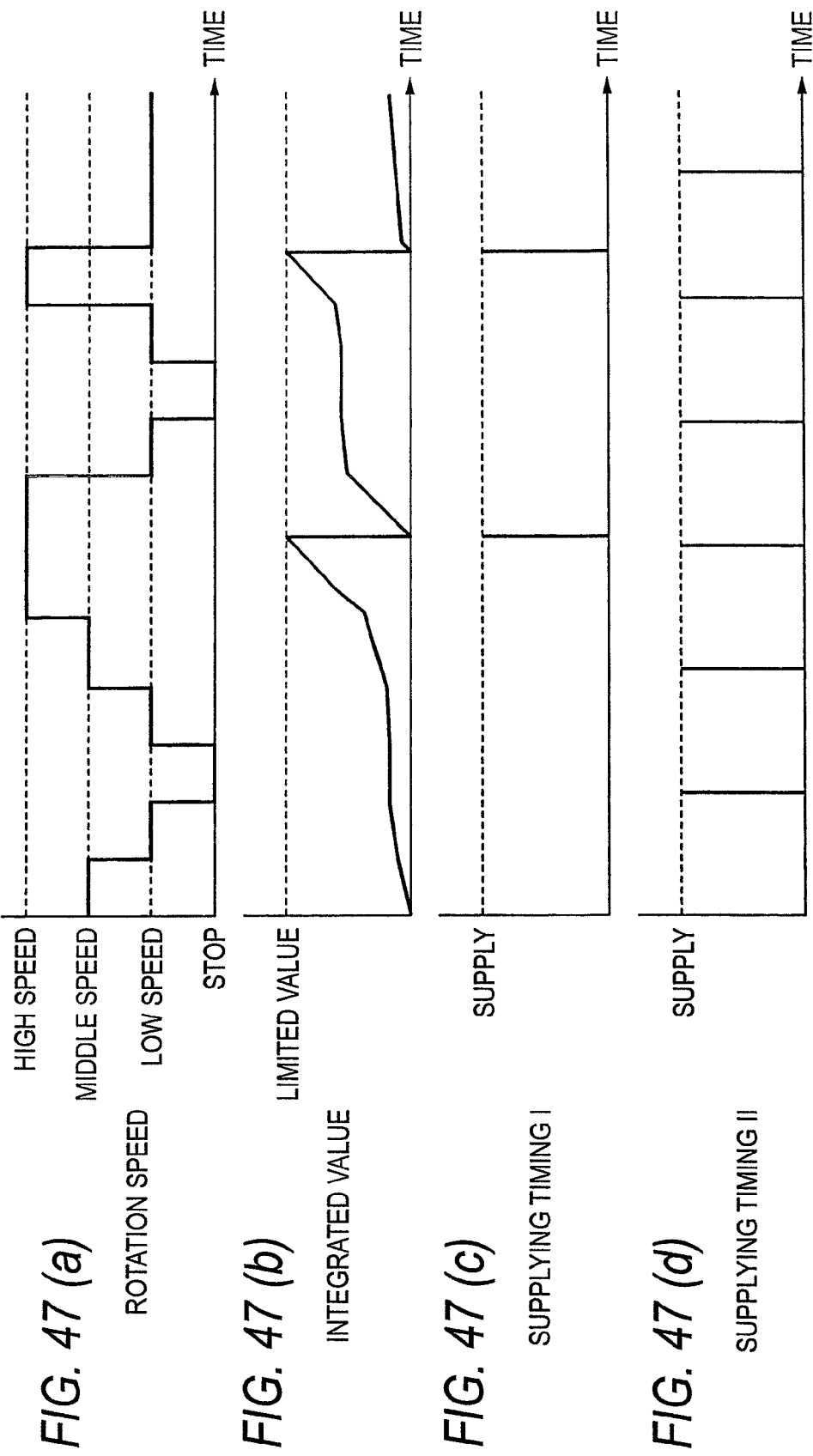
FIG. 47 is a time chart showing a grease supplying operation in the thirty-first embodiment according to the present invention.

FIG. 47 is a time chart showing a grease supplying operation in the present embodiment. FIG. 47(*a*) is a view showing the change of the rotation speed in time, FIG. 47(*b*) is a view showing the change of the integrated value in time, FIG. 47(*c*) is a view showing a supplying timing decided based on the algorithm of calculating the grease supply timing in the present embodiment, and FIG. 47(*d*) is a view showing a supplying timing when the supply is executed every predetermined interval (25 hour).

As can be seen from FIG. 47(*a*) and FIG. 47(*b*), an increasing gradient of the integrated value is sharp when the rotation speed of the spindle 701 is in the high speed area, while an increasing gradient of the integrated value is gentle when the rotation speed of the spindle 701 is in the middle speed area. An increasing gradient of the integrated value is minute when the rotation speed of the spindle 701 is in the low speed area. Also, the integrated value is not increased when the spindle 701 is stopped. In other words, the grease supply interval becomes short since an increase of the integrated value is accelerated when the rotation speed is high, while the grease supply interval becomes long since an increase of the integrated value is decelerated when the rotation speed is low. Also, the grease is not supplied when the spindle 701 is not rotated.

Also, according to the comparison between FIG. 47(*c*) and FIG. 47(*d*), the grease is supplied in response to the rotation speed of the spindle 701 in the present embodiment, while the grease is supplied periodically irrespective of a magnitude of the rotation speed or the presence or absence of the rotation in case the grease is supplied every predetermined time. It is understood that, in the present embodiment, the grease is supplied appropriately in response to the rotation frequency of the bearing unit, i.e., the degraded state of the grease whereas, in the prior art, the grease is supplied regardless of the degraded state of the grease. In this manner, according to the present embodiment, the number of times of the supply can be reduced rather than the prior art and the grease can be supplied at an appropriate timing.

With the above, according to the present embodiment, the rotation speed of the spindle 701 is read every 1 second. The rotation speed area is classified into four areas, i.e., the "stop area", the "low speed area", the "middle speed area", and the "high speed area" in response to the rotation speed, and the addend that corresponds to each speed area is added to the integrated value. Then, the control unit 620 instructs the resistance-type grease feeding unit 610 to supply the additional grease only when the integrated value exceeds a predetermined value. Therefore, it is possible to supply the grease appropriately in response to the rotation frequency of the bearing unit, i.e., the degraded state of the grease. Also, the control unit 620 does not increase the integrated value by adding 0 to the integrated value when the spindle 701 is rotated. Thus, such a waste is not generated that the grease is supplied when the spindle 701 is in its non-rotated state. Therefore, a wasteful heat generation due to the churning resistance of the excessive grease can be suppressed. As a result, the failure such as the seizure of the bearing owing to the abnormal temperature rise can be prevented beforehand, a high fitting precision of the spindle 701 can be maintained, and the enhanced lifetime of the bearing can be attained.

Also, in the present embodiment, the rotation speed area is classified into four stages, and then the addend is set to them respectively. Therefore, in contrast to the thirtieth embodiment, it is feasible to decide the grease supplying timing with better precision in response to the actual rotated situation.

In the present embodiment, the resistance-type grease feeding unit is used as the grease feeding unit. But the present invention is not limited to this, and any unit may be employed if such unit can supply the grease to the bearings 710, 710 when the integrated value exceeds a predetermined value. For example, a fixed-displacement discharge type grease feeding unit, or the like may be employed.

Also, in the present embodiment, the back-to-back arrangement type angular contact ball bearings 710, 710 is used. But the present invention is not limited to this, and a face-to-face arrangement type angular contact ball bearing may be employed. Also, other rolling bearings such as other type ball bearings, other roller bearings, etc. may be employed.

Also, in the present embodiment, the values 10, 1, 0.1, 0 are set as the addend in the high speed area, the middle speed area, the low speed area, and the stop area respectively. But the present invention is not limited to these values, and appropriate desired values may be set in answer to the used condition of the spindle 701 and the bearing 710. Also, the maximum value of the integrated value may be set to the desired value in view of the used condition, the durability, and the like.

Also, in the present embodiment, the rotation speed area is classified into four stages, and then the addend is set to them respectively. But the present invention is not limited to this, and the number of the divided rotation speed areas may be set appropriately in answer to the situation. For example, if the number of division of the rotation speed area in which the rotation speed is largely varied in operation is increased, the grease supply that is able to respond to the actually degraded situation of the grease can be made easy. Only two areas, i.e., a "stop area" and a "mobile area", for example, may be used in the rotation speed area in which the rotation speed is seldom varied.

Also, in the present embodiment, the rotation speed is calculated every 1 second. But the time interval may be set to the desired value.

Thirty-Second Embodiment

A grease supply system serving as a grease supply system of a thirty-second embodiment according to the present invention will be explained hereunder.

Figure 48:
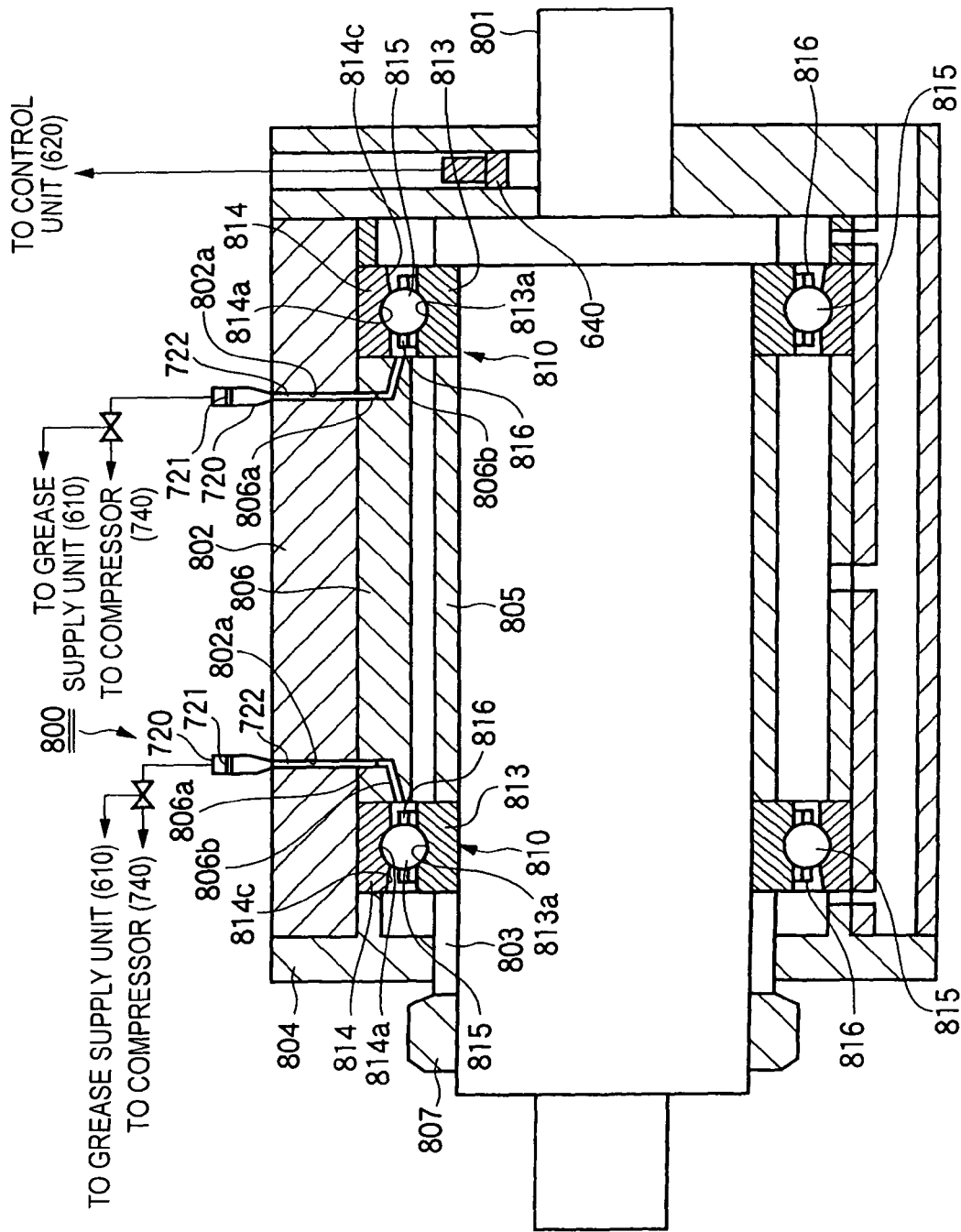
FIG. 48 is a sectional view of a bearing unit of a thirty-second embodiment according to the present invention.

FIG. 48 is a sectional view of a bearing unit 800 constituting a spindle unit of the thirty-second embodiment according to the present invention. The bearing unit 800 includes a spindle 801, a housing 802, and angular contact ball bearings 810, 810 fitted onto the spindle 801 and fitted into the housing 802. The spindle 801 is rotated in the housing 802 via the angular contact ball bearings 810, 810.

The spindle 801 is coupled to a rotating driving mechanism (not shown) such as a motor, or the like, and is rotated by the drive of the rotating driving mechanism. In the present embodiment, a maximum rotation speed of the spindle 801 is set to 22000 $min^{-1}$.

Each angular contact ball bearing 810 includes an inner ring 813, an outer ring 814, balls 815 as the rolling elements, and a cage 816. The inner ring 813 is fitted onto the spindle 801, and has an inner ring raceway 813a to guide the balls 815 on the outer periphery side. The outer ring 814 is fitted into the housing 802, and has an outer ring raceway 814a to guide the balls 815 on the inner periphery side.

The balls 815 are arranged rollably between the inner ring raceway 813a of the inner ring 813 and the outer ring raceway 814a of the outer ring 814. The cage 816 holds the balls 815 rollably in the circumferential direction at an equal interval. The outer ring 814 has a taper portion 814c on one side in the axial direction. In the present embodiment, a pair of angular contact ball bearings 810, 810 are arranged to oppose their back sides to each other, i.e., to constitute the so-called back-to-back arrangement (DB).

An inner ring spacer 805 and an outer ring spacer 806 that are arranged along the spindle 801 and the housing 802 respectively are arranged between the inner rings 813 and between the outer rings 814 of the angular contact ball bearings 810, 810. The inner ring 813 and the inner ring spacer 805, and the outer rings 814 and the outer ring spacer 806 are energized by inner ring pressing members 803, 807 and an outer ring pressing member 804 to apply a preload to each bearing. A clearance (not shown) is formed between the inner ring pressing member 803 and the outer ring pressing member 804, and the labyrinth is formed between both pressing members.

In the present embodiment, supply holes 806b, 806b that are communicated with supply holes 802a, 802a, which are formed in the housing 802 in the radial direction, and supply holes 806a, 806a and are opened toward side surfaces of the angular contact ball bearings 810, 810 are formed in the outer ring spacer 806 respectively.

The grease tanks 720, 720 which reserve the additional grease being supplied to the insides of the angular contact ball bearings 810, 810 are provided on the housing 802. The grease feeding nozzles 722, 722 are communicated with the grease tank 720, 720 respectively. A top end of the grease feeding nozzle 722 is inserted into the supply hole 806a, which is formed in the outer ring spacer 806, via the through hole 802a that is formed to pass through the housing 802. The additional grease is supplied to the inside of the angular contact ball bearing 810 via the grease feeding nozzle 722 and the supply holes 806a, 806b in compliance with the action of the piston 721 in the almost axial direction.

The rotation speed sensor 640 for sensing a rotation speed of the spindle 801 is fitted to the bearing unit 800. The speed sensor 640 is opposed to the spindle 801 to sense the sensed mark such as slit, magnet, projection, or the like formed on this spindle 801 and generate the pulse signal in response to the rotation speed of the spindle 801.

Structures of the bearing unit 800 are identical to those set forth in the thirtieth embodiment or the thirty-first embodiment. In the present embodiment, the grease supply timing may be decided by dividing the rotation speed area into three areas like the thirtieth embodiment, otherwise the grease supply timing may be decided by dividing the rotation speed area into four areas like the thirty-first embodiment.

In the above bearing unit 800, the wasteful additional grease supply can be omitted by deciding the grease supply timing like the thirtieth embodiment or the thirty-first embodiment, and the number of times of the grease supply can be reduced by supplying the grease at the appropriate timing.

Thirty-Third Embodiment

A grease supply system as a grease supply system of a thirty-third embodiment according to the present invention will be explained with reference to FIG. 49 to FIG. 55 hereunder.

Figure 49:
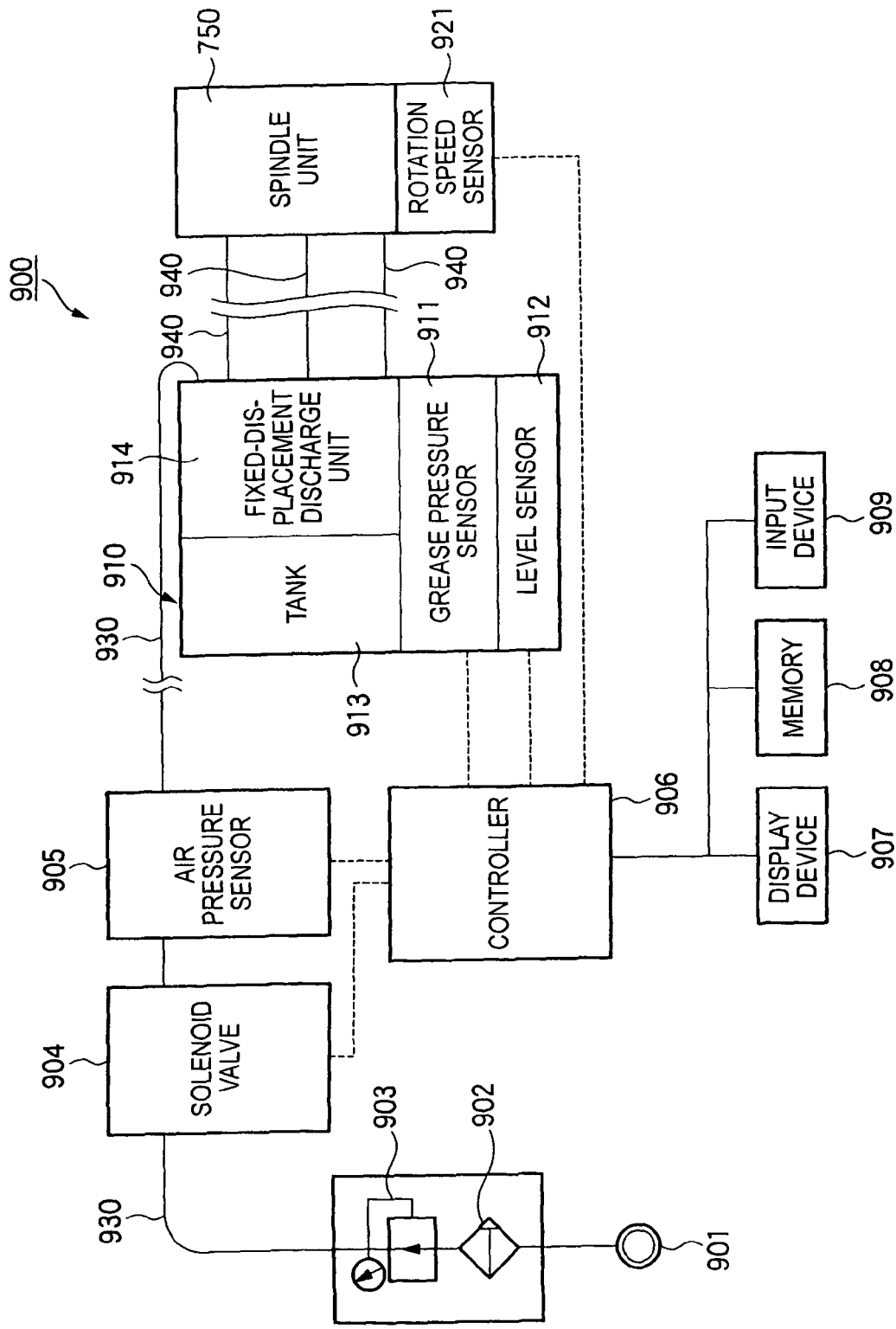
FIG. 49 is a block diagram showing a grease supply system of a thirty-third embodiment according to the present invention.
Figure 50:
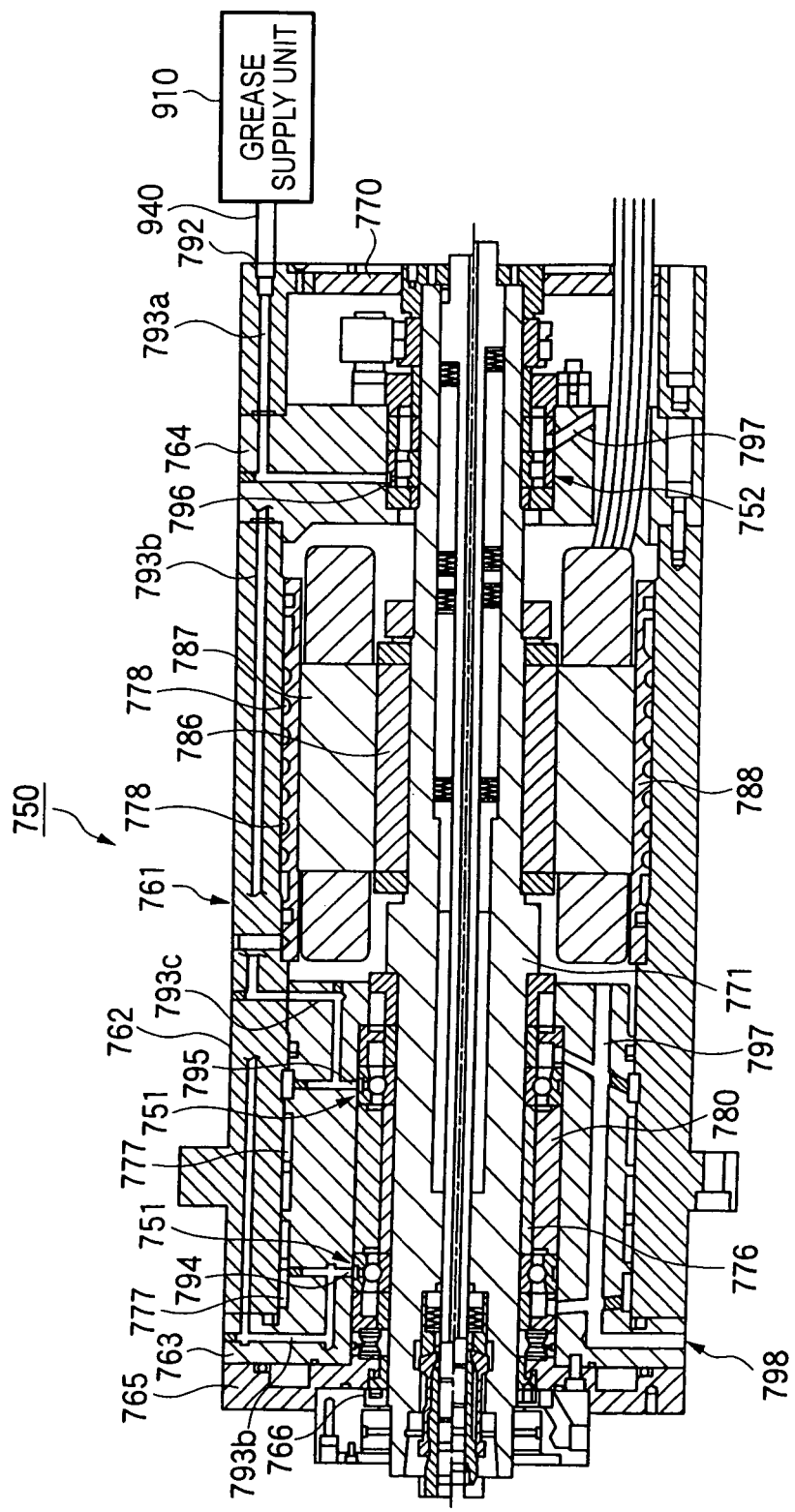
FIG. 50 is a view showing a spindle to which a grease supply system of the thirty-third embodiment according to the present invention is applied.

FIG. 49 is a view showing a spindle unit including a grease supply system 900 of the present embodiment, and FIG. 50 is a view showing a spindle unit 750 to which the grease supply system 900 of the present embodiment is fitted. The grease supply system 900 has such a structure that a grease supply unit 910 is provided together with the spindle unit 750 that supports rotatably a spindle 771 via a plurality of rolling bearings.

This spindle unit 750 supports the spindle 771 in a spindle housing 761 by using an angular contact ball bearing 751 with the outer ring groove and a cylindrical roller bearing 752 having one supply hole on one side. The spindle unit 750 in FIG. 50 employs different type bearings for illustration purpose, but such spindle unit may employ only the same type bearings.

The spindle housing 761 has a housing main body 762, a front-side bearing housing 763 fitted into a front end (the left side in FIG. 50) of the housing main body 762 and fixed thereto, and a rear-side bearing housing 764 fitted into a rear end (the right side in FIG. 50) of the housing main body 762 and fixed thereto. An outer ring pressing member 765 and an inner ring pressing member 766 are provided to an end portion of the front-side bearing housing 763. A labyrinth is formed between the outer ring pressing member 765 and the inner ring pressing member 766. A rear end face of the spindle housing 761 is covered with a cover 770.

The spindle 771 is fitted into two angular contact ball bearings 751, 751, which are fitted onto the front-side bearing housing 763, and one cylindrical roller bearing 752, which is fitted onto the rear-side bearing housing 764, and thus is supported rotatably by the spindle housing 761. An outer ring spacer 780 is arranged between the outer rings of two angular contact ball bearings 751, 751, and also an inner ring spacer 776 is arranged between the inner rings thereof.

A rotor 786 is fitted onto an almost center portion of the spindle 771 in the axial direction and fixed thereto. A stator 787 is arranged coaxially away from an outer peripheral surface of the rotor 786 at a predetermined distance. The stator 787 is fixed to the housing main body 762 via a stator fixing member 788 that is arranged on the outer peripheral surface side of the stator 787. A plurality of grooves 778 are formed between the housing main body 762 and the stator fixing member 788 along the peripheral direction of the spindle 771. A coolant for cooling the stator 787 is caused to flow through a plurality of grooves 778.

Similarly, a plurality of grooves 777 through which a coolant flows to cool the housing and the bearing are formed in portions, which are located on to the outer circumferential sides of the angular contact ball bearings 751, 751, between the housing main body 762 and the front-side bearing housing 763.

Three grease supply ports 792 to which the grease is supplied to execute the grease feeding to the bearings 751, 751, 752 respectively are opened on a rear end face of the spindle housing 161 along the circumferential direction (only one port is illustrated in FIG. 50). These three grease supply ports 792 are communicated with grease supply paths 793a, 793b, 793c, which are formed in the housing main body 762, the front-side bearing housing 763, and the rear-side bearing housing 764, respectively (for convenience, the grease supply paths 793a, 793b, 793c are illustrated on the same cross section in FIG. 50). Thus, the spindle unit 750 of the present embodiment is constructed in such a fashion that the grease can be supplied from the grease supply unit 910 provided on the outside to the inside of the spindle housing 761 via a grease supply piping 940.

The grease supply path 793a is communicated with an opening 796 that is formed to correspond to the outer ring side of the single row cylindrical roller bearing 752. The grease supply path 793b is communicated with an opening 794 that is formed to correspond to the outer ring side of the angular contact ball bearing 751 arranged on the front side (the left side in FIG. 50). The grease supply path 793c is communicated with an opening 795 that is formed to correspond to the outer ring side of the angular contact ball bearing 751 arranged on the rear side (the center in FIG. 50). Thus, the grease supplied from the grease supply unit 910 is supplied independently to the outer ring sides of respective bearings 751, 751, 752. The openings 794, 795, 796 are communicated with the supply holes formed in the bearings 751, 751, 752, so that the grease is supplied to the insides of the bearing spaces independently via the supply holes.

Next, the grease supply system 900 will be explained hereunder. The grease supply system 900 supplies the air from an air source 901 to the grease supply unit 910 to supply the grease in the grease supply unit 910 to the spindle unit 750. Respective members constituting the grease supply system 900 will be explained in detail hereunder.

An air filter 902, a regulator 903, a solenoid valve 904, and an air pressure sensor 905 are provided between the air source 901 and the grease supply unit 910. First, respective members provided between the air source 901 and the grease supply unit 910 will be explained hereunder.

The air filter 902 is a filter used to remove the dust, etc. from the air sent out from the air source 901. The air that is passed through the air filter 902 is fed to the regulator 903.

The regulator 903 is used to regulate a pressure of the air fed from the upstream into a predetermined set value. The air that is adjusted to an appropriate pressure by the regulator 903 is fed to the solenoid valve 904.

The solenoid valve 904 is a valve used to open/close an air supply path 930 that supplies the air, which is fed from the air source 901 side, to the grease supply unit 910 side provided in the downstream. The solenoid valve 904 is operated ON/OFF in response to an electric current supplied from a controller 906 provided on the outside. The ON/OFF conditions of the solenoid valve 904 will be described later.

The air pressure sensor 905 is provided in vicinity of the solenoid valve 904 on the downstream side. The air pressure sensor 905 acts as a sensor to sense/monitor the pressure of the air that flows to the grease supply unit 910 side via the solenoid valve 904. More particularly, the air pressure sensor 905 sends out an ON signal to the controller 906 when the sensed pressure exceeds a predetermined pressure. Thus, the air pressure sensor 905 informs the controller 906 of the fact that the air having the predetermined pressure or more is flowing from the solenoid valve 904 to the grease supply unit 910 side.

The grease supply unit 910 is a unit that supplies the grease to the bearings 751, 751, 752 on the spindle unit 750. This grease supply unit 910 has a grease pressure sensor 911, a level sensor 912, a grease tank 913 that has a piston (not shown) in the inside and reserves the grease, and a fixed-displacement discharge unit 914 that discharges the grease in the grease tank 913 in a predetermined quantity.

The air is supplied from the air source 901 to the grease supply unit 910 via the air supply path 930 shown in FIG. 49. This air is supplied the grease tank 913, which reserves the grease supplied to the spindle unit 750 by a predetermined amount, and the fixed-displacement discharge unit 914. When the air flows into the grease tank 913, the piston provided in the grease tank 913 is pushed down by the air to apply the pressure to the grease in the grease tank 913. Then, the grease that received the pressure is fed out to the fixed-displacement discharge unit 914 and is filled in the fixed-displacement discharge unit 914.

The air is supplied to the fixed-displacement discharge unit 914 similarly to the grease tank 913 when the solenoid valve 904 is turned ON. The supplied air pushes down the piston (not shown) provided to the inside to send out the grease filled in the inside to grease supply pipings 940 (three pipings are illustrated in FIG. 49) every predetermined amount. These three grease supply pipings 940 are communicated with grease supply paths 793a, 793b, 793c via the grease supply ports 792 opened on the spindle unit 750 respectively. The grease discharged from the fixed-displacement discharge unit 914 is fed to the grease supply paths 793a, 793b, 793c via the grease supply pipings 940. Then, the grease is supplied to the interiors of the bearings 751, 751, 752 in the spindle unit 750.

Then, an operation performed after the solenoid valve 904 is turned ON will be explained simply hereunder. When the solenoid valve 904 is turned ON, the air sent out from the air source 901 is supplied to the grease tank 913 and the fixed-displacement discharge unit 914 to push down the pistons provided in the grease tank 913 and the fixed-displacement discharge unit 914. In this condition, the grease in the grease tank 913 is brought into the pressurized state. In contrast, the piston in the fixed-displacement discharge unit 914 applies the pressure to the grease in the fixed-displacement discharge unit 914 to execute the grease supply to the spindle unit 750. Then, when the solenoid valve 904 is turned OFF, the piston in the fixed-displacement discharge unit 914 returns to the home position. At this time, if a mechanism that is able to hold the air pressure in the grease tank 913 for a predetermined time is employed, the pressure is loaded to the piston in the grease tank 913 and the grease that is subjected to the pressure is filled in the fixed-displacement discharge unit 914. This filled grease is used in the subsequent grease supply. With the above, the explanation of the movement of the grease in the grease tank 913 and the fixed-displacement discharge unit 914 following upon the ON/OFF operation of the solenoid valve 904 is given.

The grease pressure sensor 911 is a sensor that senses the pressure of the grease sent out to the fixed-displacement discharge unit 914 from the inside of the grease tank 913. This grease pressure sensor 911 monitors whether or not the piston in the grease tank 913 is operated normally by the air that flows into the grease supply unit 910, by sensing the pressure of the grease. More particularly, the grease pressure sensor 911 sends out an ON signal to the controller 906 when the sensed pressure exceeds a predetermined pressure. Thus, the grease pressure sensor 911 informs the controller 906 of the fact that the air having the predetermined pressure of more flows into the grease supply unit 910 from solenoid valve 904 side and thus the piston in the grease tank 913 is operated normally.

The level sensor 912 is a sensor that monitors a residual amount of the grease in the above grease tank 913. More particularly, the level sensor 912 sends out an OFF signal to the controller 906 when a residual amount of the grease in the grease tank 913 is reduced lower that 5% of the capacity of the grease tank, for example. Thus, the level sensor 912 informs the controller 906 of the fact that a residual amount of the grease in the grease tank 913 runs short and thus the time for supply, maintenance, or the like is coming up.

A rotation speed sensor 921 for sensing the rotation speed of the spindle is fitted to the spindle unit 750. The rotation speed sensor 921 is opposed to the spindle to sense a sensed mark such as slit, magnet, projection, or the like formed on this spindle and generate a pulse signal in response to the rotation speed of the spindle. The sensed pulse signal is sent out to the controller 906.

The controller 906 is a controller that integratedly controls the present grease supply system 900. The controller 906 is constructed such that it can receive ON/OFF information and rotation speed information from the air pressure sensor 905, the grease pressure sensor 911, the level sensor 912, and the rotation speed sensor 921, and then controls the ON/OFF operation of the solenoid valve 904, the rotation speed of the spindle of the spindle unit 750, etc. in response to the received signals.

Also, a display device 907, a memory 908, and an input device 909 are connected to the controller 906.

This display device 907 displays the signals sent from the controller 906 to inform the user of the state of the grease supply system 900. The display device 907 displays the results of decisions made in the controller 906, and informs the user of the operating situation of the present grease supply system 900 or issues the alarm to call user's attention.

The program applied to supply the grease to the spindle unit 750 is saved in the memory 908. The controller 906 is constructed such that the controller executes the process to calculate the grease supply timing in compliance with the program every time when the controller received the rotation speed information sent from the rotation speed sensor 921 (in the present embodiment, every time when the controller received the rotation speed information every 0.8 second).

The program of the present embodiment classifies the rotation speed area into three areas, i.e., a "low speed area", a "middle speed area", and a "high speed area", and has a predetermined addend assigned to respective rotation speed areas. More particularly, the "low speed area" signifies an area in which the rotation speed of the spindle 771 of the spindle unit 750 is higher that 0 $min^{-1}$ but lower than 12000 $min^{-1}$ (including the stop area), the "middle speed area" signifies an area in which the rotation speed of the spindle of the spindle unit 750 is higher that 12000 $min^{-1}$ but lower than 18000 $min^{-1}$, and the "high speed area" signifies an area in which the rotation speed of the spindle 771 is higher that 18000 $min^{-1}$. Here, 1, 2, and 10 are assigned to the "low speed area", the "middle speed area", and the "high speed area" as the addend respectively.

The controller 906 decides to which rotation speed area the rotation speed belongs at that point, in compliance with the program every time when the rotation speed of the spindle 771 is given. Then, the addend corresponding to the concerned rotation speed area is added to the integrated value saved in the memory 908. Then, when the integrated value exceeds a predetermined upper limit, the controller 906 flows a predetermined current to the solenoid valve 904 to bring the solenoid valve 904 into its opened state, supplies the air to the grease supply unit 910 from the air source 901, and supplies the grease in the fixed-displacement discharge unit 914 to respective bearings in the spindle unit 750. Then, the controller 906 brings the solenoid valve 904 into its closed state after a predetermined time, and thus the grease is supplied from the grease tank 913 to the fixed-displacement discharge unit 914.

Here, the upper limit of the integrated value is set to 900000, for example. This value indicates that the supply is executed at 25 hour in the continuous operation in the high speed area. In this case, because the bearing breakdown time at the maximum rotation speed 22000 $min^{-1}$ of the spindle is 100 hour, the upper limit of the integrated value and the addend (10) in the high speed area are decided in such a manner that the grease supply time falls within 20 to 40% of the breakdown time to ensure the safety. Also, while considering the fact that the breakdown time at the boundary speed 18000 $min^{-1}$ between the low speed area and the high speed area is 1000 hour, the upper limit of the integrated value and the addend (1) in the low speed area are decided in such a manner that the grease is supplied at 250 hour that corresponds to 25% of the breakdown time when the bearing unit 750 is continuously operated in the low speed area. In other words, in the present embodiment, when the power supply of the grease supply system 900 is turned ON, the grease is supplied automatically at a maximum of 250 hour even though the spindle is in its stopped state.

The input device 909 is an input device used to operate the grease supply system 900 via the controller 906, is composed of various buttons such as a start button, a restart button, a reset button, etc. The user can operate the grease supply system 900 via these buttons.

Next, a control operation of the grease supply system 900 in the present embodiment will be explained with reference to flowcharts shown in FIG. 51 to FIG. 55 hereunder.

Figure 51:
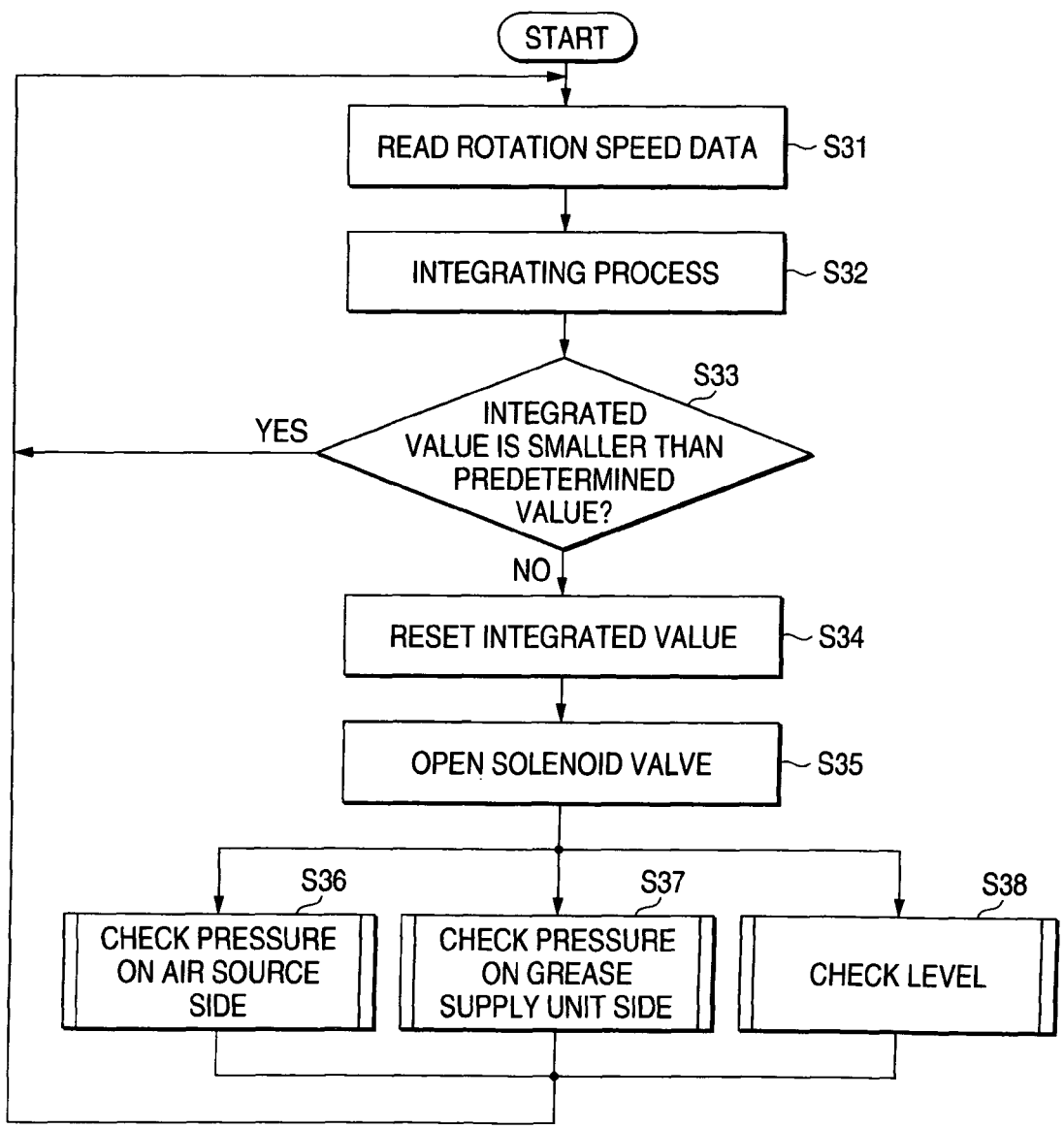
FIG. 51 is a flowchart showing a control flow in the thirty-third embodiment according to the present invention.

First, explanation will be given with reference to FIG. 51 hereunder. At first, when an operation of the grease supply system 900 is started, the controller 906 receives the rotation speed information sent periodically from the rotation speed sensor 921 provided to the spindle unit 750 and then reads the rotation speed of the spindle 771 of the spindle unit 750 based on the rotation speed information (step S31).

Then, the controller decides the addend added to the integrated value N based on the read rotation speed, and then executes an integrating process (step S32).

Figure 52:
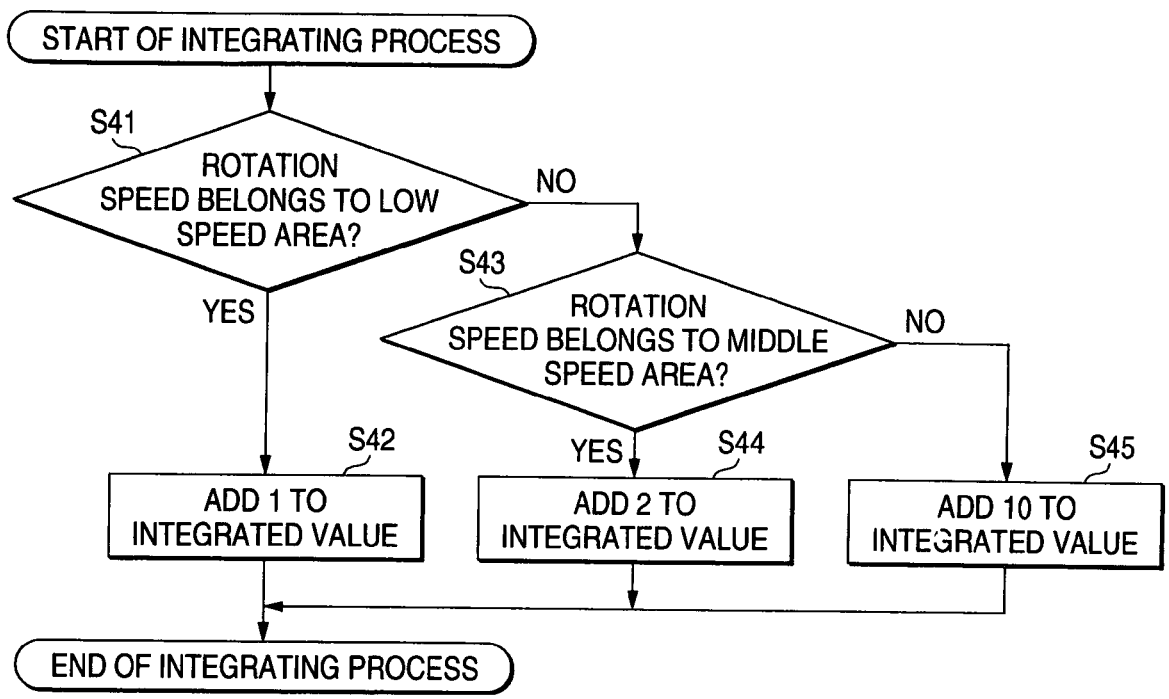
FIG. 52 is a flowchart showing an integrating process in the thirty-third embodiment according to the present invention.

FIG. 52 is a flowchart showing contents of the integrating process in step S32. Here, the addend is decided depending upon the part, to which the sensed rotation speed of the spindle corresponds, of the rotation speed area that is classified into three areas, i.e., the "low speed area", the "middle speed area", and the "high speed area".

First, in step S41, it is decided whether or not the sensed rotation speed of the spindle corresponds to the low speed area (here, the area in which the rotation speed is lower than 12000 $min^{-1}$ containing 0). Then, if the sensed rotation speed of the spindle corresponds to the low speed area, 1 is added to the integrated value N and then the integrating process is ended (step S42).

In contrast, if the sensed rotation speed of the spindle does not correspond to the low speed area, the process goes to step S43. Then, it is decided whether or not the sensed rotation speed of the spindle corresponds to the middle speed area (here, the area in which the rotation speed is higher than 12000 $min^{-1}$ but lower than 18000 $min^{-1}$). Then, if the sensed rotation speed of the spindle corresponds to the middle speed area, 2 is added to the integrated value N and then the integrating process is ended (step S44).

Also, if the sensed rotation speed of the spindle does not correspond to the middle speed area, the controller decides that the rotation speed belongs to the high speed area. Then, 10 is added to the integrated value N and then the integrating process is ended (step S45).

Returning to FIG. 51, explanation will be made again hereunder. When the integrating process is ended in step S32, the controller 906 decides whether or not the integrated value N is smaller than a predetermined value, for example, whether or not the integrated value N is smaller than 9000000 (step S33). Here, if the integrated value N is smaller than the predetermined value, the process goes back to step S31. Then, the controller reads the rotation speed once again after a predetermined time, and then the integrating process is executed in step S32.

In contrast, if the integrated value N is larger than the predetermined value, e.g., 9000000, the controller decides that the grease supply timing has just come and then the process goes to step S34.

First, in step S34, the controller 906 resets the integrated value N to 0. Then, in step S35, the controller 906 flows a predetermined current to the solenoid valve 904 to open the solenoid valve 904. Thus, the air is supplied to the grease supply unit 910 via the solenoid valve 904 to push down the piston of the fixed-displacement discharge unit 914 in the grease supply unit 910. As a result, the grease in the fixed-displacement discharge unit 914 is supplied to the bearing spaces of respective rolling bearings in the spindle unit 750. At the same time, the controller 906 adds 1 to the integrated value of the grease shot counter that is provided to its inside to count the number of times of the grease shot. Then, when the solenoid valve 904 is closed after a predetermined time elapsed, the piston of the fixed-displacement discharge unit 914 returns to its initial position and also the grease to be supplied subsequently is supplied from the grease tank 913 to the fixed-displacement discharge unit 914.

Then, when the solenoid valve 904 is turned ON, the controller 906 confirms the presence or absence of the ON/OFF signals from the air pressure sensor 905, the grease pressure sensor 911, and the level sensor 912 to check whether or not the grease supply is being executed normally, in step S36, step S37, step S38. Each of the checking operations will be explained hereunder.

Figure 53:
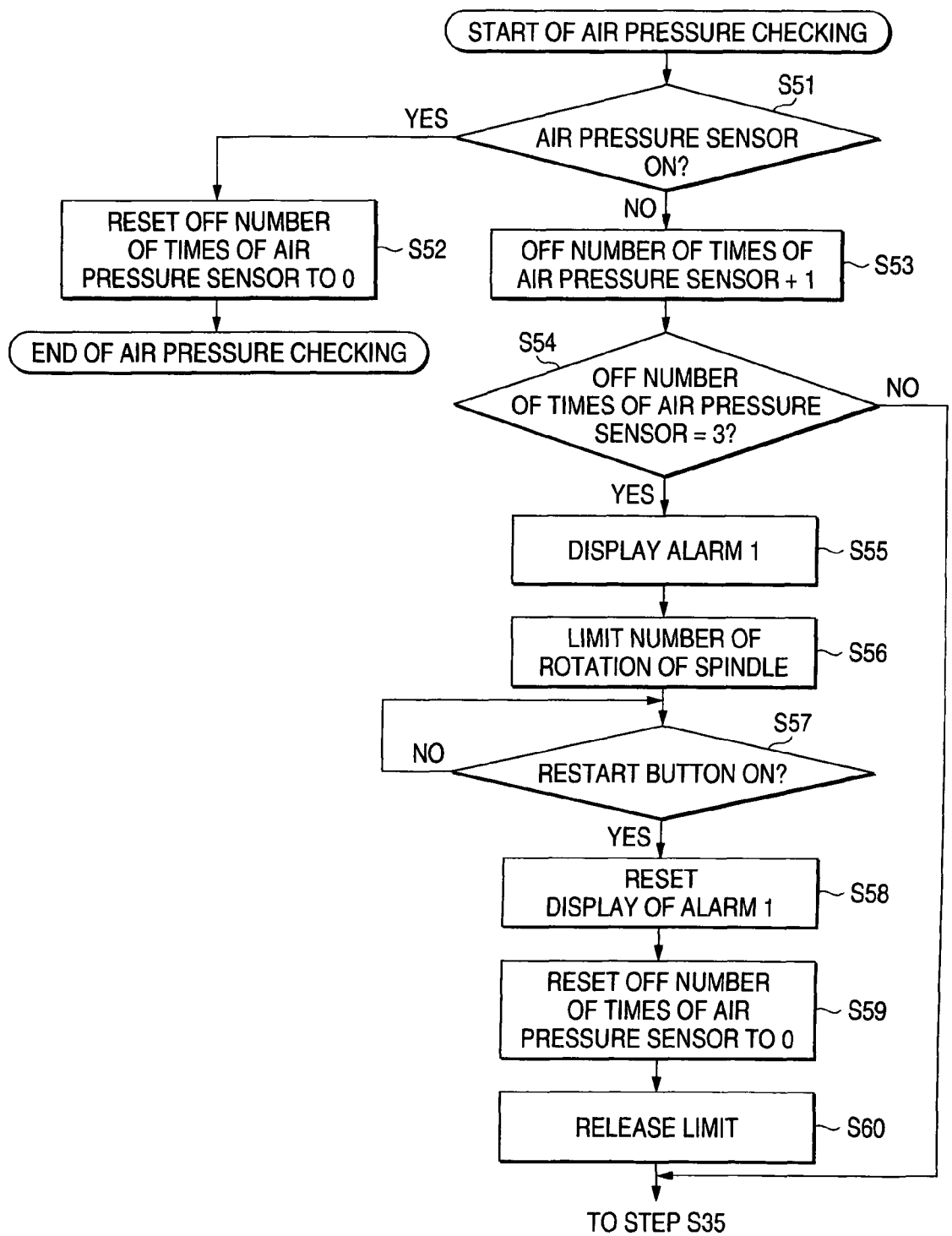
FIG. 53 is a flowchart showing an air pressure checking in the thirty-third embodiment according to the present invention.

FIG. 53 is a flowchart explaining an air pressure checking operation executed by the air pressure sensor 905.

First, the controller 906 checks whether or not such controller received the ON signal from the air pressure sensor 905 (step S51). Then, if the air pressure sensor 905 is turned ON, i.e., if the air pressure sensed by the air pressure sensor 905 exceeds a predetermined value, the controller decides that the normal air pressure is supplied. Then, the process goes to step S52 wherein the controller resets the OFF number of times of the air pressure sensor 905 to 0. Then, the checking operation is ended.

In contrast, if the air pressure sensor 905 is turned OFF, i.e., if the air pressure sensed by the air pressure sensor 905 does not exceed the predetermined value, the controller 906 decides that the normal air pressure is not supplied and adds 1 to the OFF number of times of the count in the air pressure sensor 905 (step S53).

Then, in step S54, the controller decides whether or not the OFF number of times of the air pressure sensor 905 becomes equal to 3. This is because the OFF number of times of the air pressure sensor 905 acts as the counter that indicates how many times the sensor fails to sense the air pressure. If the counter indicates 2 times or less, the process goes to step S35 wherein the controller causes the solenoid valve 904 to open again.

In contrast, if the OFF number of times of the air pressure sensor 905 becomes equal to 3, the controller decides that the air pressure did not reach the predetermined value after the opening operation of the solenoid valve 904 was tried 3 times and thus the abnormality was caused. Then, in step S55, an "alarm 1" is displayed on the display device 907. Here, the "alarm 1" is displayed like "Check! The air pressure runs short. Please make sure the air pressure.", for example, and calls upon the user to check whether nor not the air pressure of the regulator 903 is set appropriately, any trouble is caused in the air supply path 930, or the like.

Then, in step S56, the controller 906 controls to lower the setting of the maximum rotation speed of the spindle 771 in the spindle unit 750 to the rotation speed in the middle speed area (the area that is higher than 12000 $min^{-1}$ but lower than 18000 $min^{-1}$), e.g., the rotation speed of 15000 $min^{-1}$. In other words, even when the maximum rotation speed is set to 22000 $min^{-1}$ in the initial state, for example, the controller limits the maximum rotation speed to 15000 $min^{-1}$ such that the spindle 771 in the spindle unit 750 is not run at the rotation speed that exceeds that rotation speed.

Thus, such a control can be applied that the seizure of the bearing, etc. owing to lack of the grease caused when the grease is not supplied are hard to occur. Here, the upper limit of the rotation speed may be controlled at the maximum value 18000 $min^{-1}$ in the middle speed area.

Subsequent to this condition, in step S57, the controller stands by until the restart button on the input device 909 is pressed after the user devised any countermeasure. When the restart button is pressed, the controller 906 resets the display of the alarm 1 being displayed on the display device 907 (step S58), resets the OFF number of times of the air pressure sensor 905 to 0 (step S59), and releases the limit of the rotation speed set in step S56 (step S60). Then, the process goes back to step S35 wherein the controller 906 opens the solenoid valve 904 again.

The explanation of the checking operation of the air pressure sensor 905 is completed with the above.

Figure 54:
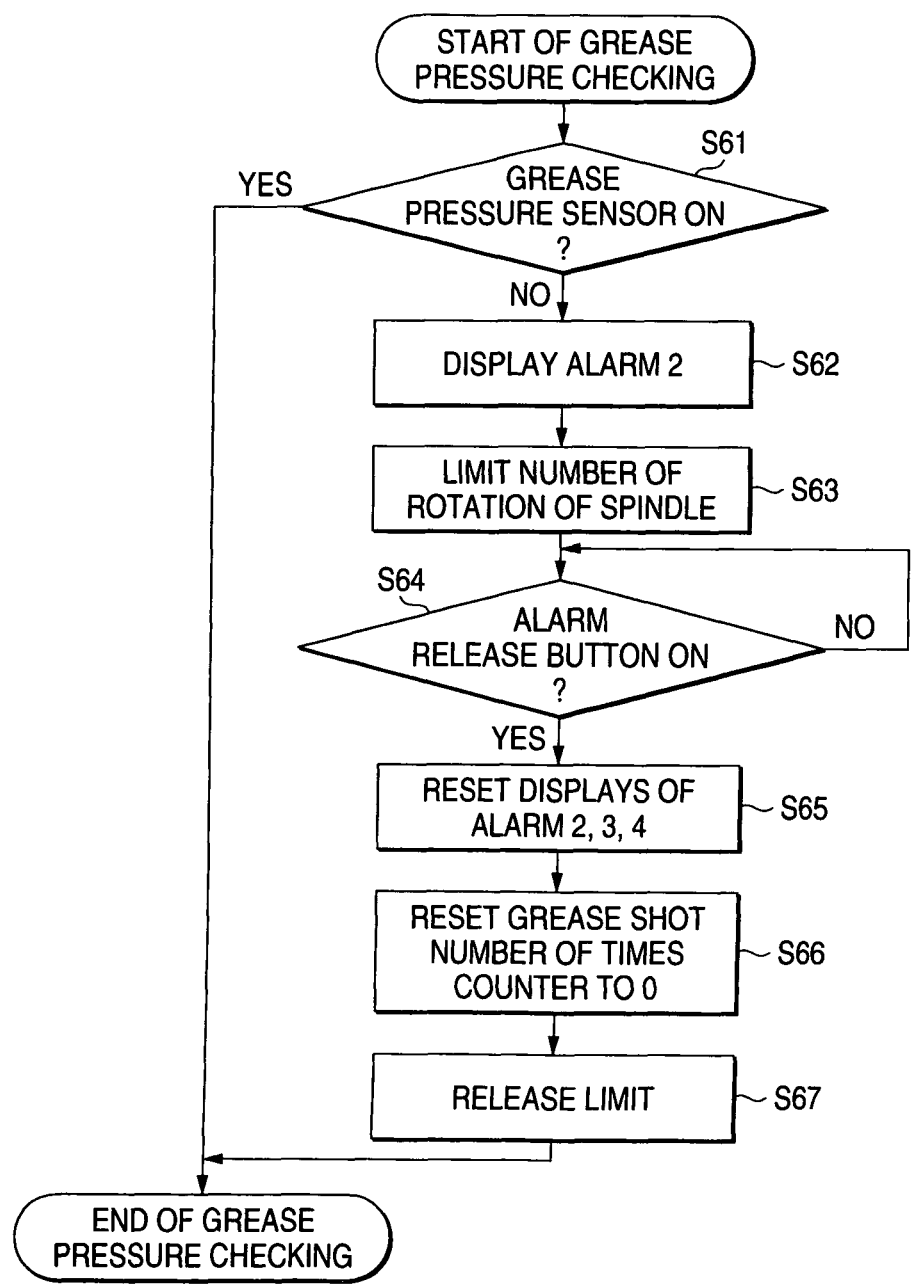
FIG. 54 is a flowchart showing a grease pressure check in the thirty-third embodiment according to the present invention.

Next, a grease pressure checking operation executed by the grease pressure sensor 911 will be explained hereunder. FIG. 54 is a flowchart explaining the grease pressure checking operation of the grease pressure sensor 911.

First, the controller 906 checks whether or not such controller received the ON signal from the grease pressure sensor 911 (step S61). Then, if the grease pressure sensor 911 is turned ON, i.e., if the pressure of the grease pressure sensor 911 exceeds a predetermined value, the controller decides that the piston in the grease tank 913 is operated normally. Then, the checking operation is ended as it is.

In contrast, if the grease pressure sensor 911 is turned OFF, i.e., if the pressure of the grease pressure sensor 911 does not exceed the predetermined value, the controller decides that the piston in the grease tank 913 is not operated normally and thus the grease is not supplied to the fixed-displacement discharge unit 914. Then, in step S62, an "alarm 2" is displayed on the display device 907.

Then, the "alarm 2" is displayed like "Trouble! The pressure in the grease tank is insufficient. Please contact the service man promptly. The upper limit of the rotation speed is limited to 15000 $min^{-1}$.", for example, and calls upon the user to take any countermeasure urgently.

In step S63, the controller 906 controls to lower the setting of the maximum rotation speed of the spindle 771 in the spindle unit 750 to the rotation speed in the middle speed area (the area that is higher than 12000 $min^{-1}$ but lower than 18000 $min^{-1}$), e.g., the rotation speed of 15000 $min^{-1}$. In other words, even when the maximum rotation speed is set to 22000 $min^{-1}$ in the initial state, for example, the controller limits the maximum rotation speed to 15000 $min^{-1}$ such that the spindle 771 in the spindle unit 750 is not rotated at the rotation speed that exceeds that rotation speed.

Thus, such a control can be applied that the seizure of the bearing, etc. owing to lack of the grease caused when the grease is not supplied are hard to occur. In this case, the upper limit of the rotation speed may be controlled at the maximum value 18000 $min^{-1}$ in the middle speed area.

Subsequent to this condition, in step S64, the controller stands by until the alarm release button on the input device 909 is pressed after the user devised any countermeasure. When the alarm release button is pressed, the controller 906 resets the display of the alarm 2 being displayed on the display device 907 in step S65 (if alarms 3, 4 are also displayed, the controller resets them at the same time), resets the grease shot number counter to 0 (step S66), and releases the limit of the rotation speed set in step S63 (step S67). Then, the checking operation of the grease pressure sensor 911 is ended.

Figure 55:
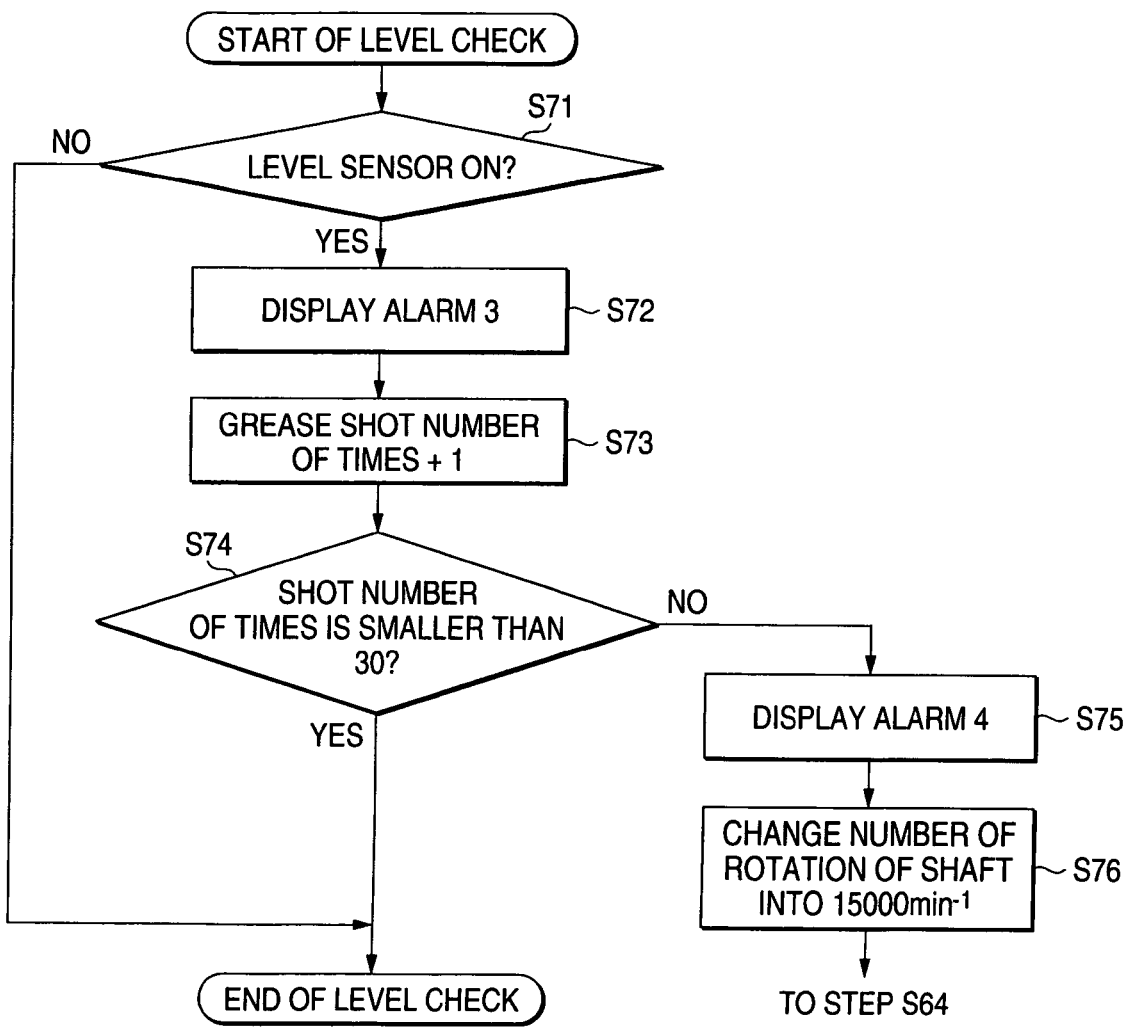
FIG. 55 is a flowchart showing a level check in the thirty-third embodiment according to the present invention.

Next, a level checking operation executed by the level sensor 912 will be explained hereunder. FIG. 55 is a flowchart explaining the level checking operation of the level sensor 912.

First, the controller 906 checks whether or not such controllers received the OFF signal from the level sensor 912 (step S71). Then, if the level sensor 912 is in its ON state, the controller decides that a residual amount of grease in the grease tank 913 is sufficient (here, 5% or more of the grease tank capacity), and then ends the level checking operation as it is.

In contrast, if the level sensor 912 is in its OFF state, the controller decides that a residual amount of grease in the grease tank 913 is below 5% of the grease tank capacity and that the timing for maintenance of the grease supply unit 910 and the spindle unit 750 is coming up. Thus, the controller displays an "alarm 3" on the display device 907 in step S72.

Here, the "alarm 3" is displayed like "Be careful! The maintenance time of the supply unit and the spindle unit is coming up. Please contact the service man.", for example, and calls upon the user to do the maintenance.

Then, the controller adds 1 to the grease shot number of times (step S73), and decides whether or not the grease shot number of times is smaller than 30 times up to now by checking the counter (step S74). If the grease shot number of times is smaller than 30 times, the controller decides that no problem arises. Then, the level checking operation is ended.

In contrast, if the grease shot number of times is equal to 30 times, the controller decides that the grease supply unit 910 and the spindle unit 750 must be maintained urgently and thus displays an "alarm 4" on the display device 907 (step S75).

Here, the "alarm 4" is displayed like "Warning! The supply unit and the spindle unit need the maintenance. Please call the service man promptly. The upper limit of the rotation speed is limited to 15000 $min^{-1}$.", for example, and calls upon strongly the user to do the maintenance.

Then, in step S76, the controller 906 controls to lower the setting of the maximum rotation speed of the spindle 771 in the spindle unit 750 to the rotation speed in the middle speed area (the area that is higher than 12000 $min^{-1}$ but lower than 18000 $min^{-1}$), e.g., the rotation speed of 15000 $min^{-1}$. In other words, even when the maximum rotation speed is set to 22000 $min^{-1}$ in the initial state, for example, the controller limits the maximum rotation speed to 15000 $min^{-1}$ such that the spindle 771 in the spindle unit 750 is not rotated at the rotation speed that exceeds that rotation speed.

Thus, even though a residual amount of grease in the grease tank 913 is small, such a control can be applied that a grease supply span is prolonged by lowering the rotation speed to suppress an amount of consumed grease and thus the seizure of the bearing, etc. owing to lack of the grease are hard to occur. In this case, the upper limit of the rotation speed may be controlled at the maximum value 18000 $\min^{-1}$ in the middle speed area.

After the rotation speed of the spindle 771 is changed, the process goes to step S64 in FIG. 54. Then, after the maintenance is ended, the process to go to step S64 is executed subsequently and then the controller returns to its normal state.

Then, in steps S36, S37, and S38, the controller 906 confirms the presence or absence of the ON/OFF signals from the air pressure sensor 905, the grease pressure sensor 911, and the level sensor 912 to check whether or not the grease supply is being executed normally. When the controller confirms that the grease was supplied to the spindle unit 750, such controller brings the solenoid valve into its OFF state from its ON state after a predetermined time. Then, the process goes back to step S31, and the controller restarts the integrating operation of the integrated value.

In the present embodiment, the grease is intermittently supplied to the spindle unit 750 by repeating the above operations.

As described above, according to the present embodiment, the rotation speed of the spindle is read every predetermined time, and the rotation speed area is classified into three areas, i.e., the "low speed area", the "middle speed area", and the "high speed area" in answer to the rotation speed, and then the addend is added to the integrated value in response to respective areas. Then, only when the integrated value exceeds a predetermined value, the additional grease is supplied to the spindle unit 750.

Therefore, the grease can be supplied appropriately in response to the rotation speed of the spindle unit 750, i.e., the degraded state of the grease. Also, controller 906 increments the integrated value by adding 1 to the integrated value even when the spindle is not turned. Thus, the maximum time interval at which the grease is supplied can be decided even when the spindle 771 is in its non-rotated state. As a result, even though the spindle is stopped, the grease is supplied within the maximum time interval if the power supply is turned ON, and consequently the grease can always be supplied stably even during the cycle of stop→acceleration→constant speeds→deceleration→stop.

Also, according to the present embodiment, the air pressure sensor 905 and the grease pressure sensor 911 are provided, and then the suitable alarm is displayed on the display device 907 in response to sensed conditions of the air pressure sensor 905 and the grease pressure sensor 911. Therefore, even though the user does not particularly take care of the maintenance timing, the alarm gives an advice to the user at an appropriate timing to maintain always the grease supply system 900 in its normal condition. As a result, the breakdown of the bearing that may be caused by the shortage of the additional grease, or the like due to the lack of maintenance can be prevented beforehand.

Also, since the reset number of times of the integrated value is integrated, an amount of remaining grease in the grease tank can be estimated, a residual amount of grease can be displayed on the display device 907, and the maintenance timing can be forecasted.

Also, according to the present embodiment, the rotation speed of the spindle is lowered to the rotation speed in the rotation speed area that is one rank lower than the high speed area, in response to the running condition of the spindle and an abnormality sensed level. That is, when the spindle is being rotated in the high speed area, the rotation speed is lowered into the middle speed area as the speed area that is lower by one rank. As a result, even when a residual amount of grease in the grease tank 913 is decreased, such a control can be applied that a consumption amount of grease is suppress by lowering the rotation speed to lengthen the grease supply span and thus the seizure of the bearing, etc. owing to the lack of the grease become difficult to occur, whereby it is possible to reduce a possibility that the seizure of the bearing is caused.

In this case, in the present embodiment, 10, 2, 1 are assigned to the high speed area, the middle speed area, and the low speed area as the addend respectively, but the present invention is not limited to these values. A desired value may be appropriately set in response to the used state of the spindle and the bearing respectively. Also, the maximum value of the integrated value may be set to a desired value with regard to the used condition, the durability, and the like.

Also, in the present embodiment, the rotation speed area is divided into three stages and the addend is assigned to them respectively, but the present invention is not limited to these stages. The number of division of the rotation speed area may be set appropriately in answer to the situation. For instance, it may be considered that, if the number of division is increased in the area in which the rotation speed is largely changed in operation, it is made easy to execute the grease supply in conformity with the actual degradation situation of the grease.

Also, in the present embodiment, the grease supply unit 910 for executing the grease supply by utilizing the air pressure is employed, but the present invention is not limited to this unit. The present invention may be constructed to execute the grease supply at the same grease supply timing as the present embodiment by using the grease supply unit that is operated by the medium except the air.

Also, in the present embodiment, the explanation is made of the grease supply by exemplifying the spindle unit 750, but the present invention is not limited to this. The present invention may be applied to the spindle unit for other machine tool spindles, the spindle unit for the motor spindle, and the like.

Also, in the present embodiment, the explanation is made in the situation that the rotation speed is calculated every 0.8 second, but the present invention is not limited to this. The present invention may be constructed to calculate the rotation speed at any time interval in response to the situation.

With the above, according to the grease supply systems, the spindle units using the grease supply system, the grease supply methods, and the grease supply programs in the thirtieth to thirty-third embodiments, the influence of the churning resistance of the grease can be suppressed to the lowest minimum and also the enhanced lifetime of the bearing can be achieved.

According to the above embodiments, the supply timing at which the additional grease is supplied is controlled in response to the rotation speed of the spindle. Therefore, the grease can be supplied appropriately at the interval that conforms to the frequency in use of the rolling bearing. Also, in contrast to the case where the grease is supplied at a constant timing, the wasteful grease supply can be avoided and the number of times of the grease supply can be reduced. As a result, the grease can be supplied at the optimum interval not to supply the excessive grease, the seizure, etc. of the bearing can be prevented in advance, and the bearing temperature can be kept stably.

Also, according to the above embodiments, the present invention can be applied similarly to the case where the grease is supplied either in the radial direction or in the axial direction.

Also, according to the above embodiments, the addend is set in response to the rotation speed, the addend is integrated in response to the actually measured rotation speed, and the grease is supplied when the integrated value exceeds a predetermined value. Therefore, the grease can be supplied appropriately at the interval that conforms to the frequency in use of the rolling bearing. Also, in contrast to the case where the grease is supplied at a constant timing, the wasteful grease supply can be avoided and the number of times of the grease supply can be reduced. As a result, the grease can be supplied at the optimum interval not to supply the excessive grease, the seizure, etc. of the bearing can be prevented in advance, and the bearing temperature can be maintained stably.

Also, according to the above embodiments, the integrated value is reset at the time of the grease supply, and the integration of the integrated value is started once again. Therefore, once the grease supply is started, such grease supply is continued in compliance with the above algorithm until the user stops intentionally the grease supply. As a result, the user can utilize the grease supply system to pay no regard to the grease supply timing and also the user's time and labor can be reduced.

Also, according to the above embodiments, since the reset number of times of the integrated value is integrated, it is possible to recognize how many times the grease supply has been applied. Therefore, a residual amount of grease in the grease supply unit can be grasped, and also the maintenance time can be forecasted.

Also, according to the above embodiments, when the spindle is stopped, the addend is set to 0 and no integration is carried out. Therefore, it is feasible to avoid generation of the fault such that the grease supply is carried out even when the bearing unit is not operated for a long term, or the like.

Also, according to the above embodiments, when a residual amount of grease in the grease supply unit is smaller than a predetermined value, the rotation speed of the spindle is controlled lower than a predetermined rotation speed. Therefore, when a residual amount of grease is reduced and the maintenance is needed, the rotation speed of the spindle is controlled such that the speed is reduced lower than a predetermined rotation speed. Thus, the maintenance is applied, and also the grease supply interval is lengthened in due course by lowering the rotation speed until the grease is filled into the grease supply unit. As a result, a small amount of grease can be supplied for a long time and also it is possible to prevent previously generation of failures such as the seizure, etc. of the bearing generated when the spindle is caused to run at a high rotation speed although the maintenance, or the like is needed.

Also, according to the above embodiments, the predetermined rotation speed belongs to the rotation speed area that is lower by one rank than the maximum rotation speed area in a plurality of areas. In this manner, the control applied to lower the rotation speed of the spindle, which is running in the maximum rotation speed area, into the rotation speed area that is one rank lower than the current rotation speed area is most effective in the controlling method that controls the rotation speed of the spindle lower than a predetermined rotation speed. In other words, a consumption amount of grease can be suppressed by lowering the rotation speed of the spindle that is running in the maximum rotation speed area, and thus the generation of failures such as the seizure, etc. of the bearing can be prevented beforehand.

In the thirtieth to thirty-third embodiments, the rotation speed sensor is provided to the spindle of the spindle unit and then the grease supply timing is controlled by sensing the rotation speed of the spindle. In this case, if the grease supply unit equipped with the grease supply mechanism to supply the grease to the inside of the rolling bearing is employed, the rotation speed sensor for sensing the rotation speed of any one of the inner ring and the outer ring of the rolling bearing may be provided and then the grease supply timing may be controlled by the controlling means in response to the rotation speed of the rotating ring.

Thirty-Fourth Embodiment

A grease supply system and a spindle unit according to a thirty-fourth embodiment of the present invention will be explained in detail with reference to FIGS. 56 to 60 hereinafter.

Figure 56:
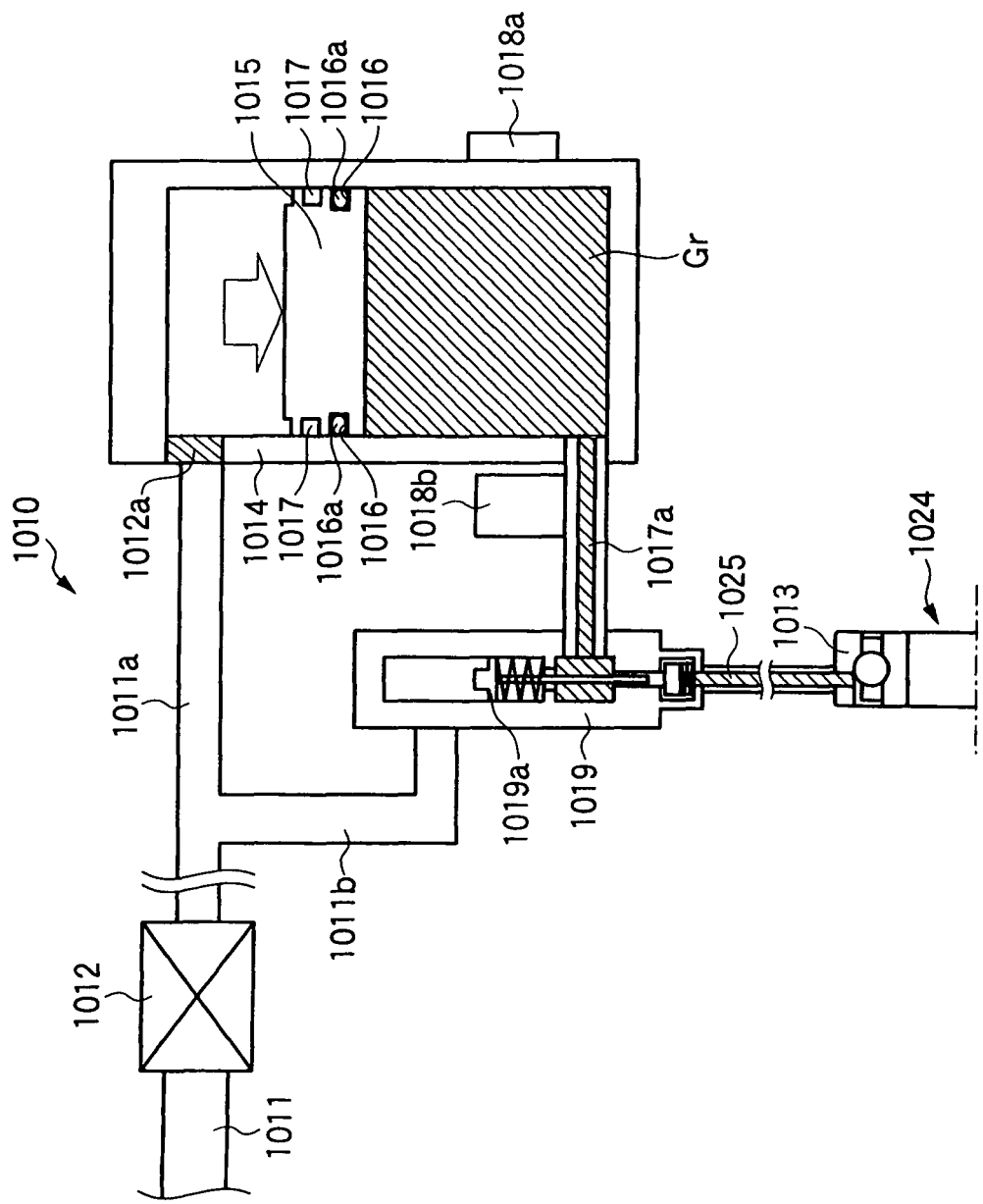
FIG. 56 is a configurative view of a grease supply system according to a thirty-fourth embodiment of the present invention.

As shown in FIG. 56, in a grease supply system 1010 constituting a grease supply system (or a grease supply mechanism) of the present embodiment, a solenoid valve 1012 is provided to the middle of an air piping 1011 from the suction port. Also, one end portion of an air piping 1011*a* is connected to a grease tank 1014, which contains a grease Gr that is supplied to a bearing 1013, via a resistor mechanism 1012*a*. Also, an in-tank piston 1015 for applying a pressure to the grease in the grease tank 1014 is arranged in the grease tank 1014.

Meanwhile, a mechanical fixed-displacement piston pump 1019 is arranged between an air piping 1011*b* extended from the solenoid valve 1012 and a grease piping 1025 that supplies the grease from the grease tank 1014 to the bearing 1013. Then, the grease tank 1014 and the mechanical fixed-displacement piston pump 1019 are connected by a grease piping 1017*a*.

A magnet 1017 and a piston ring or O ring 1016*a* is fitted to a peripheral groove portion 1016 of the in-tank piston 1015 in the grease tank 1014 to oppose to an inner surface of the grease tank 1014. Also, a level sensor 1018*a* is fitted to the outside of the grease tank 1014. A pressure sensor 1018*b* is arranged onto the grease piping 1017*a* that connects the grease tank 1014 and the mechanical fixed-displacement piston pump 1019.

Figure 57:
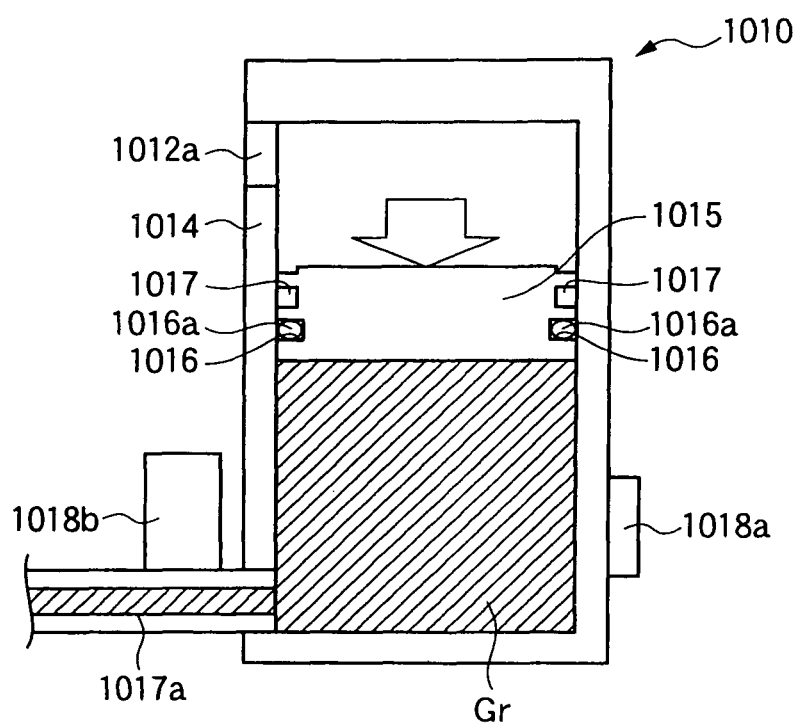
FIG. 57 is a sectional view of a grease tank of the grease supply system according to the thirty-fourth embodiment.

As shown in FIG. 57, the grease is discharged from the grease tank 1014 having the above structure by the mechanical fixed-displacement piston pump 1019. Thus, the grease Gr in the grease tank 1014 is consumed with the lapse of use time (the number of operation times) of the grease supply system 1010. That is, the piston in the grease tank 1014 goes toward the bottom.

Then, when the in-tank piston 1015 reaches a set height value of the level sensor 1018*a*, the level sensor 1018*a* responds to the magnet 1017 in the in-tank piston 1015 in the grease tank 1014. The response of the level sensor 1018*a* is electrically sensed and output to a spindle running system to inform those around one of the fact that a residual amount of the grease Gr runs short.

Meanwhile, the pressure sensor 1018*b* provided to monitor the grease-pressurized situation operates as follows.

Figure 58:
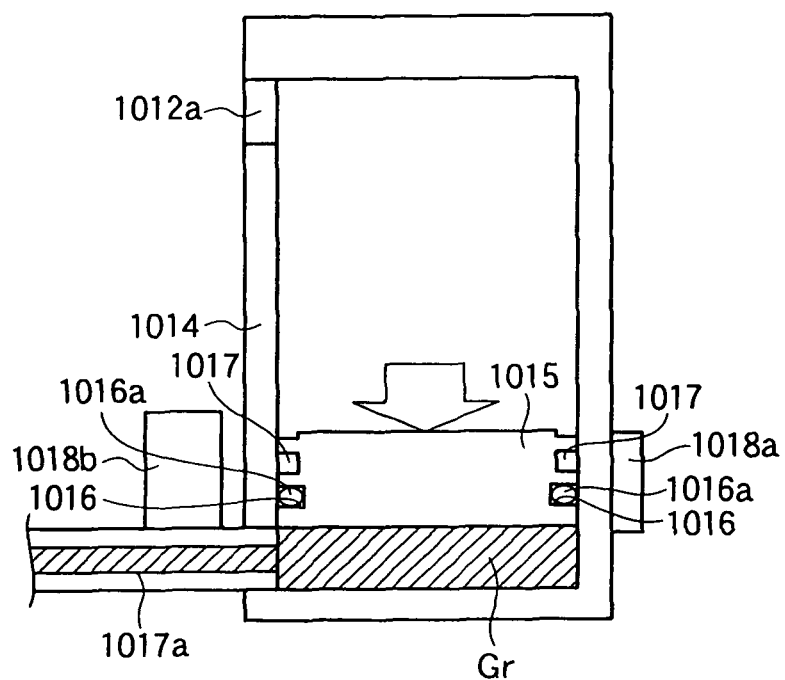
FIG. 58 is a sectional view of the grease tank of the grease supply system according to the thirty-fourth embodiment when a sensor is activated.

As shown in FIG. 58, the pressure is applied the in-tank piston 1015 by supplying the air into the grease tank, and thus the pressure is applied to the grease. When a certain pressure is applied to the grease, the pressure sensor 1018*b* for monitoring the pressure of the grease responds to this pressure. The response of the pressure sensor 1018b is electrically sensed and output to the spindle running system to inform those around one of the fact that the grease is being fed from the grease tank 1014 to the mechanical fixed-displacement piston pump 1019 (see FIG. 56).

Here, when something wrong happens in the middle of the transfer of the grease from the grease tank 1014 to the mechanical fixed-displacement piston pump 1019, the pressure sensor 1018b senses such abnormality and then outputs a signal to the spindle running system to inform those around one of the fact that the grease is not being discharged from the mechanical fixed-displacement piston pump 1019 into the spindle unit.

Figure 66:
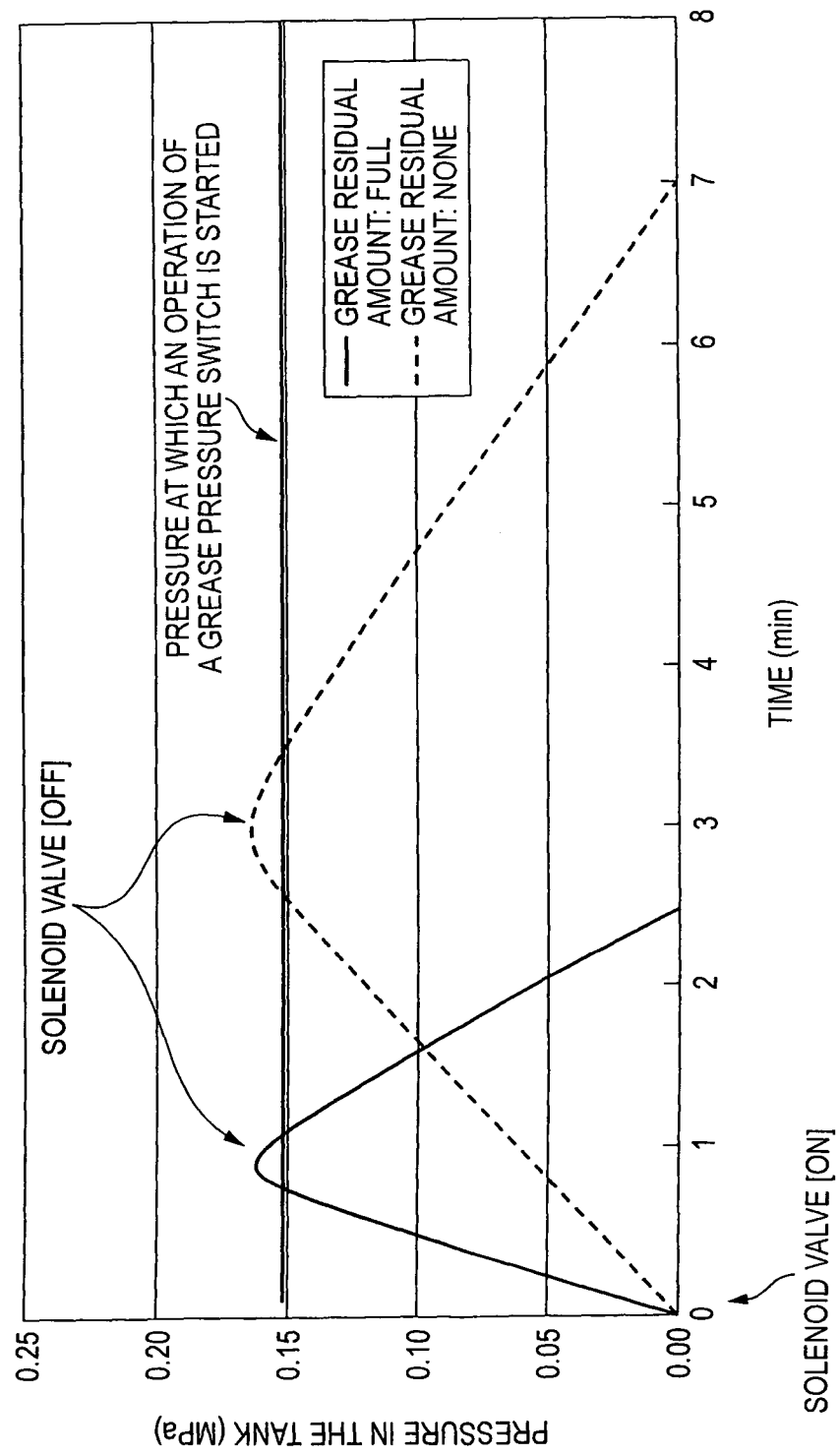
FIG. 66 is a graph representing a relationship between a grease in a tank and a time.

Also, the resistor mechanism 1012a is formed of graphite, sintered material, or the like, and is constructed to apply the pressure to the piston 1015 in the grease tank for a predetermined time after the solenoid valve 1012 is turned OFF. A graph showing the pressure in the tank when the graphite is used as the resistor mechanism 1012a is illustrated in FIG. 66. Since a volume of the air in the grease tank is changed dependent on a residual amount of the grease, there is a change in a time in which the pressure is increased. The pressure in the grease tank 1014 is held after the solenoid valve 1013 is turned OFF, and the grease Gr in the grease tank 1014 is supplied to the mechanical fixed-displacement piston pump 1019 in a predetermined quantity at a point of time when the solenoid valve 1013 is turned OFF. In this case, a check valve, a speed controller, or the like may be employed in place of the resistor mechanism 1012a.

Figure 59:
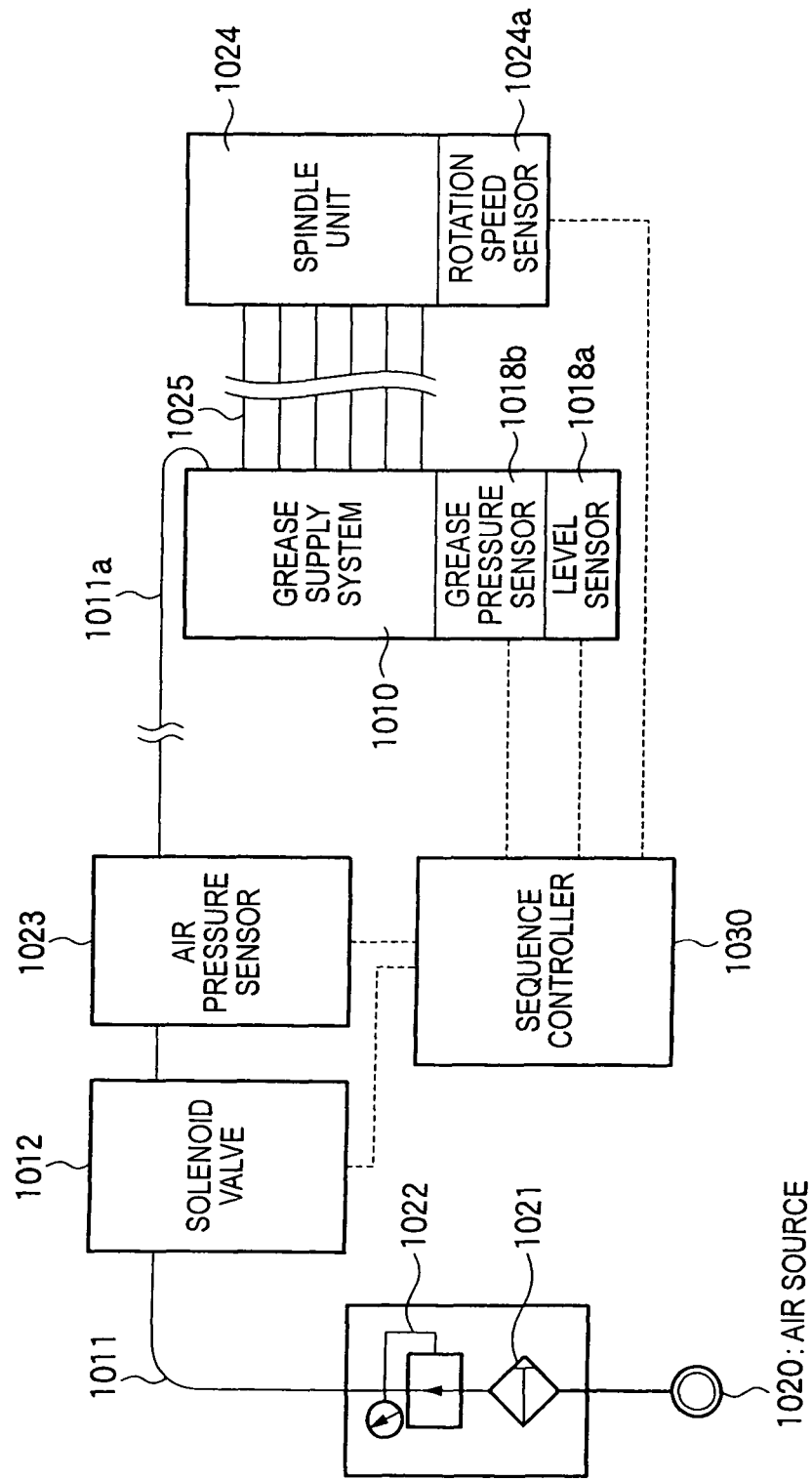
FIG. 59 is a circuit diagram of the grease supply system according to the thirty-fourth embodiment in FIG. 56.

FIG. 59 and FIG. 60 are a circuit diagram of the grease supply system of the present invention. As shown in FIG. 59, the air piping 1011 is extended from an air source 1020 to the solenoid valve 1012 via an air filter 1021 and a regulator 1022. Also, the air piping 1011 is extended to an air pressure sensor 1023 via the solenoid valve 1012 and then extended from the air pressure sensor 1023 to the grease supply system 1010 via the air piping 1011a. The grease supply system 1010 has the grease pressure sensor 1018b and the level sensor 1018a and is connected to a spindle unit 1024 with a rotation speed sensor 1024a via the grease piping 1025. A sequence controller 1030 monitors respective operations of the solenoid valve 1012 and respective sensors.

FIG. 60 is a view showing sensing operations of respective sensors in response to the operation of the solenoid valve 1012. The operation of the grease supply system 1010 will be explained hereunder.

First, the solenoid valve 1012 is turned ON. Then, the air is supplied to the grease supply system 1010, then a piston 1019a of the mechanical fixed-displacement piston pump 1019 is operated, and then the grease is discharged into the grease piping 1025 connected to the spindle unit 1024.

Then, the solenoid valve is turned OFF. The piston in the mechanical fixed-displacement piston pump is returned to its home position at the same time of the turning OFF. Since the pressure is applied to the grease in the grease tank at this time, the grease is filled into the mechanical fixed-displacement piston pump from the grease tank. A residual amount of grease is decreased when the above operations are repeated. The operation of the grease pressure sensor 1018b is monitored for a predetermined time before and after the solenoid valve 1012 is turned OFF. This monitoring is executed to check whether or not the grease in the grease tank 1014 is being fed to the mechanical fixed-displacement piston pump 1019.

If the grease pressure sensor 1018b does not respond, the sequence controller 1030 senses the fact that the grease pressure sensor 1018b does not respond, and then controls the maximum rotation speed of the spindle unit 1024. There is no need to stop immediately the spindle because the grease lubrication is applied. Thus, if the rotation speed is lowered than the rotation speed that can support the lifetime without the grease supply, the spindle can be still employed. When the magnet 1017 that is fitted to the inside of the piston 1015 in the grease tank comes up to the same level as the position of the level sensor 1018a, the level sensor 1018a responds to a residual amount of grease. The sequence controller 1030 senses the output signal to controls the maximum rotation speed of the spindle unit 1024.

Also, when the air to operate the grease supply system 1010 is not supplied, the air pressure sensor 1023 senses this situation. Then, the sequence controller 1030 senses the output of the air pressure sensor to control the rotation speed of the spindle unit 1024. Any timing may be selected as the monitoring timings (T2, T3 in FIG. 60) of the air pressure sensor 1023 if such timing falls within a period in which the solenoid valve is turned ON (T1 in FIG. 60).

In the case where the level sensor 1018a for sensing the grease remaining condition is not provided to the inside of the grease tank 1014, the in-spindle bearing 1013 is damaged when the spindle unit 1024 is run at a high speed although a residual amount of grease is 0 cc. However, if the level sensor 1018a is provided to the inside of the grease tank 1014, such level sensor 1018a can sense such a situation that a residual amount of grease runs short. Thus, the spindle can be still rotated at the rotation speed at which the in-spindle bearing 1013 is not damaged without the grease filling into the grease tank 1014 or the grease supply. Therefore, the damage of the bearing 1013 can be prevented.

Also, in the case where the grease is not filled into the mechanical fixed-displacement piston pump 1019, the grease is not discharged from the mechanical fixed-displacement piston pump 1019 and thus the bearing 1013 that is running at a high speed is damaged. However, if the grease feeding situation is monitored by the grease pressure sensor 1018b, the damage of the bearing 1013 can be prevented by finding out the fault of the grease supply system 1010 before the damage is caused in the bearing 1013 that is running at a high speed.

Thirty-Fifth Embodiment

Next, a thirty-fifth embodiment of the present invention will be explained with reference to FIG. 61 hereunder. The same symbols are affixed to the same parts as those in the thirty-fourth embodiment, and their detailed explanation will be omitted herein. A difference from the thirty-fourth embodiment resides in that the air is supplied to the grease tank and the mechanical fixed-displacement piston pump 1019 via separate systems. That is, two solenoid valves are provided such that the air is supplied to the grease tank 1014 via the solenoid valve 1012 and in addition the air is supplied to the mechanical fixed-displacement piston pump 1019 via a solenoid valve 1029.

Respective operations in this case are set in such a way that the solenoid valve 1012 for the grease tank is turned OFF (closed) within several seconds to several minutes after the solenoid valve 1029 for the mechanical fixed-displacement piston pump is turned OFF (closed). The similar advantages can be achieved by the grease supply system constructed in this manner. In such case, the resistor mechanism 1012a shown in FIG. 56 is not needed.

Figure 61:
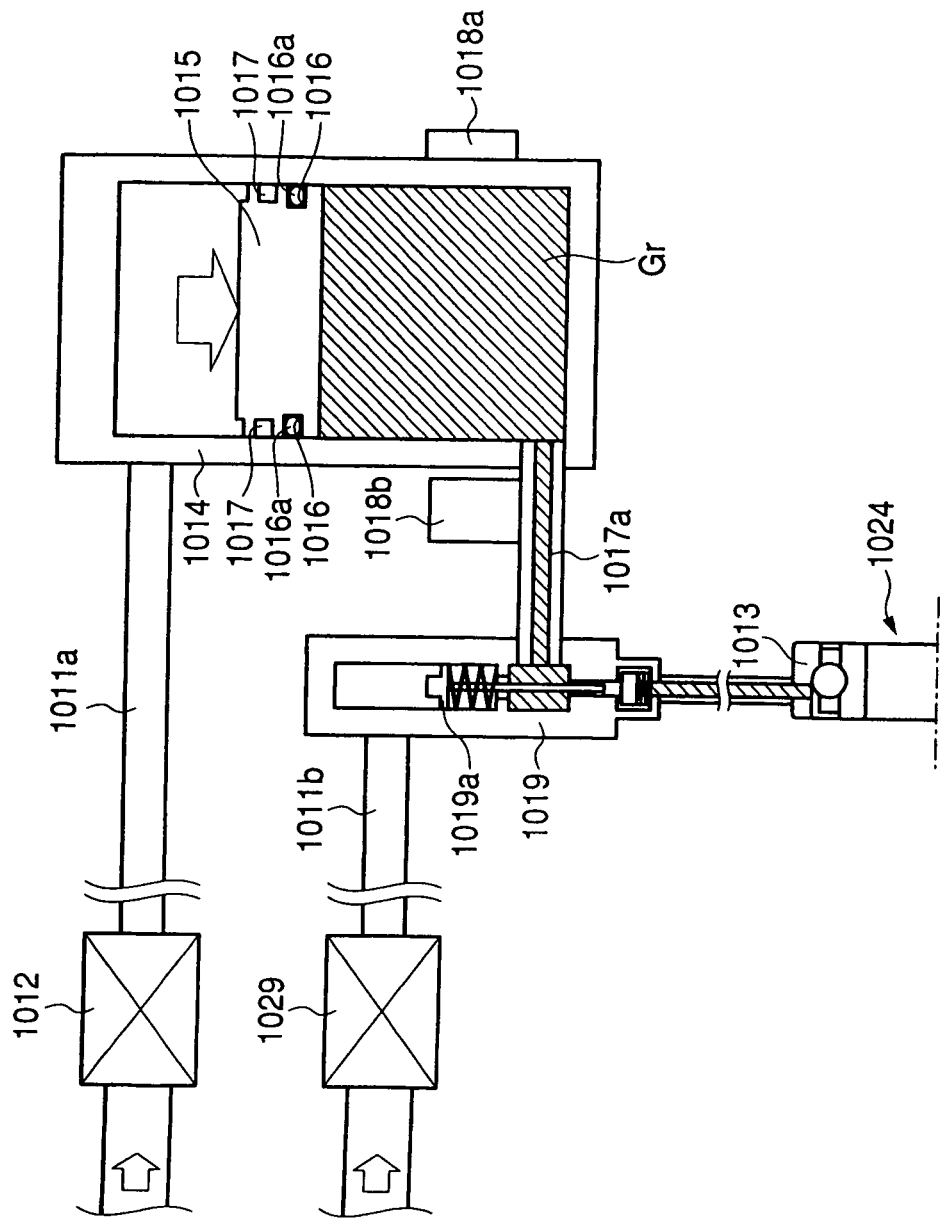
FIG. 61 is a configurative view of a grease supply system according to a thirty-fifth embodiment of the present invention.
Figure 62:
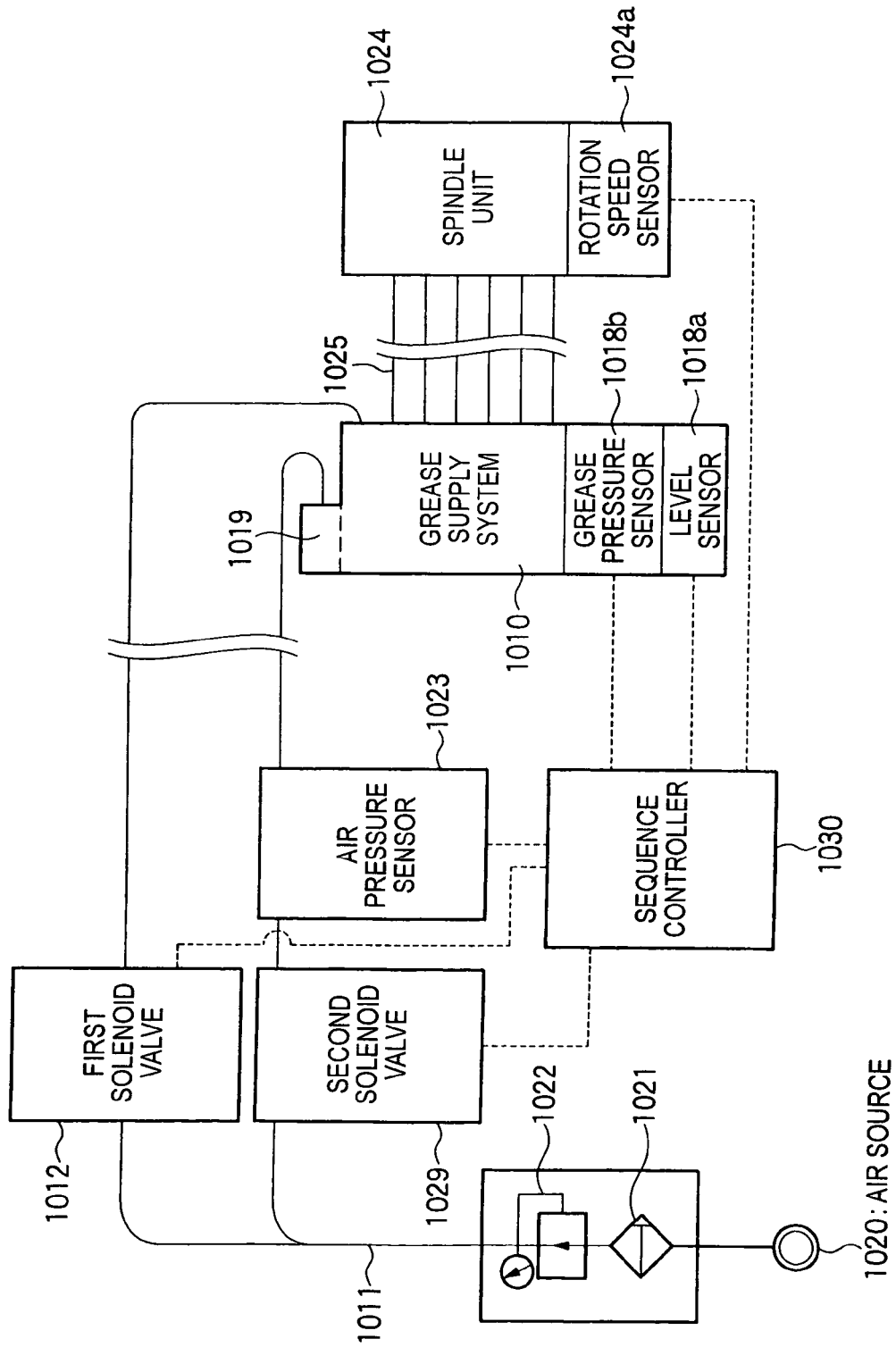
FIG. 62 is a circuit diagram of the grease supply system of the present invention in FIG. 61.

FIG. 62 is a circuit diagram of the grease supply system shown in FIG. 61. As shown in FIG. 61 and FIG. 62, the air piping is connected from the air source 1020 to the solenoid valves 1012, 1029 via the air filter 1021 and the regulator 1022. The air piping from the second solenoid valve 1029 is extended to the air pressure sensor (air monitor) 1023 and then connected to the mechanical fixed-displacement piston pump 1019 in the grease supply system 1010. In contrast, the air piping from the first solenoid valve 1012 is connected to the grease tank 1014.

FIG. 63 is a view showing a control method of the grease supply system shown in FIG. 62. As shown in FIG. 61 to FIG. 63, the second solenoid valve 1029 is turned ON and then the piston 1019*a* of the mechanical fixed-displacement piston pump 1019 is operated to discharge the grease. Then, the first solenoid valve 1012 is turned ON and then the pressure is applied to the piston 1015 in the grease tank 1014.

Then, the second solenoid valve 1029 is turned OFF. The piston 1019*a* of the mechanical fixed-displacement piston pump 1019 is returned to its home position simultaneously with the turning OFF, and the grease is filled from the grease tank 1014 to the mechanical fixed-displacement piston pump 1019. Then, the first solenoid valve 1012 is turned OFF after the grease is filled into the mechanical fixed-displacement piston pump 1019.

Thirty-Sixth Embodiment

Figure 64:
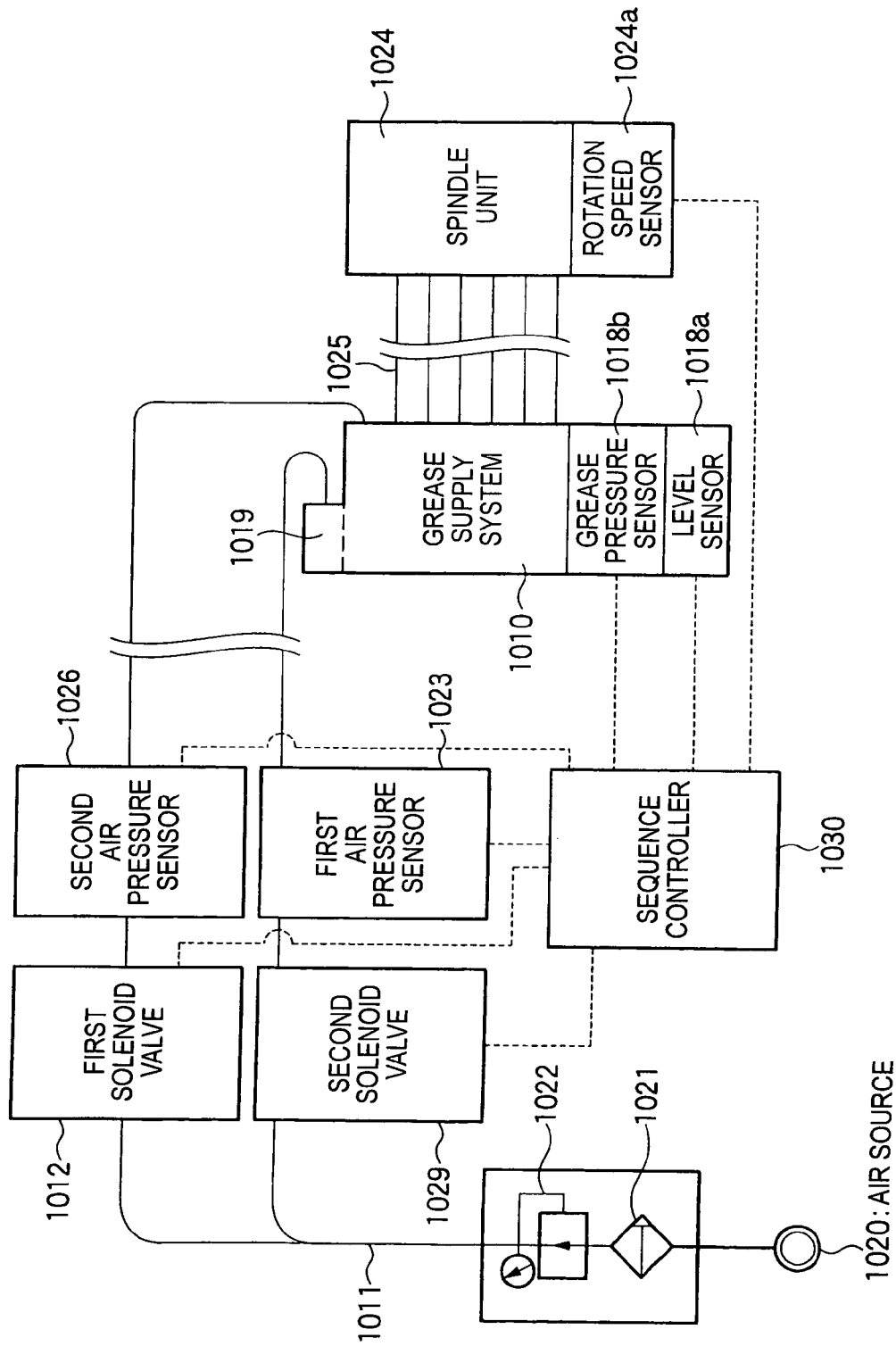
FIG. 64 is a circuit diagram showing a grease supply system according to a thirty-sixth embodiment of the present invention.

FIGS. 64 and 65 show a circuit diagram and a control method of the grease supply system according to a thirty-sixth embodiment of the present invention. In the present embodiment, a second air pressure sensor (air monitoring) 1026 is connected to the piping via the solenoid valve 1012. Other configurations are similar to those in the grease supply system according to the thirty-fifth embodiment. The similar advantages can be achieved by the grease supply system constructed in this fashion.

In this case, the above configurations are given as mere illustrations, and various variations and modifications can be applied. For example, in the thirty-fourth and thirty-fifth embodiments, the magnet is used in the piston 1015 in the grease tank 1014. But the level sensor 1018*a* may be used to respond an electric signal if any sensor for emitting the electric signal, or the like, which can be caught by the sensor, is employed. Also, either a sensor that can respond mechanically to a motion of the piston 1015 or a sensor that can respond electrically to the motion of the piston 1015 may be used as the level sensor 1018*a*.

Also, an example in which the level sensor 1018*a* for sensing a motion of the piston 1015 in the grease tank is provided outside the grease tank is explained. But such level sensor may be provided inside the grease tank. In the thirty-fourth and thirty-fifth embodiments, a mode in which the magnet 1017 is fitted onto the piston 1015 in the grease tank 1014 and the level sensor 1018*a* is fitted onto the grease tank 1014 is explained. But the level sensor 1018*a* may be fitted onto the piston 1015 and any substance that can respond to the magnet 1017 or the level sensor 1018*a* may be fitted onto the grease tank 1014.

Also, even if the level sensor 1018*a* that monitors the pressurized condition of the grease is set to any location of the grease tank 1014 in which the grease is reserved and along which the grease tank piston 1015 is not slid, the same measuring effect can be achieved by such level sensor. Also, if the sensor that is able to respond mechanically or electrically to change in the grease pressure is used, the same effect can be achieved. Also, the air is used to apply the pressure the piston 1015 in the grease tank 1014, but the pressure may be applied to the piston 1015 in the grease tank 1014 by using a motor, a mechanical equipment, or the like.

As described above, according to the grease supply system and the spindle unit in the thirty-fourth to thirty-sixth embodiments, since the sensor is fitted to the grease tank that reserves the grease of the grease supply system, neither the lubrication failure is caused in the bearing nor the seizure of the bearing is generated. Therefore, the enhanced lifetime of the bearing can be attained.

According to the above embodiments, the level sensor fitted to the grease tank that reserves the grease of the grease supply system and the magnet is embedded into the piston that applies the pressure to the grease in the grease tank. Since the position of the piston is monitored by fitting the level sensor to the grease tank, the alarm is generated when a residual amount of grease runs short, and those around one are informed of the fact that a residual amount of grease is decreased small. As a result, neither the lubrication failure is caused in the bearing nor the seizure of the bearing is generated.

Also, according to the above embodiments, the pressurized condition of the grease is monitored by providing the pressure sensor to the grease piping that connects the grease tank and the mechanical fixed-displacement piston pump. This monitoring is executed to check whether or not the grease is being fed to the mechanical fixed-displacement piston pump. If the pressure is not applied to the grease in the grease piping, the pressure sensor senses this situation to generate the alarm. Thus, the fact that the pressure is not generated in the piping and the mechanical fixed-displacement piston pump is not filled with the grease is informed of those around one. Therefore, neither the lubrication failure is caused in the bearing nor the seizure of the bearing is generated.

Grease supply systems (grease supply mechanisms) in thirty-seventh to forty-third embodiments of the present invention will be explained in detail with reference to FIG. 67 to FIG. 76 hereunder. In this case, in the thirty-eight to forty-third embodiments, the same or like symbols are affixed to the members, and the like that have the similar configuration/operation to those explained in the thirty-seventh embodiment, and therefore their explanation will be simplified or omitted herein.

Thirty-Seventh Embodiment

Figure 67:
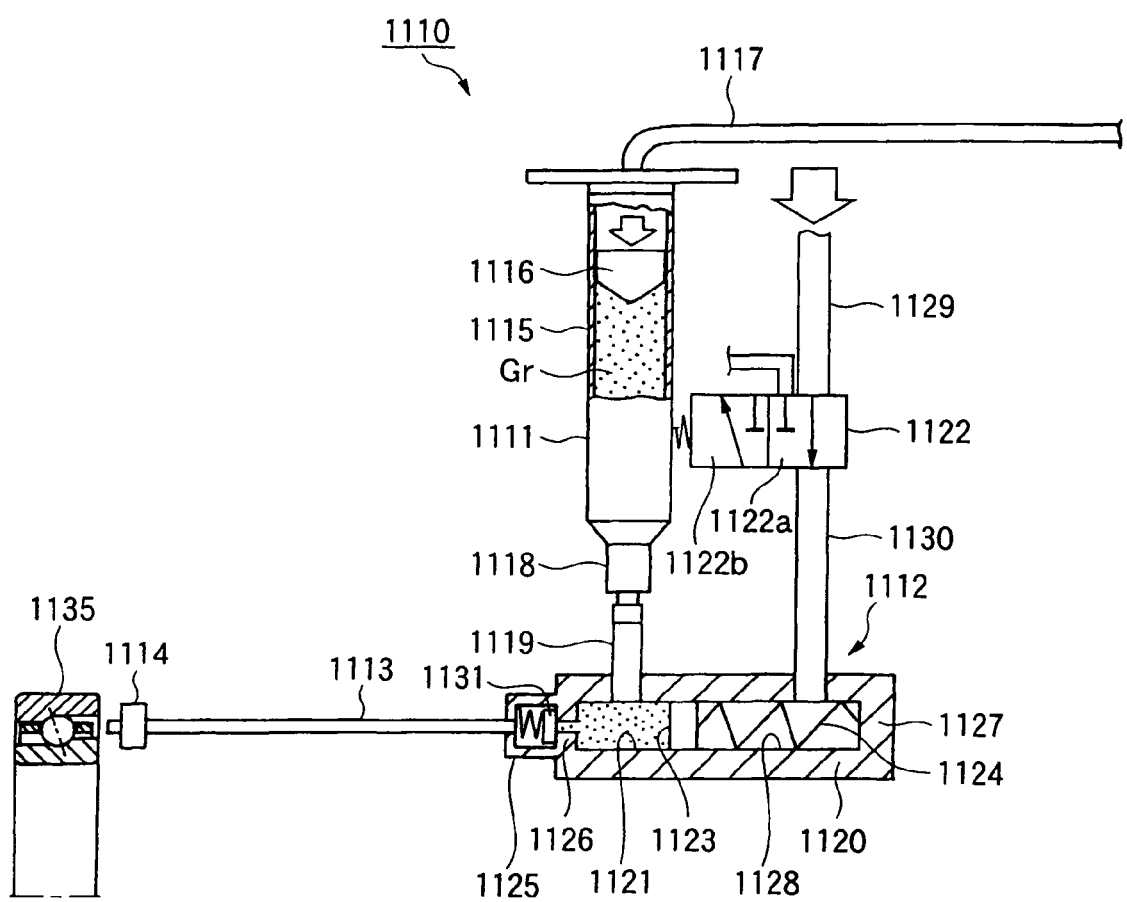
FIG. 67 is a sectional view showing a thirty-seventh embodiment of a grease supply system of the present invention.

As shown in FIG. 67, a grease supply system (grease supply mechanism) 1110 in the thirty-seventh embodiment is composed of a grease tank 1111, a grease fixed-displacement discharge mechanism 1112 serving as the mechanical fixed-displacement piston pump, a grease supply piping 1113, and a nozzle 1114, and is applied to the bearing unit or the spindle unit for the machine tool or the high speed motor.

In the grease tank 1111, its base end portion of is connected to and communicated with a pressure introducing piping 1117 and also a discharge port 1118 is provided to its top end portion, and a tank piston 1116 is installed into a cylindrical tank main body 1115. Also, the grease Gr is sealed in a space of the grease tank 1111 between the tank piston 1116 and the discharge port 1118. A predetermined pressure is applied to the grease tank 1111 from the pressure introducing piping 1117 constantly or for several second to several minutes when a fixed-displacement discharge piston 1123 is returned.

The discharge port 1118 is connected to and communicated with a fixed-delivery grease chamber 1121 in a cylinder 1120 provided to the grease fixed-displacement discharge mechanism 1112 via a feed piping 1119.

The fixed-delivery grease chamber 1121 has the cylinder 1120, the fixed-displacement discharge piston 1123, a return spring 1124, and a check valve 1125.

The cylinder 1120 is shaped into a cylindrical shape with a bottom, and a discharge portion 1126 is formed on its top end portion. Also, a portion of the cylinder 1120 on the discharge portion 1126 side is formed as the fixed-delivery grease chamber 1121, and another portion on the bottom plate 1127 side opposite to the discharge portion 1126 side is formed as an air chamber 1128. The grease Gr is supplied to the fixed-delivery grease chamber 1121 from the grease tank 1111.

An air valve 1122 is an air valve having a depressurizing function and has an air supply valve 1122*a* and a depressurize valve 1122*b* in the inside. One end of the air valve 1122 is connected to and communicated with a compressed air generation source (not shown) via an air introducing piping 1129, and the other end portion is connected to and communicated with the air chamber 1128 via an air feed piping 1130.

Also, when a predetermined current is supplied to the air valve 1122 from the external control circuit, the air supply valve 1122*a* is opened and the depressurize valve 1122*b* is closed, whereby the pressurized compressed air is introduced into the air chamber 1128 in the cylinder 1120. When the predetermined current is broken, the air supply valve 1122*a* is closed and the depressurize valve 1122*b* is opened, whereby the air is escaped via the depressurize valve 1122*b* and the air chamber 1128 and the air feed piping 1130 are released from the pressurized state.

In this case, the depressurize valve 1122*b* is not always incorporated into the air valve 1122 but the depressurize valve may be arranged in the air chamber 1128 or the air feed piping 1130.

The fixed-displacement discharge piston 1123 is arranged between the fixed-delivery grease chamber 1121 and the air chamber 1128 to move reciprocally in the cylinder 1120 along the cylinder direction. The fixed-displacement discharge piston 1123 is incorporated into the cylinder 1120 via the return spring 1124 an end portion of which is latched onto the bottom plate 1127 of the cylinder 1120. A discharge quantity of the fixed-displacement discharge piston 1123 is set to 0.003 to 0.12 cc.

The return spring 1124 is fitted to the fixed-displacement discharge piston 1123 at a natural length. The return spring 1124 is expanded when the fixed-displacement discharge piston 1123 moves forward, and then the return spring 1124 is returned to its natural length to cause the fixed-displacement discharge piston 1123 to move backward after the forward movement of the fixed-displacement discharge piston 1123 is ended.

The check valve 1125 is connected to and communicated with the discharge portion 1126 of the cylinder 1120. When the grease Gr that is filled in the fixed-delivery grease chamber 1121 by the forward movement of the fixed-displacement discharge piston 1123 in the cylinder 1120 is pressure-fed, a valve element 1131 of the check valve 1125 releases the discharge portion 1126. The check valve 1125 is connected to and communicated with one end portion of the grease supply piping 1113.

The other end portion of the grease supply piping 1113 is communicated with the nozzle 1114. The nozzle 1114 is positioned on the side of a bearing unit 1135 constituting the spindle unit having the ball bearing, the cylindrical roller bearing, etc.

Figure 68:
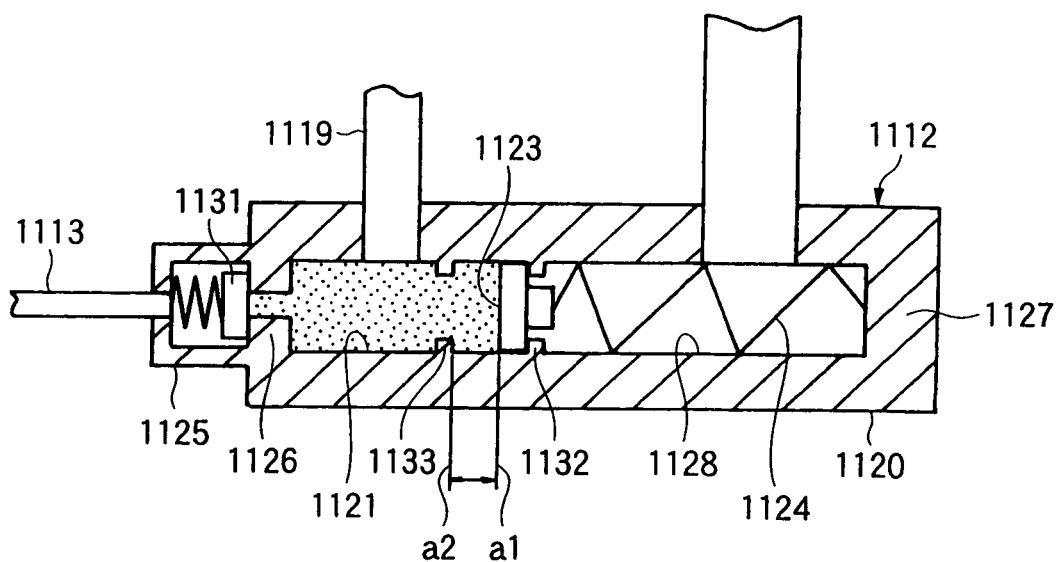
FIG. 68 is a sectional view of a pertinent portion of the grease supply system in FIG. 67.

As shown in FIG. 68, two piston stoppers 1132, 1133 are formed at a predetermined distance on an inner wall of the cylinder 1120. Out of two piston stoppers 1132, 1133, one piston stopper 1132 arranged on the bottom plate 1127 side has a function of setting a rear end position a1 when the fixed-displacement discharge piston 1123 moves backward in a returning motion by the return spring 1124 after the compressed air is released from the air chamber 1128.

The other piston stopper 1133 arranged on the discharge portion 1126 side has a function of setting a front end position a2 when the fixed-displacement discharge piston 1123 moves forward in a going motion after the compressed air is introduced into the air chamber 1128.

Figure 69:
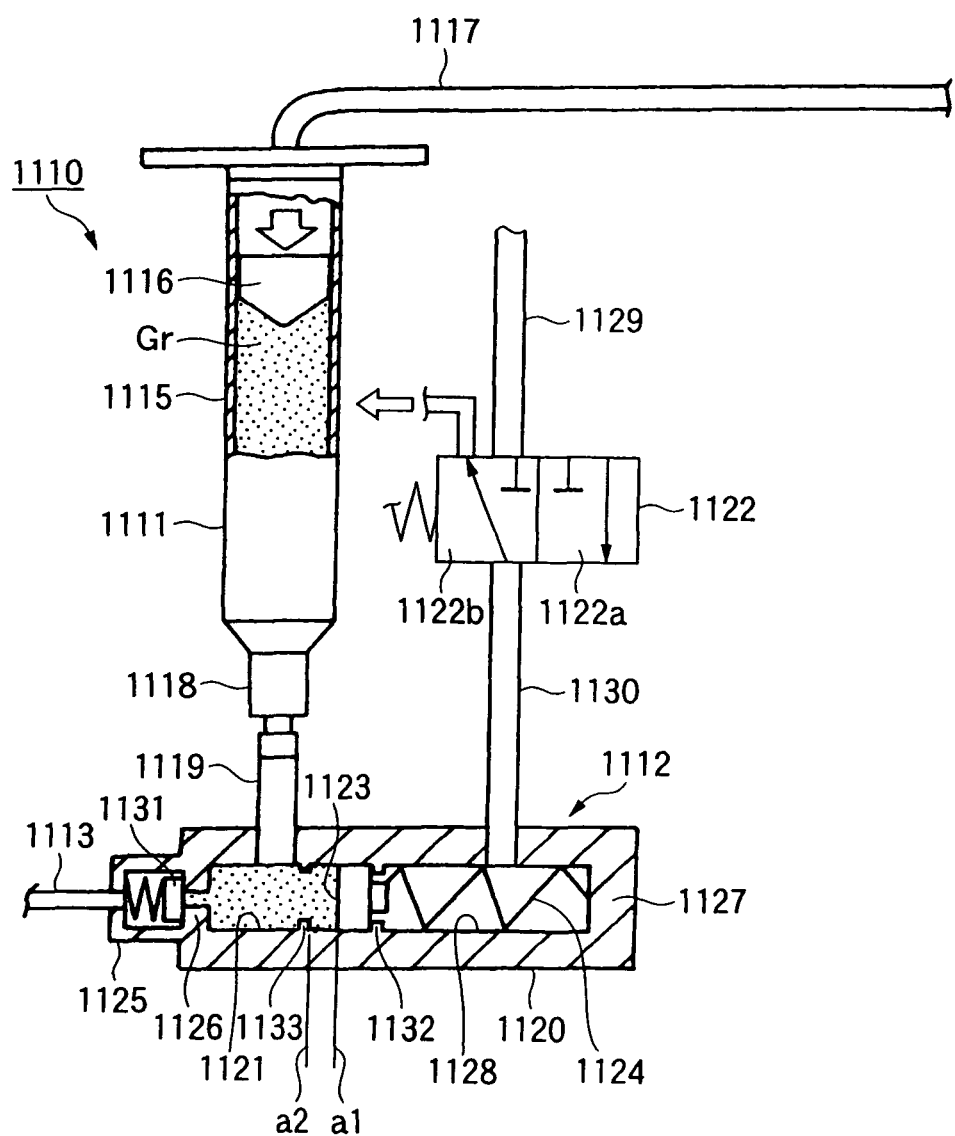
FIG. 69 is a sectional view explaining a state of the grease supply system in FIG. 67 before the discharge of grease.

Then, an operation of the grease supply system (grease supply mechanism) in the thirty-seventh embodiment will be explained with reference to FIG. 69 and FIG. 70 hereunder. As shown in FIG. 69, since the air valve 1122 is closed in the state before the grease is discharged, the fixed-displacement discharge piston 1123 is positioned at the rear end position a1 and the valve element 1131 of the check valve 1125 blocks the discharge portion 1126.

Figure 70:
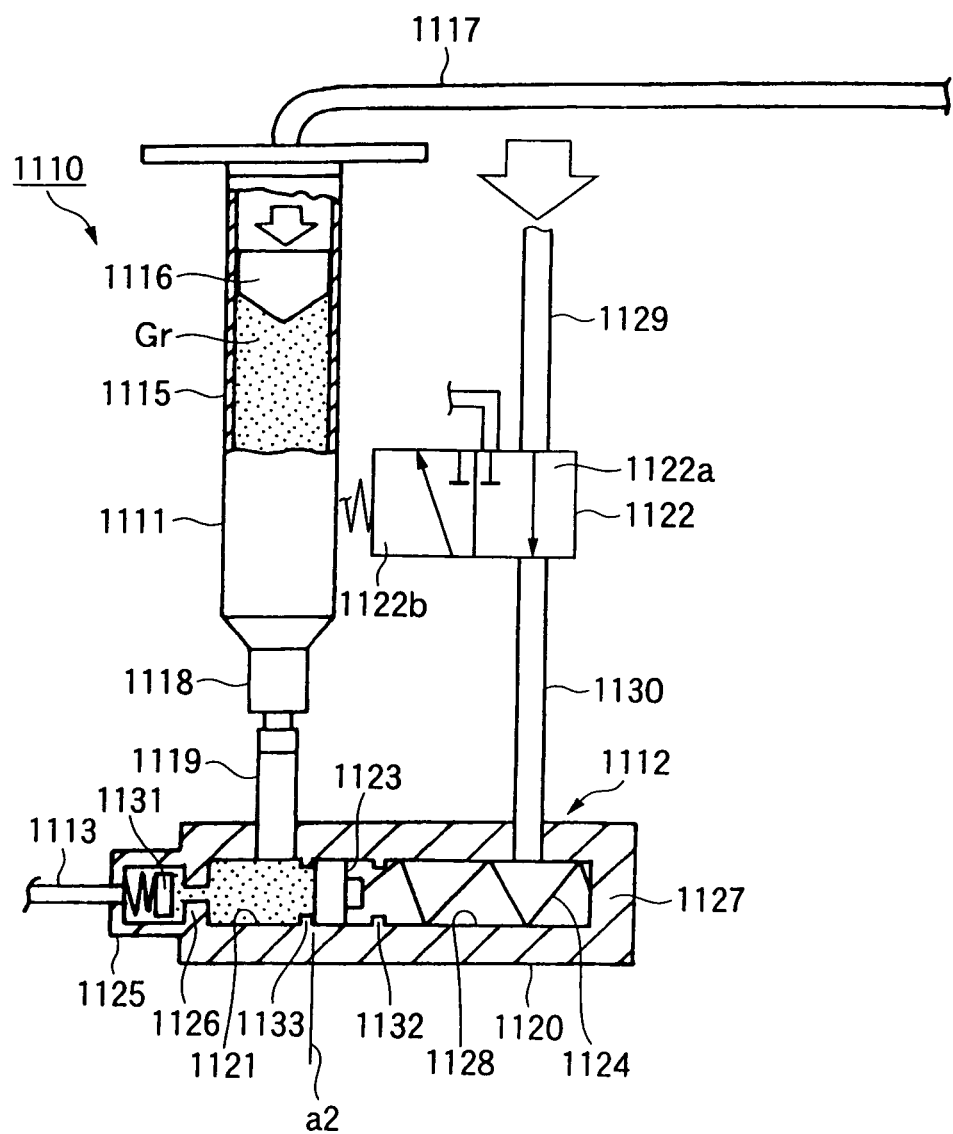
FIG. 70 is a sectional view explaining a state of the grease supply system in FIG. 67 in the course of the discharge of grease.

As shown FIG. 70, the air valve 1122 is opened by the current supply. Then, the compressed air is introduced into the air chamber 1128, then the fixed-displacement discharge piston 1123 moves forward from the rear end position a1 to the front end position a2, and then the grease Gr reserved in the fixed-delivery grease chamber 1121 is fed to the check valve 1125 in a predetermined quantity.

Therefore, the valve element 1131 of the check valve 1125 releases the check valve 1125, then the grease Gr is discharged from the nozzle 1114 via the grease supply piping 1113, and then the grease Gr is supplied into the bearing space of the bearing unit 1135 in a predetermined quantity. When the discharge of the grease is finished, the valve element 1131 of the check valve 1125 blocks the discharge portion 1126 once again. The air valve 1122 is opened and then is closed again by breaking the current supply.

Then, the air valve 1122 is closed to release the compressed air. Thus, the pressure in the fixed-delivery grease chamber 1121 and the air chamber 1128 is reduced, and then the fixed-displacement discharge piston 1123 moves backward from the front end position a2 to the rear end position a1. At that time, the grease Gr in the grease tank 1111 is fed into the fixed-delivery grease chamber 1121 in the cylinder 1120 by the predetermined pressure applied from the pressure introducing piping 1117. Thus, the grease is restored into the state shown in FIG. 69. Subsequently, the above operations are repeated.

As described above, in the grease supply system 1110 in the thirty-seventh embodiment, only the grease Gr reserved once in the fixed-delivery grease chamber 1121 is fed to the nozzle 1114 via the grease supply piping 1113 in a predetermined quantity irrespective of the current supply time of the air valve 1122. Then, the pressure in the fixed-delivery grease chamber 1121 is lowered once by breaking the current supply to the air valve 1122 and then releasing the pressure in the air chamber 1128 and the air feed piping 1130 via the depressurize valve 1122*b*. Then, the operation of feeding the new grease Gr to the fixed-delivery grease chamber 1121 is executed repeatedly.

As a result, since the grease Gr in the grease supply piping 1113 is not always subjected to the pressure, the component separation of the grease can be prevented and also the grease Gr can be always supplied to the bearing space in a minute and predetermined quantity.

According to the grease supply system 1110 in the thirty-seventh embodiment, the grease Gr fed from the grease tank 1111 is reserved in the fixed-delivery grease chamber 1121 of the cylinder 1120 by a predetermined quantity. Then, the grease Gr reserved in the fixed-delivery grease chamber 1121 in a predetermined quantity is discharged into the grease supply piping 1113 by the fixed-displacement discharge piston 1123 via the check valve 1125.

Thus, the grease Gr is always supplied to the grease supply piping 1113 in a predetermined quantity. Therefore, variation in a discharge quantity of the grease that is caused depending on the conditions such as an inner diameter and a length of the piping, a shape of the nozzle, a temperature, etc. can be eliminated and thus the stable discharge of the grease Gr can be executed.

Also, the situation that a residual pressure is applied to the grease Gr contained in the piping, which is extended from the portion at which the pressure is applied to the grease Gr to the bearing unit 1135, for a long time can be reduced. Therefore, generation of the component separation of the grease Gr can be reduced, such a possibility can be reduced that the grease Gr having different consistencies exists in the piping, and the grease Gr can be discharged in a constant quantity.

As a result, a quantitative supply to discharge the grease intermittently in a minute and predetermined quantity can be executed without the influence of the piping. Therefore, the enhanced lifetime of the grease lubrication and improvement of the liability can be achieved by supplying the grease periodically to the inside of the bearing in a minute and predetermined quantity.

Also, according to the grease supply system 1110 in the thirty-seventh embodiment, the fixed-displacement discharge piston 1123 of the grease fixed-displacement discharge mechanism 1112 is arranged to move back and forth in the cylinder 1120. Therefore, when the fixed-displacement discharge piston 1123 moved forward, the grease Gr in the fixed-delivery grease chamber 1121 can be discharged by using the forward motion of the fixed-displacement discharge piston 1123. When the discharge is completed, the check valve 1125 is closed. Then, since the new grease Gr is supplied from the grease tank 1111 when the fixed-displacement discharge piston 1123 moves backward, generation of the residual pressure in the piping can be reduced.

In addition, according to the grease supply system 1110 in the thirty-seventh embodiment, since the fixed-displacement discharge piston 1123 is operated by the air that is supplied into the cylinder 1120 via the air valve 1122, the grease fixed-displacement discharge mechanism 1112 can be constructed without the complicated mechanism. Also, since the air is used as the medium, the pressurizing mechanism can be simplified and also the measure against the leakage, and the like can be taken fairly simply rather than the case where the oil and fat, or the like is employed.

Also, according to the grease supply system 1110 in the thirty-seventh embodiment, the grease Gr set in a range of 0.004 to 0.1 cc can be discharged into the grease supply piping 1113 by the fixed-displacement discharge piston 1123. Therefore, a fine control of a discharge quantity can be applied.

Also, according to the grease supply system 1110 in the thirty-seventh embodiment, when such system is applied to the bearing unit, the prolonged lifetime of the bearing unit and improvement of the liability can be achieved by executing the stable grease supply.

Also, according to the grease supply system 1110 in the thirty-seventh embodiment, when such system is applied to the spindle unit for the machine tool or the high speed motor, the prolonged lifetime of the spindle unit for the machine tool or the high speed motor and improvement of the liability can be achieved by executing the stable grease supply.

Thirty-Eighth Embodiment

Next, a thirty-eighth embodiment according to the present invention will be explained with reference to FIG. 71 hereunder.

Figure 71:
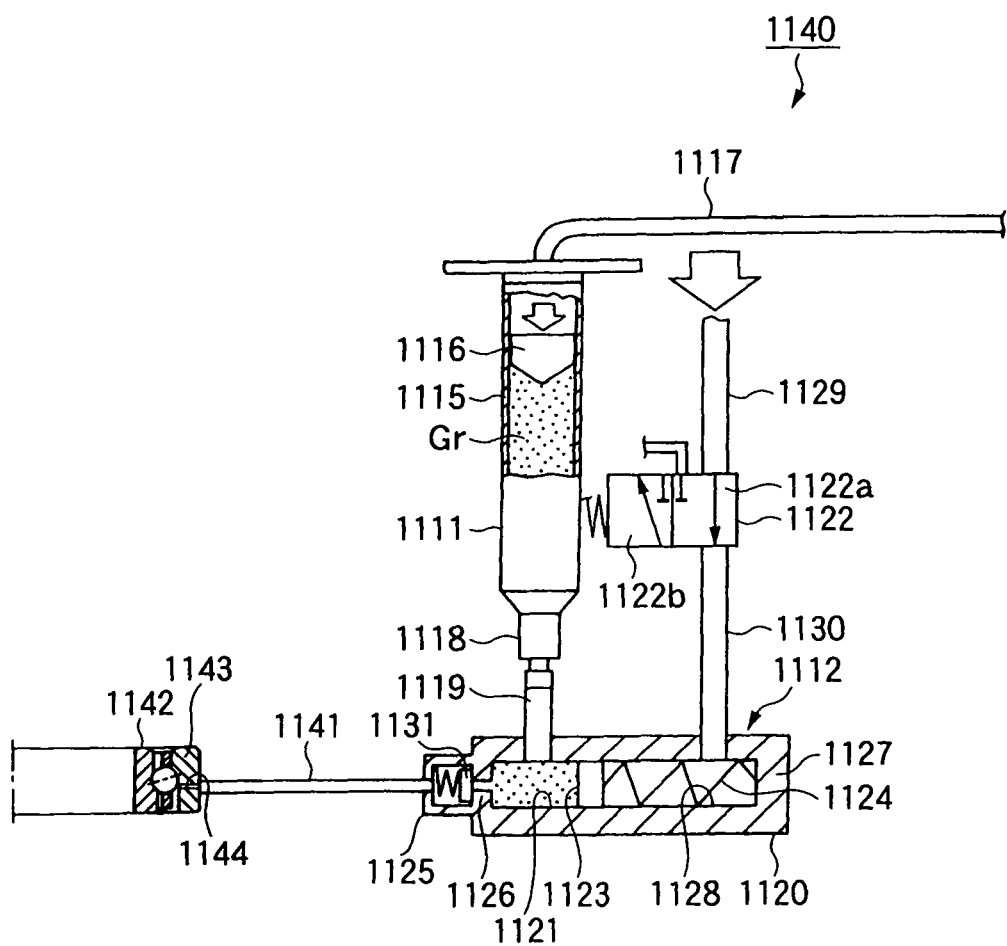
FIG. 71 is a sectional view showing a thirty-eighth embodiment of a grease supply system of the present invention.
Figure 72:
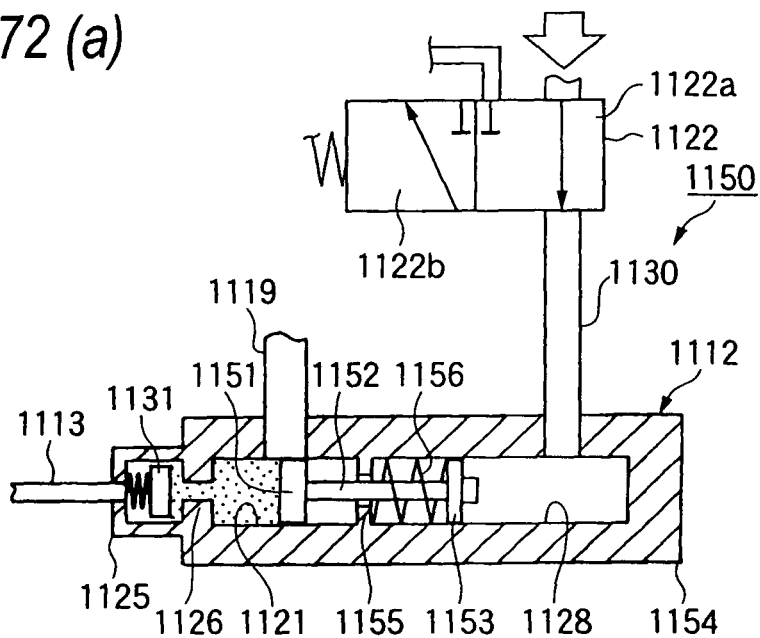
FIG. 72(a) is a sectional view explaining a state of a pertinent portion of a thirty-ninth embodiment of a grease supply system of the present invention in the course of the discharge of grease.
FIG. 72(b) is a sectional view explaining a state of the system in FIG. 72(a) before the discharge of grease.
Figure 72:
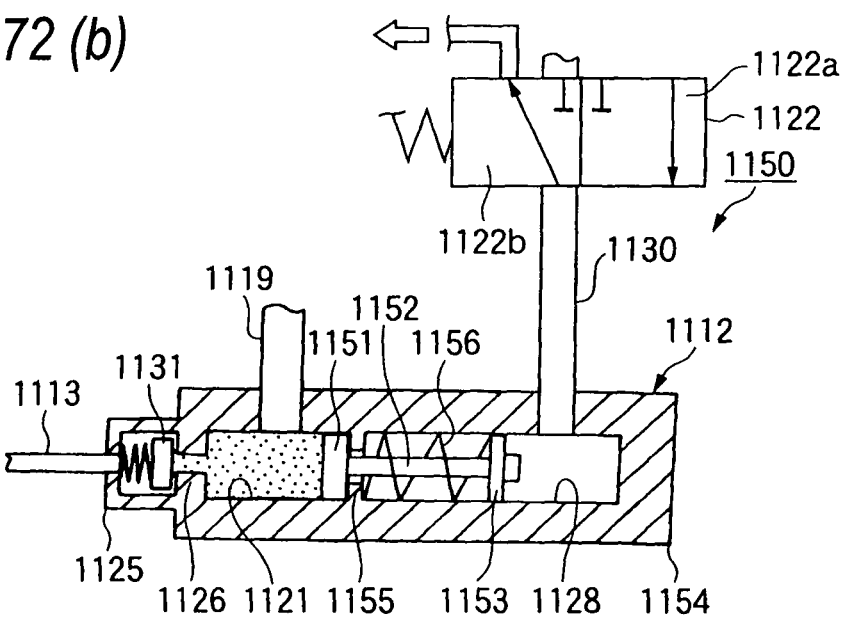
Figure 73:
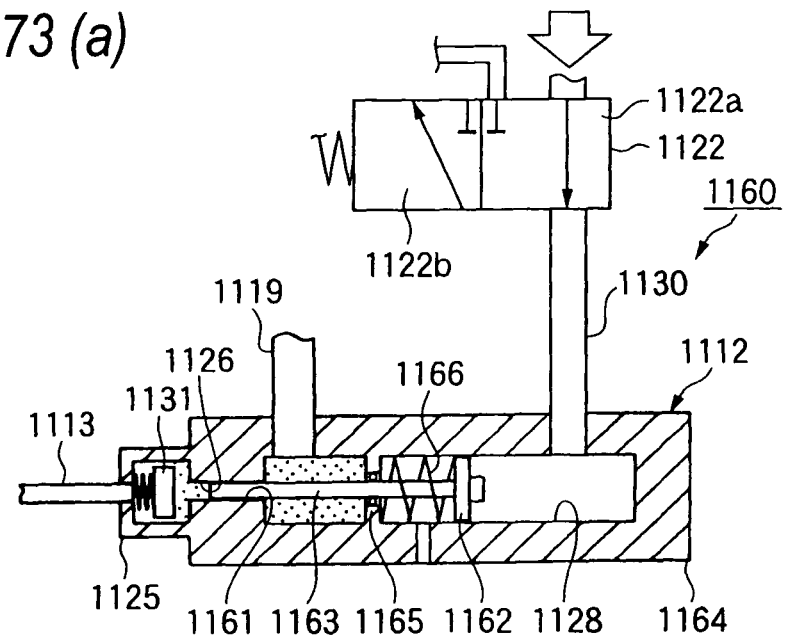
FIG. 73(a) is a sectional view explaining a state of a pertinent portion of a fortieth embodiment of a grease supply system of the present invention in the course of the discharge of grease.
FIG. 73(b) is a sectional view explaining a state of the system in FIG. 73(a) before the discharge of grease.
Figure 73:
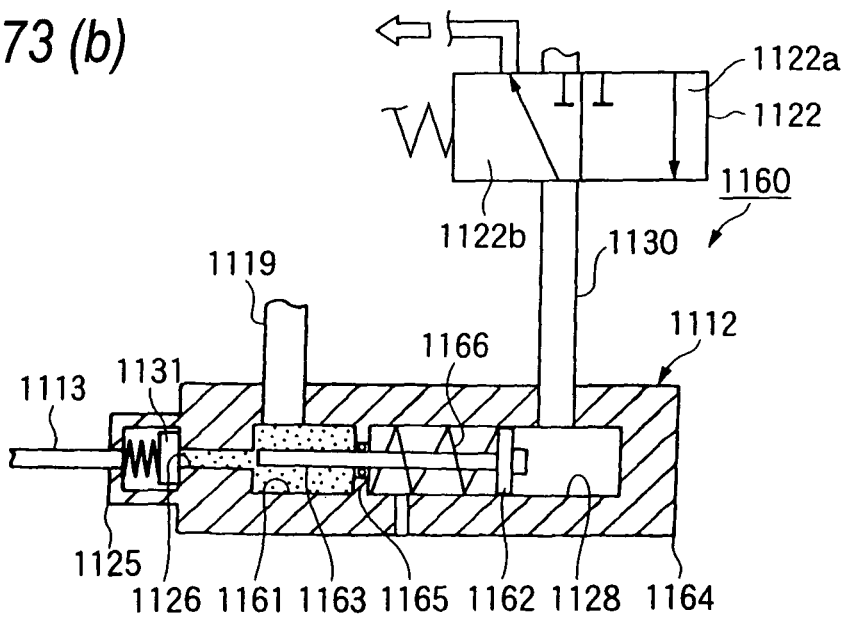

As shown in FIG. 71, a grease supply system (grease supply mechanism) 1140 according to the thirty-eighth embodiment has the similar configuration to the grease supply system 1110 shown in FIG. 67. However, a top end portion of a grease supply piping 1141 is connected to and communicated with a grease supply hole 1144 that is formed in the radial direction of an outer ring 1143 in a bearing unit 1142 constituting the spindle unit having the ball bearing, the cylindrical roller bearing, etc. The grease Gr is fed through the discharge port 1118, the grease supply piping 1141, and the grease supply hole 1144, and then is discharged into the bearing space of the bearing unit 1142 from the outer diameter portion of the outer ring through the grease supply hole 1144.

Thirty-Ninth Embodiment

Next, a thirty-ninth embodiment according to the present invention will be explained with reference to FIG. 72(a)(b) hereunder.

As shown in FIG. 72(a), a grease supply system (grease supply mechanism) 1150 according to the thirty-ninth embodiment is constructed such that a fixed-displacement discharge piston 1151 is coupled to a valve member 1153 via a rod 1152 and that a return spring 1156 is engaged with a piston stopper 1155, which is formed between the fixed-displacement discharge piston 1151 and the valve member 1153, and the valve member 1153 in a cylinder 1154.

In such grease supply system 1150, when the air supply valve 1122a in the air valve 1122 is opened and the depressurize valve 1122b is closed and then the compressed air is introduced into the air chamber 1128, the valve member 1153, the rod 1152, and the fixed-displacement discharge piston 1151 move forward up to the front end position against a spring force of the return spring 1156. Thus, a predetermined amount of grease Gr reserved in the fixed-delivery grease chamber 1121 is fed to the check valve 1125, then the valve element 1131 of the check valve 1125 releases the discharge portion 1126, and then the grease Gr is discharged via the grease supply piping 1113. When a stroke of the discharge piston 1153 is ended, the valve element 1131 of the check valve 1125 blocks the discharge portion 1126 again and the discharge of the grease is stopped.

Then, as shown in FIG. 72(b), when the air supply valve 1122a in the air valve 1122 is closed and the depressurize valve 1122b is opened and then the pressure in the air chamber 1128 and the air feed piping 1130 is released, the valve member 1153, the rod 1152, and the fixed-displacement discharge piston 1151 are moved backward up to the rear end position by the return spring 1156. Thus, the pressure in the fixed-delivery grease chamber 1121 and the air chamber 1128 is lowered. At this time, since a predetermined pressure is applied to the grease Gr in the grease tank from the pressure introducing pipe, such grease is fed into the fixed-delivery grease chamber 1121 in the cylinder 1154 and then reserved once therein.

Fortieth Embodiment

Next, a fortieth embodiment according to the present invention will be explained with reference to FIG. 73(a)(b) hereunder.

As shown in FIG. 73(a), a grease supply system (grease supply mechanism) 1160 according to a fortieth embodiment is employed when the system has a fixed-delivery grease chamber 1161 having a small capacity, and is constructed such that a rod 1163 having a function of the fixed-displacement discharge piston is coupled to a valve member 1162 and a return spring 1166 is engaged with an isolating plate 1165 formed in a cylinder 1164 and the valve member 1162.

In such grease supply system 1160, when the air supply valve 1122a in the air valve 1122 is opened and the depressurize valve 1122b is closed and then the compressed air is introduced into the air chamber 1128, the valve member 1162 and the rod 1163 move forward up to the front end position against a spring force of the return spring 1166. Thus, a predetermined amount of grease Gr reserved in the fixed-delivery grease chamber 1161 is fed to the check valve 1125, then the valve element 1131 of the check valve 1125 releases the discharge portion 1126, and then the grease Gr is discharged via the grease supply piping 1113. In this case, the grease Gr reserved in the fixed-delivery grease chamber 1161 is pressure-raised and then is discharged. When the discharge of the grease is stopped, the valve element 1131 of the check valve 1125 blocks the discharge portion 1126 once again.

Then, as shown in FIG. 73(b), when the air supply valve 1122a in the air valve 1122 is closed and the depressurize valve 1122b is opened, the pressure in the air chamber 1128 and the air feed piping 1130 is released. Thus, the valve member 1162 and the rod 1152 are moved backward up to the rear end position by the return spring 1166, and then the pressure in the fixed-delivery grease chamber 1161 and the air chamber 1128 is lowered.

Forty-First Embodiment

Next, a forty-first embodiment according to the present invention will be explained with reference to FIG. 74 hereunder.

Figure 74:
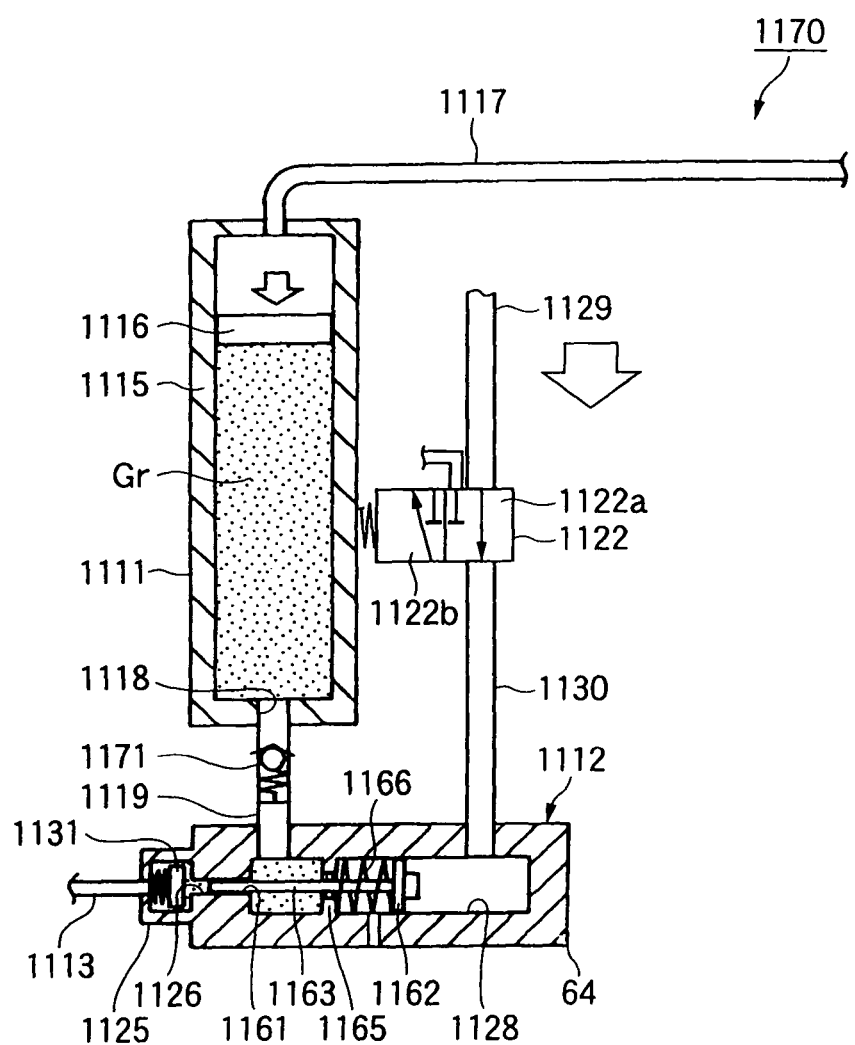
FIG. 74 is a sectional view showing a forty-first embodiment of a grease supply system of the present invention.

As shown in FIG. 74, a grease supply system (grease supply mechanism) 1170 according to the forty-first embodiment uses the grease fixed-displacement discharge mechanism 1112 shown in FIG. 73(a). A reverse-flow preventing mechanism 1171 is arranged in the feed piping 1119 that connects the grease tank 1111 and the fixed-delivery grease chamber 1161 in the cylinder 1164. The reverse-flow preventing mechanism 1171 has a function of preventing the grease, which is not discharged from the discharge portion 1126, from flowing reversely into the grease tank when the rod 1163 having a function of the fixed-displacement discharge piston is operated.

Forty-Second Embodiment

Next, a forty-second embodiment according to the present invention will be explained with reference to FIG. 75 hereunder.

Figure 75:
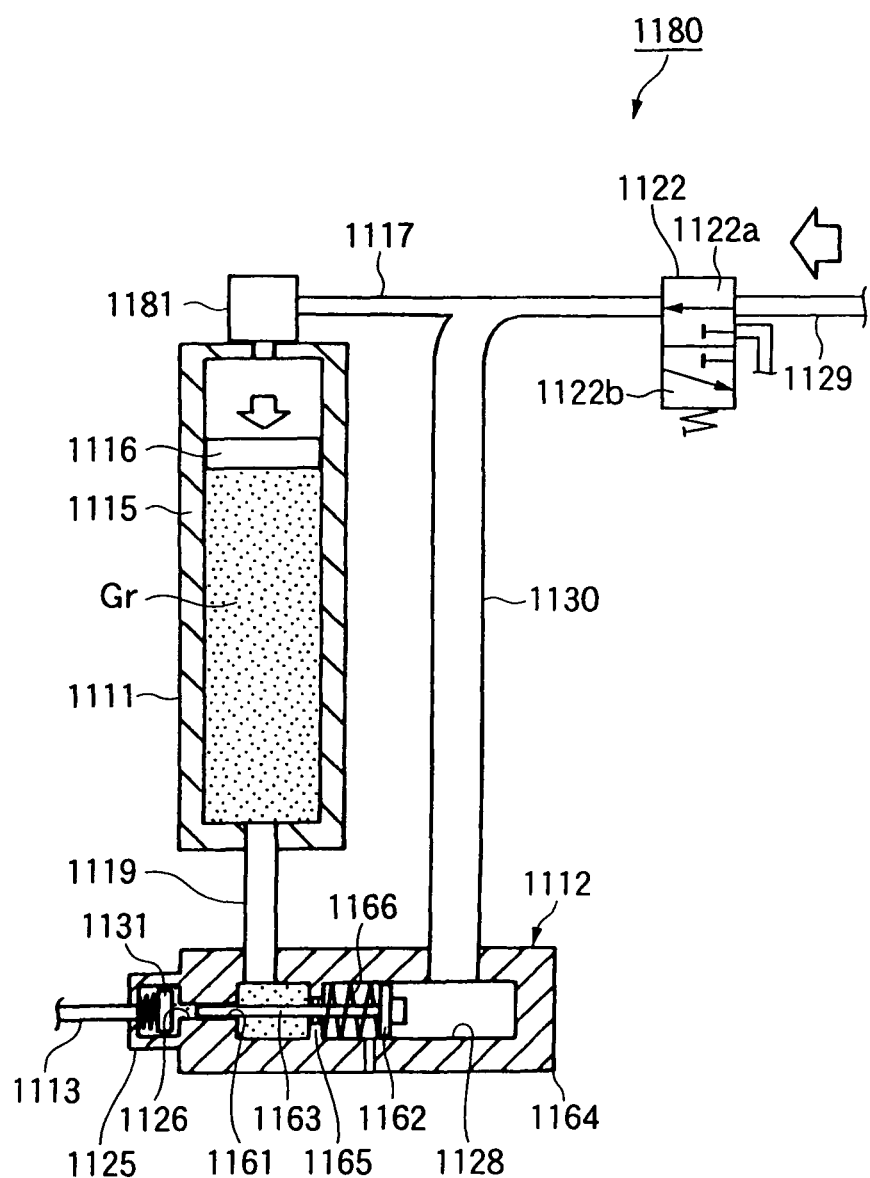
FIG. 75 is a sectional view showing a forty-second embodiment of a grease supply system of the present invention.

As shown in FIG. 75, a grease supply system (grease supply mechanism) 1180 according to the forty-second embodiment uses the grease fixed-displacement discharge mechanism 1112 shown in FIG. 73(a). A valve mechanism 1181 consisting of the check valve, the speed controller, the throttle valve, the resistance body made of sintered material, graphite, or the like is provided to the connection portion between the grease tank 1111 and the pressure introducing piping 1117, and then the pressure introducing piping 1117 and the air feed piping 1130 are connected collectively to and communicated with the air valve 1122.

In the grease supply system 1180 in the forty-second embodiment, when the air supply valve 1122a in the air valve 1122 is closed and the depressurize valve 1122b is opened, a force of pushing the piston 1116 in the grease tank 1111 is reduced in course of time and then no pressure is applied to the grease Gr after several minutes to several tens minutes. For this reason, change in properties and condition of the grease Gr can be suppressed.

Forty-Third Embodiment

Next, a forty-third embodiment according to the present invention will be explained with reference to FIG. 76 hereunder.

Figure 76:
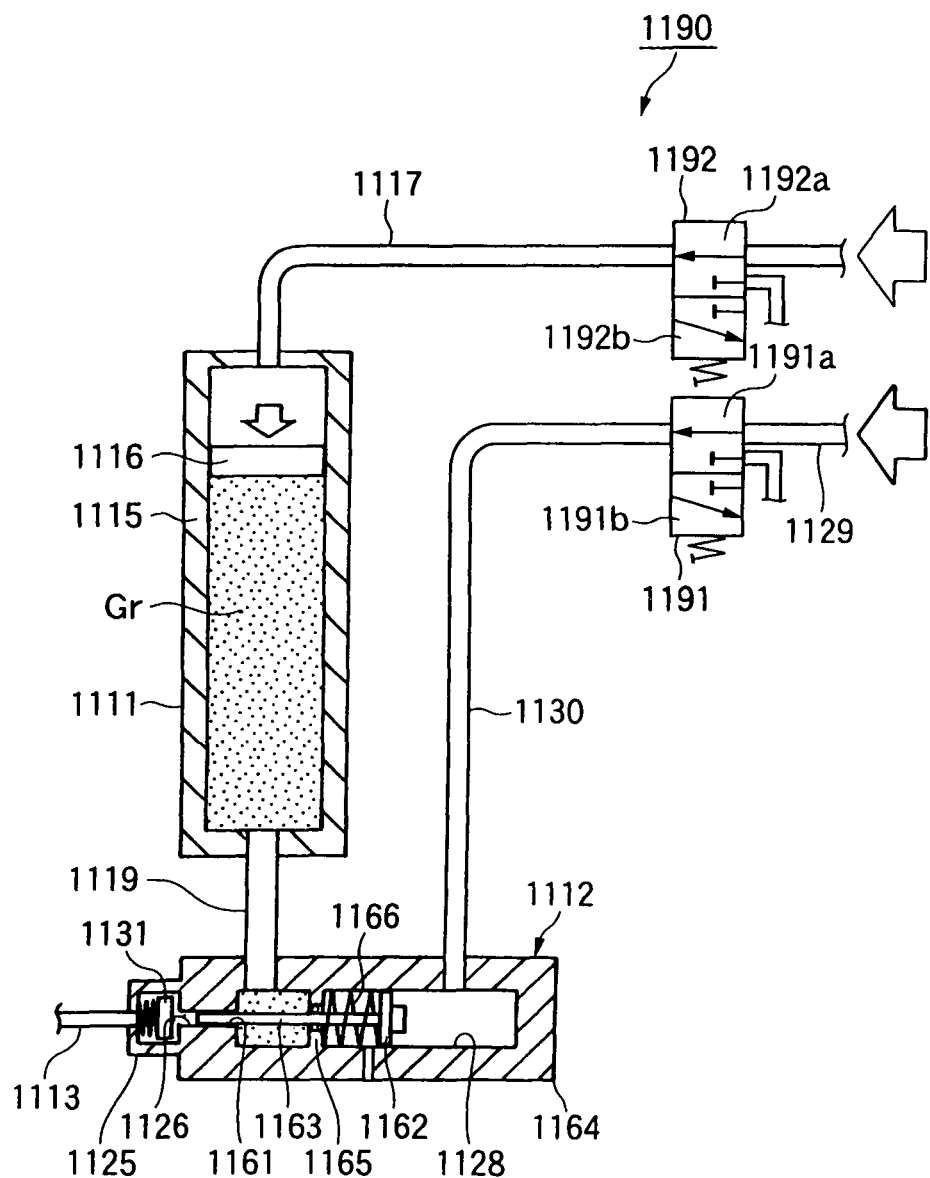
FIG. 76 is a sectional view showing a forty-third embodiment of a grease supply system of the present invention.

As shown in FIG. 76, a grease supply system (grease supply mechanism) 1190 according to the forty-third embodiment uses the grease fixed-displacement discharge mechanism 1112 shown in FIG. 73(a). An air valve 1191 with a depressurizing function is provided to the air feed piping 1130 that is connected to and communicated with the air chamber 1128 in the cylinder 1164, and an air valve 1192 is provided to the pressure introducing piping 1117 that is connected to and communicated with the grease tank 1111.

In the grease supply system 1190 in the forty-third embodiment, when an air supply valve 1191a of the air valve 1191 is opened, the air is introduced into the air chamber 1128 to discharge the grease Gr via the valve member 1162, and then the air valve 1191 is opened. When the air supply valve 1191a of the air valve 1191 is closed and a depressurize valve 1191b is opened, the pressure in the air feed piping 1130 is released and thus the valve member 1162 and the rod 1163 are restored to their home positions. At this time, the pressure is applied to the piston 116 in the grease tank 1111 and the grease Gr is filled in the fixed-delivery grease chamber 1161. Then, the air supply valve 1191a of the air valve 1191 is closed to release the pressure in the air feed piping 1130 and then the air valve 1192 is closed after several seconds to several minutes to release the pressure in the pressure introducing piping 1117.

Example 6

Examples of the grease supply system according to the present invention will be explained hereunder.

Figure 114:
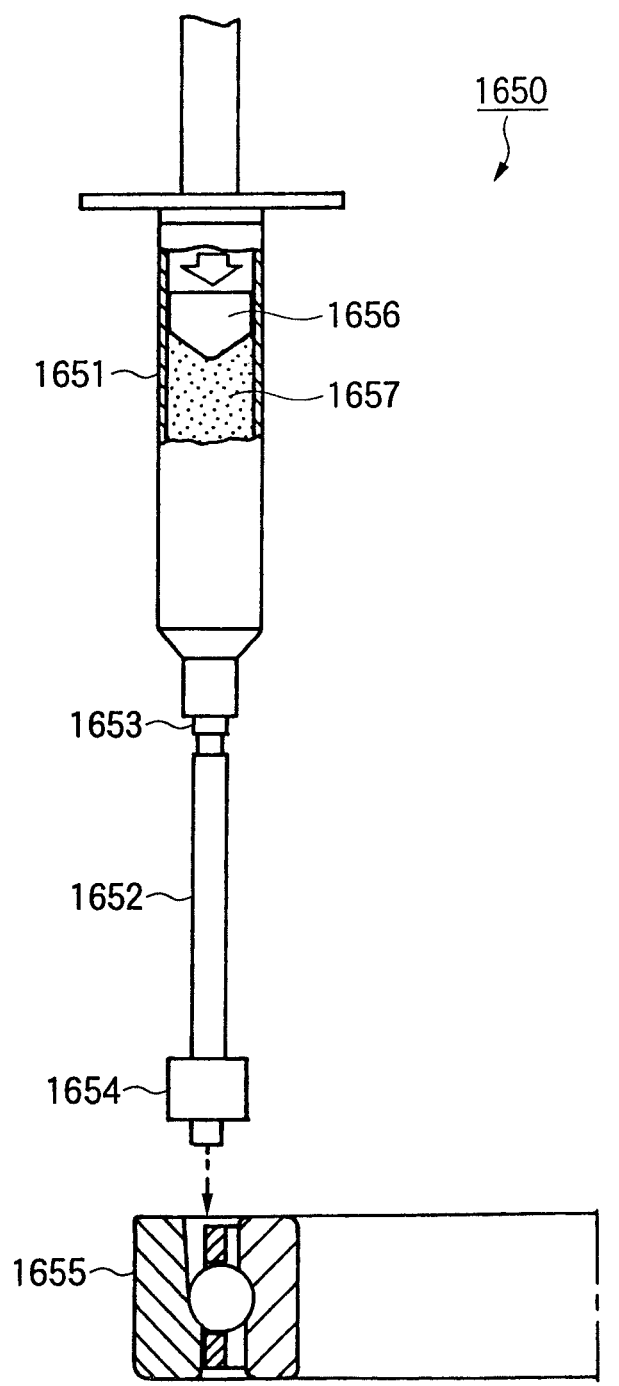
FIG. 114 is a sectional view showing another grease supply system in the prior art.
Figure 115:
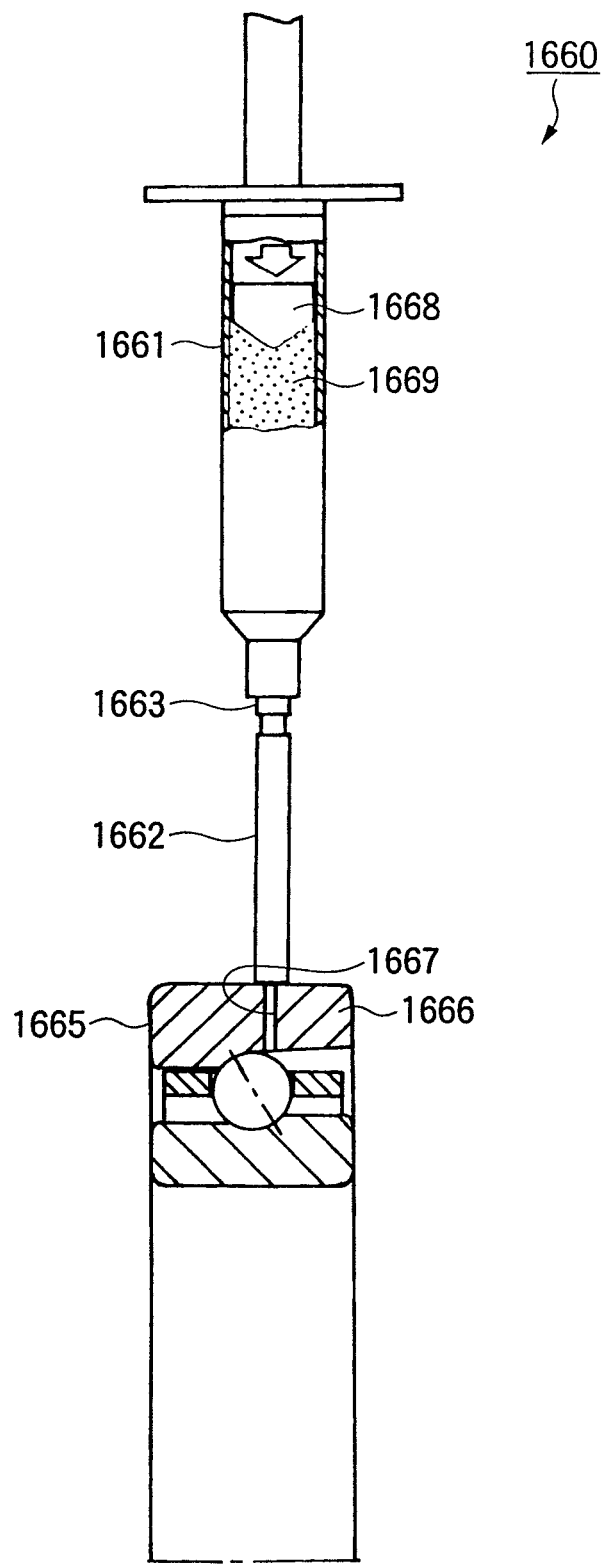
FIG. 115 is a sectional view showing still another grease supply system in the prior art.
Figure 116:
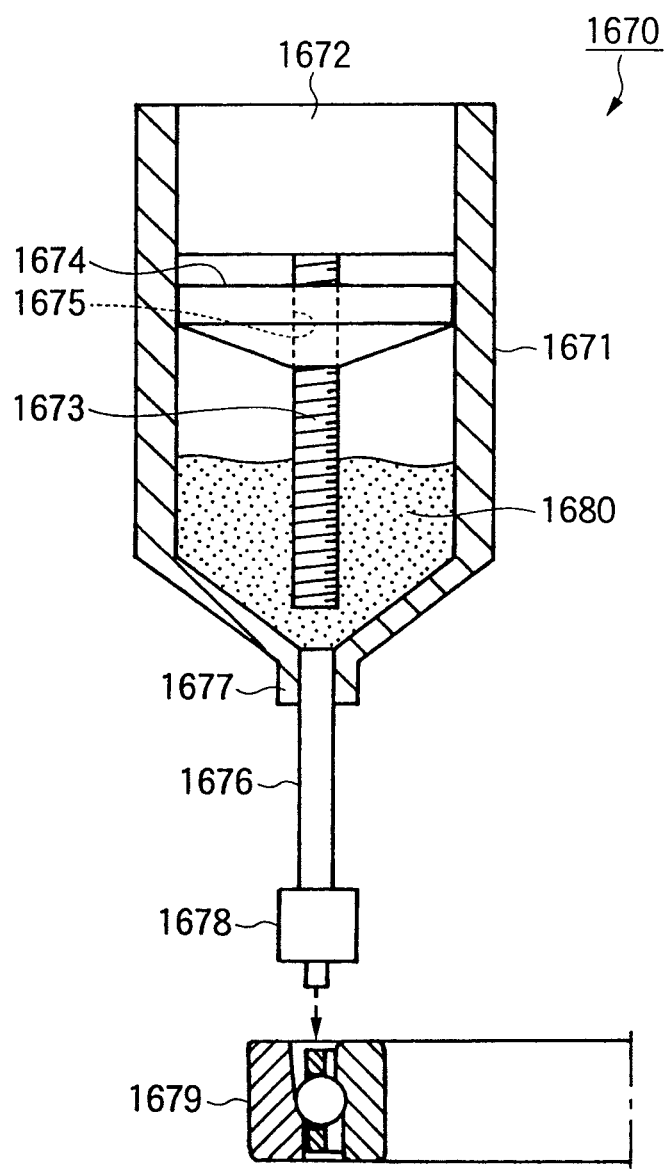
FIG. 116 is a sectional view showing yet still another grease supply system in the prior art.
Figure 118:
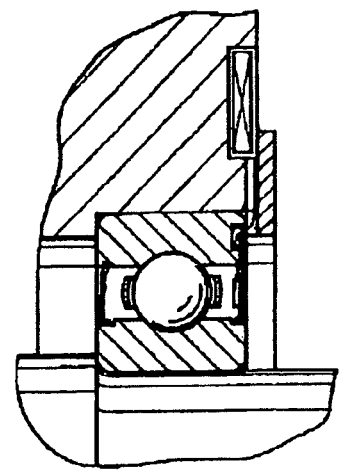
FIG. 118 is a sectional view showing a pertinent portion of another spindle unit in the prior art.
Figure 118:
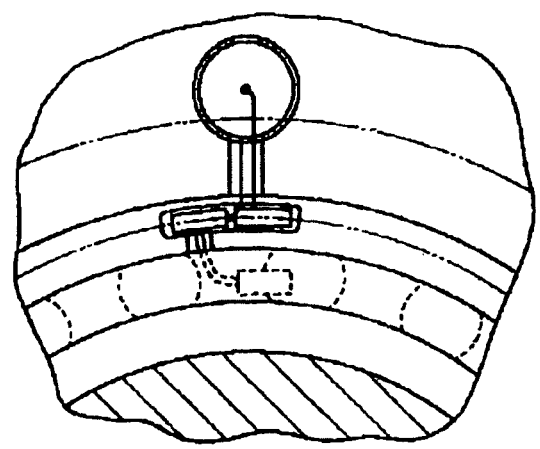
Figure 119:
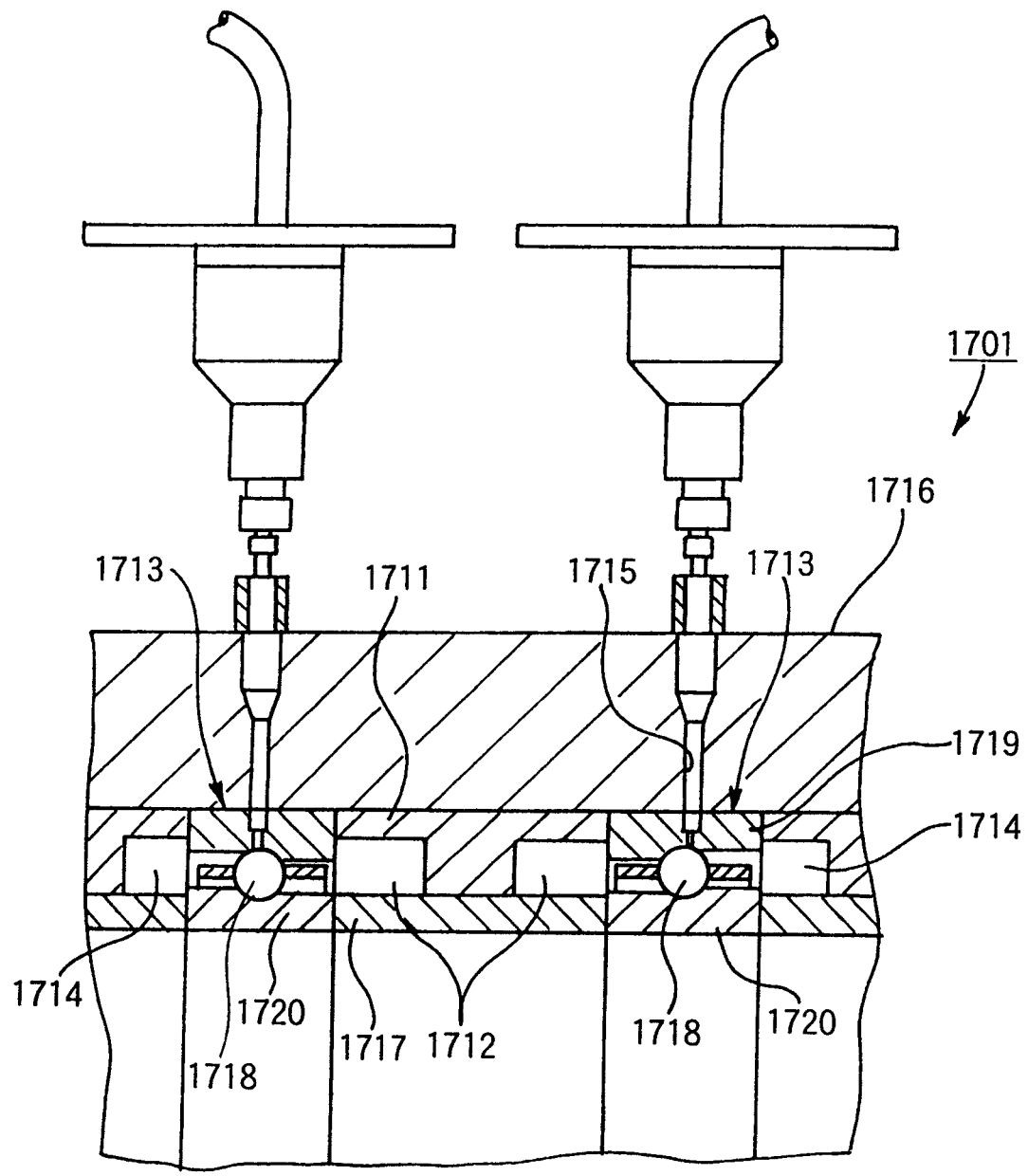
FIG. 119 is a sectional view showing an example in the prior art.
Figure 120:
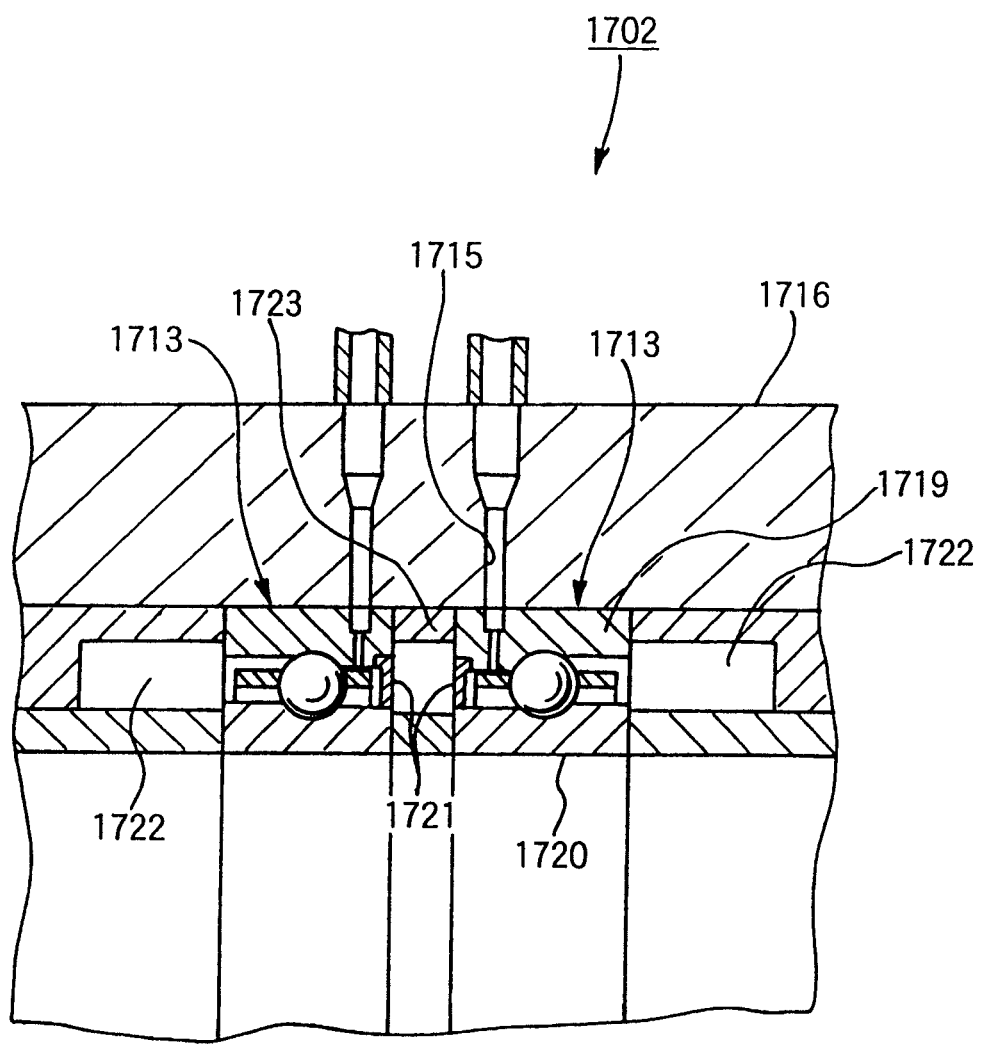

In order to confirm the advantages of the present invention, a discharge quantity of grease was observed by using three types of grease supply systems in which a length of the grease supply piping from the grease discharge portion to the bearing unit was changed. In three types of grease supply systems, the discharge unit 1 was the mechanically operated pump type shown in FIG. 116, the discharge unit 2 was the pneumatically operated pump type shown in FIG. 114, and the discharge unit 3 was the fixed-displacement discharge type in respective embodiments of the present invention.

The specifications of the grease supply piping were given as shown in Table 4.

TABLE 4

| | |
|---|---|
| Grease supply pipe | φ 4.0 × φ 2.2 |
| Grease supply pipe material | Teflon |
| Grease supply pipe length | 50 mm, 100 mm, 500 mm, 1000 mm |
| Nozzle diameter | φ 1.2 |

The specifications of three types of grease supply systems were given as shown in Table 5. Where the hours of operation of respective grease supply systems was set constant.

TABLE 5

| Discharge Unit 1 | Discharge Unit 2 | Discharge Unit 3 |
|---|---|---|
| Mechanically operated pump type | Pneumatically operated pump type (resistance type) | Fixed-displacement discharge type |
| Gear drive time: 10 (S) | Air supply time: 10 (S) | Air supply time: 10 (S) |

Test results of three types of grease supply systems were given as shown in Table 6. Here, the grease was sealed previously in the grease supply piping and the nozzle in respective grease supply systems, and then a quantity of grease discharged from the nozzle was measured.

TABLE 6

| Piping length | Unit 1 ($10^{-2}$ cc) | | | Unit 2 ($10^{-2}$ cc) | | | Unit 3 ($10^{-2}$ cc) | | |
|---|---|---|---|---|---|---|---|---|---|
| (mm) | 1-st | 2-nd | 3-rd | 1-st | 2-nd | 3-rd | 1-st | 2-nd | 3-rd |
| 50 | 5 | 5 | 5 | 6 | 5 | 4 | 5 | 5 | 4.5 |
| 100 | 5 | 5 | 5 | 2.5 | 2 | 1 | 5 | 5 | 5.5 |
| 500 | 6 | 10 | 12 | 0.3 | 0.5 | 0.8 | 5 | 4.5 | 5 |
| 1000 | 10 | 20 | 30 | 0.05 | 0.1 | 0.05 | 5.5 | 5 | 5 |

As apparent from Table 6, in the discharge unit 1 and the discharge unit 2, a discharge quantity of grease was largely changed in the first, second, and third measurements as the length of the grease supply piping was expanded. In particular, in the discharge unit 2, in case a discharge quantity of grease is reduced in inverse proportion to an increase of the number of times, it is possible that such situation causes fatal damage such as the seizure, or the like to the bearing lifetime.

On the contrary, in the discharge unit 3 corresponding to respective embodiments of the present invention, there was no noticeable variation of a discharge quantity of grease in the first, second, and third measurements irrespective of the length of the grease supply piping.

Test results of a discharge quantity of grease in three types of grease supply systems were given as shown in Table 7.

TABLE 7

| Unit 1 | Unit 2 | Unit 3 |
|---|---|---|
| A residual pressure still remained in the piping when the piping was expanded. → The base oil was separated and a discharge quantity became unstable. | The grease was largely subjected to a line friction when the piping was prolonged. Thus, a discharge quantity was changed depending on the piping length. In order to keep a discharge quantity constant, a pressure applying time had also to be controlled. | It was checked that the fixed-displacement discharge can be attained. |

As the above test results, in the discharge unit 3 corresponding to respective embodiments of the present invention, it was checked that a constant amount of grease can always be discharged under no influence of the length of the grease supply piping.

Example 7

Next, a discharge quantity of grease was observed by using three types of grease supply systems in which a length of the grease supply piping from the grease discharge portion to the bearing unit was changed. In three types of grease supply systems, the discharge unit 1 was the type shown in FIG. 67, the discharge unit 2 was the type shown in FIG. 72(a), and the discharge unit 3 was the type shown in FIG. 73(a).

The specifications of the grease supply piping were given as shown in Table 8.

TABLE 8

| Grease supply pipe | outer diameter: φ 4.0 |
| | inner diameter: φ 2.2 (Teflon) |
| Grease supply pipe length (m) | 1, 2.5, 4 |
| Nozzle diameter fitted to the tope end of the grease supply pipe | φ 1.2 |

The test conditions were given as shown in Table 9.

TABLE 9

| Air supply pressure 1 | 0.3 (MPa) |
| Air supply pressure 2 (grease tank pressure) | 0.3 (MPa) (continuous pressure) |
| Valve opening time | 3 minute |
| Fixed-displacement discharge unit stroke volume | 0.02 cc/1 stroke |

Test results of three types of grease supply systems were given as shown in Table 10. Here, the grease was sealed previously in the grease supply piping and the nozzle in respective grease supply systems, and then a discharge quantity of grease discharged from the nozzle was measured.

TABLE 10

| Grease piping length | Unit No. 1 (cc) | | | Unit No. 2 (cc) | | | Unit No. 3 (cc) | | |
|---|---|---|---|---|---|---|---|---|---|
| (m) | 1-st | 2-nd | 3-rd | 1-st | 2-nd | 3-rd | 1-st | 2-nd | 3-rd |
| 1 | 0.022 | 0.019 | 0.020 | 0.020 | 0.018 | 0.020 | 0.018 | 0.021 | 0.019 |
| 2.5 | 0.013 | 0.012 | 0.010 | 0.012 | 0.010 | 0.008 | 0.020 | 0.018 | 0.021 |
| 4 | 0.005 | 0.005 | 0.006 | 0.006 | 0.007 | 0.005 | 0.020 | 0.020 | 0.019 |

As apparent from Table 10, in the discharge unit 1 and the discharge unit 2, there is no great difference in a discharge quantity. Also, in the discharge unit 3, it was confirmed that, since the discharge unit employs the pressure-raising discharge mechanism, variation in a discharge quantity is small even when the length of the piping is prolonged like 4 m, and thus a predetermined amount of grease can be discharged stably.

Example 8

Subsequently, a discharge quantity of grease was observed by using six types of grease supply systems in which the length of the grease supply piping extended from the grease discharge portion to the bearing unit is changed.

The specifications of the grease supply piping were given similarly to those in Table 8.

The test conditions were given as shown in Table 11.

TABLE 11

| Air supply pressure | 0.3 (MPa) |
| Valve opening time | 3 minute |
| Mechanical fixed-displacement piston pump stroke volume | 0.02 cc/1 stroke |

Out of six types of grease supply systems, the discharge units 4 to 9 were given as shown in Tables 12 and 13.

TABLE 12

| Grease piping length (m) | Unit No. 4 (cc) A portion: sintered material | | | Unit No. 5 (cc) A portion: graphite | | | Unit No. 6 (cc) A portion: check valve | | | Unit No. 7 (cc) A portion: speed controller | | |
|---|---|---|---|---|---|---|---|---|---|---|---|---|
| | 1-st | 2-nd | 3-rd | 1-st | 2-nd | 3-rd | 1-st | 2-nd | 3-rd | 1-st | 2-nd | 3-rd |
| 1 | 0.022 | 0.019 | 0.020 | 0.018 | 0.021 | 0.019 | 0.020 | 0.018 | 0.020 | 0.018 | 0.021 | 0.019 |
| 2.5 | 0.020 | 0.018 | 0.022 | 0.020 | 0.018 | 0.021 | 0.021 | 0.019 | 0.020 | 0.020 | 0.018 | 0.021 |
| 4 | 0.022 | 0.021 | 0.019 | 0.018 | 0.020 | 0.019 | 0.018 | 0.022 | 0.020 | 0.018 | 0.021 | 0.019 |

TABLE 13

| Grease piping length (m) | Unit No. 8 (cc) Valve T operation: opened 10 sec prior to the closure of the valve S for 2 min | | | Unit No. 9 (cc) | | |
|---|---|---|---|---|---|---|
| | 1-st | 2-nd | 3-rd | 1-st | 2-nd | 3-rd |
| 1 | 0.022 | 0.022 | 0.019 | 0.015 | 0.012 | 0.002 |
| 2.5 | 0.018 | 0.018 | 0.018 | 0.013 | 0.011 | 0.001 |
| 4 | 0.021 | 0.021 | 0.021 | 0.012 | 0.010 | 0.004 |

More particularly, the discharge unit 4 used the valve mechanism 1181 formed of the resistor body made of the sintered material in the type shown in FIG. 75, the discharge unit 5 used the valve mechanism 1181 formed of the resistor body made of the graphite in the type shown in FIG. 75, the discharge unit 6 used the check valve mechanism 1181 in the type shown in FIG. 75, the discharge unit 7 used the speed controller valve mechanism 1181 in the type shown in FIG. 75, the discharge unit 8 was the type shown in FIG. 76, the discharge unit 9 did not provide the valve mechanism 1181 to the type shown in FIG. 75. In the discharge unit 8, the air valve 1191 is called a valve S and the pressure valve 1192 is called a valve T.

Test results of six types of grease supply systems were given as shown in Table 12 and Table 13. Here, the grease was sealed previously in the grease supply piping and the nozzle in respective grease supply systems, and then a discharge quantity of grease discharged from the nozzle was measured.

As apparent from Table 12 and Table 13, in the discharge units 4 to 7, since the pressure still existed in the grease in the grease tank after the valve is closed, the new grease was supplied to the grease fixed-displacement discharge mechanism from the grease tank. Then, a constant quantity of grease was discharged from the nozzle. Meanwhile, in the discharge unit 9, since the pressure in the grease tank was released at the same time when the valve is closed, the piston in the grease tank did not apply the pressure to the grease and thus the grease was not supplied to the grease fixed-displacement discharge mechanism. Therefore, the grease was not gradually discharged every time when the discharge was executed. In contrast, in the discharge unit 8, since the pressure was still applied to the inside of the grease tank after the fixed-displacement discharge piston was returned the grease fixed-displacement discharge mechanism, a predetermined quantity of grease could be discharged.

Example 9

In the discharge unit 4, the comparative tests were made by using the Teflon tube and the polyurethane tube as the grease supply piping 1113. The test conditions were given as shown in Table 14.

TABLE 14

| | |
|---|---|
| Air supply pressure | 0.3 (MPa) |
| Valve opening time | 3 minute |
| Mechanical fixed-displacement piston pump stroke volume | 0.02 cc/1 stroke |
| Grease supply pipe material | Teflon Polyurethane |
| Grease supply pipe length (m) | 1, 2, 4 |
| Measurement time the valve | measured after 10 minutes passed from the opening of the valve |

Test results were given as shown in Table 15. Here, the grease was sealed beforehand in the grease supply piping and the nozzle, and then a discharge quantity of grease discharged from the nozzle was measured.

TABLE 15

| Grease piping length (m) | Grease supply pipe material: Teflon | | | Grease supply pipe material: Polyurethane | | |
|---|---|---|---|---|---|---|
| | 1-st | 2-nd | 3-rd | 1-st | 2-nd | 3-rd |
| 1 | 0.022 | 0.019 | 0.020 | 0.012 | 0.012 | 0.010 |
| 2.5 | 0.020 | 0.018 | 0.022 | 0.005 | 0.006 | 0.005 |
| 4 | 0.022 | 0.021 | 0.019 | 0.001 | 0.002 | 0.001 |

As apparent from Table 15, the expansion of the conduit of the grease supply piping formed of the Teflon tube is smaller than that of the grease supply piping formed of the polyurethane tube, and therefore a constant quantity of grease could be discharged stably even when the piping was extended.

In this case, the present invention is not limited to the foregoing embodiments, and appropriate variations, improvements, and the like may be applied.

For example, the nozzle is not provided to the side portion of the bearing unit, and the nozzle may be inserted from the outer ring side of the bearing or the housing side of the spindle unit to the bearing space.

Also, the medium that is fed to the air valves 1122, 1191 is not limited to the air, and the water, the environmentally-benign and harmless gas, or the like may be used. In operating the air valves 1122, 1191, the valve may be opened/closed electrically or the valve may be opened/closed mechanically. Otherwise, a rotating force converting mechanism consisting of a connecting rod, a crank shaft, etc. may be coupled to the prime mover such as the motor, or the like, and then the fixed-displacement discharge piston may be reciprocally operated by an external force not to use the medium.

As described above, according to the grease supply system in the thirty-seventh to forty-third embodiments, the grease being fed from the grease tank is poured into the cylinder in a predetermined quantity. Then, a predetermined quantity of grease being put into the cylinder is discharged into the grease supply piping by the fixed-displacement discharge piston via the check valve.

Thus, a constant quantity of grease can always be supplied to the grease supply piping. Therefore, a variation in a discharge quantity of grease caused depending on the conditions such as the inner diameter and the length of the piping, the shape of the nozzle, the temperature, and the like can be reduced and thus the stable discharge of grease can be carried out.

Also, the residual pressure is never generated for a long time in the grease contained in the piping extended from the portion, at which the pressure is applied to the grease, to the bearing. Therefore, generation of the component separation of the grease Gr can be reduced, such a possibility can be reduced that the grease Gr having different consistencies exists in the piping, and the grease Gr can be discharged in a constant quantity. Therefore, the influence of the piping can be reduced, and the grease can be supplied periodically to the inside of the bearing in a minute and predetermined quantity by executing the quantitative supply that discharges intermittently the grease in a minute and predetermined quantity. As a result, the enhanced lifetime of the grease lubrication and improvement of the liability can be achieved.

Also, according to the grease supply system in the above embodiments, the fixed-displacement discharge piston of the mechanical fixed-displacement discharge piston pump is arranged to move reciprocally in the cylinder. Therefore, when the fixed-displacement discharge piston is moved forward, a constant quantity of grease in the cylinder can be discharged by utilizing the reciprocal movement of the fixed-displacement discharge piston. When a constant quantity of grease is discharged, the check valve is closed. Then, when the fixed-displacement discharge piston is moved backward, the new grease is supplied from the grease tank and thus generation of the residual pressure in the piping can be reduced.

Also, according to the grease supply system in the above embodiments, since the fixed-displacement discharge piston is operated by the medium supplied into the cylinder via the valve, the mechanical fixed-displacement type piston pump can be constructed without the complicated mechanism. Since the air is used as the medium, the pressuring mechanism can be simplified and also the measure against the leakage, and the like can be taken quite simply rather than the case where the oil and fat, or the like is employed.

Also, according to the grease supply system in the above embodiments, since the grease in the grease tank is pressurized toward the cylinder when the fixed-displacement discharge piston is moved backward, the negative pressure generated in the cylinder can be reduced and also generation of the air bubbles in the grease can be prevented.

Also, according to the grease supply system in the above embodiments, since the grease that is set in a range of 0.004 to 0.1 cc is discharged into the grease supply piping by the fixed-displacement discharge piston, a fine control of the discharge quantity can be attained.

Also, according to the grease supply system in the above embodiments, since the Teflon tube is used, the loss due to the expansion of the conduit can be reduced and also a discharge quantity of grease can be maintained satisfactorily.

Also, according to the grease supply system in the above embodiments, since the grease supply can be executed stably, the prolonged lifetime of the bearing unit and the spindle unit for the machine tool or the high-speed motor and also improvement of the liability can be achieved.

Forty-Fourth Embodiment

Figure 77:
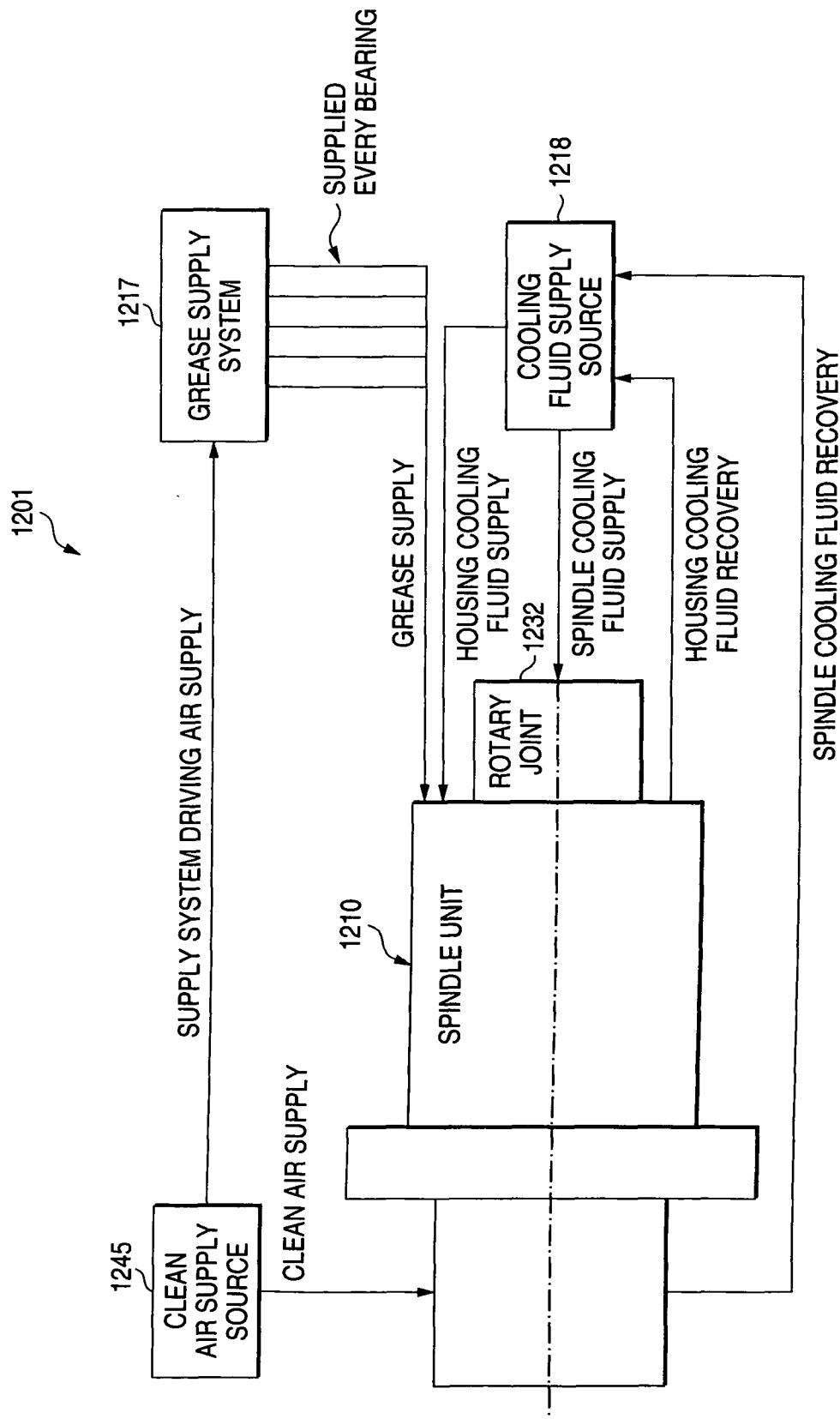
FIG. 77 is a schematic view showing a spindle system of a forty-fourth embodiment of the present invention.

FIG. 77 is a view showing a spindle system 1201 of a forty-fourth embodiment of the present invention. This spindle system 1201 includes a spindle unit 1210, a grease supply system 1217, a cooling fluid supply source 1218, and a clean air supply source 1245.

Figure 78:
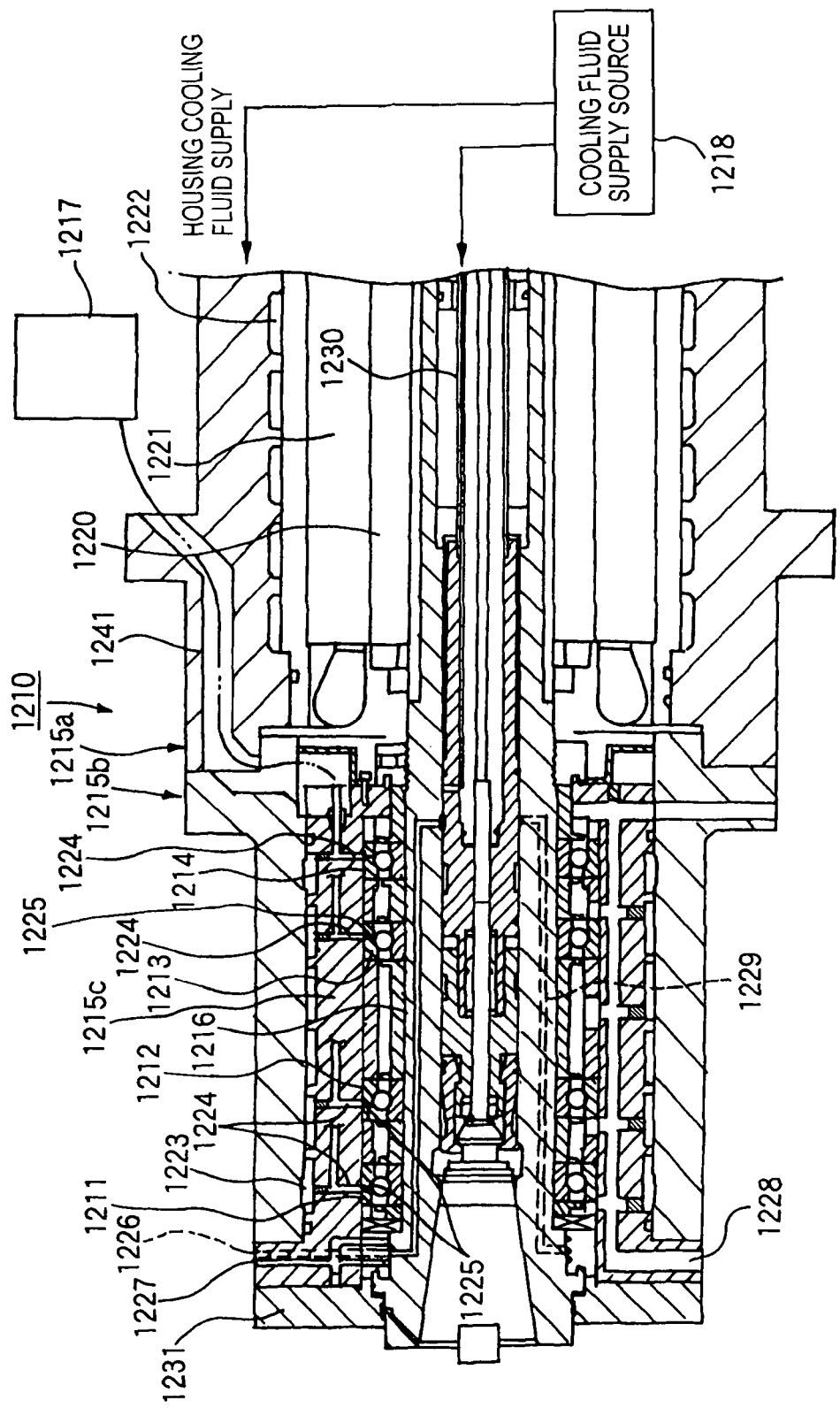
FIG. 78 is a sectional view showing a spindle unit of the forty-fourth embodiment of the present invention.

As shown in FIG. 78, the spindle unit 1210 has a housing 1215 onto which a plurality of rolling bearings 1211 to 1214 are fitted, and a spindle 1216 which is passed through the rolling bearings 1211 to 1214.

Also, the spindle unit 1210 has a rotor 1220 provided onto the spindle 1216, and a stator 1221 provided onto an inner peripheral surface of a housing 1215a to oppose to the rotor 1220.

Stator cooling grooves 1222 opposing to the stator 1221 are formed on an inner surface of the housing 1215a. Bearing cooling grooves 1223 opposing to the rolling bearings 1211 to 1214 are formed on an inner surface of a housing 1215c.

Also, a spindle center cooling-fluid recovery hole 1226, a clean air supply hole 1227, and a grease exhaust hole 1228 are formed in the housing 1215c. Cooling paths 1229, 1230 extending along a centerline of the spindle 1216 are provided to the spindle 1216. Here, a reference 1231 in FIG. 78 denotes an outer ring pushing lid.

The grease sent out from the grease supply system 1217 is supplied to the rolling bearings 1211 to 1214 through grease paths 1241, 1224 provided in the housings 1215a, 1215c.

Also, the cooling fluid sent out from a cooling fluid supply source 1218 is supplied to the cooling path 1230 in the spindle 1216 via a rotary joint 1232. This cooling fluid sent out from the cooling fluid supply source 1218 is also supplied the stator cooling grooves 1222 provided in the housing 1215.

As shown in FIG. 77, the cooling fluid supplied to the housing 1215 and the spindle 1216 from the cooling fluid supply source 1218 is recovered by the cooling fluid supply source 1218.

Also, the clean air sent out from the clean air supply source 1245 is supplied to the housing 1215c (see FIG. 78) of the spindle unit 1210 and the grease supply system 1217.

In the spindle system 1201, the stator 1221 of the spindle unit 1210 is cooled with the cooling fluid sent out from the cooling fluid supply source 1218. Also, the rolling bearings 1211 to 1214 are cooled with the cooling fluid.

In addition, the cooling fluid is supplied to the cooling path 1230 in the spindle 1216, and also the cooling fluid is passed along the longitudinal direction of the spindle 1216 and is supplied the cooling path 1229. Therefore, the spindle 1216 in the spindle system 1201 is also cooled.

According to the spindle system 1201, not only the cooling of the stator 1221 but also the cooling of the rolling bearings 1211 to 1214 is executed concurrently in a range that is in excess of dmn 1200000. Therefore, the rolling bearings 1211 to 1214 can be cooled even when the heat generation from the rolling bearings 1211 to 1214 is increased, and the lifetime of the grease can be enhanced and also an oil film can be formed firmly.

Also, since the new grease can always be supplied from the outside while the operation is continued, the lifetime can be enhanced to the same extent as the oil air lubrication or the oil mist lubrication. In addition, the grease lubrication is advantageous in the environmental aspect, so that the sprayed state of the lubrication oil can be suppressed and also the work environment can be improved.

Also, since a whistling sound in the oil air lubrication or the oil mist lubrication can be suppressed, a noise level can also be suppressed.

In addition, when the preload in operation is applied excessively in addition to the temperature, the seizure due to the lack of the oil film formation is brought about prior to the grease lifetime. In this case, the spindle 1216 is cooled simultaneously in the spindle system 1201 of the present invention, a temperature difference between the inner and outer rings of the rolling bearings 1211 to 1214 can be suppressed. Therefore, if the angular contact ball bearing (the preload in a fixed position) is used as the rolling bearings 1211 to 1214, an increase of the preload can be suppressed and the advantage can be achieved much more.

If the cylindrical roller bearing is used as the rolling bearings 1211 to 1214, the radial preload (negative clearance) can be suppressed and also the early seizure caused in the grease lubrication can be prevented. In addition, the immense effect can be obtained in extending the lifetime by the grease lubrication.

Forty-Fifth Embodiment

Figure 79:
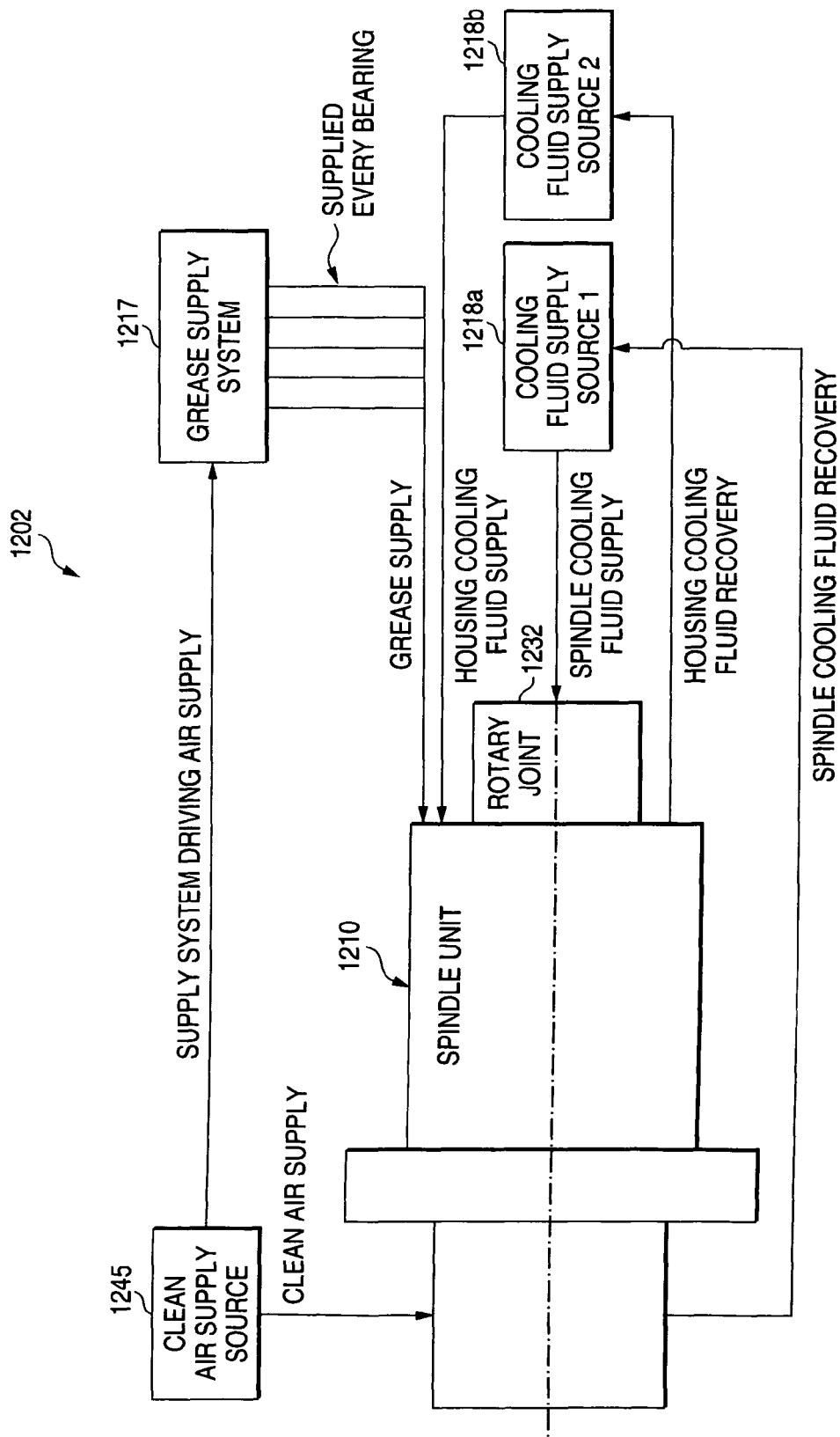
FIG. 79 is a schematic view showing a spindle system of a forty-fifth embodiment of the present invention.

FIG. 79 shows a spindle system 1202 of a forty-fifth embodiment according to the present invention. In the following explanation, the same reference numerals are affixed to the same portions as those of the spindle system 1201 (see FIGS. 77 and 78), and their detailed explanation will be omitted herein.

This spindle system 1202 includes a first cooling fluid supply source 1218*a* for supplying the cooling fluid to the cooling path 1230 in the spindle 1216 via the rotary joint 1232, and a second cooling fluid supply source 1218*b* for supplying the cooling fluid to the stator cooling grooves 1222 and the bearing cooling grooves 1223 in the housing 1215.

The cooling fluid exhausted from the cooling path 1230 is recovered by the first cooling fluid supply source 1218*a*. The cooling fluid exhausted from the stator cooling grooves 1222 and the bearing cooling grooves 1223 is recovered by the second cooling fluid supply source 1218*b*.

This spindle system 1202 can manage a temperature of the cooling fluid in the spindle 1216 and the stator 1221 separately, and can suppress the temperature difference between the inner ring and the outer ring of the bearing much more. In other words, if the temperature of the cooling fluid in the first cooling fluid supply source 1218*a* is set lower than the temperature of the cooling fluid in the second cooling fluid supply source 1218*b*, the temperature of the spindle 1216 can be lowered. Also, an increase of the preload of the bearing can be suppressed and the advantage can be achieved much more.

Forty-Sixth Embodiment

Figure 80:
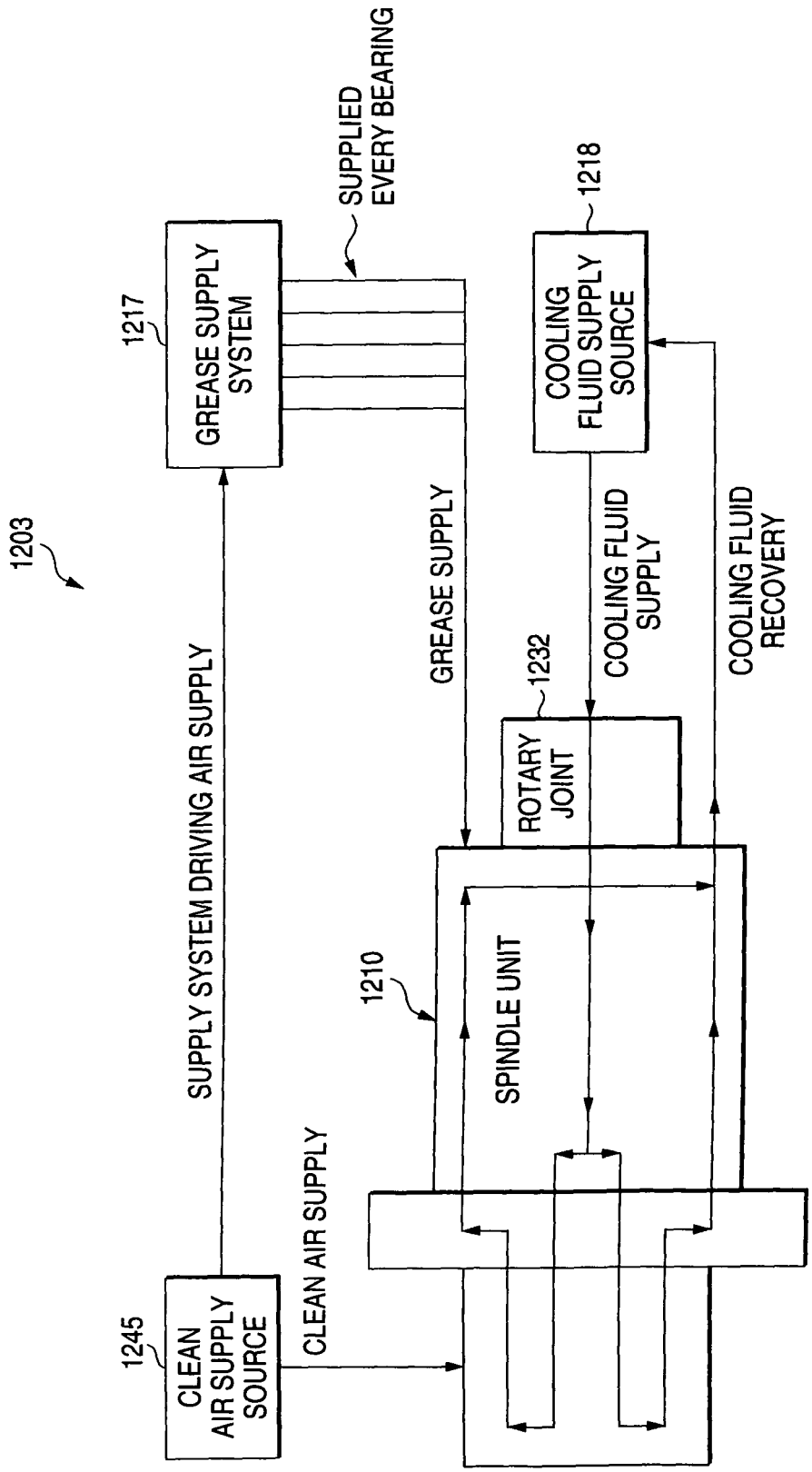
FIG. 80 is a schematic view showing a spindle system of a forty-sixth embodiment of the present invention.

FIG. 80 shows a spindle system 1203 of a forty-sixth embodiment of the present invention. In this spindle system 1203, the cooling fluid supplied from the cooling fluid supply source 1218 is passed through the cooling paths 1230, 1229 in the spindle 1216 via the rotary joint 1232, and then is supplied to the bearing cooling grooves 1223 and the stator cooling grooves 1222.

The cooling fluid exhausted from the stator cooling grooves 1222 is recovered by the cooling fluid supply source 1218.

In this case, the spindle systems 1201, 1202, 1203 are suitable for the spindle unit for the machine tool spindle and the spindle unit for the high speed motor.

Forty-Seventh Embodiment

Figure 81:
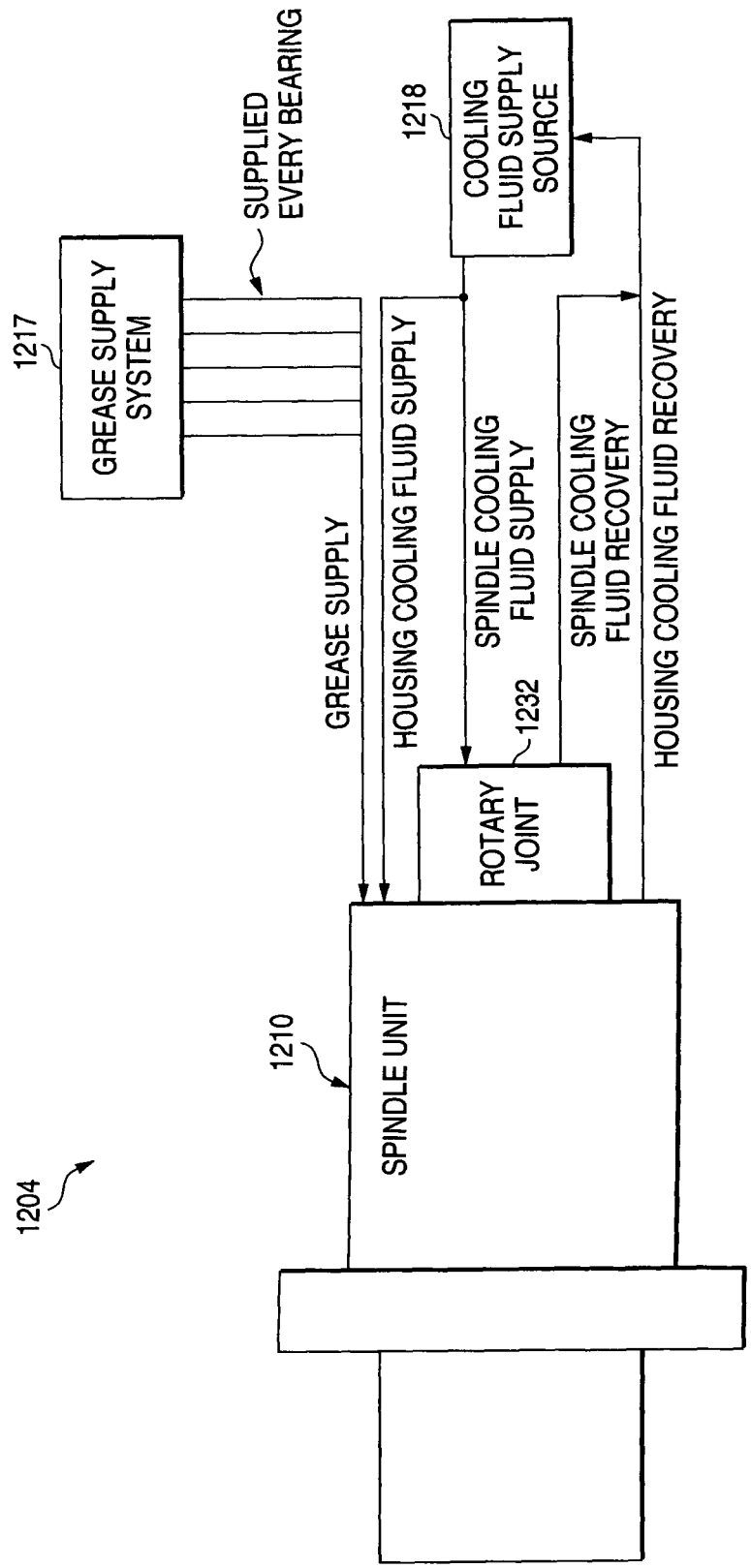
FIG. 81 is a schematic view showing a spindle system of a forty-seventh embodiment of the present invention.

FIG. 81 is a schematic view showing a spindle system 1204 of a forty-seventh embodiment according to the present invention. In this spindle system 1204, the cooling fluid supplied from the cooling fluid supply source 1218 is supplied to the spindle side and the housing side.

Also, the cooling fluid supplied to the spindle side is recovered by the spindle whereas the cooling fluid supplied to the housing side is recovered by the housing. Also, the grease supply system may be operated not pneumatically but mechanically, and also the clean air supply source may be omitted.

Forty-Eighth Embodiment

Figure 82:
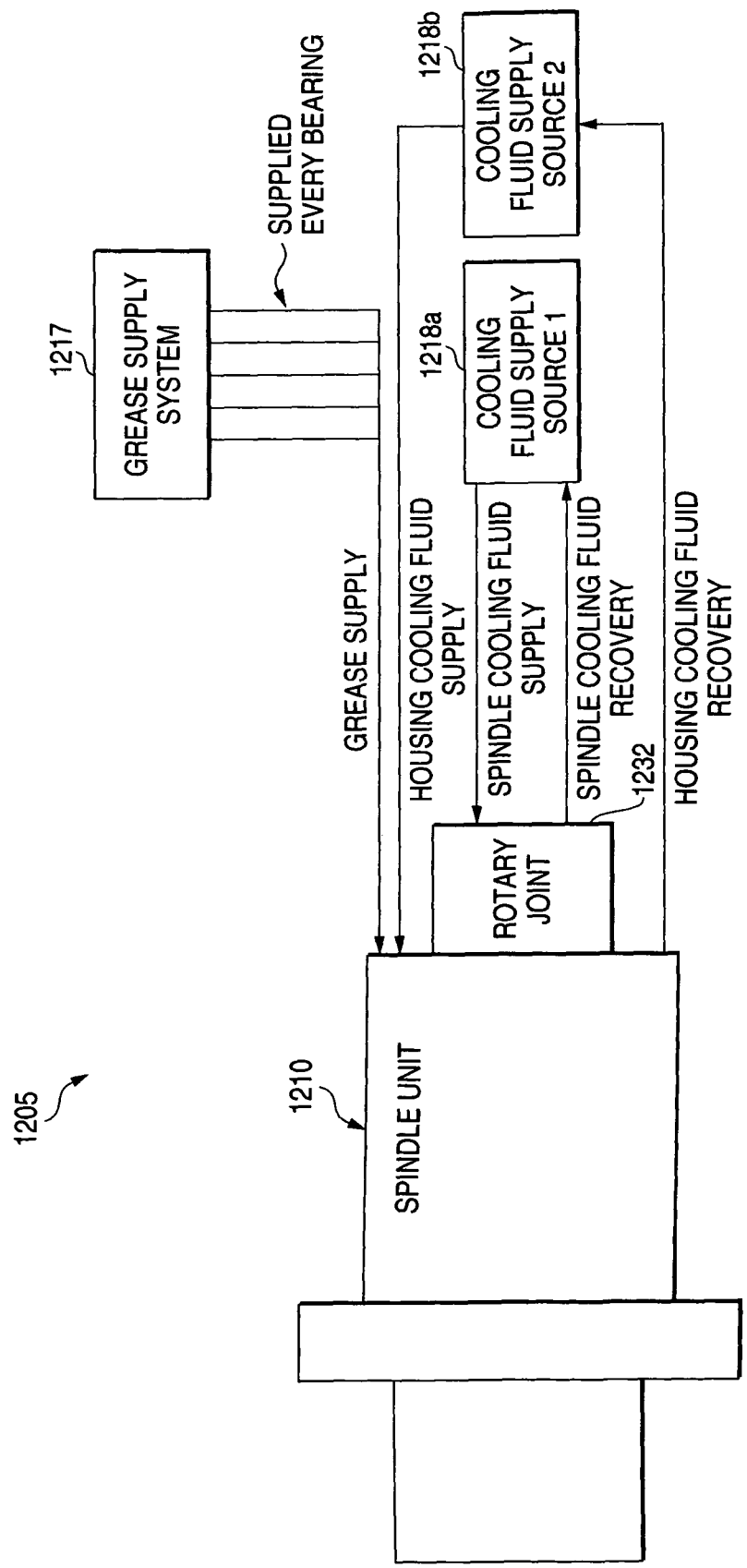
FIG. 82 is a schematic view showing a spindle system of a forty-eighth embodiment of the present invention.

FIG. 82 shows a spindle system 1205 of a forty-eighth embodiment of the present invention. Two cooling fluid supply sources 1218*a*, 1218*b* are provided to the spindle system 1205. Then, the temperature management of these cooling fluid supply sources 1218*a*, 1218*b* is executed separately. Respective configurations other than the above are similar to the spindle system 1204 in FIG. 81.

Forty-Ninth Embodiment

Figure 83:
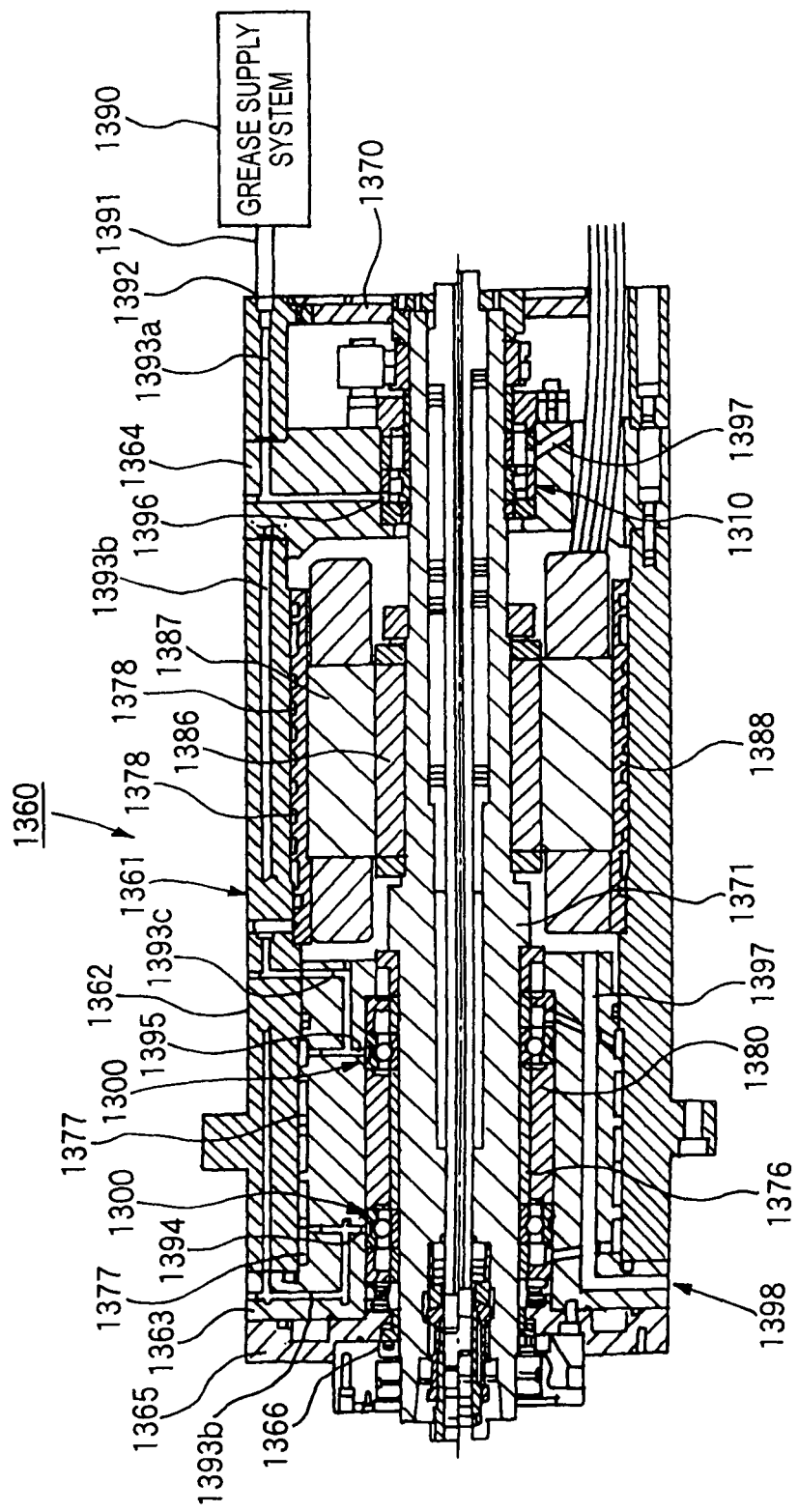
FIG. 83 is a sectional view showing a spindle unit of a forty-ninth embodiment of the present invention.

FIG. 83 is a view showing a spindle unit 1360 serving as the machine tool spindle unit according to the present invention. This spindle unit 1360 bears a spindle 1371 by angular contact ball bearings 1300 of the type in which the groove is provided to the outer ring and a cylindrical roller bearing 1310, in which one supply hole is provided on one side, in a spindle housing 1361. In this case, the spindle unit in FIG. 83 employs the different type bearings for illustration purpose, but such bearing unit may be constructed merely by the same type nearing.

The spindle housing 1361 includes a housing main body 1362, a front-side bearing housing 1363 fitted into the front end (the left side in FIG. 83) of the housing main body 1362 and fixed thereto, and a rear-side bearing housing 1364 fitted into the rear end (the right side in FIG. 83) of the housing main body 1362 and fixed thereto. An outer ring pressing member 1365 and an inner ring pressing member 1366 are provided to the end portion of the front-side bearing housing 1363, and a labyrinth is formed between the outer ring pressing member 1365 and the inner ring pressing member 1366. The rear end surface of the spindle housing 1361 is covered with a cover 1370.

The spindle 1371 is fitted into two rolling bearings 1300, 1300, which are fitted onto the front-side bearing housing 1363, and one cylindrical roller bearing 1310, which is fitted onto the rear-side bearing housing 1364, and thus is rotatably supported by the spindle housing 1361. An outer ring spacer 1380 is arranged between the outer rings of two rolling bearings 1300, 1300, and an inner ring spacer 1376 is arranged between the inner rings thereof.

A rotor 1386 is fitted onto an almost center portion of the spindle 1371 in the axial direction and fixed thereto. A stator 1387 is arranged coaxially at a predetermined distance away from the outer peripheral surface side of the rotor 1386. The stator 1387 is fixed to the housing main body 1362 via a stator fixing member 1388 that is arranged on the outer peripheral surface side of the stator 1387. A plurality of grooves 1378 are formed between the housing main body 1362 and the stator fixing member 1388 along the circumferential direction of the spindle 1371. The coolant for cooling the stator 1387 is passed through a plurality of grooves 1378.

Similarly, a plurality of grooves 1377 through which the coolant is passed to cool the housing and the bearing are formed in portions that are located between the housing main body 1362 and the front-side bearing housing 1363 on the outer peripheral surface side of the angular contact ball bearing 1300.

Three grease supply ports 1392, to which the grease is supplied to feed the grease to the bearings 1300, 1300, 1310 respectively, are opened from the rear end surface of the spindle housing 1361 along the circumferential direction (only one port is illustrated in FIG. 83). These three grease supply ports 1392 are communicated with grease supply paths 1393a, 1393b, 1393c formed in the housing main body 1362, the front-side bearing housing 1363, and the rear-side bearing housing 1364 respectively (in FIG. 83, for convenience, respective grease supply paths 1393a, 1393b, 1393c are illustrated on the same cross section). Accordingly, the spindle unit 1360 in the present embodiment is constructed to supply the grease from a grease supply system 1390 provided on the outside to the spindle housing 1361 via a grease supply piping 1391.

The grease supply path 1393a is communicated with an opening 1396 that is formed to correspond to the outer ring side of the single row cylindrical roller bearing 1310. The grease supply path 1393b is communicated with an opening 1394 that is formed to correspond to the outer ring side of the angular contact ball bearing 1300 arranged on the front side (the left side in FIG. 83). The grease supply path 1393c is communicated with an opening 1395 that is formed to correspond to the outer ring side of the angular contact ball bearing 1300 arranged on the rear side (the center side in FIG. 83). As a result, the grease fed from the grease supply system 1390 is supplied independently to the outer ring sides of respective bearings 1300, 1300, 1310. The openings 1394, 1395, 1396 are communicated with the supply hole, and the grease is supplied independently to the inside of the bearing space via the supply hole.

The grease supply system 1390 is constructed to supply the grease independently to respective bearings 1300, 1300, 1310. In other words, the grease supply system 1390 executes the grease shot to the bearings 1300, 1300, 1310 at appropriate timings (intermittently or periodically) respectively to feed a supply amount of 0.004 cc to 0.1 cc every shot. The supplied grease is caused to fit with the overall interiors of the bearings 1300 and 1310 together with a rolling motion of the balls in the bearings 1300 and the rollers in the bearing 1310 to supplement the lack of grease. Here, it is preferable that a supply amount of grease in one shot should be set to 0.01 cc to 0.03 cc in the case of the angular contact ball bearing, and it is preferable that a supply amount of grease in one shot should be set to 0.005 cc to 0.02 cc in the case of the cylindrical roller bearing. In the case where the grease shot is executed in the above range, generation of the abnormal temperature rise and the breakdown of the bearing owing to the degradation of the grease or the insufficient formation of the oil film can be prevented, and the temperature pulsation in supplying the grease can be suppressed, and also degradation of the run-out precision of the spindle unit to which respective bearings 1300, 1300, 1310 are fitted can be prevented.

Example 10

In order to establish the best specifications in the grease-supplied spindle, elemental tests to conduct following verifications were performed.

(1) To verify the durable lifetime depending on a quantity of grease (2) To verify the durable lifetime depending on a bearing temperature in operation (3) To verify the preload in operation and the durable lifetime (4) To verify a supply amount in one shot In the above elemental tests (1)(2)(3), a supply amount, the temperature, and the preload were verified by measuring the time elapsed until the seizure.

The test conditions were given as follows.

Test bearing: equivalent to NSK Bearing 65BNR10HTDB P4 (High speed type bearing equivalent to 7013)

Rotation speed: 22000 min$^{-1}$

Lubrication: MTE grease (manufactured by NSK)

Preload type: constant preload

Driving system: belt drive

Figure 84:
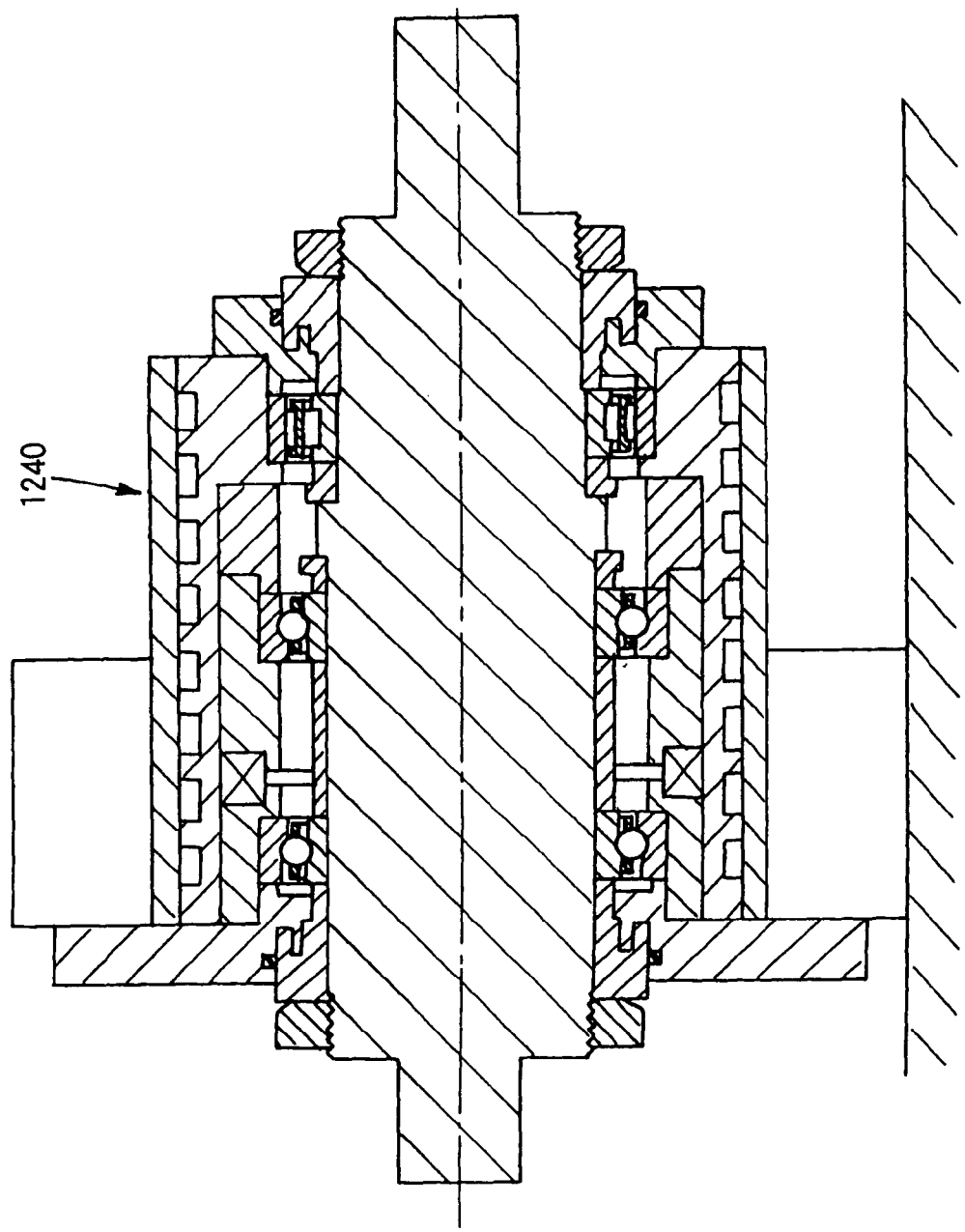
FIG. 84 is a sectional view showing a testing machine used to execute the experiment of the present invention.
Figure 86:
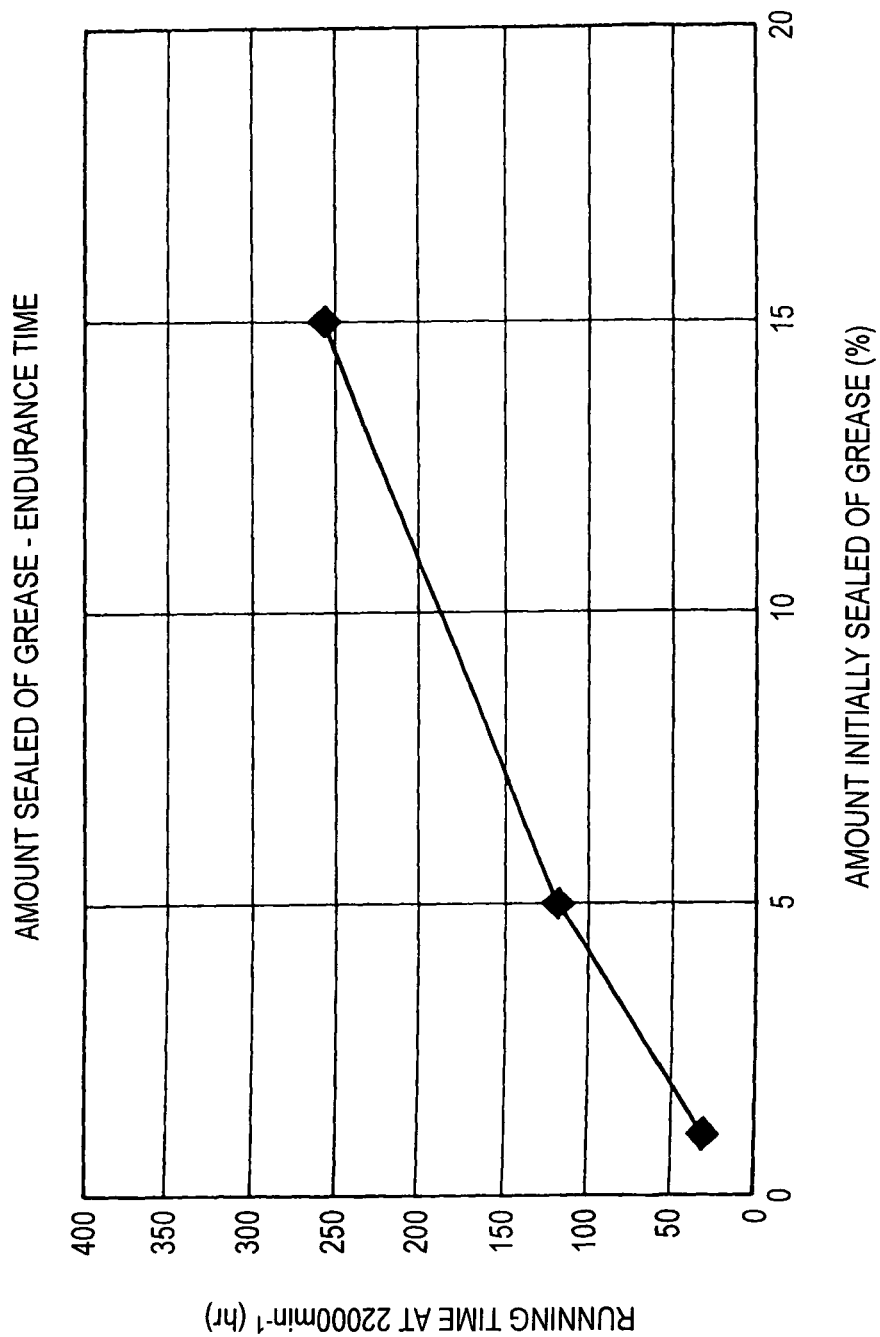
FIG. 86 is a view showing test results in Example of the present invention.

Test structure: a testing machine shown in FIG. 84 was used (1) The Durable Lifetime Depending on a Quantity of Grease Test conditions and test results were given as shown in FIG. 85 and FIG. 86.

The constant preload in the test conditions was almost equal to the preload in operation at 22000 min$^{-1}$, which is equivalent to KA in applying the preload to a fixed position (axial spring constant)=125 N/μm.

Also, the cooling conditions were almost equal to the set temperature in the actual machine.

Based on the test result, an endurance time that can be estimated from a sealed amount of grease was defined as follows in light of the safety to anticipate the variation.

Amount initially sealed of grease 1% . . . 20 hr or less

Amount initially sealed of grease 5% . . . 100 hr or less

Amount initially sealed of grease 15% . . . 250 hr or less

Also, suppose that a linear proportional relationship was held in Amount sealed-Endurance time when an amount sealed is 5% or less.

(2) The Durable Lifetime Depending on a Bearing Temperature in Operation

Figure 88:
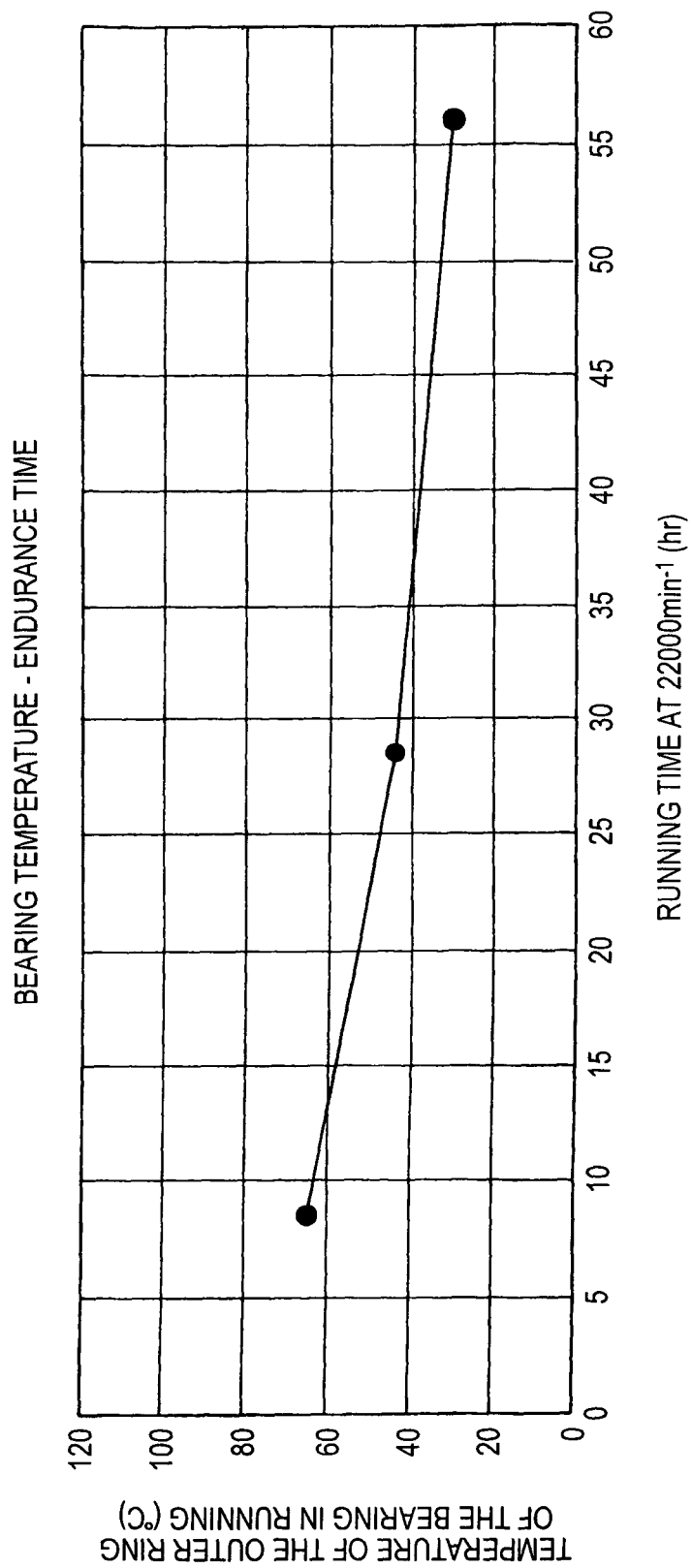
FIG. 88 is a view showing test results in Example of the present invention.

Test conditions and test results were given as shown in FIG. 87 and FIG. 88.

The constant preload in the test conditions was almost equal to the preload in operation at 22000 min$^{-1}$, which is equivalent to KA in applying the preload to a fixed position=125 N/μm.

A test time was shortened by setting an amount sealed of grease to 1%.

Based on the test result, cooling conditions in an amount sealed of grease 1% and the preload 1870 N in operation and the endurance time at 22000 min$^{-1}$ were defined as follows in light of the safety to anticipate the variation.

Bearing temperature 60° C. or more . . . 10 hr or less

Bearing temperature 40 to 60° C. . . . 20 hr or less

Figure 90:
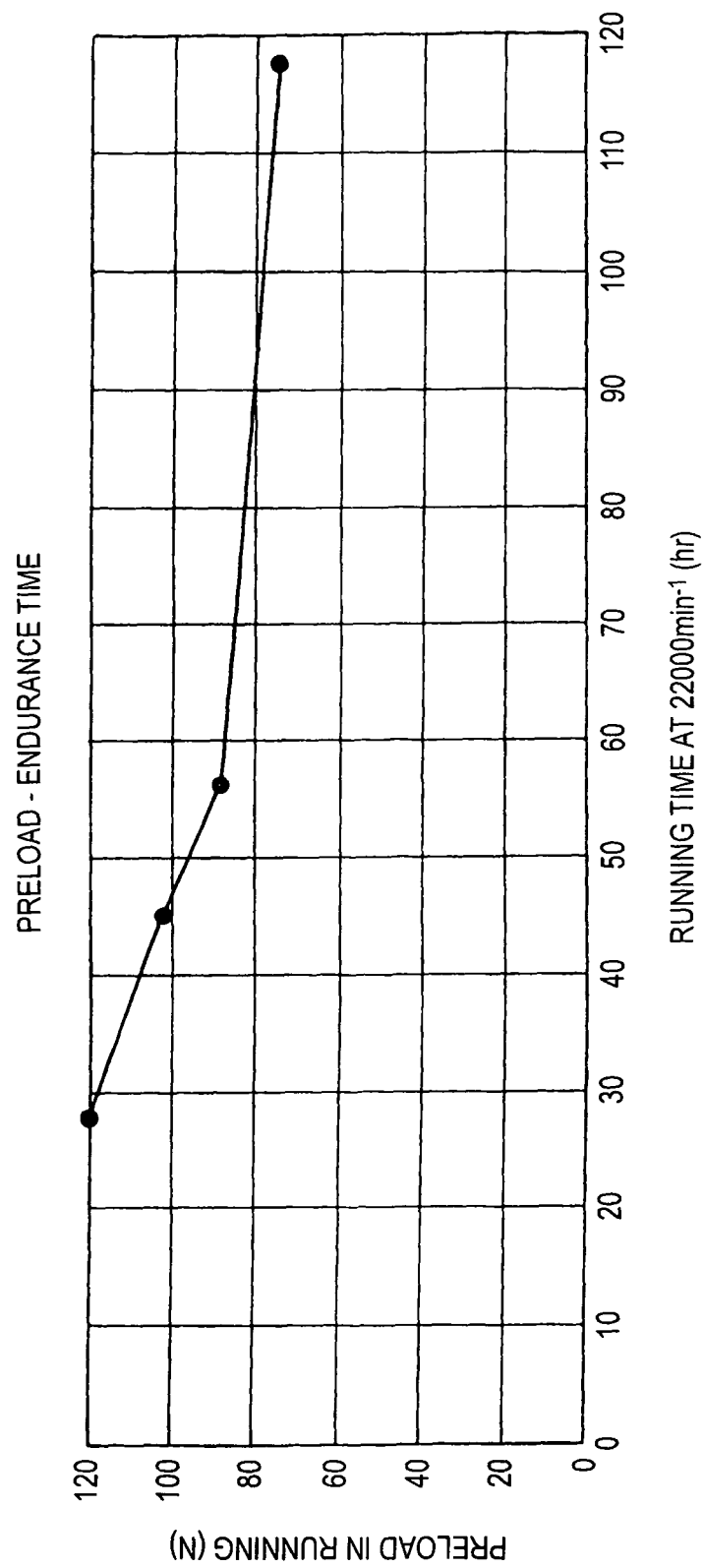
FIG. 90 is a view showing test results in Example of the present invention.

Bearing temperature 30 to 40° C. . . . 50 hr or less (3) The Preload in Operation and the Durable Lifetime Test conditions and test results were given as shown in FIG. 89 and FIG. 90. The number of rotation was 22000 min$^{-1}$, an amount sealed of grease was 5%, and the cooling conditions were almost equal to the set temperature in the actual machine. Based on the test result, the preload in operation was defined as follows in view of the safety to anticipate the variation.

Preload in operation 1870 N . . . 100 hr or less

Preload in operation 2200 N . . . 50 hr or less

Preload in operation 2600 N . . . 40 hr or less

Preload in operation 3000 N . . . 20 hr or less

Based on the elemental test result, it was found that an amount of grease, the temperature, and the preload have a great influence on the durable lifetime. In order to keep the stable performance at the high speed running, it is important that the bearing temperature should be kept low and the preload in operation should be suppressed. It was confirmed that the present invention is effective.

(4) To Verify a Supply Amount in One Shot

Figure 91:
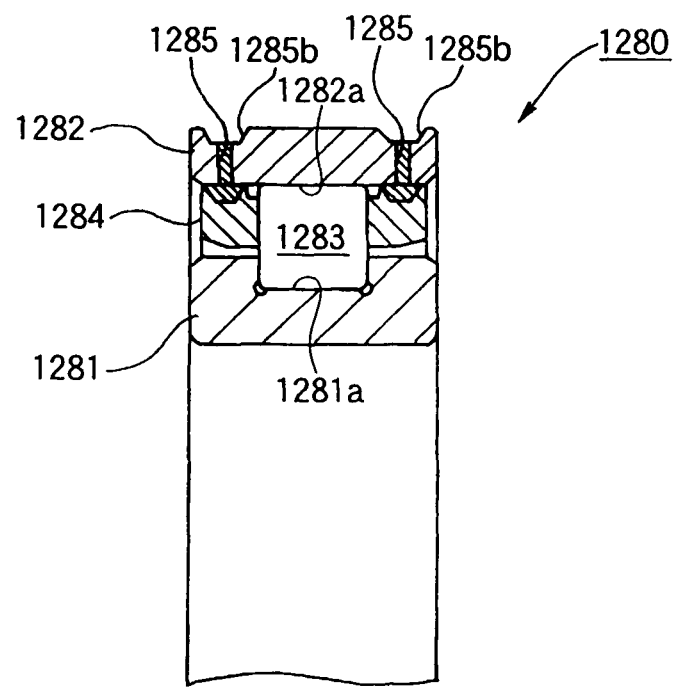
FIG. 91 is a sectional view showing the roller bearing used in Experiment.

Next, in order to detect the optimum supply amount of grease in one shot, following Experiment was carried out by using a cylindrical roller bearing 1280 shown in FIG. 91. The cylindrical roller bearing 1280 included an inner ring 1281, an outer ring 1282, a plurality of cylindrical rollers 1283 arranged between an inner ring raceway 1281a of the inner ring 1281 and an outer ring raceway 1282a of the outer ring 1282, and a cage 1284 guided by the outer ring. Also, the cage 1284 was guided by the outer ring raceway 1282a of the outer ring 1282 and has a outer-ring guided style.

Figure 92:
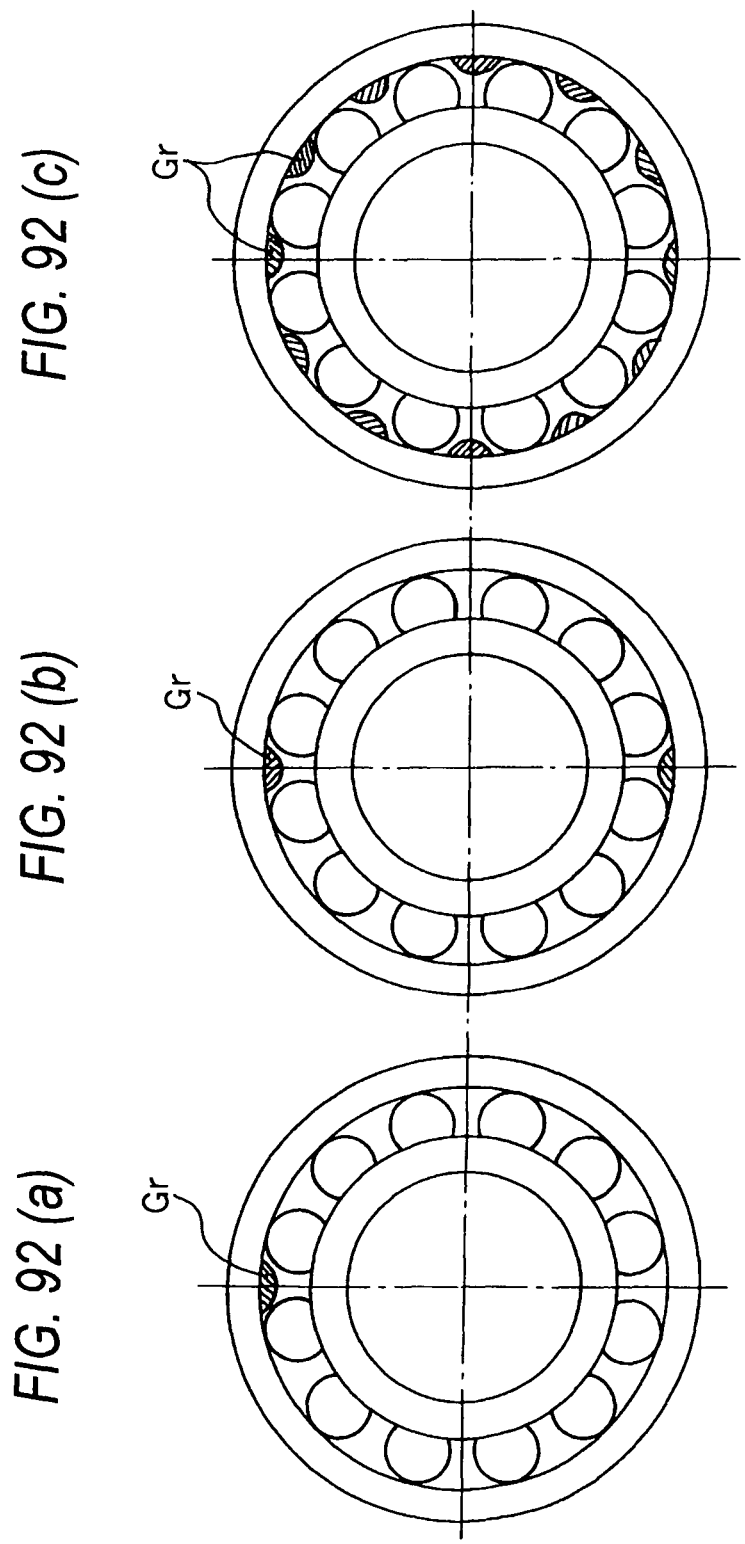
FIG. 92 is a schematic view explaining a grease supplying mode in verifying a supply amount of grease.

Then, this cylindrical roller bearing 1280 had an inner diameter of 95 mm, an outer diameter of 145 mm, a roller diameter of 11 mm, a roller length of 11 mm, the number of rollers of 27, and a bearing space volume of 31 cm$^3$. Then, the cylindrical roller bearing to the outer ring raceway of which the carbonitriding process was applied was prepared, then the grease (Isoflex NBU15: manufactured by NOK Crewbar Inc.) was filled as an initial sealed amount by 10% of the bearing space volume, and then the running-in trial of the bearing was executed. The outer ring temperature was 35° C. at 9000 min$^{-1}$ after the running-in trial was completed. Then, the experiment to measure the outer ring temperature after the rotation speed was risen from 0 to 9000 min$^{-1}$ in 2 second was done 5 times (n1 to n5) while changing a supply amount of Isoflex NBU15. In this case, the supply hole was provided to one location as shown in FIG. 92(a). The experimental results are given in Table 16.

TABLE 16

| Supply amoun | n-1 | n-2 | n-3 | n-4 | n-5 |
|---|---|---|---|---|---|
| 2% | ◎ | ◎ | ◎ | ◎ | ◎ |
| 4% | ◎ | Δ | ◎ | ○ | ○ |
| 6% | ○ | Δ | X | ○ | ○ |
| 10% | X | X | X | X | Δ |

In Table 16, ◎ denotes that the outer ring temperature was 40° C. or less, ○ denotes that the outer ring temperature was higher than 40° C. but lower than 50° C. or less, Δ denotes that the outer ring temperature was higher than 50° C. but lower than 60° C. or less, and x denotes that the outer ring temperature was in excess of 60° C.

Also, as showing in FIG. 92(b), the similar experiment was done by supplying the grease Gr to two opposing locations (positions separated by 180°) from the supply holes. The experimental results are given in Table 17.

TABLE 17

| Supply amoun | n-1 | n-2 | n-3 | n-4 | n-5 |
|---|---|---|---|---|---|
| 2% | ◎ | ◎ | ◎ | ◎ | ◎ |
| 4% | ◎ | ◎ | ◎ | ◎ | ◎ |
| 6% | Δ | ◎ | ○ | ○ | ○ |
| 10% | Δ | X | X | ○ | Δ |

In addition, as shown in FIG. 92(c), the similar experiment was done by supplying the grease Gr from the supply holes that are provided to all clearances between the rollers. The experimental results are given in Table 18.

TABLE 18

| Supply amoun | n-1 | n-2 | n-3 | n-4 | n-5 |
|---|---|---|---|---|---|
| 2% | ◎ | ◎ | ◎ | ◎ | ◎ |
| 4% | ◎ | ◎ | ◎ | ◎ | ◎ |
| 6% | ○ | ◎ | Δ | ◎ | ◎ |
| 10% | ○ | Δ | Δ | X | Δ |

As can be appreciated from Table 16 to Table 18, the abnormal temperature rise was not found in the running after the grease was supplied below 2%. Also, the abnormal temperature rise could be suppressed obviously in 4% by increasing the number of the supply locations. In other words, it was found that, although the same amount of grease is supplied, the abnormal temperature rise could be suppressed if the grease is shot from the supply holes that are provided to plural locations at an interval in the circumferential direction of the outer ring. In contrast, even though the number of grease supply holes was increased, the temperature was varied unstably when a supply amount of grease exceeds 4%.

From the above experiments, it is possible to say that preferably a supply amount of grease in one shot should be set to 4% or less of the bearing space volume. In this case, there is such a tendency that the bearing temperature is increased temporarily (i.e., the pulsation) in synchronism with the supply of the grease, and the temperature pulsation is ready to occur noticeably in the cylindrical roller bearing rather than other bearings, e.g., the angular contact ball bearing. This temperature pulsation offers no problem in the normal operation that does not demand a precision. However, in the rolling bearing applied to the spindle of the machine such as the machine tool oriented toward the mold application, or the like that demands strictly a precision, there is a possibility that a length of the spindle is changed by the temperature pulsation to affect the machining precision. Therefore, it is preferable that such temperature pulsation should be suppressed by decreasing a supply amount of grease. More concretely, the temperature pulsation can be suppressed by setting a supply amount in one shot to 0.004 cc to 0.1 cc, preferable 0.005 cc to 0.02 cc in the cylindrical roller bearing or 0.01 cc to 0.03 cc in the angular contact ball bearing. Thus, a machining precision of the machine tool spindle unit to which the rolling bearing is applied can be maintained at a high level. Other ball bearing and other roller bearing may be employed as this bearing.

As described above, in the range that exceeds dmn 1200000, if not only the cooling of the stator but also the cooling of the bearing portion is not concurrently executed, a heat is generated considerably in the bearing portion to raise the temperature and thus the grease is deteriorated in the early stage. In contrast, according to the configurations in the forty-fourth to forty-ninth embodiments, the lifetime of the grease can be extended by applying the cooling and also the oil film can be formed without fail.

Also, since the new grease can always be supplied from the outside while the operation is continued, the lifetime can be extended to the same extent as the oil air lubrication or the oil mist lubrication. In addition, the grease lubrication is advantageous in the environmental aspect, so that the sprayed state of the lubrication oil can be suppressed and also the work environment can be improved. Also, since a whistling sound generated in the oil air lubrication or the oil mist lubrication can be suppressed, a noise level can also be suppressed.

In addition, when the preload in operation is applied excessively in addition to the temperature, the seizure of the bearing due to the lack of the oil film formation is brought about prior to the grease lifetime. In the configuration of the above embodiment, since a temperature difference between the inner ring and the outer ring of the rolling bearing can be suppressed by executing the in-spindle cooling simultaneously to suppress an increase of the preload, the advantage can be achieved much more.

Also, a temperature difference between the inner and outer rings of the bearing can be suppressed by cooling the inside of the spindle, and also an increase in the preload (the preload in a fixed position) can be suppressed in the case of the angular contact ball bearing. Also, the radial preload (negative clearance) can be suppressed in the case of the cylindrical roller bearing and also the early seizure caused in the grease lubrication can be prevented. In addition, the immense effect can be obtained in extending the lifetime by the grease lubrication. In the present embodiment, the cooling means includes the cooling fluid supply source, the cooling paths provided to the spindle, the stator cooling grooves provided to the housing, and the bearing cooling grooves. This cooling means should be constructed to include at least the cooling fluid supply source and the bearing cooling grooves.

Fiftieth Embodiment

Figure 93:
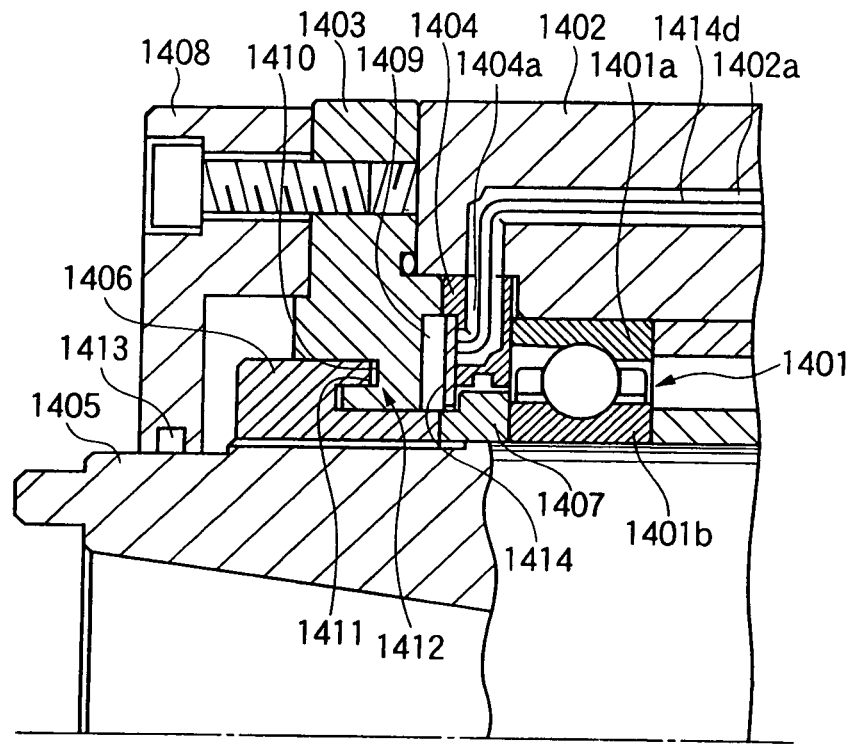
FIG. 93 is a sectional view showing a pertinent portion of a fiftieth embodiment of a spindle unit according to the present invention.
Figure 94:
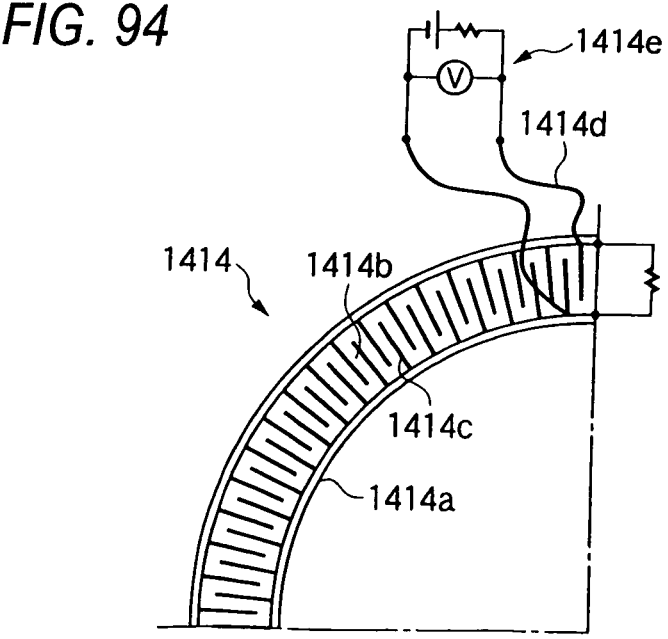
FIG. 94 is a conceptual view showing a cutting fluid sensor employed in the fiftieth embodiment.

Next, fiftieth to fifty-fifth embodiments of the present invention will be explained with reference to FIGS. 93 to 101 hereunder. FIG. 93 is a sectional view showing a pertinent portion of a fiftieth embodiment of a spindle unit according to the present invention, and FIG. 94 is a conceptual view showing a cutting fluid sensor employed in the fiftieth embodiment.

In the spindle unit illustrated in the fiftieth to fifty-fifth embodiments, an outer ring 1401a of a bearing 1401 is pushed inwardly by a front lid 1403 fitted to a top end of a housing main body 1402 via an outer ring spacer 1404, and an inner ring 1401b of the bearing 1401 is pushed inwardly by a nut 1406 screwed onto a spindle 1405 via an inner ring spacer 1407. In addition, a cover 1408 is fitted to the front side of the front lid 1403 to cover the front portion of the front lid and the front portion of the nut 1406. Also, an annular space 1409 is defined by the outer ring spacer 1404, the front lid 1403, the nut 1406, and the inner ring spacer 1407.

An annular groove 1410 opened forwardly is formed on a front inner periphery of the front lid 1403, while an annular projection 1411 is formed to direct backwardly. Also, the annular projection 1411 of the nut 1406 is inserted into the annular groove 1410 of the front lid 1403 to constitute a labyrinth seal 1412 between them.

Also, a labyrinth 1413 is arranged on an inner peripheral surface of the cover 1408. The labyrinth seals an inner peripheral surface of the cover 1408 and an outer peripheral surface of the spindle 1405.

In the embodiment shown in FIG. 93, a cutting fluid sensor 1414 is attached to a surface of the outer ring spacer 1404 on the annular space 1409 side.

In the cutting fluid sensor 1414, as shown in FIG. 94, teeth-of-comb-like contacts (electrodes) 1414b, 1414c are arranged on an annular board 1414a to oppose mutually and these contacts are connected to a sensor portion 1414e via wirings 1414d. In this embodiment, the contacts 1414a, 1414b are arranged at an interval of about 0.05 to 1 mm.

Also, holes 1404a, 1402a are formed in the outer ring spacer 1404 and the housing main body 1402 respectively, and the wirings 1414d are provided in these holes. Then, the sensor portion 1414e is provided on the outside of the housing main body 1402.

In the spindle unit in the fiftieth embodiment, the cutting fluid that enters into the inside through the labyrinth 1413 and the labyrinth seal 1412 comes into spaces between the contacts 1414b, 1414c of the cutting fluid sensor 1414 to short the contacts. Then, the cutting fluid sensor 1414 senses the entering of the cutting fluid based on a change of a voltage caused by the short circuit.

Fifty-First Embodiment

Figure 95:
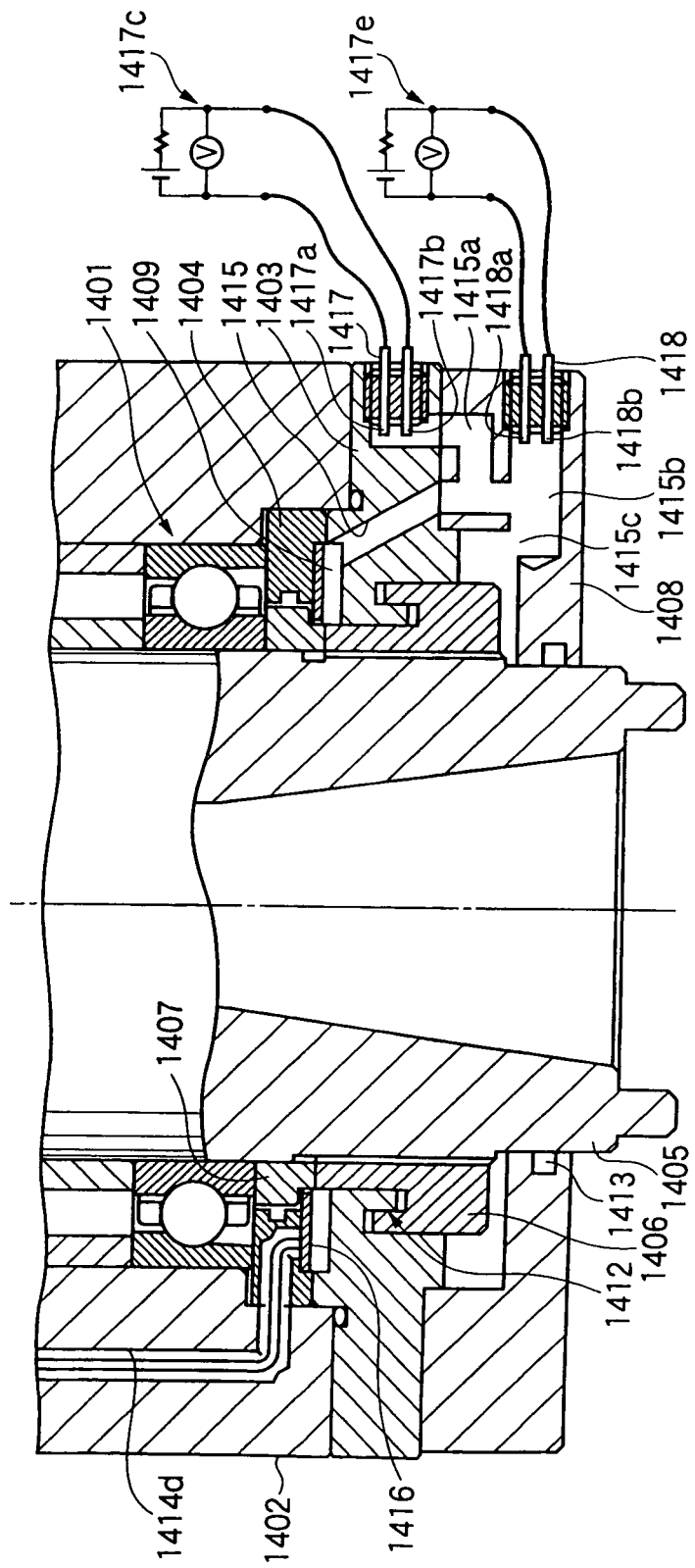
FIG. 95 is a sectional view showing a pertinent portion of a fifty-first embodiment of a spindle unit according to the present invention.

A fifty-first embodiment shown in FIG. 95 gives a vertically-provided type spindle unit that has three cutting fluid sensors.

In this spindle unit, a drain hole 1415 is formed in the front lid 1403 and the cover 1408 to communicate with each other. One end of this drain hole 1415 is opened on the bottom portion of the annular space 1409. The other end of the drain hole 1415 is branched into an upper drain hole 1415a, a lower drain hole 1415b, and a drain hole 1415c that is opened to the inner side of the cover 1408.

Also, a first cutting fluid sensor 1416 similar to that shown in the fiftieth embodiment is attached to a surface of the outer ring spacer 1404 on the annular space 1409 side. Also, a second cutting fluid sensor 1417 is provided in the upper drain hole 1415a at a height that corresponds to the labyrinth seal 1412, while a third cutting fluid sensor 1418 is provided in the lower drain hole 1415b at a height that corresponds to the oil seal 1413.

The second and third cutting fluid sensors 1417, 1418 have two electrode 1417a, 1417b, 1418a, 1418b respectively. Sensor portions 1417c, 1418c sense the cutting fluid based on a change of the voltage caused when these electrodes are electrically connected by the cutting fluid In the spindle unit in the fifty-first embodiment, when the cutting fluid that enters into the cover 1408 via the labyrinth 1413 flows into the cutting fluid sensor 1418 via the drain hole 1415c, the entering of the cutting fluid is sensed by the sensor.

Then, when the cutting fluid comes up to a height of the labyrinth 1412, such cutting fluid flows into the drain hole 1415 and then is sensed by the cutting fluid sensor 1417.

Then, when the cutting fluid reaches the annular space 1409, such cutting fluid is sensed by the cutting fluid sensor 1416.

Therefore, according to the fifty-first embodiment, a degree of entering of the cutting fluid can be sensed and therefore the spindle unit can be controlled correspondingly.

For example, when the sensor 1418 senses the cutting fluid, the alarm calls upon the operator to take the measure such as adjustment of the cutting fluid using conditions or the cutting fluid injection nozzle, and thus the further entering can be prevented. When the sensor 1417 senses the cutting fluid, the degradation of the lubricating performance can be prevented by supplying the new lubricant to the bearing 1. When the sensor 1416 senses the cutting fluid, the seizure of the bearing can be prevented beforehand by restricting the running conditions of the spindle unit or stopping forcedly the running of the spindle unit.

Fifty-Second Embodiment

Figure 96:
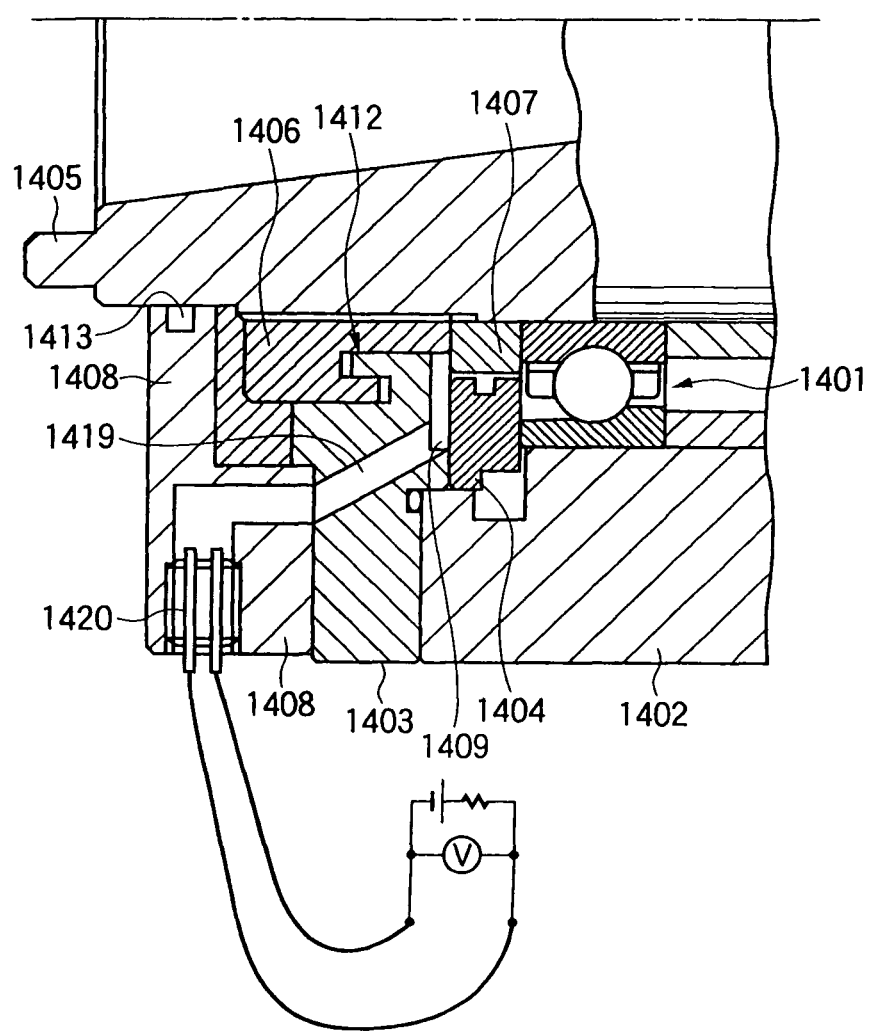
FIG. 96 is a sectional view showing a pertinent portion of a fifty-second embodiment of a spindle unit according to the present invention.

In a fifty-second embodiment shown in FIG. 96, like the fifty-first embodiment, a drain hole 1419 is formed in the front lid 1403 and the cover 1408 to communicate with each other. An upper end of the drain hole 1419 is opened to the annular space 1409, and a cutting fluid sensor 1420 that is similar to the second cutting fluid sensor in the fifty-first embodiment is provided to the other end thereof.

In a spindle unit in the fifty-second embodiment, the cutting fluid that enters into the annular space 1409 via the labyrinth 1413 and the labyrinth seal 1412 comes up to the cutting fluid sensor 1420 via the drain hole 1419. Then, the sensor senses the entering of this cutting fluid.

According to this embodiment, this spindle unit is effective in the situation that the sensor cannot be arranged around the bearing 1401.

Fifty-Third Embodiment

Figure 97:
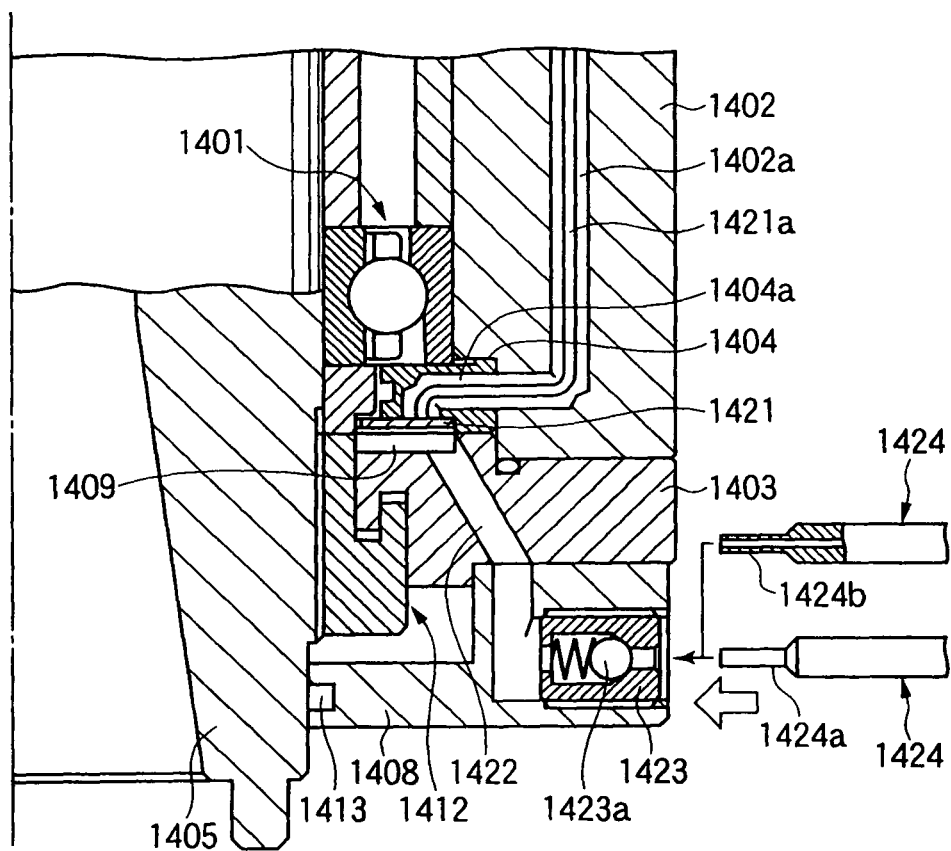
FIG. 97 is a sectional view showing a pertinent portion of a fifty-third embodiment of a spindle unit according to the present invention.

In a fifty-third embodiment shown in FIG. 97, a cutting fluid sensor 1421 that is similar to that in the fiftieth embodiment is pasted onto a surface of the outer ring spacer 1404 on the annular space 1409 side, the holes 1404a, 1402a are formed in the outer ring spacer 1404 and the housing main body 1402 respectively, and wirings 1421a are put into these holes.

In this embodiment, a drain hole 1422 is formed in the front lid 1403 and the cover 1408 to communicate with each other, and one end of the drain hole is opened on the bottom portion of the annular space 1409. Then, an exhaust valve 1423 is provided to the other end of the drain hole 1422. The check valve is employed as this exhaust valve 1423. This exhaust valve 1423 is opened by pushing a ball 1423a, and has a pushing tool 1424 to push in the ball 1423a. This pushing tool 1424 has a rod-like projection 1424a at its top end. Also, this pushing tool 1424 may have a suction path 1424b in its inside.

In a spindle unit in the fifty-third embodiment, the cutting fluid that enters into the annular space 1409 via the labyrinth 1413 and the labyrinth seal 1412 flows in the exhaust valve 1423 via the drain hole 1422. In the case of this embodiment, the cutting fluid is reserved in the drain hole 1422, and then such cutting fluid is sensed by the cutting fluid sensor 1421 when the cutting fluid reaches the annular space 1409. Since the drain hole 1422 is closed by a check valve mechanism of the exhaust valve 1423 up to that time, the cutting fluid never enters from the drain hole 1422. When the cutting fluid is sensed by the cutting fluid sensor 1421, the ball 1423a in the exhaust valve 1423 is pushed inward by the projection 1424a of the pushing tool 1424 to open the exhaust valve 1423 and therefore the cutting fluid in the drain hole 1422 can be exhausted to the outside.

In this case, if the cutting fluid in the drain hole 1422 is sucked by using the pushing tool 1424 having the suction path 1424b, the cutting fluid a viscosity of which is increased can also be exhausted surely.

Also, if the pushing tool 1424 is fixed in a movable range of the spindle, a moving mechanism of the feed shaft can be employed and therefore the automation can be achieved at a low cost. Also, if the presence of the pushing tool 1424 in the movable range is not good for the operation, the pushing tool 1424 may be operated by the actuator.

Fifty-Fourth Embodiment

Figure 98:
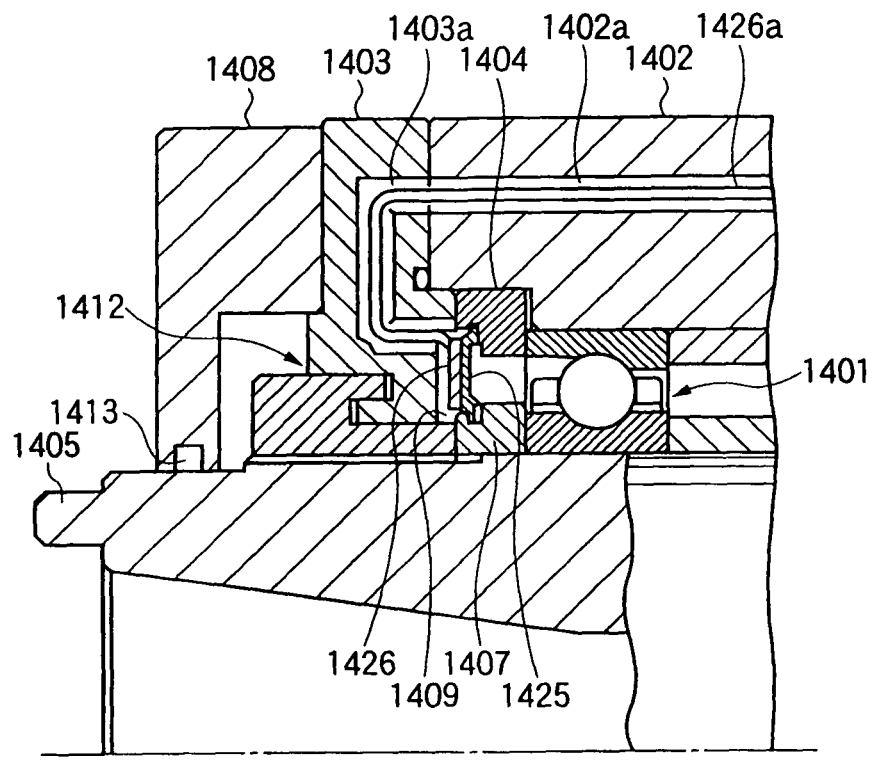
FIG. 98 is a sectional view showing a pertinent portion of a fifty-fourth embodiment of a spindle unit according to the present invention.

In a fifty-fourth embodiment shown in FIG. 98, a bearing seal 1425 is arranged between the outer ring spacer 1404 and the inner ring spacer 1407, and then a cutting fluid sensor 1426 that is similar to that in the fiftieth embodiment is fitted onto the bearing seal 1425 on the annular space 1409 side. Also, in this embodiment, holes 1403a, 1402a are formed in the front lid 1403 and the housing main body 1402 respectively and then a piping 1426a is inserted into these holes.

In a spindle unit in the fifty-fourth embodiment, like the fiftieth embodiment, the cutting fluid that enters into the inside via the labyrinth 1413 and the labyrinth seal 1412 is sensed by the cutting fluid sensor 1426.

In the case of the spindle unit in the fifty-fourth embodiment, the entering of the foreign matter into the bearing 1401 can be prevented by the bearing seal 1425 and also the leakage of the lubricant from the bearing can be prevented. Further, the sensor that is compact and has a good fitting ability can be provided as the bearing seal with the sensor.

Fifty-Fifth Embodiment

Figure 99:
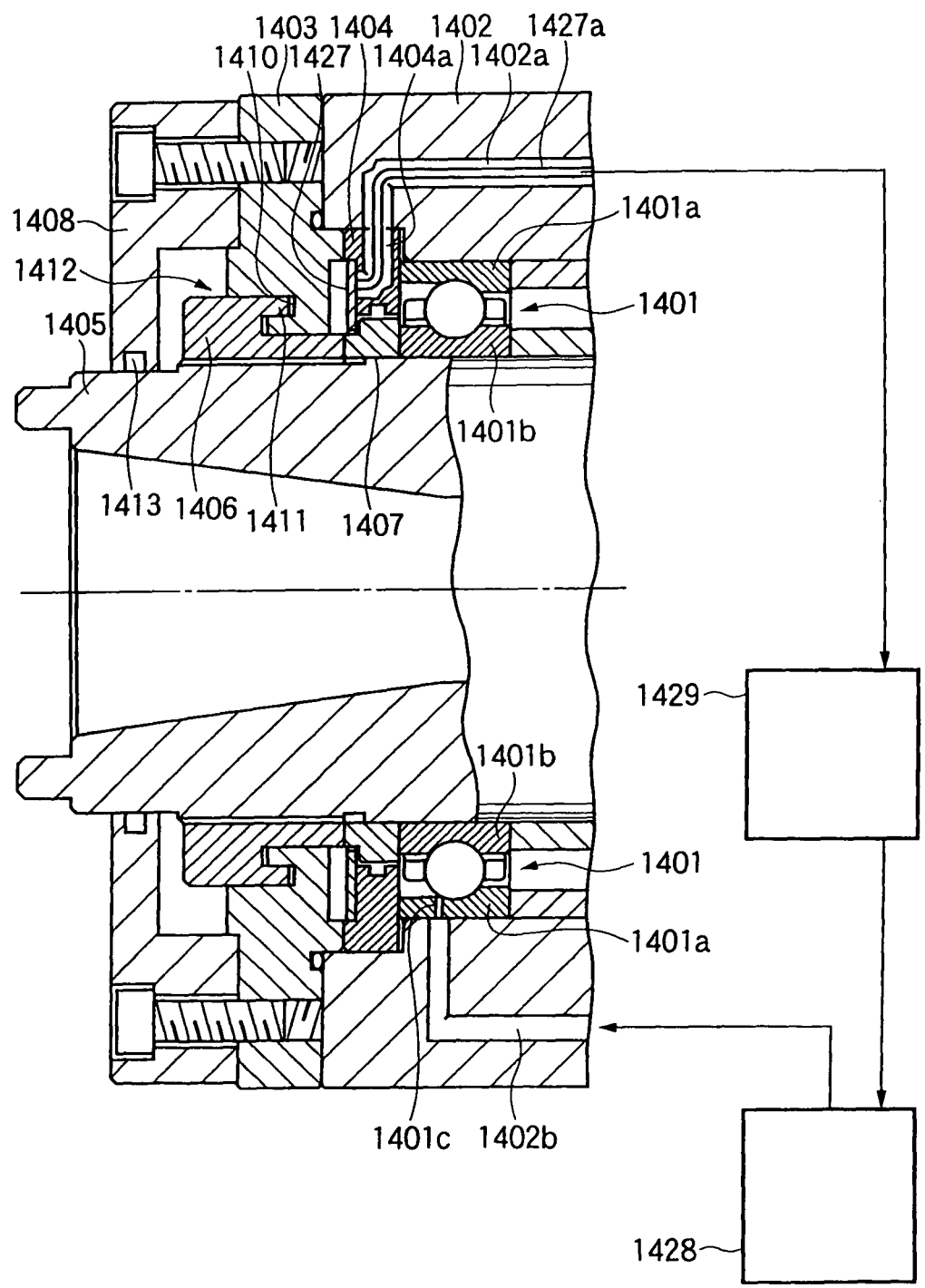
FIG. 99 is a sectional view showing a pertinent portion of a fifty-fifth embodiment of a spindle unit according to the present invention.

A fifty-fifth embodiment shown in FIG. 99 shows a spindle unit that has a function of supplying the lubricant to the bearing 1401 in response to a signal of the cutting fluid sensor.

In this embodiment, like the fiftieth embodiment, a cutting fluid sensor 1427 is fitted to a surface of the outer ring spacer 1404 on the annular space 1412 side, the holes 1404a, 1402a are formed in the outer ring spacer 1404 and the housing main body 1402 respectively, and then a wiring 1427a is inserted into these holes.

Also, in this embodiment, a grease supply hole 1401c is formed in the outer ring 1401a of the bearing 1401, and the grease supply hole is connected to a lubricant supply system 1428 via the hole 1402b formed in the housing main body 1402.

Then, the lubricant supply system 1428 is controlled by a control unit 1429 based on a signal of the cutting fluid sensor 1427.

In the spindle unit in the fifty-fifth embodiment, like the fiftieth embodiment, the cutting fluid that enters into the inside via the labyrinth 1413 and the labyrinth seal 1412 is sensed by the cutting fluid sensor 1427. Then, when the cutting fluid is sensed by the sensor 1427, a lubricant supply command is fed from the control unit 1429 to the lubricant supply system 1428 and then the lubricant is pressure-fed to the bearing 1401 from the lubricant supply system.

In particular, in the case of the grease-sealed type spindle unit, the lubrication performance is deteriorated remarkably once the cutting fluid enters into the bearing, and thus the seizure of the bearing is liable to occur. In addition, if a cutting fluid sensing function is not provided, it is impossible to repair the bearing prior to the seizure.

In the case of the spindle unit in this embodiment, since the lubricant supply system 1428 is provided, the grease-lubrication type spindle unit with high reliability can be obtained by using it together with the cutting fluid sensor 1427.

Figure 100:
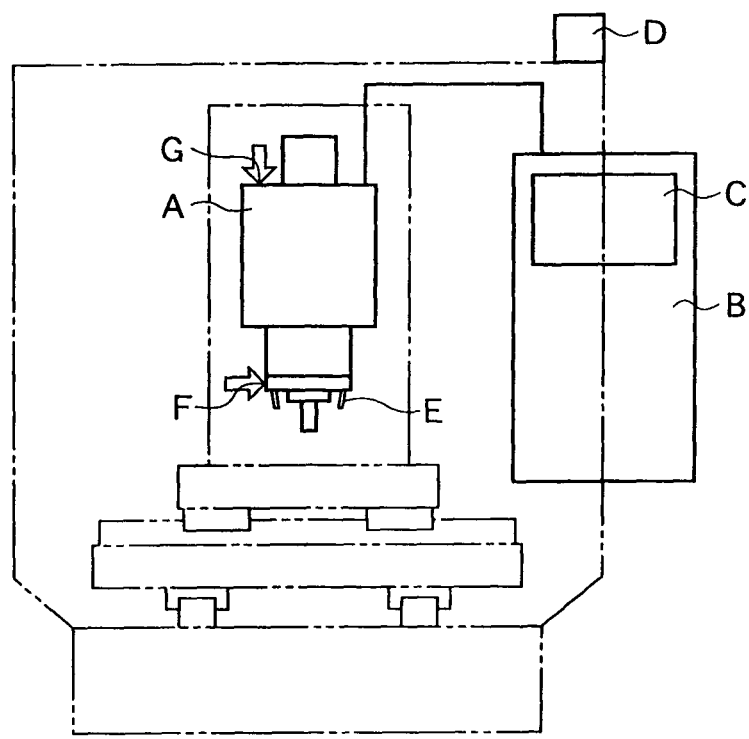
FIG. 100 is a view showing a control system of the machine tool having the spindle unit of the present invention.

FIG. 100 shows a control system of the machine tool having a spindle unit A of the present invention.

In this machine tool, when the presence of the cutting fluid is sensed by the cutting fluid sensor in the spindle unit A, a signal is input into a control unit B, and then a warning message is displayed on a monitor C attached to the control unit B or a warning lamp D is turned ON at the same time. The operator who knows this warning message operates an operation panel of the control unit B to adjust a flow rate or a pressure of the cutting fluid, change a direction of a cutting fluid injection nozzle E, or the like, so that the operator can prevent the further entering of the cutting fluid.

Also, the cutting fluid can be exhausted to the outside from an exhaust valve (valve 1423 in FIG. 97) F provided to the spindle unit A. In addition, the new lubricant can be supplied from a lubricant supply hole (the lubricant supply hole 1402b in FIG. 99) G.

Figure 101:
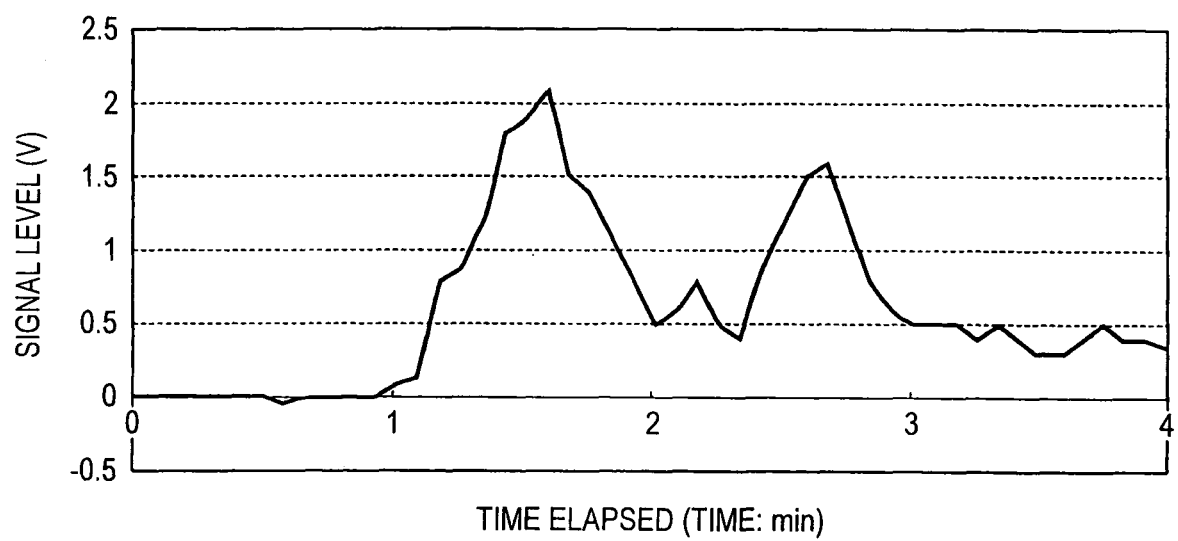
FIG. 101 is a graph in which an output signal of a cutting fluid sensor is measured in a time series.

FIG. 101 shows the results that were obtained by measuring the sensor signal in a time series while the cutting fluid was poured actually on the spindle unit having the cutting fluid sensor. Since a voltage that raised from 0 volt to 2 volt at a point of time when the cutting fluid entered could be sensed, the effect of the sensor could be confirmed.

As explained above, according to the spindle unit of the fiftieth to fifty-fifth embodiments, the entering of the cutting fluid into the inside of the spindle unit can be sensed before the cutting fluid enters into the inside of the bearing. Thus, the lubricating performance of the spindle bearing can be maintained stably for a long time not to stop the operation of the machine for a long time.

According to the spindle unit of the above embodiment, the cutting fluid that enters into the seal portion can be sensed before such cutting fluid enters into the inside of the bearing. Also, such a problem has arisen that the rotary joint is damaged by the through coolant used recently and then the cutting fluid enters into the inside of the spindle unit. Therefore, the sensor for sensing the leakage was attached in some case, nevertheless it was difficult to deal with the entering of the cutting fluid after the sensor sensed such entering of the cutting fluid. In the present case, since the lubricant is supplied to the bearing after the entering of the cutting fluid is sensed, the damage of the bearing caused when the lubricant is rinsed out in the prior art can be prevented and also it is feasible to avoid the situation that the spindle unit cannot be used although the damaged parts must be repaired. In particular, the present embodiment is effective in the case where the spindle unit is lubricated with the grease.

Next, fifty-sixth to sixty-third embodiments of the present invention will be explained with reference to the drawings hereunder. The embodiments explained hereunder are used preferably to support the machine tool spindle unit or the AC servo motor spindle unit.

Fifty-Sixth Embodiment

Figure 102:
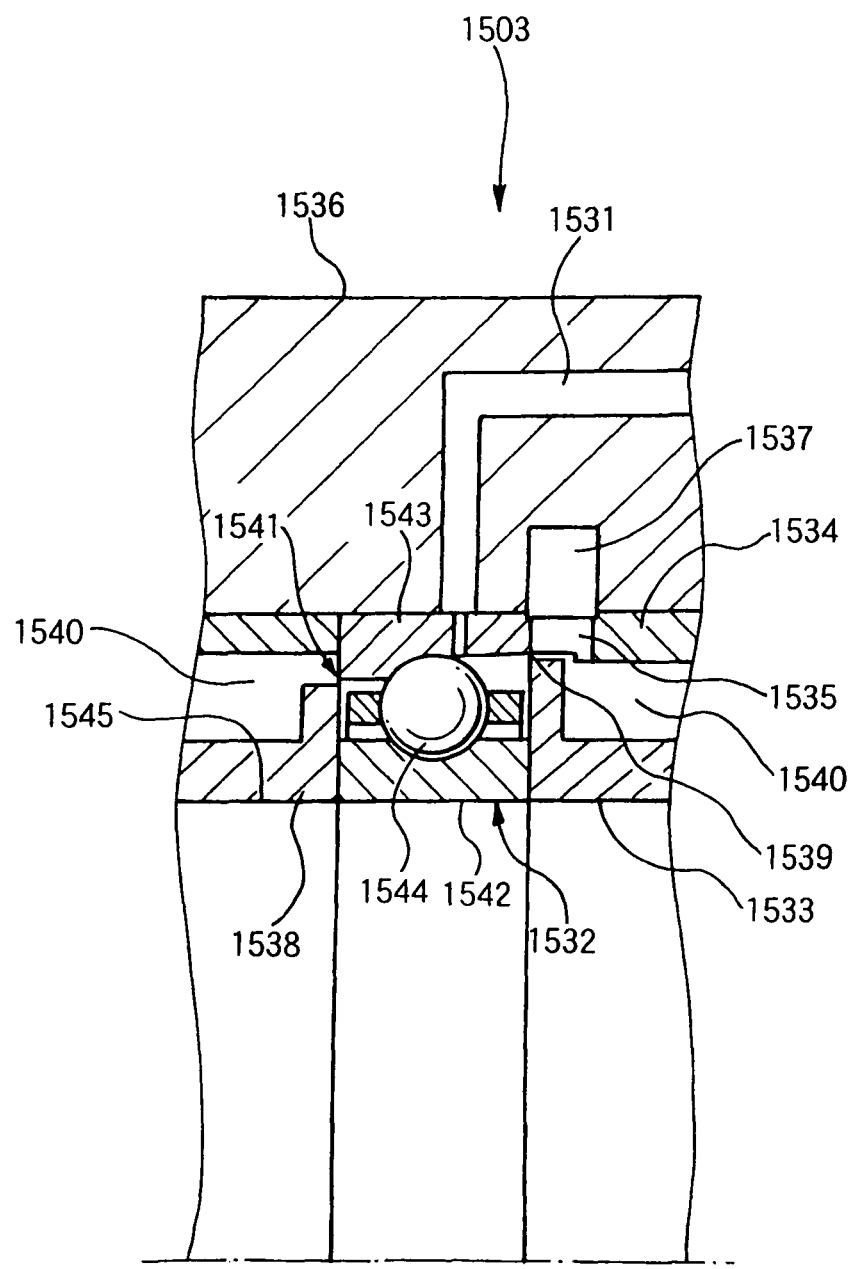
FIG. 102 is a sectional view showing a fifty-sixth embodiment of the present invention.

FIG. 102 shows an angular contact ball bearing unit 1503 constituting a spindle unit having an angular contact ball bearing in a fifty-sixth embodiment to which the present invention is applied. The angular contact ball bearing unit 1503 includes an angular contact ball bearing 1532, exhaust spacers 1533, 1538 arranged on the side of the angular contact ball bearing 1532 in vicinity of inner and outer rings 1542, 1543 and serving as rolling elements, a rotating shaft 1545, and a housing 1536 for supporting the angular contact ball bearing 1532.

Also, the angular contact ball bearing unit 1503 includes an outer ring spacer 1534, notches 1535 formed in the end portion of the outer ring spacer 1534, and a lubricant storage space 1537 formed in the housing 1536 on the outer peripheral side of the notches 1535.

Figure 103:
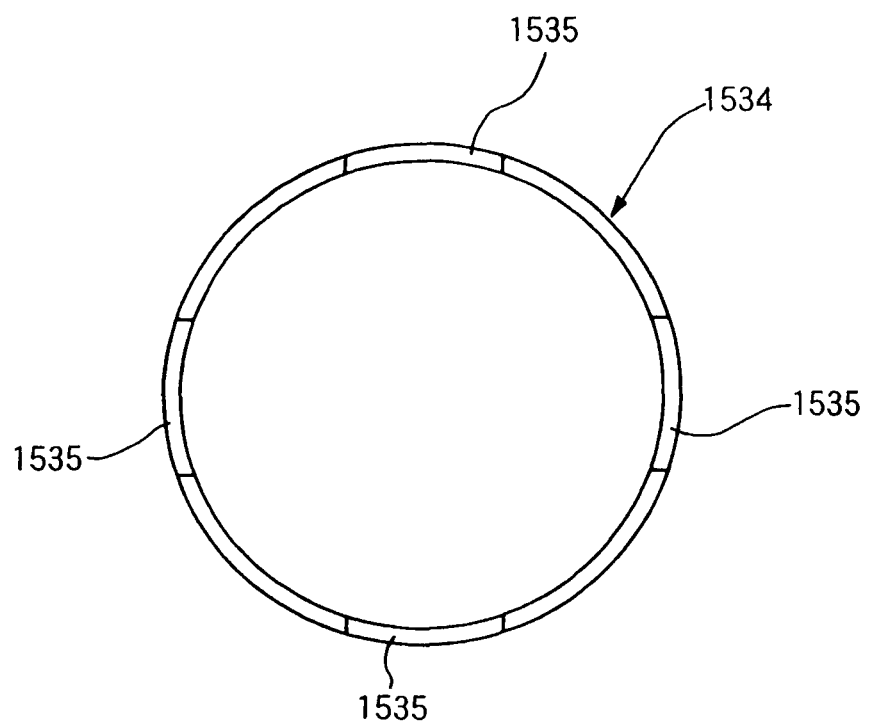
FIG. 103 is a view showing notches of an outer ring spacer of the fifty-sixth embodiment of the present invention.
Figure 103:
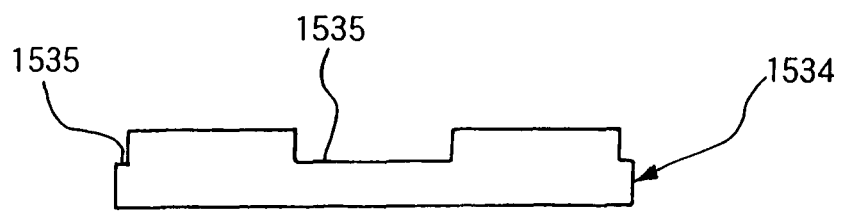

As shown in FIG. 103, the notch 1535 is formed radially in plural in the outer ring spacer 1534. An exhaust efficiency of the lubricant can be improved by providing a plurality of notches 1535 radially in this manner.

In FIG. 102, a clearance 1539 is formed between the angular contact ball bearing 1532 and the outer ring spacer 1534. Also, a lubricant supply path 1531 for supplying the lubricant from the outside to the inside of the angular contact ball bearing 1532 is formed in the housing 1536. Also, a lubricant storage space 1540 is formed on the side of the exhaust spacers 1533, 1538.

In this angular contact ball bearing unit 1503, the lubricant fed from the outside is supplied to the inside of the angular contact ball bearing 1532 via the lubricant supply path 1531 and then stored in the inside of the angular contact ball bearing 1532.

When the lubricant stored in the angular contact ball bearing 1532 comes into contact with the exhaust spacers 1533, 1538, such lubricant is sprung out to the outside of the angular contact ball bearing 1532 by a rotating force of the exhaust spacers 1533, 1538.

The lubricant that was sprung out by the exhaust spacer 1533 passes through the notches 1535 provided in the outer ring spacer 1534, then enters into the lubricant storage space 1537 provided in the housing 1536, and then is stored therein.

The lubricant that could not pass through the notches 1535 passes through the clearance 1539 formed between the angular contact ball bearing 1532 and the exhaust spacer 1533 and then is stored in the lubricant storage space 1540 formed between the exhaust spacer 1533 and the outer ring spacer 1534.

The lubricant storage space 1537 is a space provided in the inner diameter of the housing 1536 like a groove. The lubricant storage space 1537 and the lubricant storage space 1540 can store in total the lubricant to 20000 hours, which is supposed as the common lifetime of the lubricant for use in the machine tool spindle.

Normally, a space volume that is required to store the lubricant to 20000 hours is almost 33 cc in the case where a discharge quantity of lubricant in one shot is set to 0.02 cc and a discharge interval is set to 12 hours. In the present invention, a total volume of both lubricant storage spaces 1537, 1540 is 34 cc.

In FIG. 102, when the rotating shaft 1545 is running at a high speed, the air in the angular contact ball bearing 1532 flows from the left side to the right side in FIG. 102 because of the influence of an axis of rotation of a ball 1544. Therefore, the lubricant is mainly exhausted to the right side of the angular contact ball bearing 1532 and thus an exhausting efficiency can be improved if the clearance 1539 is set to 0.2 to 0.5 mm.

Since the exhaust spacer 1538 on the left side in FIG. 102 is essentially hard to exhaust the lubricant, a clearance 1541 may be formed larger than the clearance 1539. Also, even if no lubricant storage space is provided to the outer periphery of the housing 1536, the lubricant can be exhausted.

In this manner, in the angular contact ball bearing unit 1503 of the present invention, the lubricant filled in the inside of the angular contact ball bearing 1532 adheres onto the exhaust spacers 1533, 1538, which are formed as the rolling elements and arranged in vicinity of the angular contact ball bearing 1532. Then, since the exhaust spacers 1533, 1538 are rotated together with the rotating shaft 1545, the lubricant adhered onto the exhaust spacers 1533, 1538 is sprung out to the outside of the bearing by a rotating force. Therefore, the lubricant is exhausted forcedly and continuously to the outside of the bearing.

The present embodiment is effective for both the grease and the oil as the lubricant, and has an action of suppressing the heat generation by reducing the churning resistance of the lubricant.

In addition, the lubricant storage space 1537 for storing the exhausted lubricant is provided in the housing 1536 in the outer circumferential direction of the exhaust spacer 1533. Therefore, the lubricant that was sprung out by the exhaust spacer 1533 can easily enter into the lubricant storage space 1537 and also the storage space volume can be increased.

Also, since a magnitude of the rotating force to spring out the lubricant is changed in response to the number of revolution of the rotating shaft 1545, a supply amount of lubricant can be reduced. Also, an exhaust amount of lubricant can also be suppressed in the low speed running and thus the appropriate lubricant supply that is adapted to the number of revolution can be carried out.

Fifty-Seventh Embodiment

Figure 104:
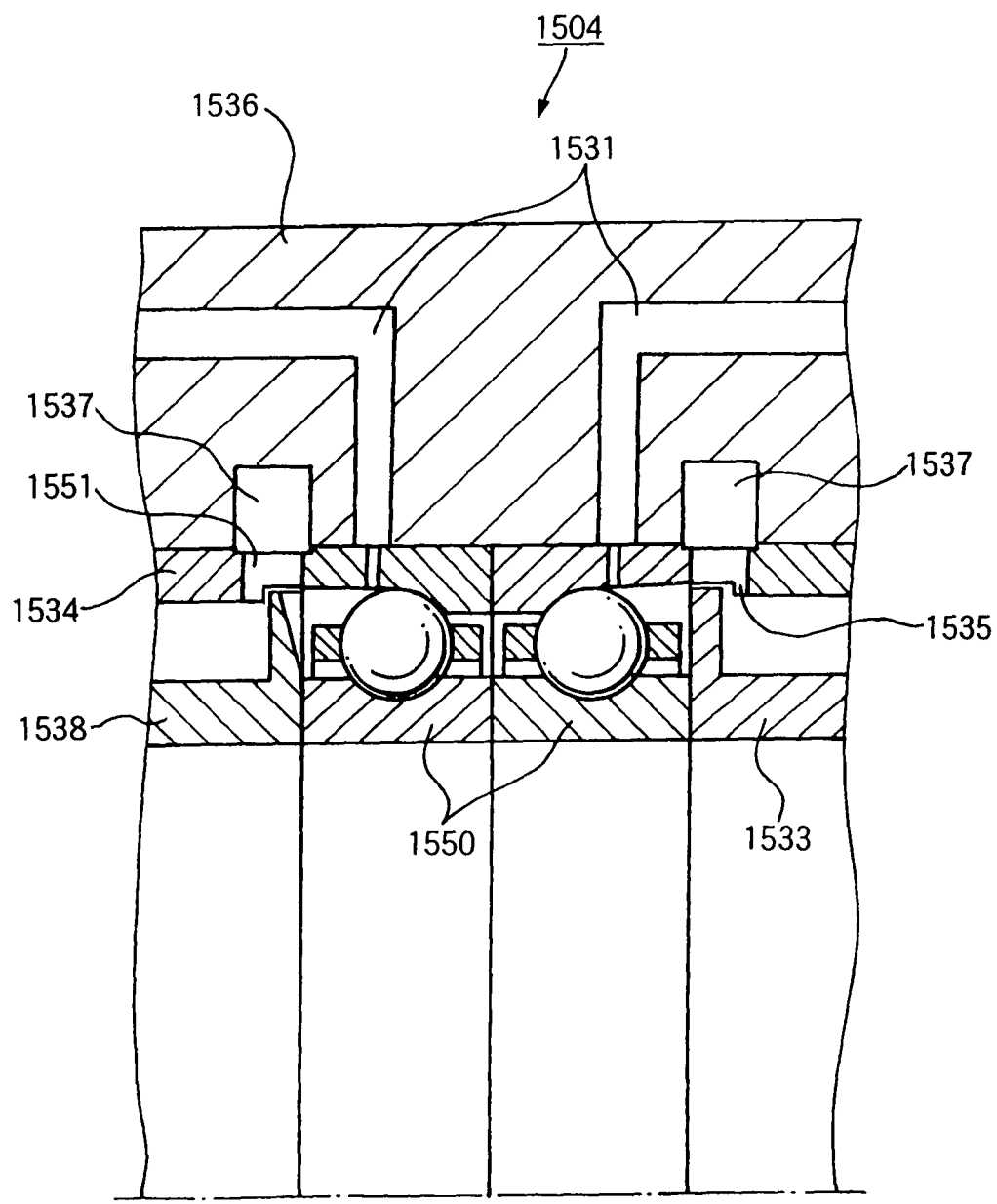
FIG. 104 is a sectional view showing a fifty-seventh embodiment of the present invention.

FIG. 104 shows an angular contact ball bearing unit 1504 constituting a spindle unit in a fifty-seventh embodiment of the present invention. In this case, in respective embodiment given in the following, the same references are affixed to the same portions as those in FIG. 102 and their detailed explanation will be omitted herein.

In this angular contact ball bearing unit 1504, angular contact ball bearings 1550 are fitted in a back-to-back arrangement style. Also, spaces via which the lubricant passes through the outer ring spacer 1534 on the left side of FIG. 4 are formed as holes 1551.

Figure 105:
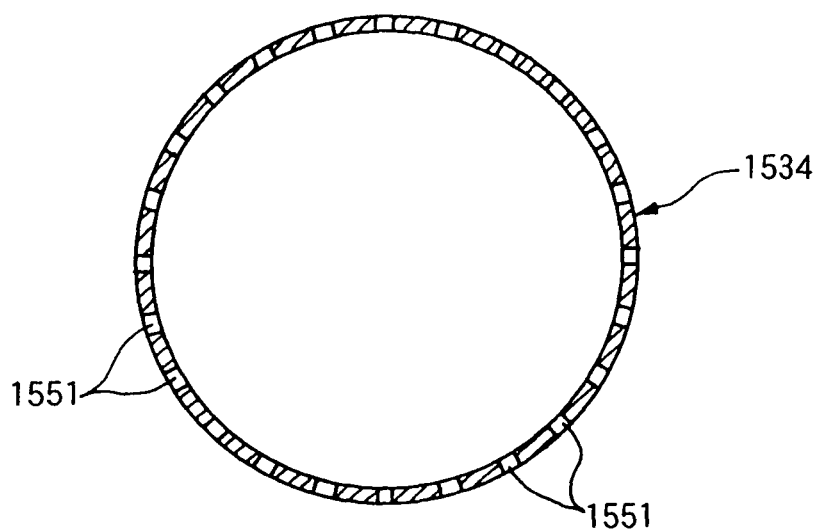
FIG. 105 is a view showing holes through which the lubricant in the fifty-seventh embodiment of the present invention is passed.
Figure 105:
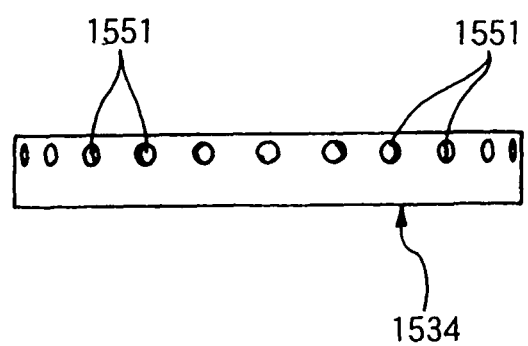

As shown in FIGS. 105(a)(b), the hole 1551 is provided in the outer ring spacer 1534 radially at plural locations. Accordingly, the lubricant can be exhausted effectively.

This angular contact ball bearing unit 1504 can achieve the similar advantages/effects to those of the angular contact ball bearing unit 1503 in the fifty-sixth embodiment.

Fifty-Eighth Embodiment

Figure 106:
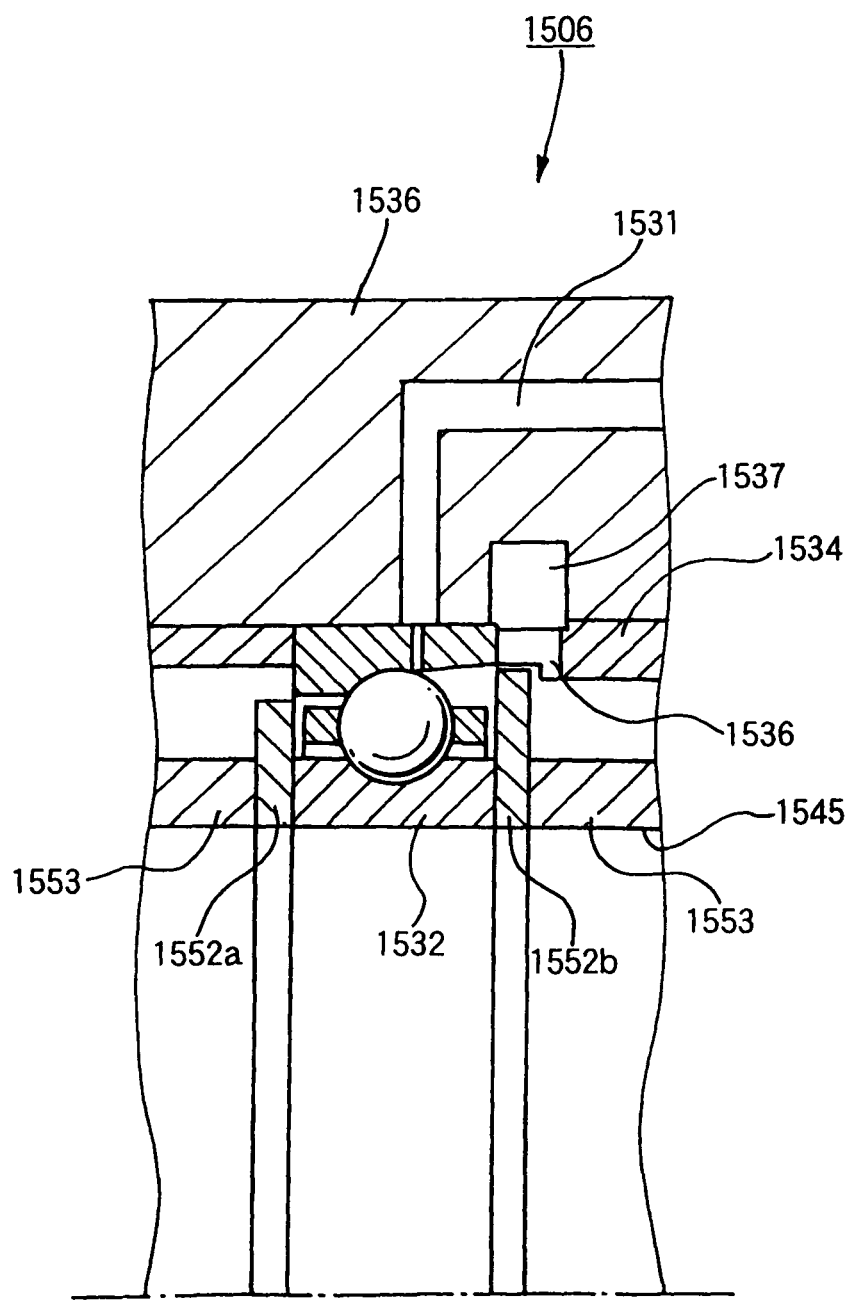
FIG. 106 is a sectional view showing a fifty-eighth embodiment of the present invention.

FIG. 106 shows an angular contact ball bearing unit 1506 constituting a spindle unit in a fifty-eighth embodiment to which the present invention is applied.

In this angular contact ball bearing unit 1506, exhaust spacers 1552a, 1552b are formed of the separate member that is different from an inner ring spacer 1553. In this case, the exhaust spacers 1552a, 1552b can be formed of the minimum material and a low cost can be attained.

Fifty-Ninth Embodiment

Figure 107:
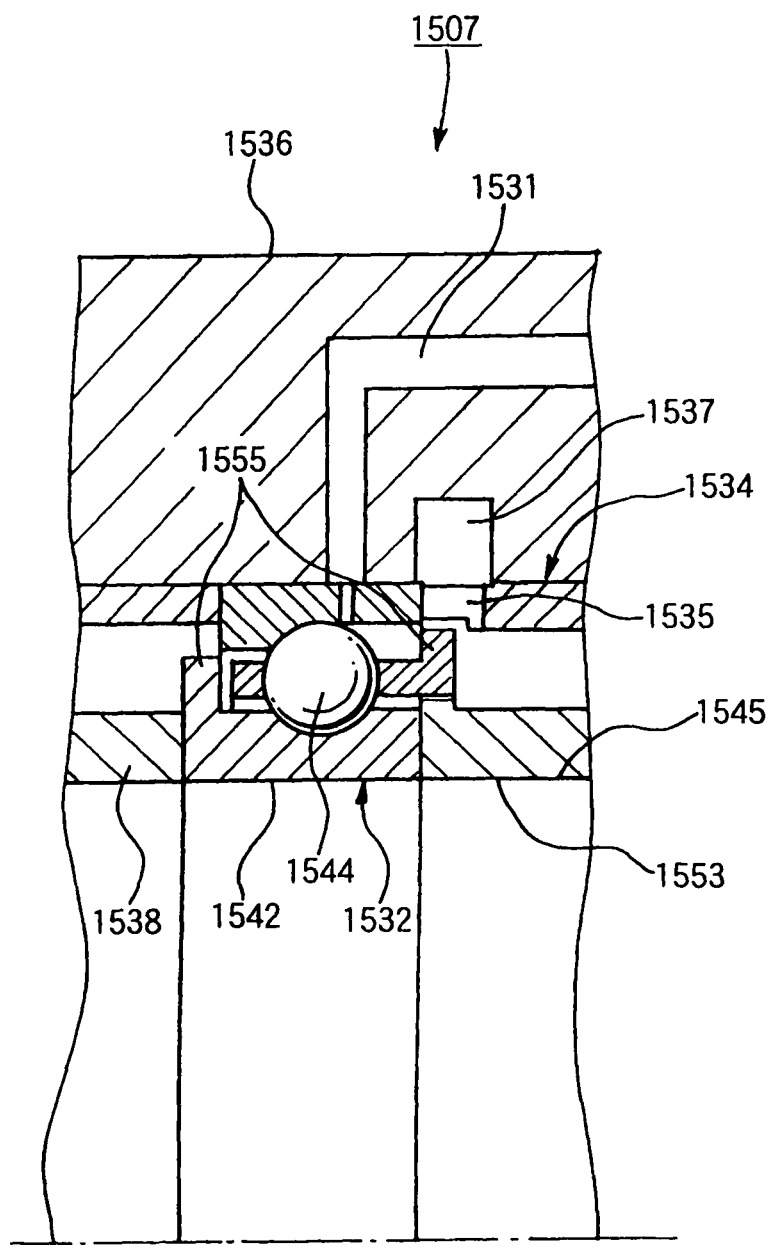
FIG. 107 is a sectional view showing a fifty-ninth embodiment of the present invention.

FIG. 107 shows an angular contact ball bearing unit 1507 constituting a spindle unit in a fifty-ninth embodiment to which the present invention is applied.

In this angular contact ball bearing unit 1507, exhaust collars 1555 are provided to the inner ring 1542 of the bearing 1532 and a cage 1554, in place of the exhaust spacer 1533 in FIG. 2.

In the angular contact ball bearing unit 1507, a design for a shape of the inner ring spacer 1553 is not affected at all.

Sixtieth Embodiment

Figure 108:
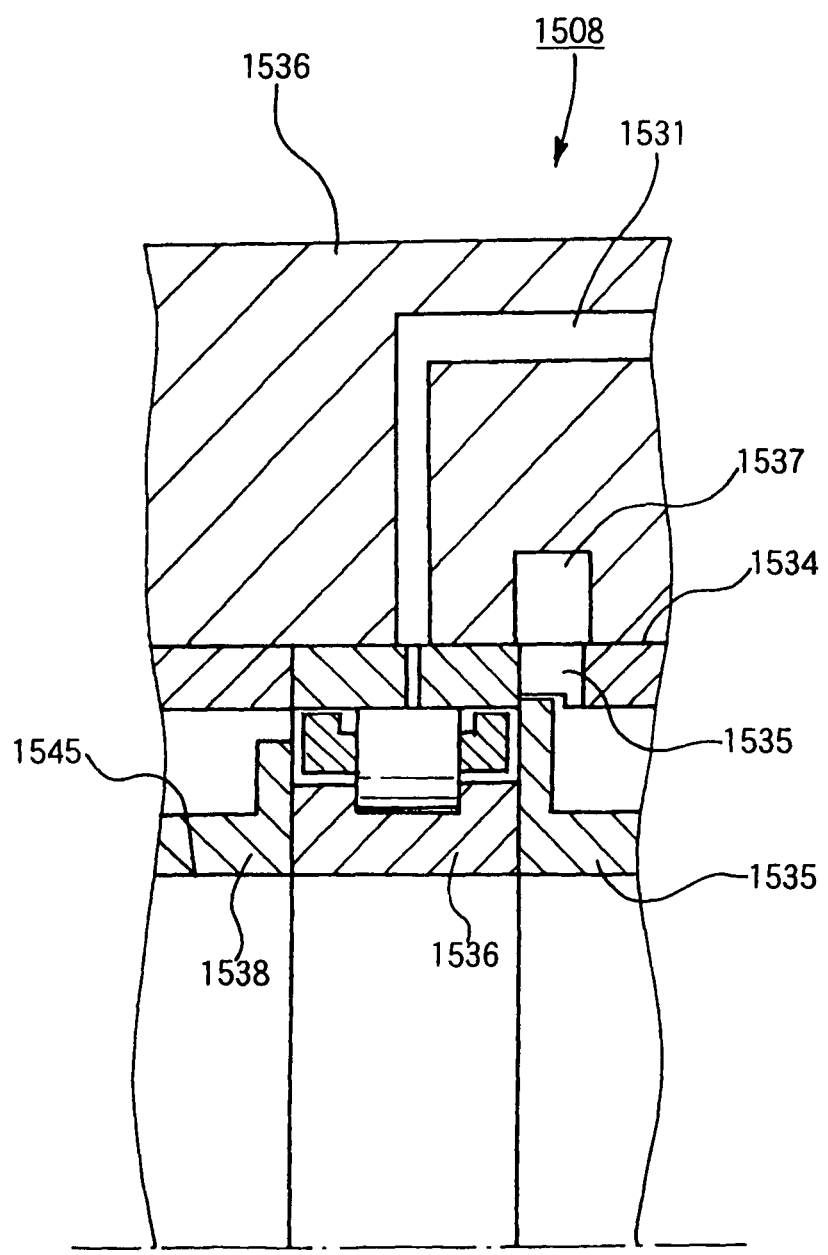
FIG. 108 is a sectional view showing a sixtieth embodiment of the present invention.

FIG. 108 shows a roller bearing unit 1508 constituting a spindle unit in a sixtieth embodiment to which the present invention is applied.

In this roller bearing unit 1508, a roller bearing 1566 is used instead of the angular contact ball bearing 32 in the angular contact ball bearing unit 1503 shown in FIG. 1. This roller bearing unit 1508 can also achieve the similar advantages/effects to those of the angular contact ball bearing unit 1503 shown in FIG. 102.

Sixty-First Embodiment

Figure 109:
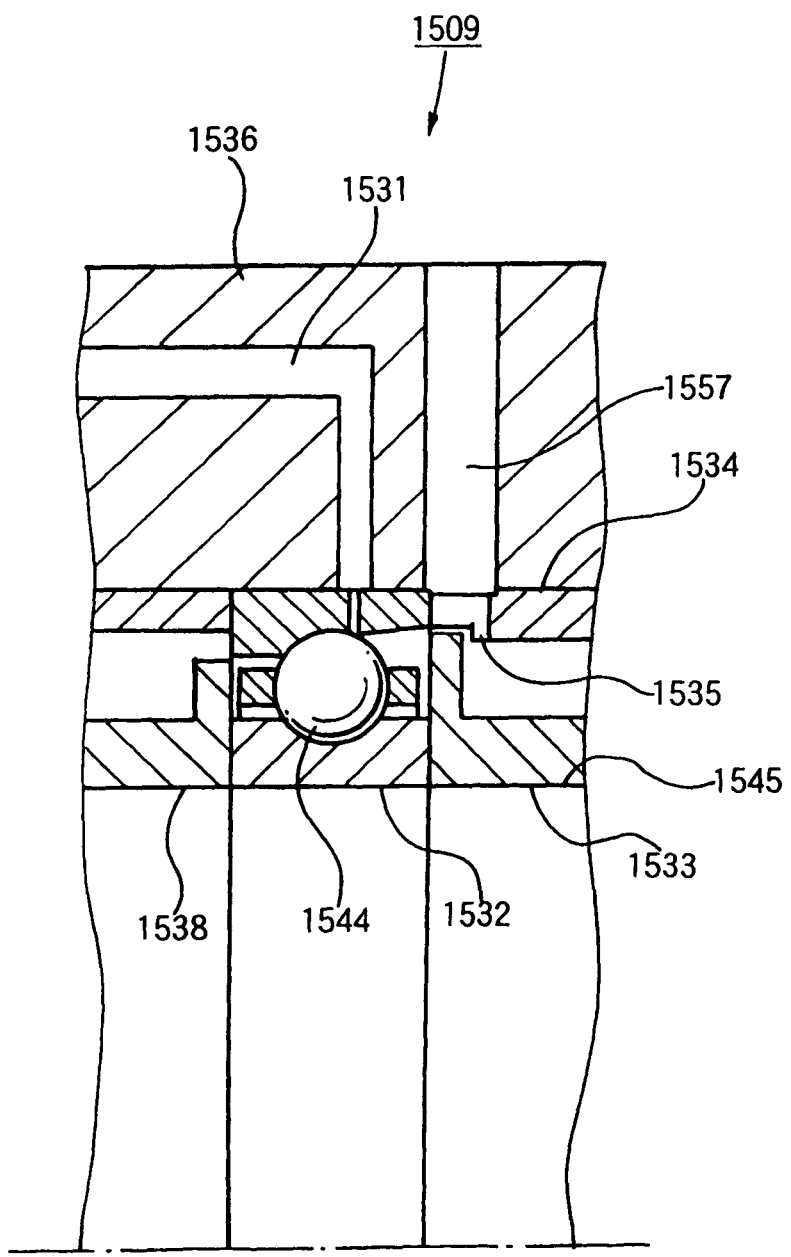
FIG. 109 is a sectional view showing a sixty-first embodiment of the present invention.

FIG. 109 shows an angular contact ball bearing unit 1509 constituting a spindle unit in a sixty-first embodiment to which the present invention is applied. In this angular contact ball bearing unit 1509, lubricant storage holes 1557 are provided in lieu of the lubricant storage space 1537 in FIG. 102.

The lubricant storage hole 1557 is provided in plural radially. Accordingly, the space having a size enough to store the lubricant can be obtained.

Sixty-Second Embodiment

Figure 110:
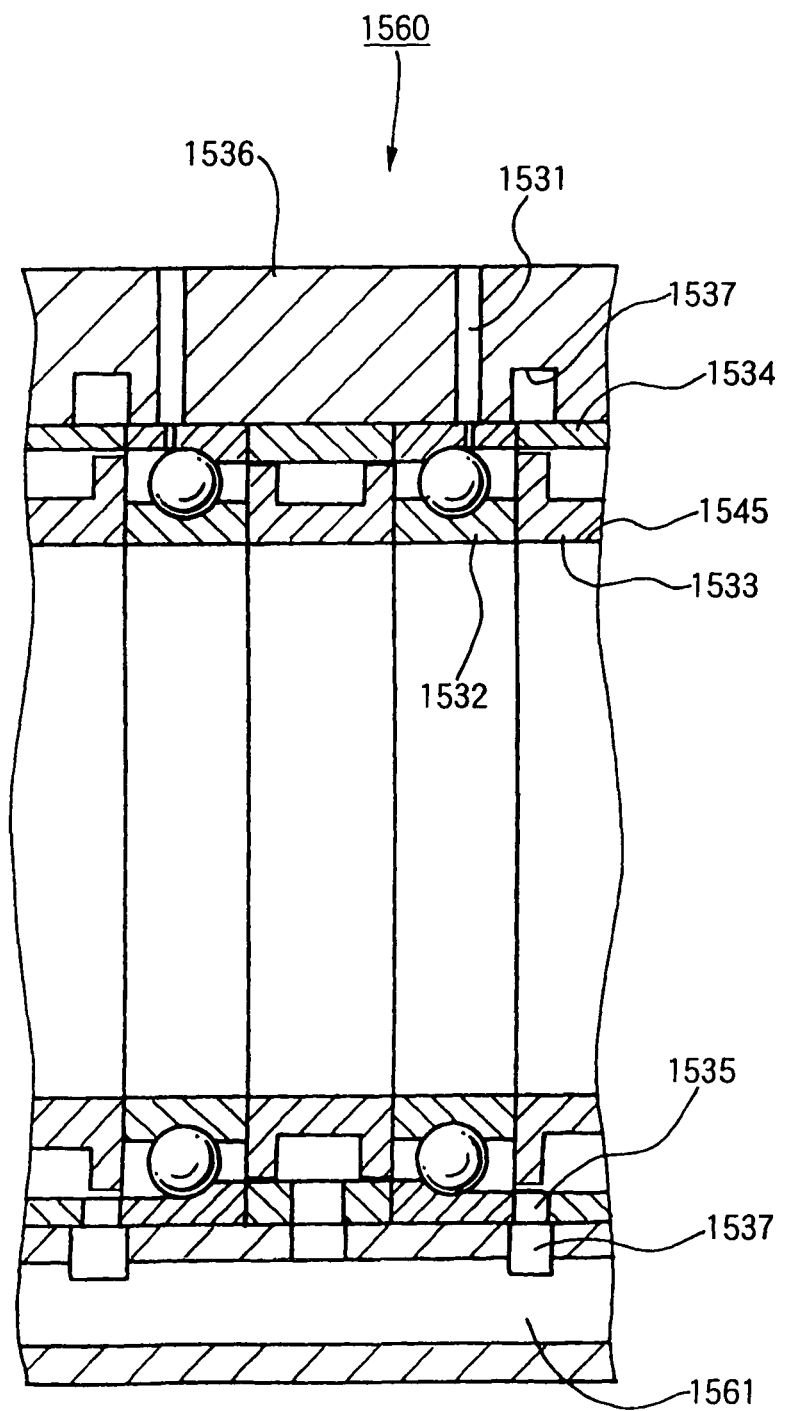
FIG. 110 is a sectional view showing a sixty-second embodiment of the present invention.

FIG. 110 shows a bearing unit 1560 constituting a spindle unit in a sixty-second embodiment to which the present invention is applied. In this bearing unit 1560, the lubricant stored in the lubricant storage spaces 1537 in the housing 1536 flows into exhaust holes 1561 that are communicated with the lubricant storage spaces 1537 and is stored therein.

The exhaust hole 1561 is provided in plural on the circumference, and a volume of the lubricant storage space 1537 can be set largely.

In case the rotating shaft 1545 is provided horizontally, the exhaust hole 1561 is provided in plural on the circumference. Therefore, no matter how the housing 1536 is arranged in phase, the exhaust hole 1561 can be positioned lower than the lubricant storage spaces 1537. Such an advantage can be achieved that design and fitting operations can be facilitated.

Sixty-Third Embodiment

Figure 111:
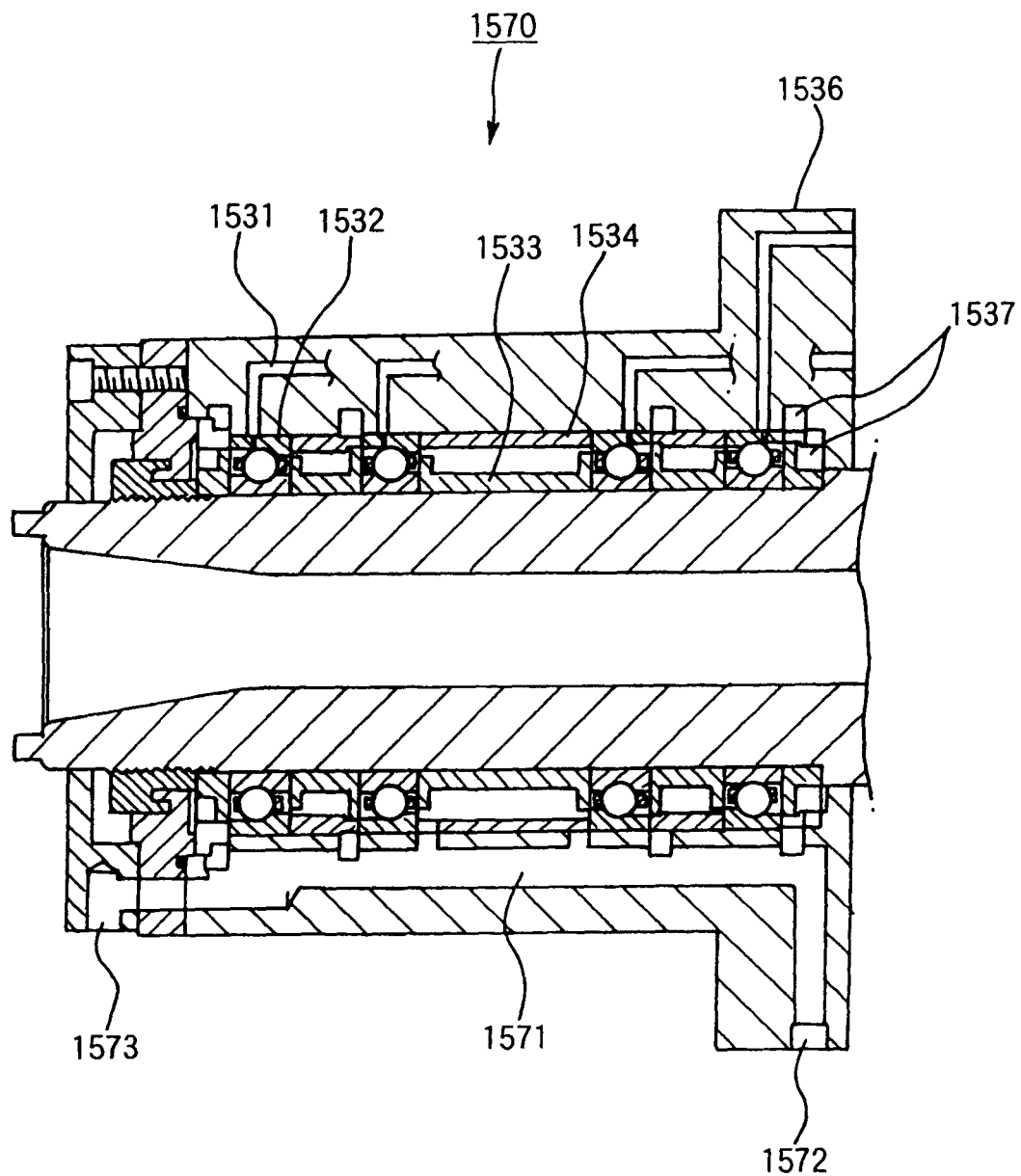
FIG. 111 is a sectional view showing a sixty-third embodiment of the present invention.
Figure 113:
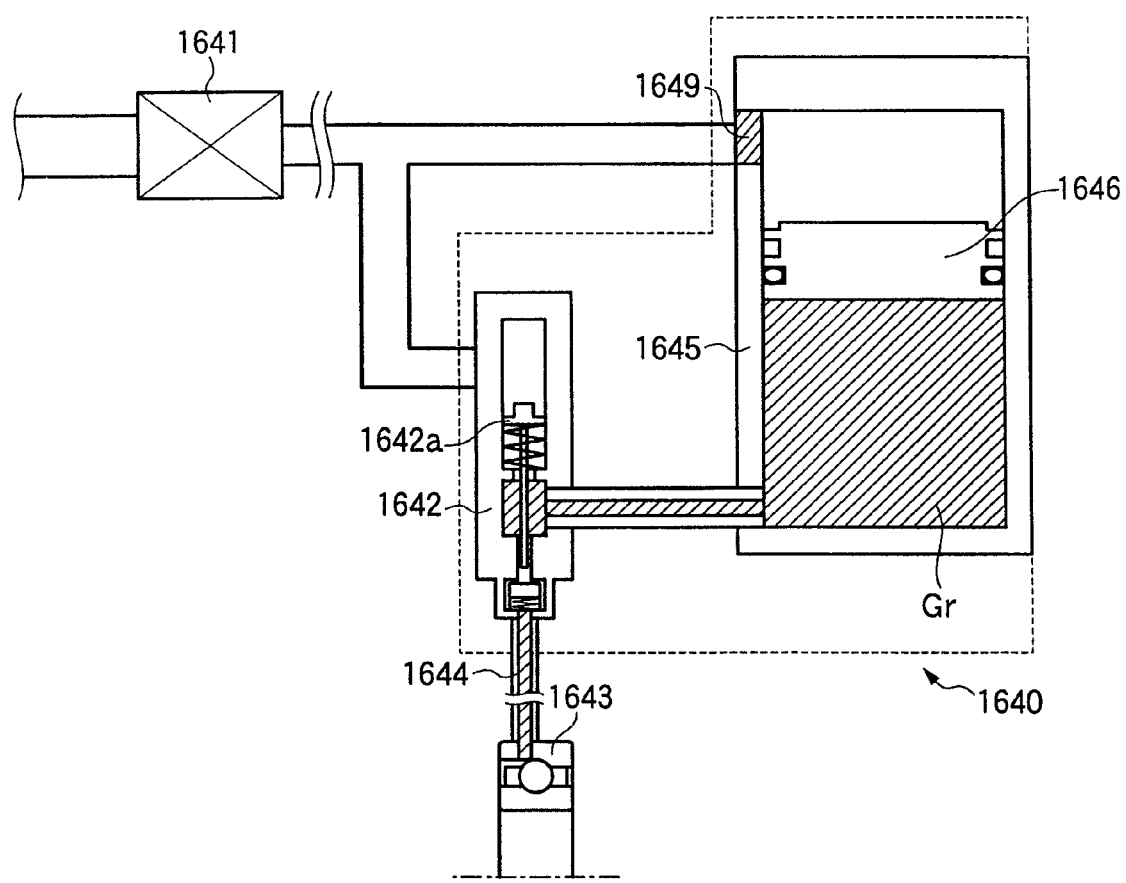
FIG. 113 is a configurative view of a grease supply system in the prior art.

FIG. 111 shows a spindle unit 1570 in a sixty-third embodiment to which the present invention is applied. In this spindle unit 1570, an exhaust hole 1571 is provided in the housing 1536. Also, a fluid inlet 1572 is provided to one end portion of the exhaust hole 1571 and a lubricant exhaust port 1573 is provided to the other end portion thereof.

This spindle unit 1570 has a function of executing the maintenance when another fluid is fed into the exhaust hole 1571 from the outside.

When the spindle unit 1570 can no longer store the lubricant therein after such spindle unit is operated continuously for a predetermined period and the lubricant is filled in the lubricant storage spaces 1537 and the exhaust hole 1571, the maintenance is needed.

At this time, when the fluid is fed from the fluid inlet 1572, the lubricant stored in the interiors of the angular contact ball bearing 1532, the lubricant storage spaces 1537, and the exhaust hole 1571 is washed away and then exhausted from the lubricant exhaust port 1573.

The fluid inlet 1572 and the lubricant exhaust port 1573 may be positioned inversely, and the fluid may be supplied from both ports and the lubricant may be exhausted from both ports. In case the old lubricant is exhausted and then the new lubricant is supplied from the external unit, the original lubricating performance can be exhibited unless the spindle unit 1570 is exploded and reassembled.

If a lubricant supplying function provided originally to the spindle unit 1570 is used to supply the lubricant from the outside, the maintenance can be done more easily. Also, the supply system for the maintenance may be used.

As an example of the fluid used in the maintenance, there are the compressed air, the cleaning agent, the oil, and the like, and their combination.

FIG. 112 gives a comparison of results that were obtained by operating the bearing continuously while supplying the lubricant, in the present invention and the prior art. In the present invention, the abnormal temperature rise was not caused unlike the prior art and also a residual amount of the lubricant in the angular contact ball bearing 1532 took a proper value.

Here, the test conditions in FIG. 112(a) are given in FIG. 112(b).

As described above, according to the present invention, the lubricant supplied into the inside of the bearing adheres onto the rolling elements, which are arranged in vicinity of the bearing, and then is sprung out to the outside of the bearing by the rotating force of the rolling elements. Thus, the lubricant is exhausted forcedly and continuously to the outside of the bearing. The present invention is effective for both the grease and the oil as the lubricant, and has an action of suppressing the heat generation by reducing the churning resistance.

In addition, the lubricant storage space for storing the exhausted lubricant is provided in the housing in the outer circumferential direction of the rolling element. Therefore, the lubricant that was sprung out by the rolling element can easily enter into the storage space and also the storage space volume can be increased.

Also, since a magnitude of the rotating force to spring out the lubricant is changed in response to the number of revolution of the spindle, a supply amount of lubricant can be reduced and also an exhaust amount of lubricant can be suppressed in the low speed running. Therefore, the proper lubricant supply that is adapted to the number of revolution can be carried out.

When the storage space is filled with the lubricant, such lubricant must be exhausted to the outside of the bearing unit. In this case, according to the present invention, the lubricant can be exhausted completely by pouring the fluid into the exhaust hole, which is coupled to the storage space provided in the housing, from the outside. Therefore, the maintenance can be done easily.

In this case, the grease supply system in the above embodiment is used mainly to lubricate the rolling bearing used in the spindle unit with the grease. But the grease supply system of the present invention is not limited to the spindle unit, and may be used to lubricate the rolling bearing used in other apparatuses.

The present invention is explained in detail with reference to particular embodiments. But it is apparent for the person skilled in the art that various variations and modifications may be applied without departing from a spirit and a scope of the present invention.

This application was filed based on
Japanese Patent Application (Patent Application No. 2002-220015) filed on Jul. 29, 2002,
Japanese Patent Application (Patent Application No. 2002-226233) filed on Aug. 2, 2002,
Japanese Patent Application (Patent Application No. 2002-253082) filed on Aug. 30, 2002,
Japanese Patent Application (Patent Application No. 2003-070338) filed on Mar. 14, 2003,
Japanese Patent Application (Patent Application No. 2003-110788) filed on Apr. 15, 2003,
Japanese Patent Application (Patent Application No. 2003-110789) filed on Apr. 15, 2003,
Japanese Patent Application (Patent Application No. 2003-113421) filed on Apr. 17, 2003,
Japanese Patent Application (Patent Application No. 2003-122551) filed on Apr. 25, 2003,
Japanese Patent Application (Patent Application No. 2003-270786) filed on Jul. 3, 2003,
Japanese Patent Application (Patent Application No. 2003-274546) filed on Jul. 15, 2003,
Japanese Patent Application (Patent Application No. 2003-279135) filed on Jul. 24, 2003,
Japanese Patent Application (Patent Application No. 2003-279306) filed on Jul. 24, 2003,
Japanese Patent Application (Patent Application No. 2003-279345) filed on Jul. 24, 2003, and
Japanese Patent Application (Patent Application No. 2003-280365) filed on Jul. 25, 2003,
, and the contents thereof are incorporated herein by the reference.

INDUSTRIAL APPLICABILITY

The rolling bearing, the grease supply system, the spindle unit, the grease supply method, and the grease supply program, capable of making the high-speed operation possible in the lubricant supply, particularly in the grease supply, and also enhancing the lifetime of the bearing, can be provided.

The invention claimed is:

1. A spindle unit of a machine tool, the spindle unit comprising:
a rolling bearing including an outer ring having an outer ring raceway groove on an inner peripheral surface, an inner ring having an inner ring raceway groove on an outer peripheral surface, and a plurality of balls provided rollably between the outer ring raceway groove and the inner ring raceway groove and having a contact angle of more than zero degrees, the inner ring being fitted onto a spindle of the machine tool whereby the spindle is borne rotatably in a housing; and
a grease supply system for supplying a grease to an inside of the rolling bearing during a rotation of the spindle;
wherein the grease supply system supplies the grease such that a supply amount of the grease in one shot is set to 0.004 cc to 0.1 cc to prevent a temperature pulsation of the rolling bearing, the temperature pulsation being a transitory increase of a temperature of the rolling bearing,
wherein the grease supply system contains a supply hole provided in the outer ring, the supply hole extending in a radial direction of the rolling bearing and having a diameter of 0.1 mm to 5 mm,
wherein the outer ring raceway groove comprises a contact portion that contacts the balls, a maximum diameter portion having a maximum diameter of the outer ring raceway groove in the radial direction, and a reduced diameter portion having a smaller diameter than the maximum diameter portion, the reduced diameter portion being formed on a side opposite to the contact portion with respect to the maximum diameter portion in an axial direction of the rolling bearing, and
wherein the supply hole is opened at a location on a portion of the inner peripheral surface of the outer ring other than the outer ring raceway groove such that an outlet of the supply hole overlaps a portion of the plurality of balls in the radial direction of the rolling bearing, said location being opposite to the contact portion with respect to the maximum diameter portion in the axial direction, and said location being adjacent to the reduced diameter portion of the outer ring raceway groove.

2. A spindle unit according to claim 1, wherein the supply hole communicates with a grease supply path formed in the housing.

3. The spindle unit according to claim 1, wherein said location where the supply hole is opened is on a counterbored side of the outer ring.

4. A method for supplying grease to a rolling bearing of a spindle unit of a machine tool, the method comprising:
providing a rolling bearing including an outer ring having an outer ring raceway groove on an inner peripheral surface, an inner ring having an inner ring raceway groove on an outer peripheral surface;
rollably providing a plurality of balls between the outer ring raceway groove and the inner ring raceway groove such that the plurality of balls has a contact angle of more than zero degrees, the inner ring being fitted onto a spindle of the machine tool whereby the spindle is borne rotatably in a housing; and
supplying the grease to an inside of the rolling bearing during a rotation of the spindle, where a supply amount of the grease in one shot is set to 0.004 cc to 0.1 cc to prevent a temperature pulsation of the rolling bearing, the temperature pulsation being a transitory increase of a temperature of the rolling bearing, wherein the grease is supplied via a supply hole provided in the outer ring, the supply hole extending in a radial direction of the rolling bearing and having a diameter of 0.1 mm to 5 mm, wherein the outer ring raceway groove comprises a contact portion that contacts the balls, a maximum diameter portion having a maximum diameter of the outer ring raceway groove in the radial direction, and a reduced diameter portion having a smaller diameter than the maximum diameter portion, the reduced diameter portion being formed on a side opposite to the contact portion with respect to the maximum diameter portion in an axial direction of the rolling bearing, and wherein the supply hole is opened at a location on a portion of the inner peripheral surface of the outer ring other than the outer ring raceway groove such that an outlet of the supply hole overlaps a portion of the plurality of balls in the radial direction of the rolling bearing, said location being opposite to the contact portion with respect to the maximum diameter portion in the axial direction, ring and said location being adjacent to the reduced diameter portion of the outer ring raceway groove.

5. The method according to claim 4, wherein said location where the supply hole is opened is on a counterbored side of the outer ring.

* * * * *